(12) United States Patent
Li et al.

(10) Patent No.: US 11,544,019 B2
(45) Date of Patent: Jan. 3, 2023

(54) DATA SHARING METHOD, GRAPHICAL USER INTERFACE, ELECTRONIC DEVICE, AND SYSTEM

(71) Applicant: HUAWEI TECHNOLOGIES CO., LTD., Guangdong (CN)

(72) Inventors: Changzhu Li, Shenzhen (CN); Jiaxin Li, Shanghai (CN); Xiaodong Tian, Shenzhen (CN); Yu Tang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/274,898

(22) PCT Filed: Oct. 13, 2018

(86) PCT No.: PCT/CN2018/110169
§ 371 (c)(1),
(2) Date: Mar. 10, 2021

(87) PCT Pub. No.: WO2020/051968
PCT Pub. Date: Mar. 19, 2020

(65) Prior Publication Data
US 2021/0397390 A1 Dec. 23, 2021

(30) Foreign Application Priority Data
Sep. 11, 2018 (CN) .......................... 201811058363.5

(51) Int. Cl.
*G06F 3/12* (2006.01)
*G06F 3/04842* (2022.01)

(52) U.S. Cl.
CPC .......... *G06F 3/1226* (2013.01); *G06F 3/1204* (2013.01); *G06F 3/126* (2013.01); *G06F 3/1292* (2013.01); *G06F 3/04842* (2013.01)

(58) Field of Classification Search
None
See application file for complete search history.

(56) References Cited

U.S. PATENT DOCUMENTS

2012/0086652 A1* 4/2012 Kim ...................... G06F 3/1256
345/173
2012/0250072 A1* 10/2012 Miller ..................... G06F 3/017
358/1.15

(Continued)

FOREIGN PATENT DOCUMENTS

CN 102999251 A 3/2013
CN 103324408 A 9/2013

(Continued)

OTHER PUBLICATIONS

ITU-T H.264(Apr. 2017), Series H: Audiovisual and Multimedia Systems, Infrastructure of audiovisual services-Coding of moving video, Advanced video coding for generic audiovisual services, total 812 pages.

(Continued)

*Primary Examiner* — Frantz Bataille
(74) *Attorney, Agent, or Firm* — Womble Bond Dickinson (US) LLP

(57) ABSTRACT

This application relates to the field of mobile communications, and in particular, to a technical solution of sharing data with a nearby device by using a wireless communications technology. In a method for printing a photo, a mobile phone first selects a to-be-printed photo, then discovers a nearby device by using the foregoing related wireless communications technology, and displays the discovered device such as a printer or a projector on the mobile phone; and then a user performs a tap operation on the discovered printer, so that one-tap printing can be implemented. In this way, printing efficiency of an electronic device is improved, and user experience is also improved.

15 Claims, 108 Drawing Sheets

(56) References Cited

U.S. PATENT DOCUMENTS

| | | |
|---|---|---|
| 2013/0332855 A1 | 12/2013 | Roman et al. |
| 2014/0118776 A1 | 5/2014 | Lee |
| 2014/0365912 A1 | 12/2014 | Shaw et al. |
| 2015/0347200 A1 | 12/2015 | Fadel et al. |
| 2016/0231686 A1* | 8/2016 | Itoh .................. G03G 15/502 |
| 2017/0192727 A1* | 7/2017 | Yun .................. G06F 3/1217 |
| 2017/0274267 A1 | 9/2017 | Blahnik |

FOREIGN PATENT DOCUMENTS

| | | |
|---|---|---|
| CN | 103975634 A | 8/2014 |
| CN | 104094183 A | 10/2014 |
| CN | 104369552 A | 2/2015 |
| CN | 104750438 A | 7/2015 |
| CN | 104834489 A | 8/2015 |
| CN | 105224185 A | 1/2016 |
| CN | 105308634 A | 2/2016 |
| CN | 105763229 A | 7/2016 |
| CN | 106797566 A | 5/2017 |
| CN | 107808458 A | 3/2018 |
| CN | 108337458 A | 7/2018 |
| EP | 2637092 A2 | 9/2013 |

OTHER PUBLICATIONS

The Unofficial Applekeynotes Channel: "Apple WWDC 2013—iOS 7 Introduction", Jun. 11, 2013 (Jun. 11, 2013), XP055981801, 2 pages.

Jerad Hill Tech: "iPhone 6 Tips—How to Use the iOS Share Sheet," Jul. 2, 2015 (Jul. 2, 2015), XP055981800, 2 pages.

More: "iOS 7 AirDrop: Everything you need to know!, "Sep. 18, 2013 (Sep. 18, 2013), XP055981802, 2 pages.

Rolfe, Tom: "Share Sheet: Send Stuff To Your Contacts | iPad OS 15 Guide", Jun. 1, 2018 (Jun. 1, 2018), XP055981797, 5 pages.

Broida, Rick: "How to share your iPhone photos with AirDrop", May 5, 2015 (May 5, 2015), XP055981798, 3 pages.

Elliott, Matt: "Back up iPhone photos with new share sheet for Google Drive", Oct. 2, 2015 (Oct. 2, 2015), XP055981799, 3 pages.

\* cited by examiner

CONT. FROM FIG. 11A-1

CONT. FROM FIG. 11C-1

DATA SHARING METHOD, GRAPHICAL USER INTERFACE, ELECTRONIC DEVICE, AND SYSTEM

This application is a national stage of International Application No. PCT/CN2018/110169, filed on Oct. 13, 2018, which claims priority to Chinese Patent Application No. 201811058363.5, filed on Sep. 11, 2018. Both of the aforementioned applications are hereby incorporated by reference in their entireties.

TECHNICAL FIELD

This application relates to the field of mobile communications, and in particular, to a data sharing method, a graphical user interface, an electronic device, and a system.

BACKGROUND

With development of wireless communications technologies, electronic devices such as a smartphone and a tablet computer start to support a user in sharing data such as a picture and a document, thereby improving office efficiency and office experience of the user. For example, the user can print a picture and a document in a portable electronic device such as a smartphone without copying data in the portable electronic device such as the smartphone into a computer, and without using a data line to connect the portable electronic device such as the smartphone to a printer.

For example, the user can print data such as a picture in a portable electronic device such as a smartphone in the following several manners:

Existing manner 1: The user first needs to enter a setting interface to enable a default print service, search for a printer, and choose to connect to a found printer. Then, the user needs to install a printer application (APP) corresponding to the printer, open the app, select a picture in the app, and then select printing.

Existing manner 2: The user selects a photo from Gallery, taps a "More" button to open a menu, then selects a "Print or export to PDF" option in the menu to enter a page for printing or exporting to PDF, selects "Add a printer", enables "Default print service" to trigger searching for a printer, selects a found printer for connection, and selects printing after the connection succeeds.

It can be learned that in the foregoing two existing data sharing manners, the user needs to perform many complex operations. This greatly reduces use efficiency of the electronic device.

SUMMARY

An objective of the present disclouser is to provide a data sharing method, a graphical user interface (GUI), an electronic device, and a system, so that a process in which a user shares data by using an electronic device can be more intuitive, simple, and effective, and use efficiency of the electronic device can be greatly improved.

The foregoing objective and another objective may be achieved by using features in independent claims. Further implementations are reflected in the dependent claims, the specification, and the accompanying drawings.

According to a first aspect, a data sharing method is provided. The method may include: An electronic device may display a first graphical user interface, where one or more objects (such as a picture and a document) may be displayed in the first user interface; the electronic device may detect a first operation (for example, a user taps a picture by using a finger) of sharing a selected object, and in response to the first operation, the electronic device may display a second user interface, and discover a first device and a second device. The second user interface may be used to display one or more user options, one or more device options, and one or more service options, the device option corresponds to the first device discovered by the electronic device, and the user option corresponds to the second device discovered by the electronic device. The first device may include one or more of the following: a printer, a projector, a display, and the like. In the second user interface, the electronic device may detect a second operation (for example, the user taps a device option) performed on the device option, and the electronic device may trigger, in response to the second operation, the first device corresponding to the device option on which the second operation is performed to process the selected object, where the processing includes one or more of the following: printing, projection, displaying, and the like.

Herein, the first user interface may be a user interface that is of a first application and that is used to display an object. The first application may be "Gallery" displaying a picture, and an object displayed by the first application may be the picture. Alternatively, the first application may be "File browser" displaying a file, and an object displayed by the first application may be the file. Alternatively, the first application may be "Web page browser" displaying a web page, and an object displayed by the first application may be the web page. Alternatively, the first application may be an application displaying characters, and an object displayed by the first application may be the characters. This is not limited herein. Alternatively, the first application may be another application displaying an object such as a picture, a document, or characters.

According to the technical solution described in the first aspect, a printing process of printing the object such as the picture, the document, or the web page by using the electronic device, a projection process of performing projection by using the electronic device, a screen mirroring process of performing screen mirroring by using the electronic device, and the like can be more intuitive, simple, and effective for the user, and use efficiency of the electronic device is also improved.

According to the first aspect, in an embodiment, the device option displayed in the second user interface may include one or more of the following: a printer option, a projector option, a display option, and the like. The second operation may be specifically performed on the one or more of the device options. In response to the second operation, the electronic device may perform the following operation:

if the device option on which the second operation is performed is the printer option, triggering, by the electronic device, the printer corresponding to the printer option to print the selected object, so that the electronic device can quickly print the selected object by performing a simple operation, thereby greatly improving print efficiency of the electronic device such as a mobile phone; or if the device option on which the second operation is performed is the projector option, triggering, by the electronic device, the projector corresponding to the projector option to project the selected object, so that the electronic device (for example, a mobile phone) can quickly project the selected object by performing a simple and intuitive operation, thereby greatly improving projection efficiency of the mobile phone.

if the device option on which the second operation is performed is the display option, triggering, by the electronic device, the display corresponding to the display option to display the selected object in a screen mirroring manner, so that similarly, in this technical solution, efficiency of performing displaying in a screen mirroring manner by using the electronic device such as a mobile phone is also greatly improved.

In addition to the device options, another device option may be further displayed in the second user interface, for example, a media playback device option. The user can select, by using the another device option, a device corresponding to the another device option to process the selected object.

According to the first aspect, in an embodiment, in the second user interface, the electronic device may trigger, in response to a detected third operation performed on the service option, a process of sharing the selected object with a cloud contact or a server by using an application (for example, WeChat) or a protocol (for example, Bluetooth) corresponding to the service option.

According to the first aspect, in an embodiment, in the second user interface, the electronic device may trigger, in response to a detected fourth operation performed on the user option, a process of sending the selected object to the second device corresponding to the user option.

The following first describes an embodiment of the second user interface (namely, a "moment share interface" mentioned in subsequent embodiments) in the first aspect.

In an embodiment, the second user interface may include a first area, a second area, and a third area. The first area may be used to display one or more selected objects. Certainly, the first area may alternatively display one or more unselected objects. The second area may be used to display the one or more service options. The third area may be used to display the one or more user options and the one or more device options.

The device option may include a nearby device option and/or a cloud device option. The nearby device option may correspond to a nearby first device discovered by the electronic device, and the cloud device option may correspond to a cloud first device discovered by the electronic device. To be specific, in an embodiment, the electronic device may discover a nearby device and a cloud device, and may display both the discovered nearby device and the discovered cloud device, so that the user can more intuitively select a device processing a selected object. Certainly, if the electronic device discovers only a nearby device but does not discover a cloud device, the electronic device may display only the nearby device discovered by the electronic device.

The third area is specifically implemented as follows:

In an embodiment, when a first communications service (namely, "Moment share" mentioned in subsequent implementations) is not enabled, a first interactive element may be displayed in the third area, and the first interactive element is used to listen to an operation of enabling the first communications service. The operation may be referred to as a fifth operation. The electronic device may enable the first communications service in response to the fifth operation. The first communications service may be used by the electronic device to discover the first device and the second device by using one or more of a WLAN, Bluetooth, and a cellular network.

In an embodiment, the electronic device may refresh the third area after enabling the first communications service, where one or more of the user option and the device option are displayed in the refreshed third area; and the user option corresponds to a second device discovered by the electronic device by using the first communications service, and the device option corresponds to a first device discovered by the electronic device by using the first communications service.

In an embodiment, when one or more cloud device options discovered by the electronic device are displayed in the third area, the electronic device may further display, in the third area, location information of cloud first devices corresponding to the one or more cloud device options, so that the user can learn of the location information of the cloud first device corresponding to the cloud device option, to help select a proper cloud device option.

In an embodiment, the second user interface may include a first area, a second area, a third area, and a fourth area, the first area may be used to display one or more selected objects, the second area may be used to display the one or more service options, the third area may be used to display the one or more nearby device options and user options, and the fourth area may be used to display the one or more cloud device options.

The user option may include one or more of the following: a nearby user option and a cloud user option. The nearby user option may correspond to a nearby second device discovered by the electronic device, and the cloud user option may correspond to a cloud second device discovered by the electronic device.

The third area is specifically implemented as follows:

In an embodiment, when a second communications service (namely, "local moment share" mentioned in subsequent embodiments) is not enabled, a second interactive element may be displayed in the third area, and the second interactive element is used to listen to an operation of enabling the second communications service. The operation may be referred to as a sixth operation. The electronic device may enable the second communications service in response to the sixth operation. The second communications service may be used by the electronic device to discover the nearby first device and the nearby second device by using one or more of a WLAN and Bluetooth.

In an embodiment, the electronic device may refresh the third area after enabling the second communications service, where one or more of the nearby user option and the nearby device option are displayed in the refreshed third area; and the nearby device option corresponds to a nearby first device discovered by the electronic device by using the second communications service, and the nearby user option corresponds to a nearby second device discovered by the electronic device by using the second communications service.

The fourth area is specifically implemented as follows:

In an embodiment, when a third communications service (namely, "cloud moment share" mentioned in subsequent embodiments) is not enabled, a third interactive element may be displayed in the fourth area, and the third interactive element is used to listen to an operation of enabling the third communications service. The operation may be referred to as a seventh operation. The electronic device may enable the third communications service in response to the seventh operation. The third communications service may be used by the electronic device to discover the cloud first device and the cloud second device by using one or more technologies such as a WLAN or a cellular network.

In an embodiment, the electronic device may refresh the fourth area after enabling the third communications service, where one or more of the cloud user option and the cloud device option are displayed in the refreshed fourth area; and the cloud device option corresponds to a cloud first device discovered by the electronic device by using the second communications service, and the cloud user option corresponds to a cloud second device discovered by the electronic device by using the second communications service.

In an embodiment, when the device option displayed in the fourth area includes the cloud device option, the electronic device may further display, in the fourth area, location information of the cloud first device corresponding to the cloud device option.

The following further describes a specific manner of responding to the second operation by the electronic device in the first aspect.

In an embodiment, if the device option on which the second operation is performed is the printer option, before the triggering the printer corresponding to the printer option to print the selected object, the electronic device displays, in response to the second operation, a user interface used to perform a print setting on the selected object, where the print setting includes one or more of the following: a quantity of to-be-printed copies, a paper size, a print color, and the like.

To be specific, when the user triggers printing, the user interface used by the user to perform the print setting may be provided, so that the user performs the print setting, for example, sets the quantity of to-be-printed copies, the paper size, and the print color. In this way, the electronic device can provide personalized selection that meets different user requirements for a print service, thereby improving user experience.

In an embodiment, if the device option on which the second operation is performed is the printer option, in response to the second operation, the electronic device may trigger the printer corresponding to the printer option to print the selected object.

To be specific, during triggering of printing, a print service based on a default print setting may be provided, and the user may not need to perform a print setting. This simplifies an operation of printing a file by using the electronic device, and improves print efficiency of the electronic device.

In an embodiment, if the device option on which the second operation is performed is the printer option, before the triggering the printer corresponding to the printer option to print the selected object, the electronic device displays, in response to the second operation, a user interface used to pay a print fee, where a fee for printing the selected object is determined based on the print setting corresponding to the selected object. The print setting corresponding to the selected object may be a default print setting, or may be selected by the user in the user interface used to perform the print setting on the selected object. In this way, the user is prevented from frequently performing printing by using the electronic device, and security of the printer is also ensured, by performing authentication (for example, paying the print fee).

In an embodiment, if the device option on which the second operation is performed is the printer option, the electronic device may display a first notification window in response to the second operation, where prompt information used to indicate a print status of printing the selected object by the printer may be displayed in the first notification window. In this way, the user can be conveniently and intuitively prompted with a current print progress, thereby improving user experience.

The following describes embodiments of the first notification window.

In an embodiment, the first notification window may be displayed in one or more of the following user interfaces: a home screen, the first user interface, the second user interface, or a lock screen.

The prompt information in the first notification window may be specifically used to indicate the state in which the printer selected in the second operation prints the selected object, and the state may include one or more of the following:

a first print state, used to indicate that the selected object is waiting in a queue to be processed by the printer selected in the second operation;

a second print state, used to indicate that the printer selected in the second operation is printing the selected object;

a third print state, used to indicate that printing of the selected object is complete; and a fourth print state, used to indicate that the selected object fails to be printed.

The second print state may be specifically used to indicate a print progress in which the printer selected in the second operation is printing the selected object.

In an embodiment, if the first device corresponding to the device option on which the second operation is performed is a nearby printer discovered by the electronic device, an interactive element used to listen to an operation used to trigger the printer selected in the second operation to make a sound may be further displayed in the first notification window. In this way, it may be convenient for the user to trigger the printer to make the sound, so that a location of the printer is found based on the sound, thereby improving user experience.

In an embodiment, if the first device corresponding to the device option on which the second operation is performed is a cloud printer discovered by the electronic device, prompt information used to indicate a location of the cloud printer selected in the second operation may be further displayed in the first notification window. An interactive element used to listen to an operation of opening a navigation interface may be further displayed in the first notification window. The electronic device may display, in response to a detected operation performed on the sixth interactive element, a user interface used to navigate a user's way to the location of the cloud printer selected in the second operation. In this way, the user can learn of the location of the selected cloud printer, and can conveniently open a navigation interface used to go to the location, thereby improving user experience.

According to a second aspect, a picture printing method is provided. The method may specifically include:

displaying a graphical user interface of a first app such as Photos or Gallery on a touchscreen of an electronic device, where the GUI may include one or more pictures, a first picture, one or more videos, and the like;

receiving, by the electronic device, a selection operation performed by a user on the first picture;

displaying, on the touchscreen of the electronic device in response to the selection operation, a control used to share a picture;

detecting, by the electronic device, an operation performed on the control;

displaying, on the touchscreen of the electronic device in response to the operation, a GUI used to share a picture, where the GUI may include a first area, a second area, and a third area; a picture (including the selected first picture) in the first app is displayed in the first area; one or more pieces of service identification information such as an icon for sharing a photo by using WeChat and an icon for sharing a picture by using Bluetooth are displayed in the second area; and a control used to discover a nearby device is displayed in the second area;

detecting, by the electronic device, an operation performed on the control used to discover the nearby device;

in response to the operation, discovering, by the electronic device, the nearby device by using various short-range wireless communications technologies, and displaying device identification information (for example, a device icon) of the discovered nearby device in the third area, where specifically, user identification information such as a contact avatar and device identification information such as a printer icon that are of the discovered nearby device are displayed in the third area;

detecting, by the electronic device, an operation performed on the printer icon;

displaying, on the touchscreen in response to the operation, a graphical user interface used to perform a print setting, where the graphical user interface includes a control used to indicate a printer to perform a job;

detecting, by the electronic device, an operation performed on the control; and in response to the operation, displaying a home screen on the touchscreen, and displaying a window on the home screen in a superimposition manner, where the window is used to prompt the user with a print status of printing the first picture by the printer, for example, a print state indicating that the printer is printing the first picture or a print state indicating that printing of the first picture is complete.

According to a third aspect, a picture printing method is provided. The method may specifically include:

displaying a graphical user interface of a first app such as Photos or Gallery on a touchscreen of an electronic device, where the GUI may include a first picture and a first video;

receiving, by the electronic device, a selection operation performed by a user on the first picture and the first video;

displaying, on the touchscreen in response to the selection operation, a control used to share data;

detecting, by the electronic device, an operation performed on the control;

displaying, on the touchscreen in response to the operation, a GUI used to share data, where the GUI may include a first area, a second area, and a third area; the selected first picture and the selected first video are displayed in the first area; one or more pieces of service identification information such as an icon for sharing a photo by using WeChat and an icon for sharing a picture by using Bluetooth are displayed in the second area; and a control used to discover a nearby device is displayed in the second area;

detecting, by the electronic device, an operation performed on the control used to discover the nearby device;

in response to the operation, discovering, by the electronic device, the nearby device by using a short-range wireless communications technology, and displaying device identification information (for example, a device icon) of the discovered nearby device in the third area, where specifically, user identification information such as a contact avatar and device identification information such as a printer icon and a projector icon that are of the discovered nearby device are displayed in the third area;

detecting, by the electronic device, a first drag gesture performed on the first picture, where the drag gesture is used to move the first picture and display the first picture on the printer icon in a superimposition manner;

sending, by the electronic device in response to the drag gesture, a print instruction to a printer represented by the printer icon;

displaying an updated printer icon in response to response information of the printer, for example, presenting the printer icon in a printing state;

detecting, by the electronic device, a second drag gesture performed on the first video, where the second drag gesture is used to move the first video and display the first video on the projector icon in a superimposition manner;

sending, by the electronic device in response to the second drag gesture, a projection instruction to a projector represented by the projector icon; and displaying an updated projector icon in response to response information of the projector, for example, presenting the projector icon in a projecting state.

According to a fourth aspect, a graphical user interface on an electronic device is provided. The electronic device may include a display screen, a touch sensor, a memory, and one or more processors. The one or more processors are configured to execute one or more computer programs stored in the memory. The graphical user interface may include: displaying a first graphical user interface, where one or more objects (such as a picture and a document) may be displayed in the first user interface; and displaying a second user interface in response to a detected first operation of sharing a selected object. The second user interface may be used to display one or more user options, one or more device options, and one or more service options, the device option corresponds to a first device discovered by the electronic device, and the user option corresponds to a second device discovered by the electronic device; and the first device includes one or more of the following: a printer, a projector, and a display. In the second user interface, the electronic device may detect a second operation performed on the device option, and the electronic device may trigger, in response to the second operation, the first device corresponding to the device option on which the second operation is performed to process the selected object, where the processing includes one or more of the following: printing, projection, and displaying.

Herein, the first user interface may be a user interface that is of a first application and that is used to display an object. The first application may be "Gallery" displaying a picture, and an object displayed by the first application may be the picture. Alternatively, the first application may be "File browser" displaying a file, and an object displayed by the first application may be the file. Alternatively, the first application may be "Web page browser" displaying a web page, and an object displayed by the first application may be the web page. Alternatively, the first application may be an application displaying characters, and an object displayed by the first application may be the characters. This is not limited herein. Alternatively, the first application may be another application displaying an object such as a picture, a document, or characters.

According to the fourth aspect, in an embodiment, in the second user interface, the electronic device may trigger, in response to a detected third operation performed on the service option, a process of sharing the selected object with a cloud contact or a server by using an application or a protocol corresponding to the service option on which the third operation is performed.

According to the fourth aspect, in an embodiment, in the second user interface, the electronic device may trigger, in response to a detected fourth operation performed on the user option, a process of sending the selected object to the second device corresponding to the user option on which the fourth operation is performed.

According to the fourth aspect, in an embodiment, if consumables of the printer discovered by the electronic device are used up, in response to a detected operation (for example, a double-tap operation performed by a user on a printer icon) performed on a printer option corresponding to the printer, the electronic device may jump to and display a user interface used by the user to purchase the consumables of the printer, where the user interface may be an interface of a shopping application (for example, Taobao). In this way, it may be convenient for the user to purchase the consumables of the printer. This is simple and convenient. According to the fourth aspect, in an embodiment, in response to a detected operation performed on the printer option, prompt information used to prompt the user with a print state of a selected picture may be displayed in a third area in the second user interface, and the prompt information may be progress information displayed on a ring progress bar around the printer icon. The progress information displayed on the ring progress bar may be used to prompt the user with print states, for example, "Print task is queuing . . . ", "Printing . . . ", and "Printing is completed".

According to the fourth aspect, in an embodiment, in response to a detected operation performed on the printer option, only the printer corresponding to the printer option and a state in which the printer prints the selected object, for example, a print progress may be displayed in the third area in the second user interface. After the printer prints the selected object, a device option corresponding to each first device discovered by the electronic device may be redisplayed in the third area, or the first user interface may be displayed in the third area.

For an embodiment of the second user interface in the fourth aspect, refer to the embodiment of the second user interface in the first aspect. Details are not described herein again.

For a specific manner of responding to the second operation by the graphical user interface in the fourth aspect, refer to the specific manner of responding to the second operation in the first aspect. Details are not described herein again.

According to a fifth aspect, an electronic device is further provided. The electronic device may include a display screen, a touch sensor, a wireless communications module, a memory, and one or more processors. The one or more processors are configured to execute one or more computer programs stored in the memory.

The display screen may be configured to display a first graphical user interface, where one or more objects (such as a picture and a document) may be displayed in the first user interface.

The touch sensor may be configured to detect a first operation of sharing a selected object.

The display screen may be configured to display a second user interface in response to a first operation.

The wireless communications module may be configured to discover a first device and a second device.

The touch sensor may be configured to detect, in the second user interface, a second operation performed on a device option.

The processor may be configured to trigger, in response to the second operation, the first device corresponding to the device option on which the second operation is performed to process the selected object, where the processing includes one or more of the following: printing, projection, and displaying.

The second user interface may be used to display one or more user options, one or more device options, and one or more service options, the device option corresponds to the first device discovered by the electronic device, and the user option corresponds to the second device discovered by the electronic device. The first device includes one or more of the following: a printer, a projector, and a display.

According to the fifth aspect, in an embodiment, the wireless communications module may include one or more of the following: a Bluetooth module, a WLAN module, and a cellular mobile communications module.

For an embodiment of the second user interface in the fifth aspect, refer to an embodiment of the second user interface in the first aspect. Details are not described herein again.

For a specific manner of responding to the second operation by the components included in the electronic device in the fifth aspect, refer to the specific manner of responding to the second operation in the first aspect. Details are not described herein again.

According to a sixth aspect, an electronic device is further provided. The electronic device may include an apparatus, and the apparatus may implement any possible embodiment of the first aspect, any possible embodiment of the second aspect, any possible embodiment of the third aspect, or any possible embodiment of the fourth aspect.

According to a seventh aspect, a data sharing apparatus is further provided. The apparatus has a function of implementing actual behavior of the electronic device in the foregoing method embodiments. The function may be implemented by hardware, or may be implemented by hardware executing corresponding software. The hardware or the software includes one or more modules corresponding to the function.

According to an eighth aspect, a computer device is provided, and includes a memory, a processor, and a computer program that is stored in the memory and that can be run on the processor. When the processor executes the computer program, the computer device is enabled to implement any possible embodiment of the first aspect, any possible embodiment of the second aspect, any possible embodiment of the third aspect, or any possible embodiment of the fourth aspect.

According to a ninth aspect, a computer program product including an instruction is provided. When the computer program product is run on an electronic device, the electronic device is enabled to perform any possible embodiment of the first aspect, any possible embodiment of the second aspect, any possible embodiment of the third aspect, or any possible embodiment of the fourth aspect.

According to a tenth aspect, a computer readable storage medium is provided, and includes an instruction. When the instruction is run on an electronic device, the electronic device is enabled to perform any possible embodiment of the first aspect, any possible embodiment of the second aspect, any possible embodiment of the third aspect, or any possible embodiment of the fourth aspect.

According to an eleventh aspect, a communications system is provided. The communications system may include an electronic device, and may further include one or more of a printer, a projector, and a display. The electronic device may perform any possible embodiment of the first aspect, any possible embodiment of the second aspect, any possible embodiment of the third aspect, or any possible embodiment of the fourth aspect.

It should be understood that in the specification, descriptions about technical features, technical solutions, advantages, or similar words do not imply that all features and advantages can be implemented in any single embodiment. On the contrary, it can be understood that the descriptions about features or advantages mean that at least one embodiment includes particular technical features, technical solutions, or advantages. Therefore, in the specification, the descriptions about technical features, technical solutions, or advantages are not necessarily included in a same embodiment. In addition, technical features, technical solutions, and advantages described in the following embodiments may be further combined in any appropriate manner. One of ordinary skilled in the art understands that an embodiment can be implemented without one or more particular technical features, technical solutions, or advantages in a particular embodiment. In other embodiments, additional technical features and advantages may be further identified in a particular embodiment that does not reflect all the embodiments.

BRIEF DESCRIPTION OF DRAWINGS

FIG. 11A-1 and FIG. 11A-2 to FIG. 11D-1 and FIG. 11D-2 show a series of user interfaces of a notification window according to an embodiment;

FIG. 12 to FIG. 16A and FIG. 16B show a series of user interfaces of a related embodiment of a notification window according to an embodiment;

FIG. 17A and FIG. 17B-1 and FIG. 17B-2 show a series of user interfaces indicating a printer according to an embodiment;

FIG. 25B-1 and FIG. 25B-2 are a schematic flowchart of a data sharing method according to an embodiment;

FIG. 26B-1 and FIG. 26B-2 are a schematic flowchart of a data sharing method according to another embodiment;

FIG. 27A-1 and FIG. 27A-2 are a schematic architectural diagram of a communications system according to another embodiment; and FIG. 27B-1 and FIG. 27B-2 are a schematic flowchart of a data sharing method according to another embodiment.

DESCRIPTION OF EMBODIMENTS

Figure 1A:
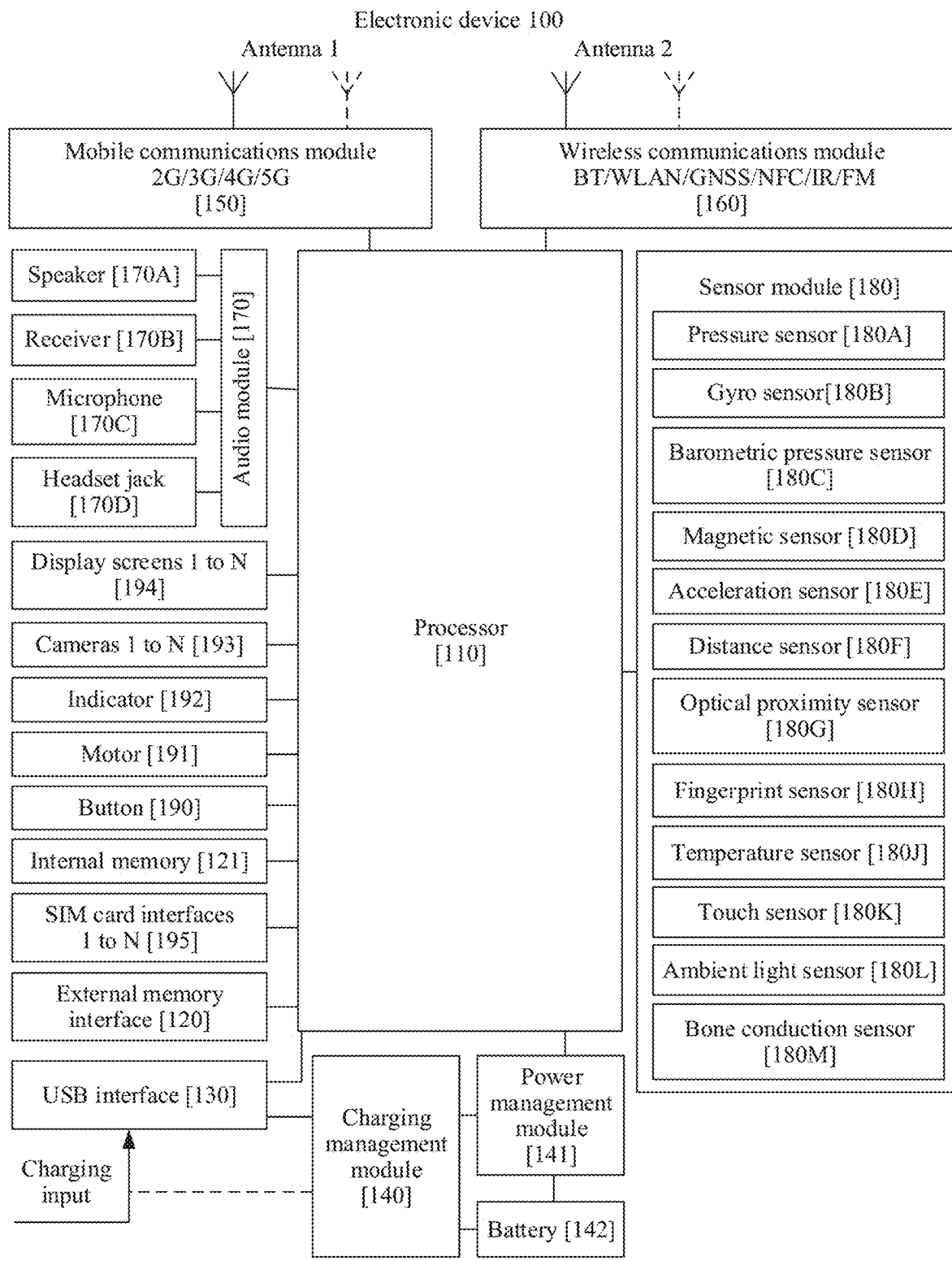
FIG. 1A is a schematic diagram of a structure of an electronic device according to an embodiment.

Terms used in the following embodiments of this application are merely intended to describe specific embodiments, but are not intended to limit this application. The terms "one", "a", and "this" of singular forms used in this specification and the appended claims of this application are also intended to include plural forms, unless otherwise specified in the context clearly. It should also be understood that the term "and/or" used in this application indicates and includes any or all possible combinations of one or more listed items.

The following describes an electronic device, a user interface used for such an electronic device, and embodiments used for using such an electronic device. In some embodiments, the electronic device may be a portable electronic device that further includes other functions such as a personal digital assistant function and/or a music player function, for example, a mobile phone, a tablet computer, or a wearable electronic device (for example, a smartwatch) having a wireless communication function. An example embodiment of the portable electronic device includes but is not limited to a portable electronic device using iOS®, Android®, Microsoft®, or another operating system. The portable electronic device may alternatively be another portable electronic device, for example, a laptop computer having a touch-sensitive surface or a touch panel. It should be further understood that in some other embodiments, the electronic device may not be a portable electronic device, but a desktop computer having a touch-sensitive surface or a touch panel.

The term "user interface (user interface, UI)" in the specification, claims, and accompanying drawings of this application is a medium interface for interaction and information exchange between an application or an operating system and a user, and implements conversion between an internal form of information and a form that can be accepted by the user. A user interface of an application is source code written in a specific computer language such as Java or an extensible markup language (XML). The interface source code is parsed and rendered on the terminal device, and is finally presented as content that can be identified by a user, for example, a control such as a picture, a text, or a button. The control is also referred to as a widget, and is a basic element of the user interface. Typical controls include a toolbar, a menu bar, a text box, a button, a scrollbar, a picture, and a text. An attribute and content of a control in an interface are defined by using a tag or a node. For example, the XML defines, by using the node such as <Textview>, <ImgView>, or <VideoView>, the control included in the interface. Anode corresponds to a control or an attribute in an interface. After being parsed and rendered, the node is presented as content visible for a user. In addition, interfaces of a plurality of applications such as a hybrid application usually further include a web page. The web page, also referred to as a page, may be understood as a special control embedded in an application interface. The web page is source code written in a specific computer language, for example, a hypertext markup language (HTML), a cascading style sheet (CSS), or JavaScript (JS). A browser or a web page display component whose function is similar to that of a browser may load and display the web page source code as content that can be identified by the user. Specific content included in the web page is also defined by using a label or a node in the web page source code. For example, the HTML defines an element and an attribute of the web page by using <p>, <img>, <video>, or <canvas>.

The user interface is usually in a representation form of a graphical user interface (GUI), which is a user interface that is related to a computer operation and that is displayed in a graphical manner. The user interface may be an interface element such as an icon, a window, or a control displayed on a display screen of the electronic device, and the control may include a visual interface element such as an icon, a button, a menu, a tab, a text box, a dialog box, a status bar, a navigation bar, or a widget.

The following embodiments of this application provide a data sharing method, a graphical user interface, an electronic device, and a system, so that a printing process of printing an object such as a picture, a document, or a web page by using the electronic device, a projection process of performing projection by using the electronic device, a screen mirroring process of performing screen mirroring by using the electronic device, and the like are more intuitive, simple, and effective for a user, and use efficiency of the electronic device is improved.

In the following embodiments of this application, if "Moment share" of an electronic device such as a smartphone is enabled, when the electronic device identifies a scenario in which a user shares an object such as a picture, a document, or a web page, the electronic device may automatically discover another device such as a printer, a projector, a display, a mobile phone, or a tablet computer. If the user expects to print data, the user may select the printer discovered by the electronic device for printing. Therefore, an operation is simple and effective. Similarly, a projection process of performing projection by using the electronic device, a screen mirroring process of performing screen mirroring by using the electronic device, and the like are also more intuitive, simple, and effective for the user.

In the following embodiments of this application, "Moment share" may be a service or a function provided by the electronic device, and may be used to support the electronic device in transmitting data to another device. In some embodiments, "Moment share" may be used to support the electronic device in transmitting data to a nearby device by using one or more technologies such as Bluetooth, wireless fidelity direct (Wi-Fi direct), and a Wi-Fi software access point (SoftAP). In some other embodiments, "Moment share" may be used to support the electronic device in transmitting, through a local area network (LAN), data to a device (for example, another electronic device) that is located in a same local area network as the electronic device. In some embodiments of this application, a device that is located in a same local area network as the electronic device may alternatively be a device near the electronic device. In some embodiments, "Moment share" may be used to support the electronic device in transmitting, by using a cellular mobile communications technology such as 3G, LTE, or 5G or a wide area network (WAN) technology, data to a cloud device that can be accessed by the electronic device. It may be understood that the nearby device and the cloud device are merely relative concepts. The cloud device is a device discovered by the electronic device by using a cellular mobile communications technology or a wide area network communications technology. The nearby device is a device discovered by the electronic device by using one or more technologies such as Bluetooth, Wi-Fi direct (such as Wi-Fi P2P), Wi-Fi SoftAP, and a Wi-Fi LAN.

In this application, enabling "Moment share" may include enabling one or more of a Bluetooth module, a WLAN module, and a mobile communications module of the electronic device. In some embodiments, after enabling the foregoing function, the electronic device may discover a device near the electronic device by using one or more technologies such as Bluetooth, Wi-Fi direct (such as Wi-Fi P2P), Wi-Fi SoftAP, and a Wi-Fi LAN. In some other embodiments, after enabling the foregoing function, the electronic device may discover a cloud device by using a cellular mobile communications network technology or a wide area network technology. For an embodiment of discovering the cloud device, in some embodiments, after the electronic device is connected to a server in a network, the server may provide the electronic device with a device list of another device connected to the server, so that the electronic device can discover the another device, and the another device may be the cloud device discovered by the electronic device.

It may be understood that "即时分享" or "Moment share" is merely a word used in the embodiments, a meaning represented by the word has been recorded in the embodiments, and a name of the word does not constitute any limitation on the embodiments. In addition, in some other embodiments of this application, "Moment share" may also be referred to as another noun such as "Short-distance share". Similarly, "Moment share" mentioned in the embodiments of this application may also be referred to as another name such as "Shoot share" in some other embodiments.

An example electronic device 100 provided in the following embodiments of this application is first described.

FIG. 1A is a schematic diagram of a structure of an electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in an embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent devices, or may be integrated into one or more processors. In some embodiments, the electronic device 100 may alternatively include one or more processors 110.

The controller may be a nerve center and a command center of the electronic device 100. The controller may generate an operation control signal based on instruction operation code and a time sequence signal, to complete control of instruction fetching and instruction execution.

The memory may be further disposed in the processor 110, and is configured to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110, thereby improving efficiency of the electronic device 100.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like by using different I2C bus interfaces. For example, the processor 110 may be coupled to the touch sensor 180K by using the I2C interface, so that the processor 110 communicates with the touch sensor 180K by using the I2C bus interface to implement a touch function of the electronic device 100.

The I2S interface may be configured to perform audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communications module 160 by using the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 by using a PCM bus interface. In some embodiments, the audio module 170 may also transmit an audio signal to the wireless communications module 160 by using the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transmit an audio signal to the wireless communications module 160 by using the UART interface, to implement a function of playing music by using a Bluetooth headset.

The MIPI interface may be configured to connect the processor 110 to a peripheral component such as the display screen 194 or the camera 193. The MIPI interface includes a camera serial interface (CSI), a display serial interface (DSI), and the like. In some embodiments, the processor 110 communicates with the camera 193 by using the CSI interface, to implement a photographing function of the electronic device 100. The processor 110 communicates with the display screen 194 by using the DSI interface, to implement a display function of the electronic device 100.

The GPIO interface may be configured by software. The GPIO interface may be configured as a control signal, or may be configured as a data signal. In some embodiments, the GPIO interface may be configured to connect the processor 110 to the camera 193, the display screen 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to perform data transmission between the electronic device 100 and a peripheral device, or may be configured to connect to a headset to play audio by using the headset. The interface may alternatively be configured to connect to another electronic device, such as an AR device.

It may be understood that an interface connection relationship between the modules that is shown in an embodiment of the present disclouser is merely an example for description, and does not constitute a limitation on the structure of the electronic device 100. In some other embodiments, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger by using the USB interface 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display screen 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communications module 150, the wireless communications module 160, a modem processor, a baseband processor, and the like.

The antenna 1 and the antenna 2 are configured to: transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation by using the antenna 1. In some embodiments, at least some function modules in the mobile communications module 150 may be disposed in the processor 110. In some embodiments, at least some function modules in the mobile communications module 150 and at least some modules in the processor 110 may be disposed in a same component.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and is then transferred to an application processor. The application processor outputs a sound signal by using an audio device (which is not limited to the speaker 170A, the receiver 170B, or the like), or displays an image or a video by using the display screen 194. In some embodiments, the modem processor may be an independent component. In some other embodiments, the modem processor may be independent of the processor 110, and is disposed in a same component as the mobile communications module 150 or another function module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the electronic device 100. The wireless communications module 160 may be one or more components integrating at least one communications processor module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2. For example, the wireless communications module 160 may include a Bluetooth module, a Wi-Fi module, and the like.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

In some embodiments, a Bluetooth (BT) module and a WLAN module included in the wireless communications module 160 may transmit a signal to detect or scan a device near the electronic device 100, so that the electronic device 100 can discover a nearby device by using a wireless communications technology such as Bluetooth or a WLAN, establish a wireless communication connection to the nearby device, and share data with the nearby device by using the connection. The Bluetooth (BT) module may provide a Bluetooth communication solution including one or more of classic Bluetooth (Bluetooth 2.1) or Bluetooth low energy (BLE). The WLAN module may provide a WLAN communication solution including one or more of Wi-Fi direct, a Wi-Fi LAN, or Wi-Fi SoftAP.

In some embodiments, the wireless communication solution provided by the mobile communications module 150 may enable the electronic device to communicate with a device (for example, a server) in a network, and the WLAN wireless communication solution provided by the wireless communications module 160 may also enable the electronic device to communicate with a device (for example, a server) in a network, and to communicate with a cloud device by using the device (for example, the server) in the network. In this way, the electronic device can discover the cloud device and transmit data to the cloud device.

The electronic device 100 may implement a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs, which execute an instruction to generate or change display information.

The display screen 194 is configured to display an image, a video, and the like. The display screen 194 includes a display panel. The display panel may be a liquid crystal display (liquid crystal display, LCD), an organic light-emitting diode (OLED), an active-matrix organic light emitting diode or an active-matrix organic light emitting diode (AMOLED), a flexible light-emitting diode (FLED), a mini LED, a micro LED, a micro OLED, a quantum dot light emitting diode (QLED), or the like. In some embodiments, the electronic device 100 may include one or N display screens 194, where N is a positive integer greater than 1.

The electronic device 100 may implement the photographing function by using the ISP, the camera 193, the video codec, the GPU, the display screen 194, the application processor, and the like.

The ISP is configured to process data fed back by the camera 193. For example, during photographing, a shutter is pressed, a ray of light is transmitted to a light-sensitive element of a camera through a lens, and an optical signal is converted into an electrical signal. The light-sensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated by using the lens, and is projected to a photosensitive element. The light-sensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to a DSP for processing. The DSP converts the digital image signal into an image signal of a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy, or the like.

The video codec is configured to compress or decompress a digital video. The electronic device 100 may support one or more video codecs. In this way, the electronic device 100 can play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 by using the external memory interface 120, to implement a data storage function. For example, data such as music, a photo, and a video is stored in the external memory card.

The internal memory 121 may be configured to store one or more computer programs, where the one or more computer programs include an instruction. The processor 110 may run the instruction stored in the internal memory 121, so that the electronic device 100 performs the data sharing method provided in some embodiments of this application, various function applications, data processing, and the like. The internal memory 121 may include a program storage area and a data storage area. The program storage area may store an operating system. The program storage area may further store one or more applications (for example, Gallery and Contacts), and the like. The data storage area may store data (for example, Photos and Contacts) created during use of the electronic device 100. In addition, the internal memory 121 may include a high-speed random access memory, and may further include a nonvolatile memory, for example, at least one magnetic disk storage device, a flash memory device, or a universal flash storage (UFS).

The electronic device 100 can implement an audio function such as music playback or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to: code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When the electronic device 100 answers a call or receives voice information, the receiver 170B may be placed close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, reduce noise, and further identify a sound source, implement a directional recording function, and the like.

The headset jack 170D is configured to connect to a wired headset. The headset jack 170D may be the USB interface 130, or may be a 3.5 mm open mobile electronic device platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display screen 194. There are many types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display screen 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to a first pressure threshold is performed on an SMS message application icon, an instruction for creating a new SMS message is executed.

The gyro sensor 180B may be configured to determine a motion posture of the electronic device 100. In some embodiments, an angular velocity of the electronic device 100 around three axes (namely, x, y, and z axes) may be determined by using the gyro sensor 180B. The gyro sensor 180B may be configured to perform image stabilization during photographing. For example, when the shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement the image stabilization. The gyro sensor 180B may also be used in a navigation scenario and a somatic game scenario.

The barometric pressure sensor 180C is configured to measure atmospheric pressure. In some embodiments, the electronic device 100 calculates an altitude based on a value of the atmospheric pressure measured by the barometric pressure sensor 180C, to assist positioning and navigation.

The magnetic sensor 180D includes a Hall sensor. The electronic device 100 may detect opening/closing of a flip leather case by using the magnetic sensor 180D. In some embodiments, when the electronic device 100 is a clamshell phone, the electronic device 100 may detect opening/closing of a flip cover based on the magnetic sensor 180D. Further, a feature such as automatic unlocking of the flip cover is set based on a detected opening/closing state of the leather case or a detected opening/closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 180E may be further configured to identify a posture of the electronic device, and is applied to an application such as switching between landscape orientation and portrait orientation or a pedometer.

The distance sensor 180F is configured to measure a distance. The electronic device 100 may measure the distance in an infrared or a laser manner. In some embodiments, in a photographing scenario, the electronic device 100 may measure the distance by using the distance sensor 180F to implement quick focusing.

For example, the optical proximity sensor 180G may include a light-emitting diode (LED) and an optical detector, for example, a photodiode. The light-emitting diode may be an infrared light-emitting diode. The electronic device 100 emits infrared light through the light-emitting diode. The electronic device 100 detects infrared reflected light from a nearby object through the photodiode. When detecting sufficient reflected light, the electronic device 100 may determine that there is an object near the electronic device 101. When detecting insufficient reflected light, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a flip cover mode or a pocket mode to automatically unlock or lock the screen.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally because of a low temperature. In some other embodiments, when the temperature is less than still another threshold, the electronic device 100 boosts an output voltage of the battery 142 to avoid abnormal shutdown caused by a low temperature.

The touch sensor 180K may also be referred to as a touch panel or a touch-sensitive surface. The touch sensor 180K may be disposed on the display screen 194. The touch sensor 180K and the display screen 194 form a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. Visual output related to the touch operation may be provided by using the display screen 194. In some other embodiments, the touch sensor 180K may also be disposed on a surface of the electronic device 100 at a location different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be used for an incoming call vibration prompt, or may be used for a touch vibration feedback. For example, touch operations performed on different applications (for example, photographing and audio playing) may correspond to different vibration feedback effects. The motor 191 may also correspond to different vibration feedback effects for touch operations performed on different areas of the display screen 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may also be compatible with different types of SIM cards. The SIM card interface 195 may also be compatible with an external storage card. The electronic device 100 interacts with a network by using the SIM card, to implement a call function, a data communication function, and the like. In some embodiments, the electronic device 100 uses an eSIM, namely, an embedded SIM card. The eSIM card may be embedded into the electronic device 100, and cannot be separated from the electronic device 100.

For example, the electronic device 100 shown in FIG. 1A may display, by using the display screen 194, user interfaces described in the following embodiments. The electronic device 100 may detect a touch operation in each user interface by using the touch sensor 180K, for example, a tap operation (for example, a touch operation or a double-tap operation on an icon) in each user interface, or an upward or downward swipe operation or an operation of drawing a circle gesture in each user interface. In some embodiments, the electronic device 100 may detect, by using the gyro sensor 180B, the acceleration sensor 180E, or the like, a motion gesture made by the user by holding the electronic device 100, for example, shaking the electronic device. In some embodiments, the electronic device 100 may detect a non-touch gesture operation by using the camera 193 (for example, a 3D camera or a depth camera).

A software system of the electronic device 100 may use a layered architecture, an event-driven architecture, a microkernel architecture, a micro service architecture, or a cloud architecture. In an embodiment of the present disclouser, an Android system of the layered architecture is used as an example to illustrate a software structure of the electronic device 100.

Figure 1B:
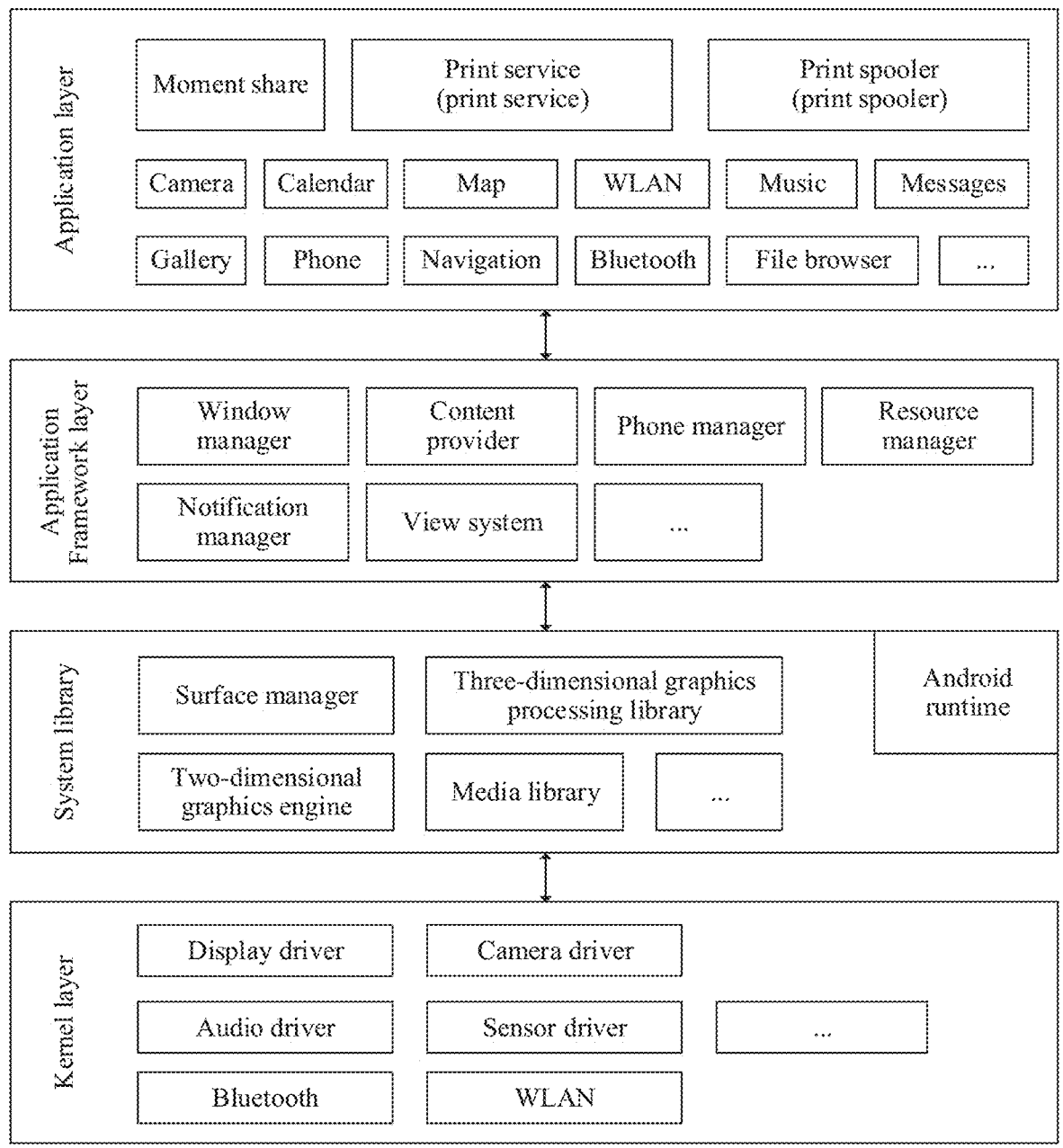
FIG. 1B is a schematic diagram of a software structure of an electronic device according to an embodiment.

FIG. 1B is a block diagram of a software structure of the electronic device 100 according to an embodiment of the present disclouser.

In the layered architecture, software is divided into several layers, and each layer has a clear role and task. The layers communicate with each other through a software interface. In some embodiments, the Android system is divided into four layers, namely, an application layer, an application framework layer, Android runtime, a system library, and a kernel layer from top to bottom.

The application layer may include a series of application packages.

As shown in FIG. 1B, the application package may include applications such as Camera, Gallery, Calendar, Phone, Map, Navigation, WLAN, Bluetooth, Music, Videos, and Messages.

The application framework layer provides an application programming interface (API) and a programming framework for the application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a size of a display screen, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, an address book, and the like.

The view system includes a visual control such as a text display control, or a picture display control. The view system can be configured to construct an application. A display interface may include one or more views. For example, a display interface including an SMS message notification icon may include a text display view and a picture display view.

The phone manager is configured to provide a communication function of the electronic device 100, for example, management of a call status (including answering or declining).

The resource manager provides various resources such as a localized character string, an icon, a picture, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears on the top of a status bar of a system in a text form of a graph or a scroll bar, for example, a notification of an application running in a background or a notification that appears on a screen in a form of a dialog window. For example, text information is prompted in the status bar, an alert sound is produced, the electronic device vibrates, or an indicator light blinks.

The Android runtime includes a kernel library and a virtual machine. The Android runtime is responsible for scheduling and management of the Android system.

The kernel library includes two parts: a function that needs to be invoked by a Java language and a kernel library of Android.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playback and recording of a plurality of frequently used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The software system shown in FIG. 1B relates to an application presentation (such as a gallery or a file manager) that uses a sharing capability, a moment share module that provides the sharing capability, a print service that provides a printing capability, and a print spooler. In addition, the application framework layer provides a printing framework, a WLAN service, and a Bluetooth service, and the bottom kernel layer provides a WLAN Bluetooth capability and a basic communications protocol.

The following describes working procedures of software and hardware of the electronic device 100 by using an example with reference to a photographing capture scenario.

When the touch sensor 180K receives a touch operation, a corresponding hardware interruption is sent to the kernel layer. The kernel layer processes the touch operation into a raw input event (including information such as touch coordinates or a time stamp of the touch operation). The raw input event is stored at the kernel layer. The application framework layer obtains the raw input event from the kernel layer, and identifies a control corresponding to the input event. For example, the touch operation is a touch touch operation, and a control corresponding to the touch operation is a control of a camera application icon. A camera application invokes an interface at the application framework layer to enable the camera application, then enables a camera driver by invoking the kernel layer, and captures a static image or a video by using the camera 193.

Figure 1C:
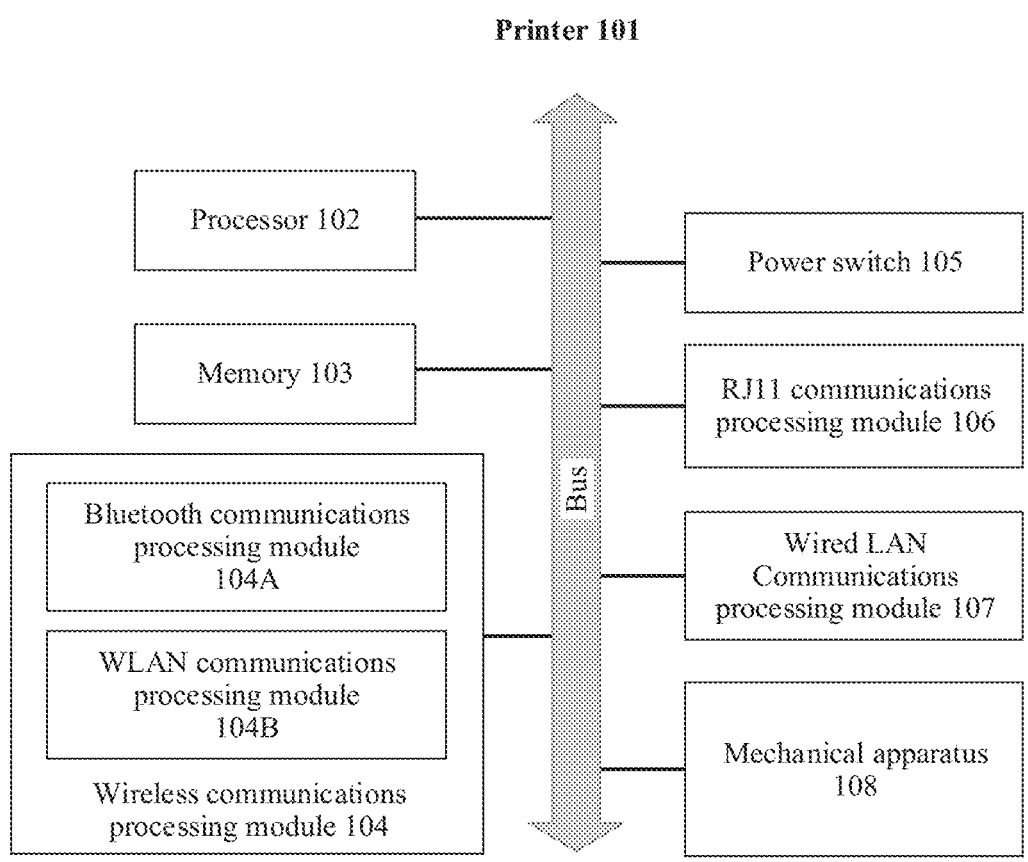
FIG. 1C is a schematic diagram of a structure of a printer according to an embodiment.

FIG. 1C shows an example of a schematic diagram of a structure of a printer 101 according to this application.

As shown in FIG. 1C, the printer 101 may include a processor 102, a memory 103, a wireless communications processing module 104, a power switch 105, an RJ11 communications processing module 106, a wired LAN communications processing module 116, and a mechanical apparatus 108. These components may be connected by using a bus.

The processor 102 may be configured to: read and execute a computer readable instruction. In an embodiment, the processor 102 may mainly include a controller, an arithmetic unit, and a register. The controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, or may perform an address operation and an address conversion. The register is mainly responsible for storing a quantity of register operations, intermediate operation results, and the like that are temporarily stored during instruction execution. In an embodiment, a hardware architecture of the processor 102 may be an application-specific integrated circuit (ASIC) architecture, an MIPS architecture, an ARM architecture, an NP architecture, or the like.

In some embodiments, the processor 102 may be configured to parse signals/a signal received by the wireless communications processing module 104 and/or the wired LAN communications processing module 116, for example, a probe request that is broadcast by the electronic device 100, a print request sent by the electronic device 100, and a print instruction sent by a server of a cloud printing service provider. The processor 102 may be configured to perform a corresponding processing operation based on a parsing result, for example, generate a probe response, or drive, based on the print request or according to the print instruction, the mechanical apparatus 108 to perform a print operation.

In some embodiments, the processor 102 may be further configured to generate signals/a signal sent by the wireless communications processing module 104 and/or the wired LAN communications processing module 116, for example, a Bluetooth broadcast signal or a beacon signal, or a signal that is sent to the electronic device and that is used to feed back a print status (for example, a print success or a print failure).

The memory 103 is coupled to the processor 102, and is configured to store various software programs and/or a plurality of sets of instructions. In an embodiment, the memory 103 may include a high-speed random access memory, and may further include a nonvolatile memory, for example, one or more magnetic disk storage devices, a flash memory device, or another nonvolatile solid-state storage device. The memory 103 may store an operating system, for example, an embedded operating system such as uCOS, VxWorks, or RTLinux. The memory 103 may further store a communication program, and the communication program may be used to communicate with the electronic device 100, one or more servers, or an additional device.

The wireless communications processing module 104 may include one or more of a Bluetooth (BT) communications processing module 104A and a WLAN communications processing module 104B.

In some embodiments, the one or more of the Bluetooth (BT) communications processing module and the WLAN communications processing module may obtain, through listening, a signal transmitted by another device (for example, the electronic device 100), for example, a probe request or a scan signal; may send a response signal, for example, a probe response or a scan response, so that the another device (for example, the electronic device 100) can discover the printer 101; establish a wireless communication connection to the another device (for example, the electronic device 100); and communicate with the another device (for example, the electronic device 100) by using one or more wireless communications technologies such as Bluetooth or a WLAN.

In some other embodiments, the one or more of the Bluetooth (BT) communications processing module and the WLAN communications processing module may alternatively transmit a signal, for example, a broadcast Bluetooth signal or a beacon signal, so that another device (for example, the electronic device 100) can discover the printer 101; establish a wireless communication connection to the another device (for example, the electronic device 100); and communicate with the another device (for example, the electronic device 100) by using one or more wireless communications technologies such as Bluetooth or a WLAN.

The wireless communications processing module 104 may further include a cellular mobile communications processing module (not shown). The cellular mobile communications processing module may communicate with another device (for example, a server) by using a cellular mobile communications technology.

The power switch 105 may be configured to control a power supply to supply power to the printer 101.

The RJ11 communications processing module 106 may be configured to process data received or sent through an RJ11 interface. The RJ11 interface is mainly configured to connect to the modem modem.

The wired LAN communications processing module 107 may be configured to communicate with another device in a same LAN by using a wired LAN, and may be further configured to connect to a WAN by using the wired LAN, and may communicate with a device in the WAN.

The mechanical apparatus 108 may include a print head, a carriage mechanism, a paper feeding mechanism, a ribbon transmission mechanism, an ink (toner) supply mechanism, a toner cartridge transmission mechanism, and the like. The mechanisms are all execution mechanisms of a printer system, and are uniformly coordinated and controlled by the processor 102.

It may be understood that the structure shown in FIG. 1C does not constitute a specific limitation on the printer 101. In some other embodiments of this application, the printer 101 may include more or fewer components than those shown in the figure, or combine some components, or split some components, or have different component arrangements. The components shown in the figure may be implemented by hardware, software, or a combination of software and hardware.

Figure 1D:
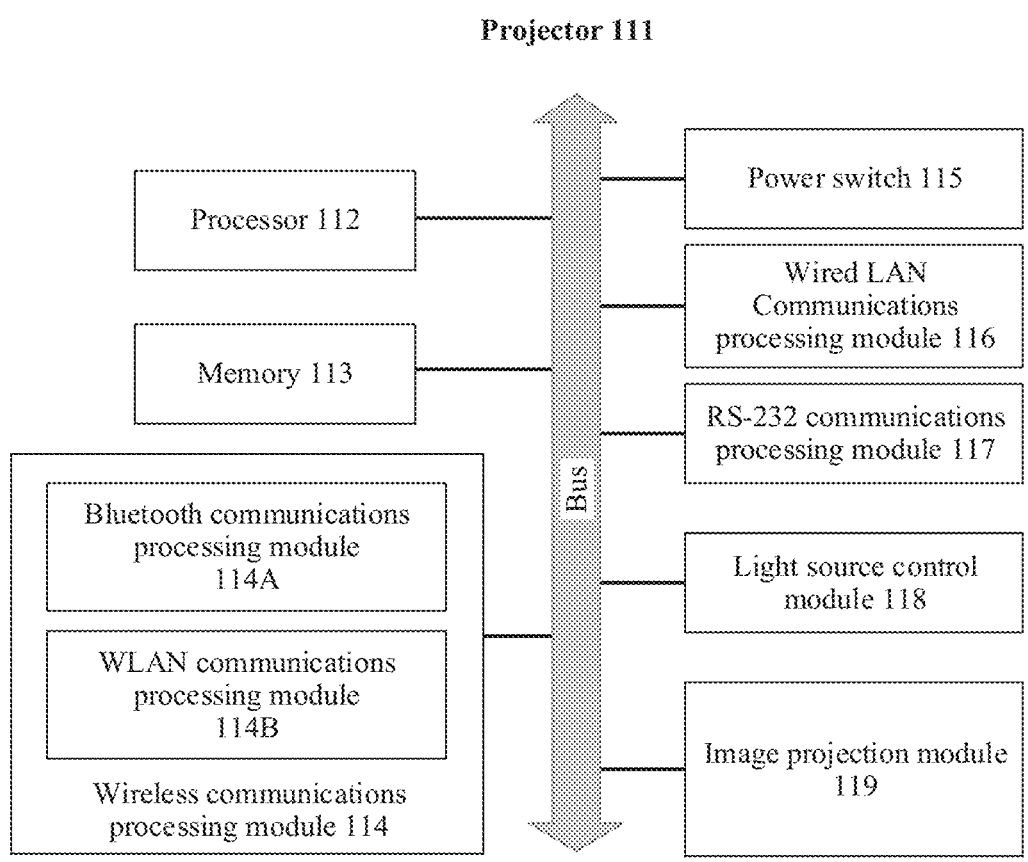
FIG. 1D is a schematic diagram of a structure of a projector according to an embodiment.

FIG. 1D shows an example of a schematic diagram of a structure of a projector 111 according to this application.

As shown in FIG. 1D, the projector 111 may include a processor 112, a memory 113, a wireless communications processing module 114, a power switch 115, a wired LAN communications processing module 116, an RS-232 communications processing module 117, a light source control module 118, and an image projection module 119.

The processor 112 may be configured to: read and execute a computer readable instruction. In an embodiment, the processor 112 may mainly include a controller, an arithmetic unit, and a register. The controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, or may perform an address operation and an address conversion. The register is mainly responsible for storing a quantity of register operations, intermediate operation results, and the like that are temporarily stored during instruction execution. In an embodiment, a hardware architecture of the processor 112 may be an application-specific integrated circuit (ASIC) architecture, an MIPS architecture, an ARM architecture, an NP architecture, or the like.

In some embodiments, the processor 112 may be configured to parse signals/a signal received by the wireless communications processing module 114 and/or the wired LAN communications processing module 116, for example, a probe request that is broadcast by the electronic device 100, a projection request sent by the electronic device 100, and a projection instruction sent by a server of a cloud projection service provider. The processor 112 may be configured to perform a corresponding processing operation based on a parsing result, for example, generate a detection response, or drive, based on the projection request or according to the projection instruction, the light source control module 118 and the image projection module to perform a projection operation.

In some embodiments, the processor 112 may be further configured to generate signals/a signal sent by the wireless communications processing module 114 and/or the wired LAN communications processing module 116, for example, a Bluetooth broadcast signal or a beacon signal, or a signal that is sent to the electronic device and that is used to feed back a projection status (for example, a projection success or a projection failure).

The memory 113 is coupled to the processor 112, and is configured to store various software programs and/or a plurality of sets of instructions. In an embodiment, the memory 113 may include a high-speed random access memory, and may further include a nonvolatile memory, for example, one or more magnetic disk storage devices, a flash memory device, or another nonvolatile solid-state storage device. The memory 113 may store an operating system, for example, an embedded operating system such as uCOS, VxWorks, or RTLinux. The memory 113 may further store a communication program, and the communication program may be used to communicate with the electronic device 100, one or more servers, or an additional device.

The wireless communications processing module 114 may include one or more of a Bluetooth (BT) communications processing module 114A and a WLAN communications processing module 114B.

In some embodiments, the one or more of the Bluetooth (BT) communications processing module and the WLAN communications processing module may obtain, through listening, a signal transmitted by another device (for example, the electronic device 100), for example, a probe request or a scan signal; may send a response signal, for example, a probe response or a scan response, so that the another device (for example, the electronic device 100) can discover the projector 111; establish a wireless communication connection to the another device (for example, the electronic device 100); and communicate with the another device (for example, the electronic device 100) by using one or more wireless communications technologies such as Bluetooth or a WLAN.

In some other embodiments, the one or more of the Bluetooth (BT) communications processing module and the WLAN communications processing module may alternatively transmit a signal, for example, a broadcast Bluetooth signal or a beacon signal, so that another device (for example, the electronic device 100) can discover the projector 111; establish a wireless communication connection to the another device (for example, the electronic device 100); and communicate with the another device (for example, the electronic device 100) by using one or more wireless communications technologies such as Bluetooth or a WLAN.

The wireless communications processing module 114 may further include a cellular mobile communications processing module (not shown). The cellular mobile communications processing module may communicate with another device (for example, a server) by using a cellular mobile communications technology.

The power switch 115 may be configured to control a power supply to supply power to the projector 111.

The wired LAN communications processing module 116 may be configured to communicate with another device in a same LAN by using a wired LAN, and may be further configured to connect to a WAN by using the wired LAN, and may communicate with a device in the WAN.

The RS-232 communications processing module 117 may be configured to communicate with another device through an RS-232 interface (not shown).

The image projection module 119 may have a light source (not shown), and may modulate, based on image data, light emitted from the light source and project an image on a screen.

The light source control module 118 may be configured to control lighting of the light source of the image projection module 119.

It may be understood that the structure shown in FIG. 1D does not constitute a specific limitation on the projector 111. In some other embodiments of this application, the projector 111 may include more or fewer components than those shown in the figure, or combine some components, or split some components, or have different component arrangements. The components shown in the figure may be implemented by hardware, software, or a combination of software and hardware.

Figure 1E:
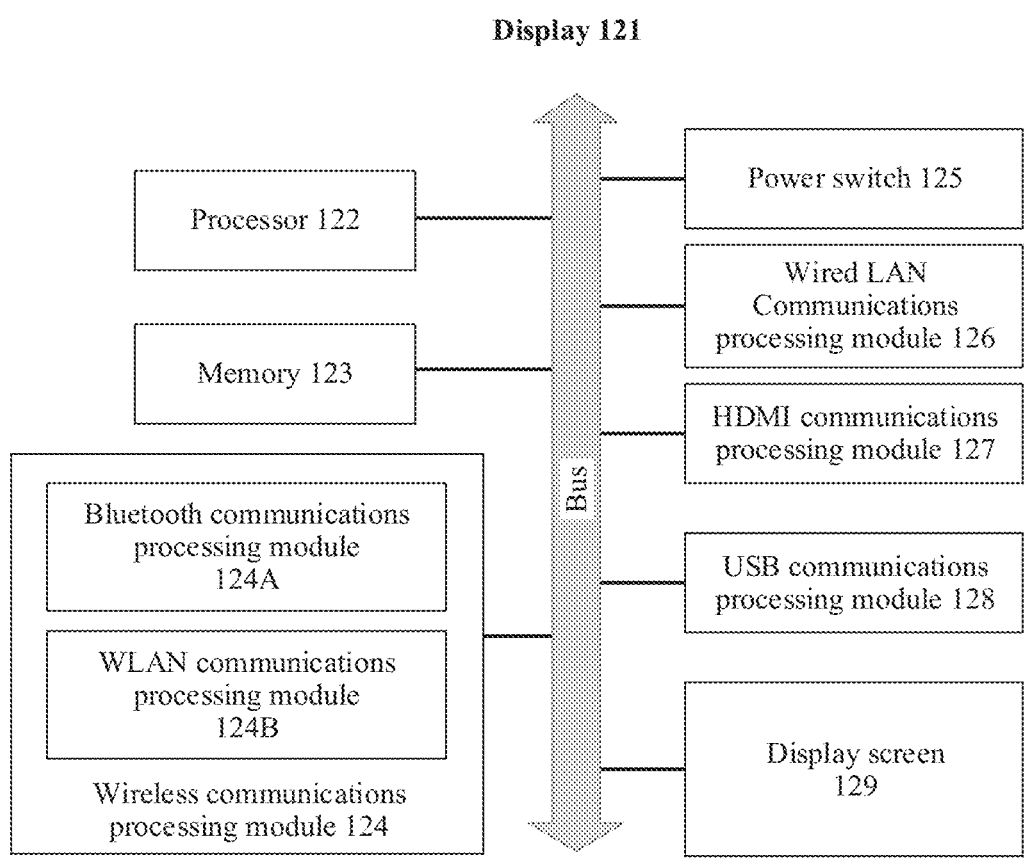
FIG. 1E is a schematic diagram of a structure of a display according to an embodiment.

FIG. 1E shows an example of a schematic diagram of a structure of a display 121 according to this application.

As shown in FIG. 1E, the display 121 may include a processor 122, a memory 123, a wireless communications processing module 124, a power switch 125, a wired LAN communications processing module 126, an HDMI communications processing module 127, a USB communications processing module 128, and a display screen 129.

The processor 122 may be configured to: read and execute a computer readable instruction. In an embodiment, the processor 122 may mainly include a controller, an arithmetic unit, and a register. The controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, and may also perform an address operation and an address conversion. The register is mainly responsible for saving a quantity of register operations temporarily stored during instruction execution, intermediate operation results, and the like. In an embodiment, a hardware architecture of the processor 122 may be an application-specific integrated circuit (ASIC) architecture, an MIPS architecture, an ARM architecture, an NP architecture, or the like.

In some embodiments, the processor 122 may be configured to parse signals/a signal received by the wireless communications processing module 124 and/or the wired LAN communications processing module 126, for example, a probe request that is broadcast by the electronic device 100, a display request sent by the electronic device 100, and a display instruction sent by a server of a cloud screen mirroring service provider. The processor 122 may be configured to perform a corresponding processing operation based on a parsing result, for example, generate a probe response, or drive, based on the display request or according to the display instruction, the display screen 129 to perform displaying.

In some embodiments, the processor 122 may be further configured to generate signals/a signal sent by the wireless communications processing module 124 and/or the wired LAN communications processing module 126, for example, a Bluetooth broadcast signal or a beacon signal, or a signal that is sent to the electronic device and that is used to feed back a display status (for example, a display success or a display failure).

The memory 123 is coupled to the processor 122, and is configured to store various software programs and/or a plurality of sets of instructions. In an embodiment, the memory 123 may include a high-speed random access memory, and may further include a nonvolatile memory, for example, one or more magnetic disk storage devices, a flash memory device, or another nonvolatile solid-state storage device. The memory 123 may store an operating system, for example, an embedded operating system such as uCOS, VxWorks, or RTLinux. The memory 123 may further store a communication program, and the communication program may be used to communicate with the electronic device 100, one or more servers, or an additional device.

The wireless communications processing module 124 may include one or more of a Bluetooth (BT) communications processing module 124A and a WLAN communications processing module 124B.

In some embodiments, the one or more of the Bluetooth (BT) communications processing module and the WLAN communications processing module may obtain, through listening, a signal transmitted by another device (for example, the electronic device 100), for example, a probe request or a scan signal; may send a response signal, for example, a probe response or a scan response, so that the another device (for example, the electronic device 100) can discover the display 121; establish a wireless communication connection to the another device (for example, the electronic device 100); and communicate with the another device (for example, the electronic device 100) by using one or more wireless communications technologies such as Bluetooth or a WLAN.

In some other embodiments, the one or more of the Bluetooth (BT) communications processing module and the WLAN communications processing module may alternatively transmit a signal, for example, a broadcast Bluetooth signal or a beacon signal, so that another device (for example, the electronic device 100) can discover the display 121; establish a wireless communication connection to the another device (for example, the electronic device 100); and communicate with the another device (for example, the electronic device 100) by using one or more wireless communications technologies such as Bluetooth or a WLAN.

The wireless communications processing module 124 may further include a cellular mobile communications processing module (not shown). The cellular mobile communications processing module may communicate with another device (for example, a server) by using a cellular mobile communications technology.

The power switch 125 may be configured to control a power supply to supply power to the display 121.

The wired LAN communications processing module 126 may be configured to communicate with another device in a same LAN by using a wired LAN, and may be further configured to connect to a WAN by using the wired LAN, and may communicate with a device in the WAN.

The HDMI communications processing module 127 may be configured to communicate with another device through an HDMI interface (not shown).

The USB communications processing module 128 may be configured to communicate with another device through a USB interface (not shown).

The display screen 129 may be configured to display an image, a video, and the like. The display screen 129 may be a liquid crystal display (LCD), an organic light-emitting diode (OLED) display screen, an active-matrix organic light emitting diode (AMOLED) display screen, a flexible light-emitting diode (FLED) display screen, a quantum dot light emitting diode (QLED) display screen, or the like.

In some embodiments, the display 121 may further include an audio module (not shown). The audio module may be configured to output an audio signal through an audio output interface, so that the display 121 can support audio playback. The audio module may be further configured to receive audio data through an audio input interface. The display 121 may be a media playback device such as a television set.

In some embodiments, the display 121 may further include a serial interface such as an RS-232 interface. The serial interface may be connected to another device, for example, an audio speaker device such as a sound box, so that the display collaborates with the audio speaker device to play audio and video.

It may be understood that the structure shown in FIG. 1E does not constitute a specific limitation on the display 121. In some other embodiments of this application, the display 121 may include more or fewer components than those shown in the figure, or combine some components, or split some components, or have different component arrangements. The components shown in the figure may be implemented by hardware, software, or a combination of software and hardware.

The following describes an example user interface that is on the electronic device 100 and that is used for an application menu.

Figure 2A:
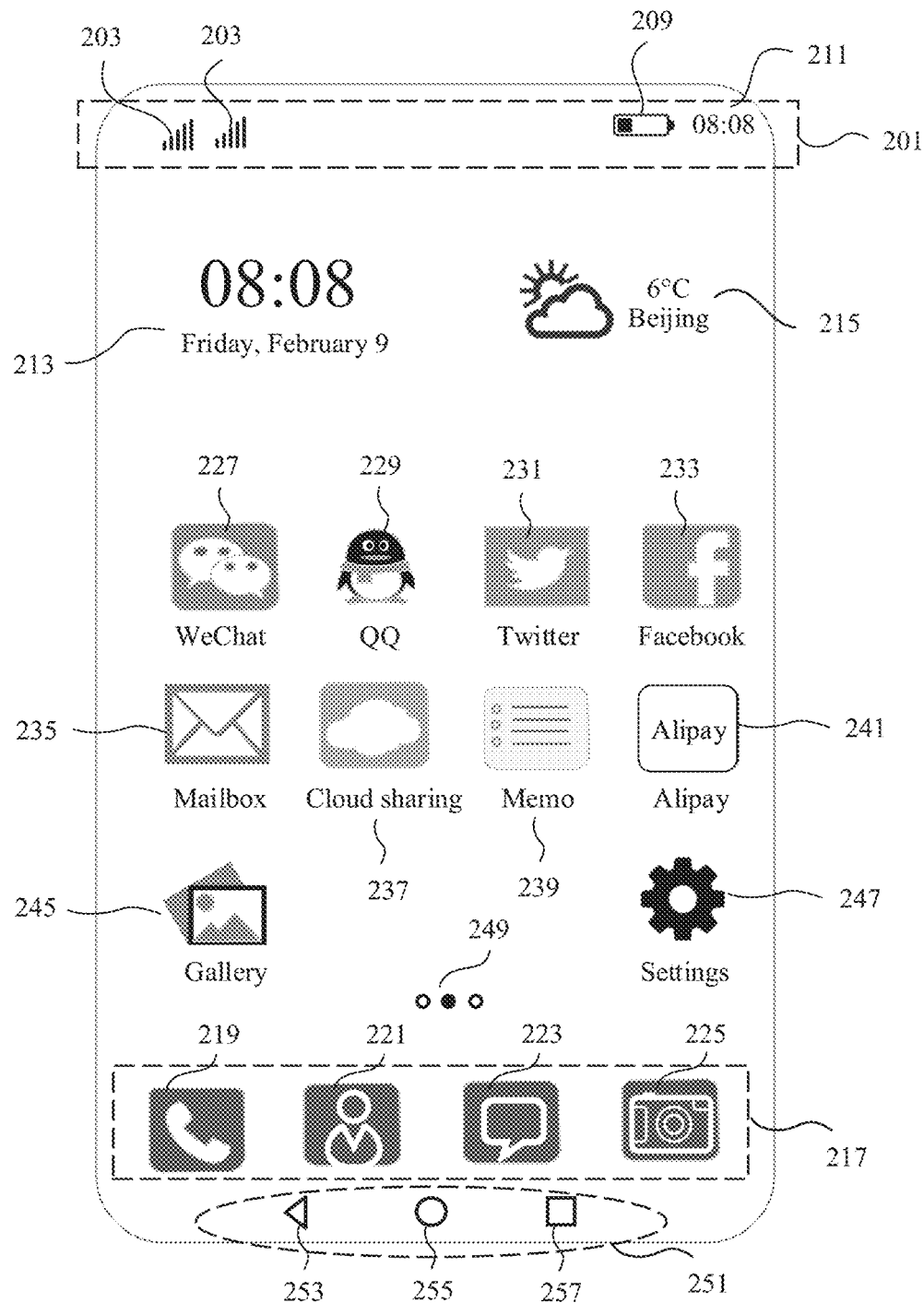
FIG. 2A shows a user interface that is on an electronic device and that is used for an application menu according to an embodiment.

FIG. 2A shows an example of an example user interface 21 that is on the electronic device 100 and that is used for an application menu.

The user interface 21 may include a status bar 201, a tray 217 having a frequently used application icon, a calendar indicator 213, a weather indicator 215, a navigation bar 251, and other application icons.

The status bar 201 may include one or more signal strength indicators 203 of a mobile communication signal (which may also be referred to as a cellular signal), one or more signal strength indicators 207 of a wireless fidelity (wireless fidelity, Wi-Fi) signal, a battery status indicator 209, and a time indicator 211.

The calendar indicator 213 may be used to indicate a current time, for example, a date, a day of a week, or hour minute information.

The weather indicator 215 may be used to indicate a weather type, for example, Clouds Early/Clearing Late or Light Rain, and may be further used to indicate information such as a temperature.

The tray 217 having the frequently used application icon may display a Phone icon 219, a Contacts icon 221, a Messages icon 223, and a Camera icon 225.

The navigation bar 251 may include system navigation buttons such as a back button 253, a home screen button 255, and a historical call-out task button 257. When detecting that a user taps the back button 253, the electronic device 100 may display a previous page of a current page. When detecting that a user taps the home screen button 255, the electronic device 100 may display a home screen. When detecting that a user taps the historical call-out task button 257, the electronic device 100 may display a task last opened by the user. Names of the navigation buttons may alternatively be other names. This is not limited in this application. In addition to a virtual button, each navigation button in the navigation bar 251 may be further implemented as a physical button.

For example, the other application icons may be a WeChat icon 227, a QQ icon 229, a Twitter icon 231, a Facebook icon 233, a Mailbox icon 235, a Cloud sharing icon 237, a Memo icon 239, an Alipay icon 241, a Gallery icon 245, and a Settings icon 247. The user interface 21 may further include a page indicator 249. The other application icons may be distributed on a plurality of pages, and the page indicator 249 may be used to indicate a specific page on which an application is currently browsed by the user. The user may swipe left or right in an area of the other application icons, to browse an application icon on another page.

In some embodiments, for example, the user interface 21 shown in FIG. 2A may be a home screen.

In some other embodiments, the electronic device 100 may further include a home button. The home button may be a physical button or a virtual button. The home button may be used to receive an instruction from the user, and return a currently displayed UI to the home screen, so that the user can view the home screen at any time. The instruction may be specifically an operation instruction of pressing the home button once by the user, or may be an operation instruction of consecutively pressing the home button twice within a short time by the user, or may be an operation instruction of touching and holding the home button within a predetermined time by the user. In some other embodiments of this application, a fingerprint recognizer may be further integrated into the home button, to collect and recognize a fingerprint when the home button is pressed.

It may be understood that FIG. 2A merely shows the example of the user interface on the electronic device 100, and should not constitute a limitation on an embodiment of the application.

Figures 1, 2B:
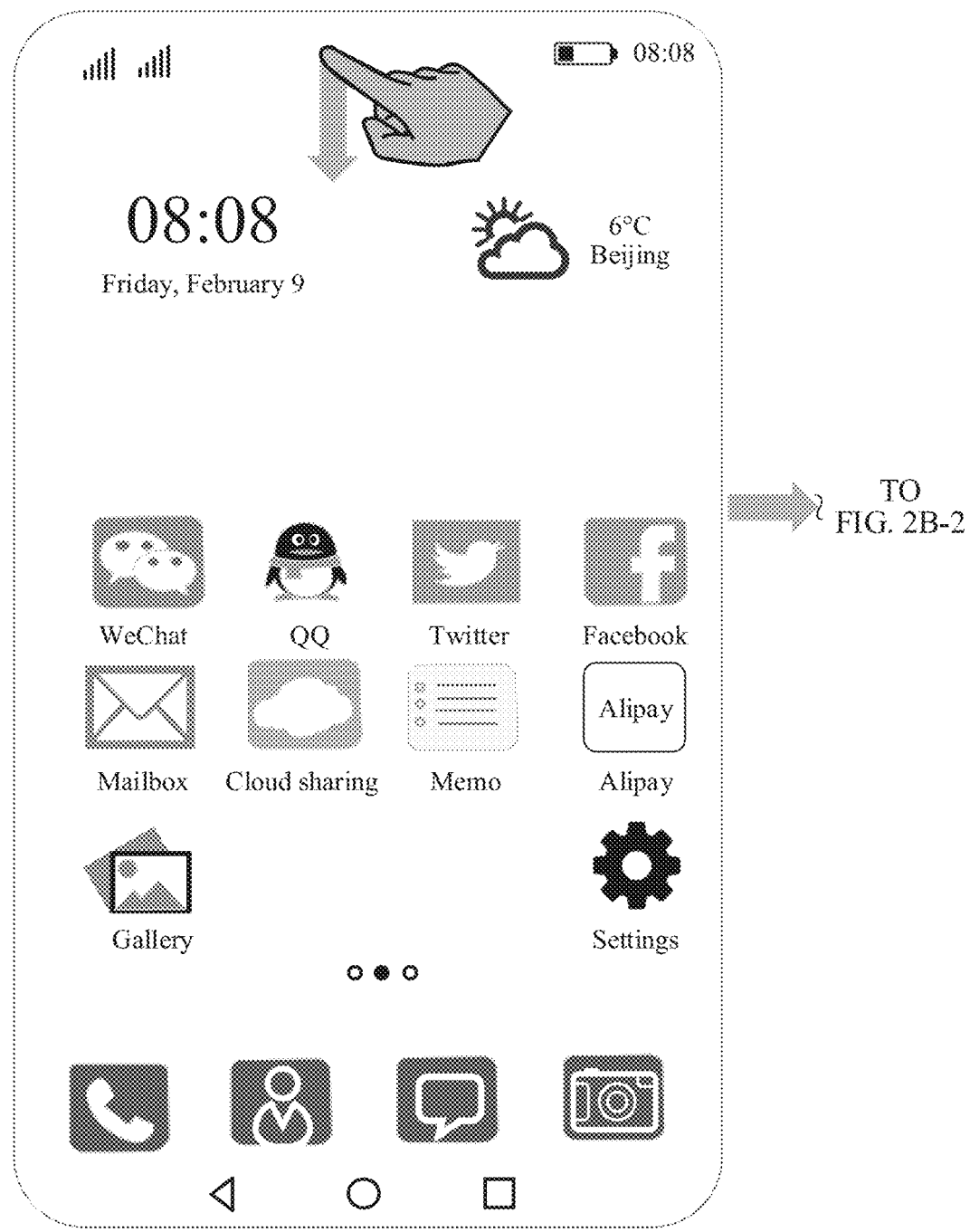
FIG. 2B-1 and FIG. 2B-2 are a schematic diagram of enabling "Moment share" according to an embodiment.
Figures 2, 2B:
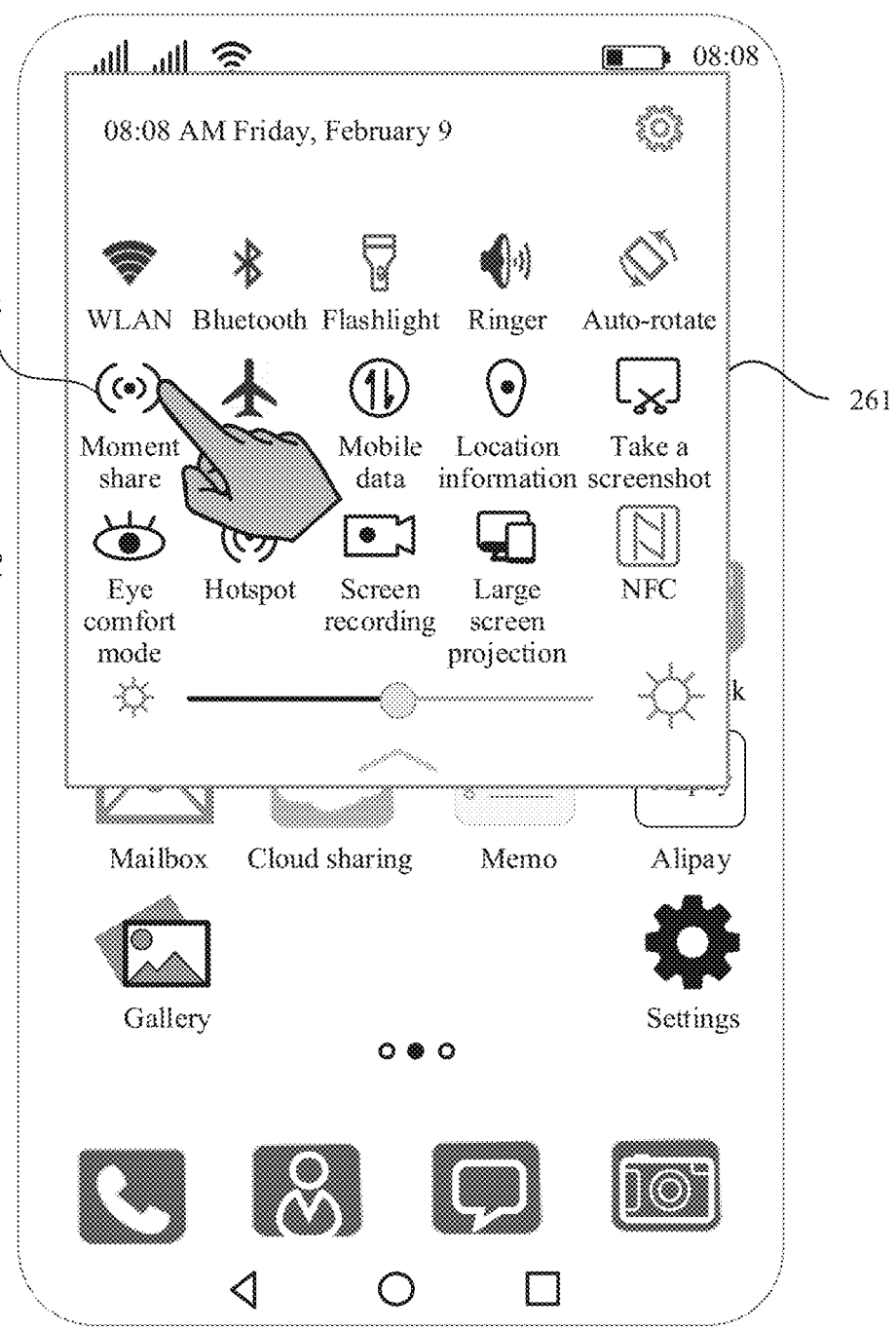

FIG. 2B-1 and FIG. 2B-2 show an example of an operation of enabling "Moment share" on the electronic device 100.

As shown in FIG. 2B-1 and FIG. 2B-2, when detecting a downward swipe gesture performed on the status bar 201, the electronic device 100 may display a window 261 in the user interface 21 in response to the gesture. The window 261 may display an on/off control 263 of "Moment share", and may further display on/off controls of other functions (for example, Wi-Fi, Bluetooth, and Flashlight). When detecting an operation (for example, a touch operation performed on the on/off control 263) performed on the on/off control 263 in the window 261, the electronic device 100 may enable "Moment share" in response to the operation.

In other words, the user may perform a downward swipe gesture on the status bar 201 to open the window 261, and may tap the on/off control 263 of "Moment share" in the window 261 to conveniently enable "Moment share".

In addition to enabling "Moment share" in the window 261, the user may further enable "Moment share" when selecting data (such as a picture, a document, or a web page) for sharing. Detailed descriptions are provided in subsequent embodiments, and details are not described herein.

The following separately describes application scenarios in this application and some embodiments of the user interface implemented on the electronic device 100.

Scenario in which a User Shares a Picture

Figure 3A:
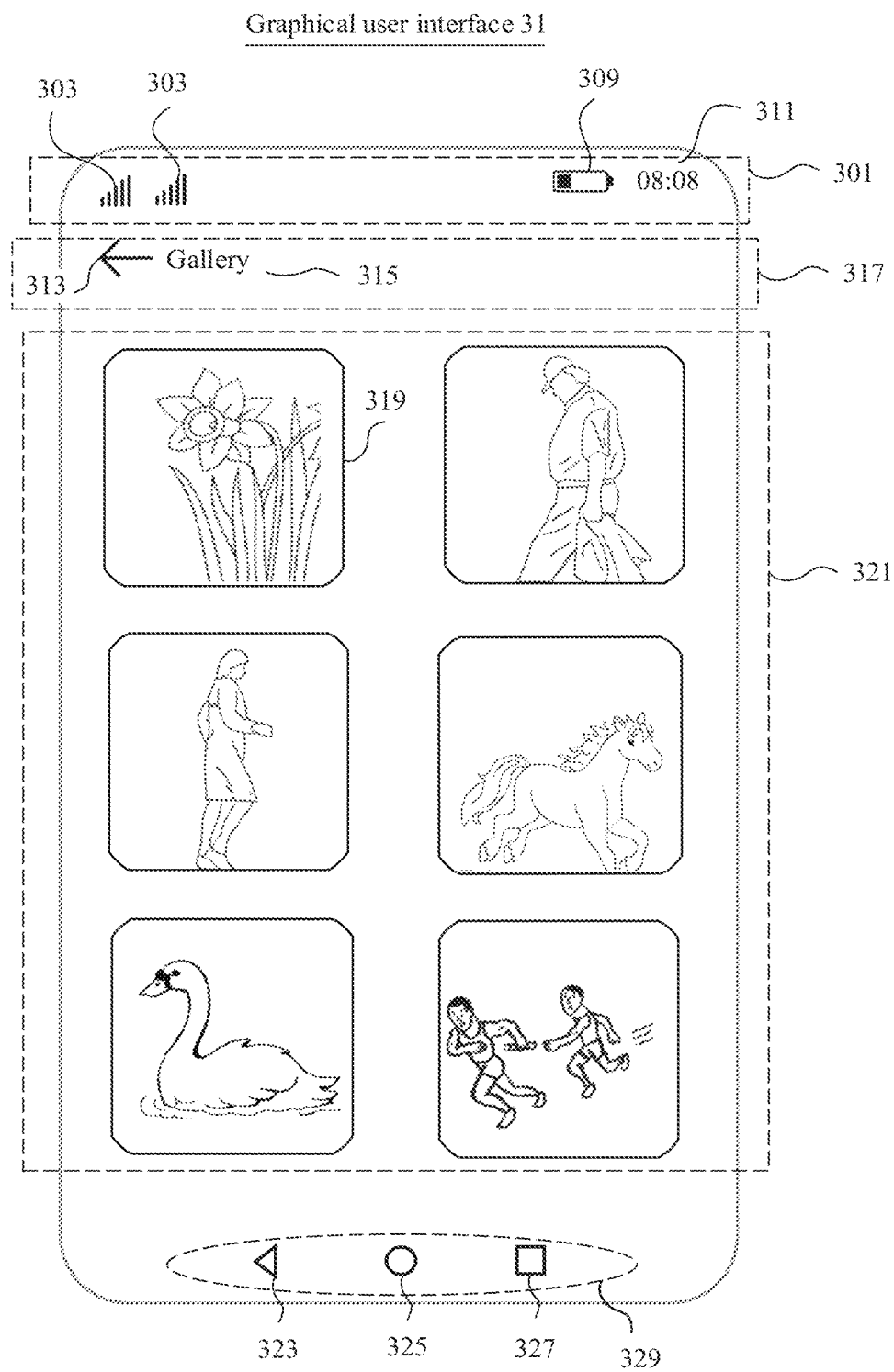
FIG. 3A and FIG. 3B are schematic diagrams of a data sharing scenario according to an embodiment.

FIG. 3A shows an example of a user interface 31 of a first application (for example, "Gallery") displayed by an electronic device such as a smartphone. "Gallery" is a picture management application on an electronic device such as a smartphone or a tablet computer, and may also be referred to as "Album". A name of the application is not limited in an embodiment. The app may support the user in performing various operations on a picture stored in the electronic device, for example, operations such as browsing, editing, deletion, and selection. In other words, an object managed by "Gallery" is the picture. In some other cases, the app may also support the user in performing the various operations on a picture stored in a cloud server. It may be understood that in an embodiment, the picture may be captured by the electronic device by using the camera 193, or may be obtained from another application or downloaded from a web page.

As shown in FIG. 3A, the user interface 31 may include a status bar 301, an application title bar 317, a picture area 321, and a navigation bar 329.

For the status bar 301, refer to the status bar 201 in the user interface 21 shown in FIG. 2A. Details are not described herein again.

The application title bar 317 may include a back button 313 and a current page indicator 315. The back button 313 is an app-level back button, and may be used to back to an upper-level menu. One of ordinary skilled in the art may understand that a logical upper level of a page is fixed, and is determined during application design. The current page indicator 315 may be used to indicate a current page, for example, may be text information "Gallery". In addition to the text information, the current page indicator 315 may be further an icon.

One or more pictures may be displayed in the picture area 321, for example, a picture 319. When the electronic device detects an upward swipe operation or a downward swipe operation in the picture area 317, the electronic device may update, in response to the swipe operation, the picture displayed in the picture area 317, so that the user browses the picture. To be specific, the user may swipe up or down in the picture area 317 to browse more pictures. In addition to performing the upward swipe operation or the downward swipe operation, the user may further swipe left or right in the picture area 317 to browse more pictures. The picture 319 may be a thumbnail. In this case, an original picture corresponding to the picture 319 may be stored in the electronic device, or may be stored in a cloud server. Unless otherwise specified, a picture in the following embodiments may be stored in the electronic device, or may be stored in the cloud server.

For the navigation bar 329, refer to the navigation bar 251 in the user interface 21 shown in FIG. 2A. Details are not described herein again.

Figure 3B:
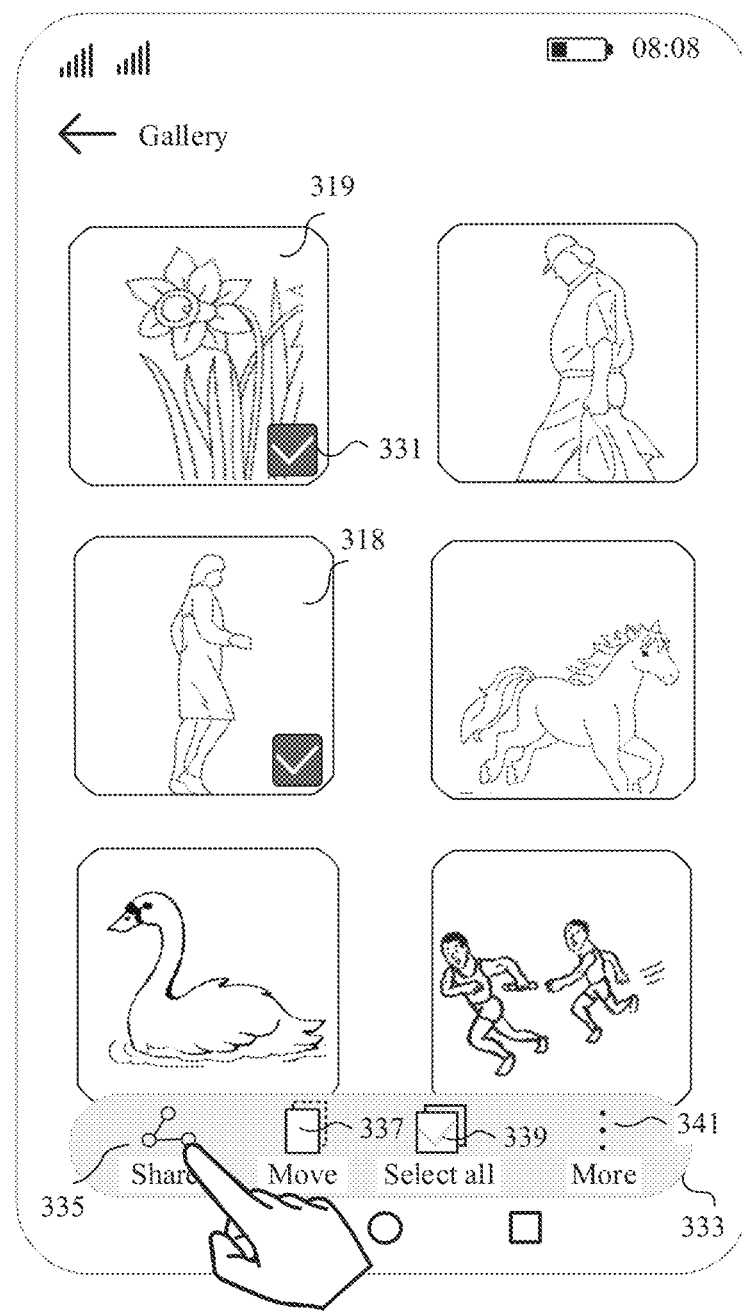

FIG. 3B shows an example of an embodiment in which a user shares a picture in "Gallery". As shown in FIG. 3B, the electronic device may detect, in the user interface 31, an operation of selecting a picture 318 and the picture 319 by the user for sharing. The electronic device may display a "moment share interface" in response to the operation. A device option corresponding to a device such as a printer, a projector, or a display discovered by the electronic device by using the wireless communications module 160 may be displayed in the "moment share interface". The device option may be represented by using a device icon, text information, or the like. In this way, the user may select, in the "moment share interface" by performing an operation of tapping a printer option, a printer to print pictures (for example, the picture 318 and the picture 319) selected in a first operation. The operation is simple, and print efficiency of the electronic device is also improved. Similarly, the user may alternatively select, in the moment share interface by performing an operation of tapping a projector option, a projector to project pictures (for example, the picture 318 and the picture 319) selected in a first operation. The user may alternatively select, in the "moment share interface" by performing an operation of tapping a display option, a display to perform screen mirroring on pictures (for example, the picture 318 and the picture 319) selected in a first operation.

In other words, the user may select an object such as a picture in "Gallery" for sharing, and may print the object such as the selected picture, or project the object such as the selected picture, or perform screen mirroring on the object such as the selected picture, or the like. In this application, an operation of sharing the object such as the selected picture may be referred to as the first operation.

It may be understood that the "moment share interface" is merely a word used in the embodiments of this application, a meaning represented by the word is described in subsequent GUI embodiments, and a name of the word does not constitute any limitation on the embodiments of this application.

In some embodiments, an operation of selecting a picture for sharing may be an operation of first selecting one or more pictures and then tapping a button 335.

In some embodiments, when the electronic device detects, in the user interface 31 in which one or more pictures are displayed, an operation of selecting one or more pictures 319, the electronic device may display a menu 333 in the user interface 31. In some embodiments, the electronic device may further display marks 331 on the selected picture 318 and the selected picture 319. The mark 331 may indicate that the picture has been selected by the user. In some embodiments, the electronic device may alternatively initially display the menu 333 in the user interface 31, in other words, may display the menu 333 without detecting that the user selects the picture. The menu 333 may include a control 335 ("Share"), a control 337 ("Move"), a control 339 ("Select all"), and a button 341 ("More"). The control 335 may be used by the user to share the selected picture, the control 337 may be used to listen to an operation of moving the selected picture to another storage path, the control 339 may be used to listen to an operation of selecting all pictures in Gallery, and the button 341 may be used to listen to an operation of opening a next-level menu, to provide more functions, for example, renaming and picture editing.

In addition to the operation of first selecting the one or more pictures and then tapping the control 335, the first operation may be further presented in another form, for example, an operation of first selecting a picture and then drawing a circle gesture in the picture area 321, or an operation of selecting a picture in a fixed time (for example, 1 second) after the electronic device is shaken. The first operation may be further a voice control operation, that is, the user only needs to speak out a voice instruction for sharing a picture. An embodiment of the operation of selecting the picture for sharing is not limited in this application.

In addition to the picture in "Gallery", the scenario in which the user shares the picture may further include that the user shares a picture in another application, for example, a picture in an application such as File browser. Moreover, in addition to the picture in the electronic device, the picture shared by the user may further include a picture shared by the user in the cloud server.

UI Embodiments in which Printing is Performed by Using the Electronic Device in the Scenario in which the User Shares the Picture that are Provided in this Application UI Embodiments Shown as Examples in FIG. 4A to FIG. 4H In the UI embodiments shown as the examples in FIG. 4A to FIG. 4H, the user may select a printer near the electronic device that is discovered by the electronic device to print a picture. The picture selected by the user may be a picture stored in the electronic device, or may be a picture in a cloud server accessed by the electronic device.

"Moment share" may be used to support the user in sharing data with a device near the electronic device. The nearby device may include a nearby first device, for example, a nearby printer, a nearby projector, or a nearby display, or may include a nearby second device, for example, a nearby mobile phone, a nearby tablet computer, or a nearby personal computer. Enabling "Moment share" may be enabling one or more of a WLAN or Bluetooth. After enabling "Moment share", the electronic device may discover the device near the electronic device by using a communications technology such as Bluetooth, Wi-Fi direct (such as Wi-Fi P2P), Wi-Fi SoftAP, or a Wi-Fi LAN.

The Following Describes User Interfaces Provided in the Examples of the UI Embodiments Shown in FIG. 4A to FIG. 4H.

"Moment Share Interface"

The "moment share interface" is displayed on a touchscreen of the electronic device when the electronic device detects an operation of selecting a picture for sharing.

In some embodiments, the "moment share interface" may be used to display one or more device options, one or more user options, and one or more service options. The device option may correspond to a nearby first device discovered by the electronic device, the user option may correspond to a nearby second device discovered by the electronic device, and the service option may correspond to an application or a protocol used to share data. The device option may include one or more of the following: a printer option, a projector option, and a display option. The printer option may correspond to a nearby printer discovered by the electronic device, the projector option may correspond to a nearby projector discovered by the electronic device, and the display option may correspond to a nearby display discovered by the electronic device. The electronic device may trigger, in response to a detected operation performed on the device option, a first device corresponding to the device option selected in the operation to process the selected picture. The processing may include one or more of the following: printing, projection, and screen mirroring.

One or more pictures in "Gallery" may be further displayed in the "moment share interface", and the one or more pictures may include the picture selected by the user.

Figure 4A:
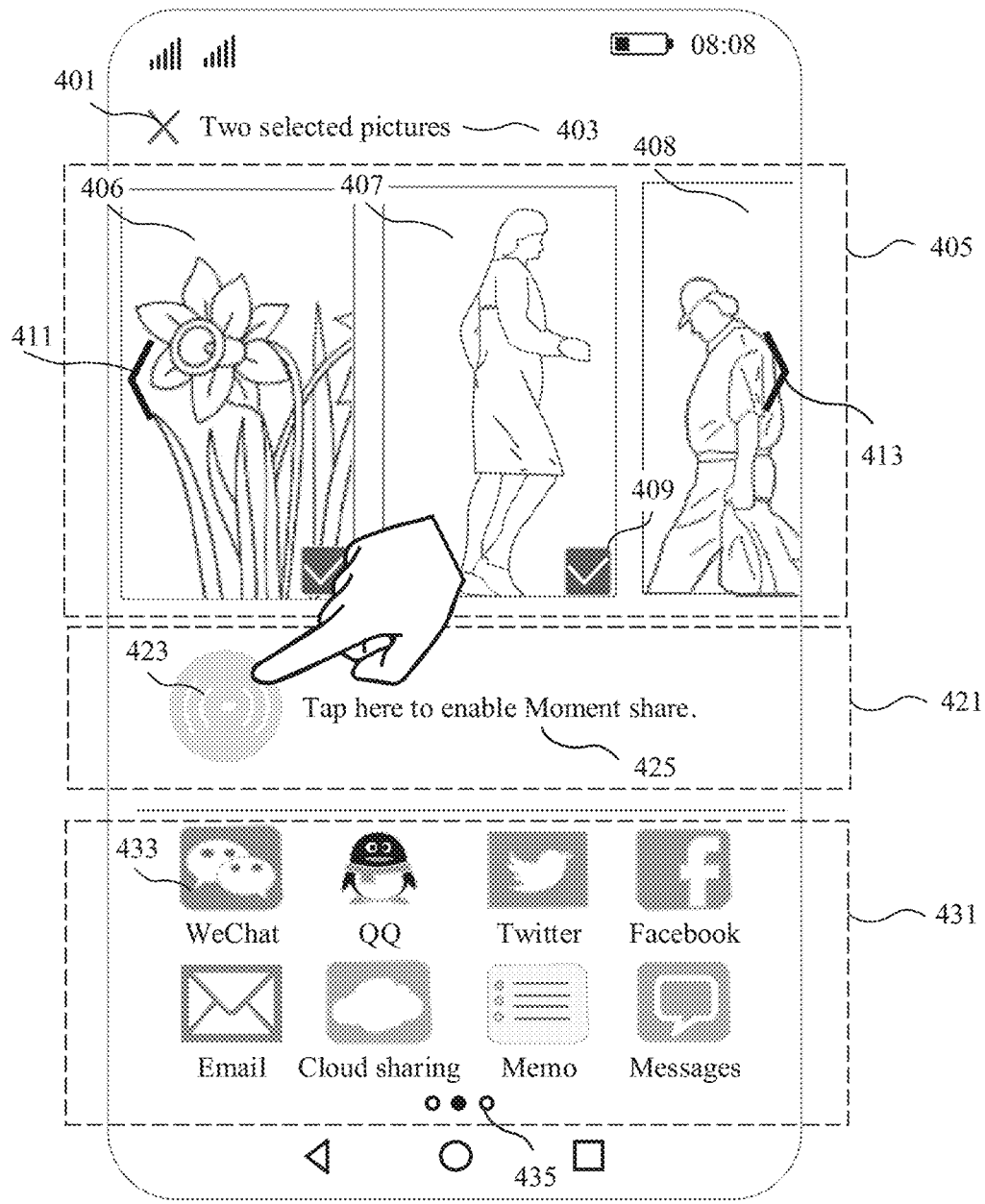
FIG. 4A to FIG. 4H show some user interfaces of a data sharing method according to an embodiment.
Figure 4B:
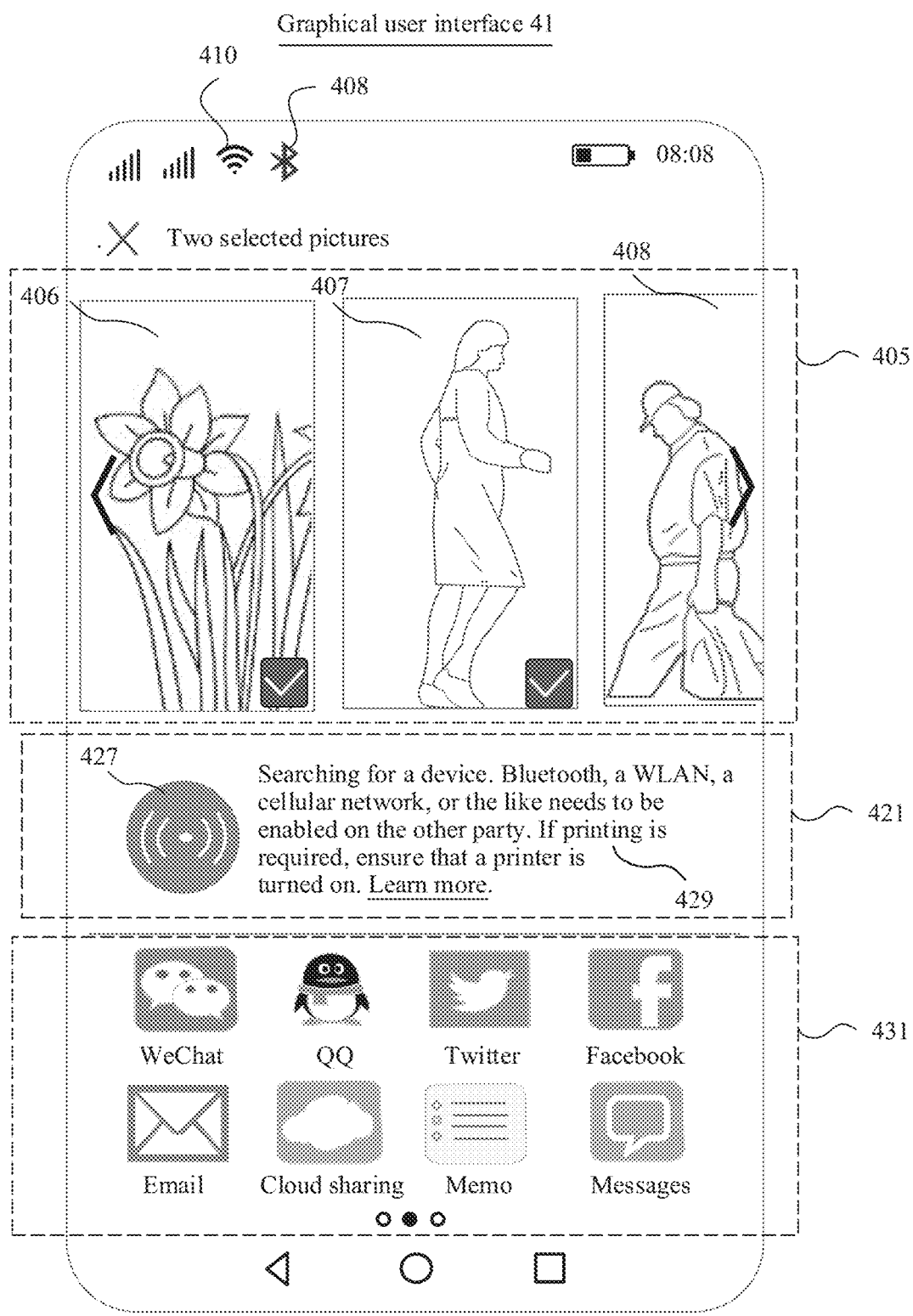
Figure 4C:
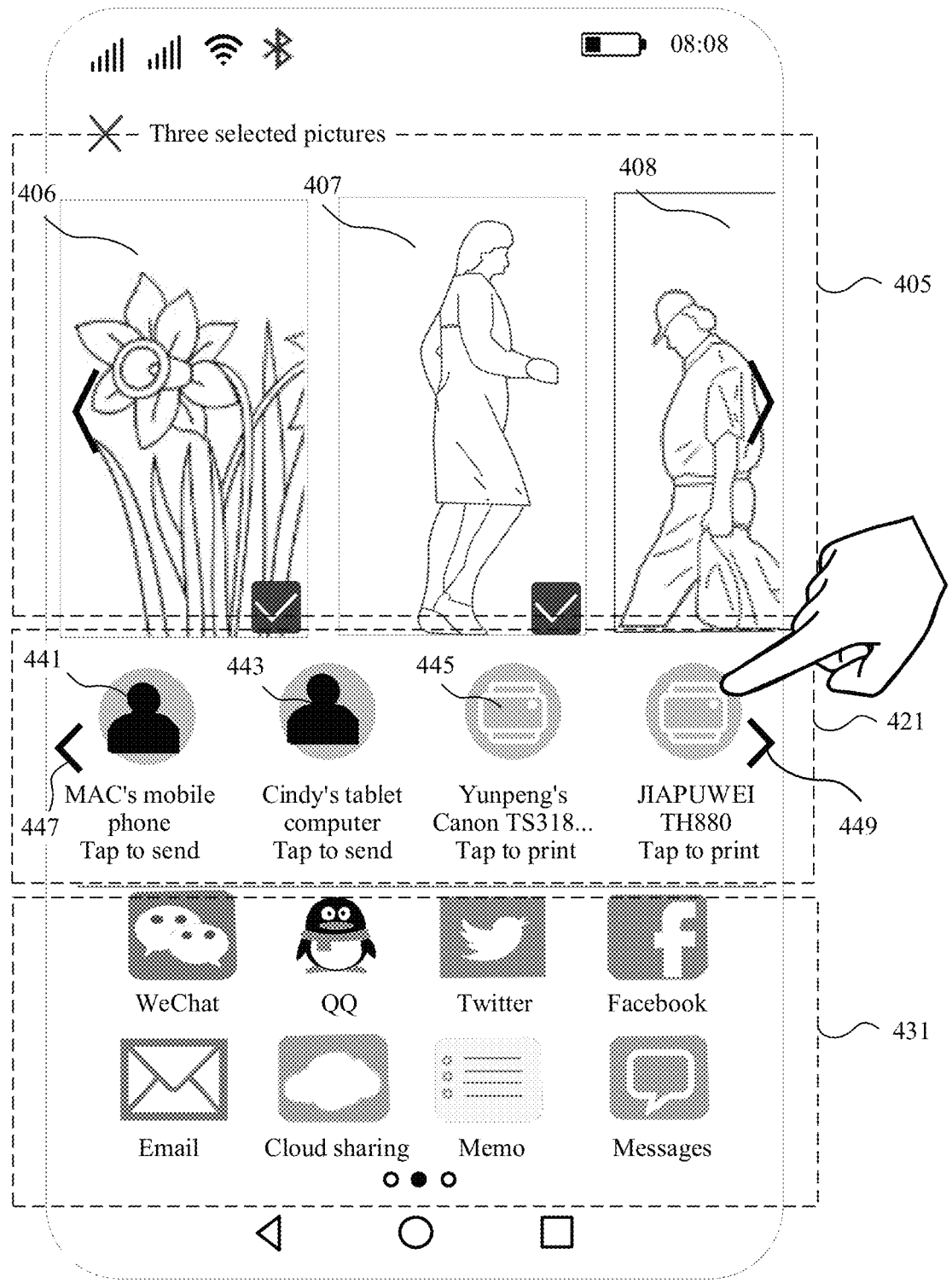

In an embodiment, a user interface 41 shown as an example in FIG. 4A to FIG. 4C may be the "moment share interface". As shown in FIG. 4A to FIG. 4C, the user interface 41 may include an area 405, an area 431, and an area 421.

The area 405 may be used to display one or more pictures in Gallery, and the one or more pictures may include pictures selected by the user, for example, a selected picture 406 and a selected picture 407. In some embodiments, marks 409 may be displayed on the selected picture 406 and the selected picture 407, and the marks 409 may indicate that the picture 406 and the picture 407 that correspond to the marks 409 are selected by the electronic device (that is, the pictures have been selected by the user). In some other embodiments, a control 411 and a control 413 may be further displayed in the area 405, and the two controls may be used to switch or update the picture displayed in the area 405. In addition to the controls, another interactive element may also be displayed in the area 405 to switch or update the picture displayed in the area 405. In some other embodiments, the electronic device may not need to display the controls 411 and 413 in the area 405, and instead, the user performs a leftward or rightward swipe gesture or the like in the area 405 to switch or update the picture. The picture 407 may be a thumbnail. An original picture corresponding to the picture displayed in the area 405 may be a picture stored in the electronic device, or may be stored in the cloud server.

One or more service options (for example, an icon 433) may be displayed in the area 431. An application or a protocol corresponding to the service option may be used to support sharing the picture selected by the user with a contact or a server. In some embodiments, the electronic device may trigger, in response to an operation (for example, a touch operation performed on the icon 433) that is detected in the area 431 and that is performed on the service option, a process of sharing the selected picture with a cloud contact or a server by using an application or a protocol corresponding to the service option. The process may include: The electronic device opens the application or the protocol, displays a user interface of the application or the protocol, and when detecting, in the user interface, an operation of sharing data by the user, shares the selected picture with the cloud contact or the server by using the application or the protocol in response to the operation. In other words, the user may share the data by using the application or the protocol corresponding to the service option. For example, the user shares the selected picture with one or more contacts in WeChat. For another example, the user shares the selected picture with a dynamic publishing platform (namely, a server) of Facebook.

In some other embodiments, a page indicator 435 may be further displayed in the area 431. When a relatively large quantity of service options need to be displayed in the area 431, the service options may be displayed on a plurality of pages. The page indicator 435 may indicate a page on which a currently displayed service option is located.

The area 421 may be used to display an option of a nearby device discovered by the electronic device, and one or more user options. The user option corresponds to a nearby second device discovered by the electronic device. The following describes embodiments of the area 421 in the following cases.

When "Moment share" is not enabled, as shown in FIG. 4A, both an icon 423 and prompt information 425 may be displayed in the area 421. The icon 423 may be used to listen to an operation of enabling "Moment share". The prompt information 425 may be used to prompt the user to enable "Moment share". The prompt information 425 may be text information, for example, "Tap here to enable Moment share". In addition to the text information, the prompt information 425 may be further in another form such as a picture or a link. This is not limited in this embodiment. In some other embodiments, the prompt information 425 in the user interface may not be displayed on the touchscreen, but may be audio played by using the speaker 170A.

It may be understood that in some other embodiments, in addition to the icon 423, the electronic device may further listen to an operation of enabling "Moment share" by using an interactive element (IE) in another form. For example, some or all of the prompt information 425 may also be used to receive the operation of enabling "Moment share". For example, some characters "Tap here" in the prompt information 425 "Tap here to enable Moment share" may be used to receive the operation of enabling "Moment share".

As shown in FIG. 4A, the electronic device may detect an operation (for example, an operation performed by the user on the icon 423, such as tapping, heavy pressing, or touching and holding) performed on the icon 423, and in response to the operation, the electronic device may enable "Moment share", and may further update the area 421. The updated area 421 may be shown in FIG. 4B. The electronic device may further display indicators of related wireless signals of "Moment share" in a status bar, for example, a Wi-Fi indicator 410 and a Bluetooth indicator 408. For details, refer to FIG. 4B.

When "Moment share" is enabled but the electronic device has not discovered a nearby device, as shown in FIG. 4B, both an icon 427 and prompt information 429 may be displayed in the display area 421. The icon 427 may indicate that "Moment share" is enabled. The prompt information 429 may be used to prompt the user with a fact that the electronic device is searching for a nearby device. For example, the prompt information 429 may be text information "Searching for a nearby device. Bluetooth or a WLAN needs to be enabled on the other party. If printing is required, ensure that a printer is turned on. Learn more". "Learn more" can be tapped by the user to show more details than the prompt information 429. In addition to the text information, the prompt information 429 may be further in another form such as a picture. This is not limited in this embodiment. In some other embodiments, the prompt information 429 in the user interface may not be displayed on the touchscreen, but may be audio played by using the speaker 170A.

It may be understood that in addition to the interactive elements (the icon 427 and the prompt information 429) shown as an example in FIG. 4B, an interactive element in another form may be further used in the area 421 to indicate that "Moment share" is enabled and the user is prompted with a fact that the electronic device is searching for a nearby device.

In some embodiments, when the electronic device does not discover a nearby device, the electronic device may not present any content in the display area 421, that is, the display area 421 is blank. Therefore, this may indicate that the nearby device is not discovered currently.

If the electronic device discovers the nearby device after a period of time, the electronic device may update information in the area 421, where an option (for example, an icon or a text) of the nearby device discovered by the electronic device and/or a user option corresponding to a nearby second device discovered by the electronic device may be displayed in the updated area 421. For details, refer to FIG. 4C.

When "Moment share" is enabled and the electronic device discovers the nearby device, as shown in FIG. 4C, the option of the nearby device discovered by the electronic device, for example, a printer icon 445, and/or the user option corresponding to the nearby second device discovered by the electronic device, for example, a user icon 441 or a user icon 443, may be displayed in the area 421.

In other words, the area 421 may be used to display the option of the nearby device discovered by the electronic device, or may be used to display the user option corresponding to the nearby second device discovered by the electronic device. In addition to the device icon (for example, the printer icon 445), the device option may be further represented in another form, for example, text information "Printer". In addition to the user icon, the user option may be further represented in another form, for example, text information "MAC's mobile phone", where "MAC" in the text information "MAC's mobile phone" is a user account, or text information "Cindy's tablet computer", where "Cindy" in the text information "Cindy's tablet computer" is a user account.

The user option (for example, the user icon 441 or the user icon 443) displayed in the area 421 may be used to listen to an operation used to trigger sharing. The electronic device may trigger, in response to a detected operation (for example, a touch operation performed on the user icon) performed on the user option, a process of sharing a selected picture to a second device corresponding to the user option selected in the operation. The process may include: The electronic device establishes a communication connection to the second device corresponding to the selected user option, and then transmits, by using the communication connection, the selected picture to the second device corresponding to the user option.

A printer option (for example, the printer icon 445) displayed in the area 421 may be used to listen to an operation of selecting a printer to trigger printing. For example, the operation may be an operation (for example, a touch operation performed on the printer icon) performed on the printer option. How the electronic device processes the detected operation of selecting the printer to trigger printing is described in detail in the following embodiments.

In some embodiments, the printer corresponding to the printer option displayed in the area 421 is a printer that can support printing the selected picture. Herein, supporting printing may mean that a format supported by the printer includes a format (for example, a picture format of a picture) of data selected by the user. In some embodiments, the electronic device may first determine whether a print format supported by the discovered printer includes a format of the selected picture. If the print format supported by the discovered printer does not include the format of the selected picture, the electronic device may not display, in the area 421, the printer option corresponding to the printer. If the print format supported by the discovered printer includes the format of the selected picture, the electronic device may display, in the area 421, the printer option corresponding to the printer. Therefore, the printer corresponding to the printer option displayed in the area 421 can support printing the picture selected by the user. In this way, a problem that data printing fails because the user selects an inappropriate printer can be avoided, thereby avoiding a waste of resources, and improving use efficiency of the electronic device.

In some embodiments, the printer corresponding to the printer option displayed in the area 421 is a printer can normally work. Herein, normally working may include one or more of the following: The printer has sufficient consumables (for example, an ink cartridge and paper), the printer has no abnormality (for example, an abnormal temperature or an extremely low battery level), and the like. In this way, a problem that data printing fails because the user selects a printer that cannot normally work can be avoided, thereby avoiding a waste of resources, and improving use efficiency of the electronic device.

In some embodiments, a control 447 or a control 449 may be further displayed in the area 421. The control 447 or the control 449 may be used by the user to switch or update the device option displayed in the area 421, so that more discovered first devices can be viewed. In addition to the controls, another interactive element may also be used by the user to switch the device option displayed in the area 421. In some other cases, the user may further perform a leftward or rightward swipe gesture in the area 421 to switch or update the device option displayed in the area 421.

In some other embodiments, the electronic device may automatically update information in the area 421, and a device option corresponding to a nearby device currently discovered by the electronic device may be displayed in the updated area 421. The device option corresponding to the nearby device that is discovered once by the electronic device but cannot be discovered currently may no longer be displayed in the area 421. In addition, a device option corresponding to a nearby device that is newly discovered by the electronic device may be displayed in the area 421. In some other cases, a control may be further displayed in the rea 421, and the control is used by the user to manually update a device option corresponding to a currently discovered nearby device.

In some other embodiments, as shown in FIG. 4C, operation prompt information corresponding to the device option may be further displayed in the area 421. Operation prompt information corresponding to a device option may be used to prompt the user with an operation that can be used to trigger the electronic device to share data with the first device corresponding to the device option, or trigger the first device corresponding to the device option to perform corresponding processing, such as printing, projection, or screen mirroring, on selected data (for example, the selected picture).

For example, text information "Tap to print" displayed below the printer icon 445 may be used to prompt the user to tap the icon 445 to trigger the printer to print the selected picture. To be specific, operation prompt information corresponding to the printer option may be used to prompt the user to trigger, through an operation (for example, a touch operation performed on the printer icon) performed on the printer option, the printer corresponding to the printer option to print the selected picture. For another example, operation prompt information corresponding to the projector option may be used to prompt the user to trigger, through an operation (for example, a touch operation performed on the projector icon) performed on the projector option, a projector corresponding to the projector option to project the selected picture. For still another example, operation prompt information corresponding to the display option may be used to prompt the user to trigger, through an operation (for example, a touch operation performed on the display icon) performed on the display option, a display corresponding to the display option to display the selected picture.

The foregoing examples are merely some embodiments provided in an embodiment, and should not be construed as a limitation. In addition to the operation performed on the device option (for example, the device icon), the operation prompt information corresponding to the device option may be further used to prompt the user to trigger, by performing an operation in another form, the first device (for example, the printer) corresponding to the device option to perform different processing on data shared by the electronic device. For example, the operation prompt information may be used to prompt the user to perform a specific gesture of drawing a circle counterclockwise on the printer option (for example, the printer icon) to trigger the printer corresponding to the printer option to print the selected picture. For another example, the operation prompt information may be further used to prompt the user to perform a specific gesture of drawing a circle clockwise on the projector option (for example, the projector icon) to trigger the projector corresponding to the projector option to project the selected picture.

It may be understood that in an embodiment, in addition to the area 405, the area 421, and the area 431 described above, the "moment share interface" may further include an interactive element in another form. As shown in FIG. 4A to FIG. 4C, the user interface 41 may further include a title bar, and both a control 401 and indication information 403 may be displayed in the title bar. The control 401 may be used to cancel an operation of selecting a picture for sharing, that is, the user may tap the control 401 to cancel sharing of the selected picture. The indication information 403 may be used to indicate a quantity of selected pictures.

In the "moment share interface" shown in FIG. 4A to FIG. 4C, an area (for example, the area 405) used to display one or more pictures may be referred to as a first area, an area (for example, the area 431) used to display a service option (for example, a WeChat icon or a Mailbox icon) may be referred to as a second area, and an area (for example, the area 521) used to display a user option and a device option may be referred to as a third area. An interactive element (for example, the icon 423) that is displayed in the third area and that is used to enable "Moment share" may be referred to as a first interactive element.

The device option displayed in the examples of the UI embodiments shown in FIG. 4A to FIG. 4H is specifically the nearby device option, and corresponds to the nearby first device discovered by the electronic device, such as the printer, the projector, or the display.

In addition to page layouts shown in FIG. 4A to FIG. 4C, a page layout of the "moment share interface" may be further presented in another form. This is not limited in this embodiment.

Related User Interface Used to Select a Printer for Printing

As shown in FIG. 4C, the electronic device may detect an operation (for example, tapping) performed on the printer icon in the area 421. In other words, the electronic device may detect, in the area 421, an operation (for example, a touch operation performed on the printer icon) performed on the printer option. The operation is an operation of selecting the printer for printing, and can be used to trigger printing. The printer corresponding to the printer option on which the operation is performed is a selected printer, namely, a printer selected by the user.

Figure 4D:
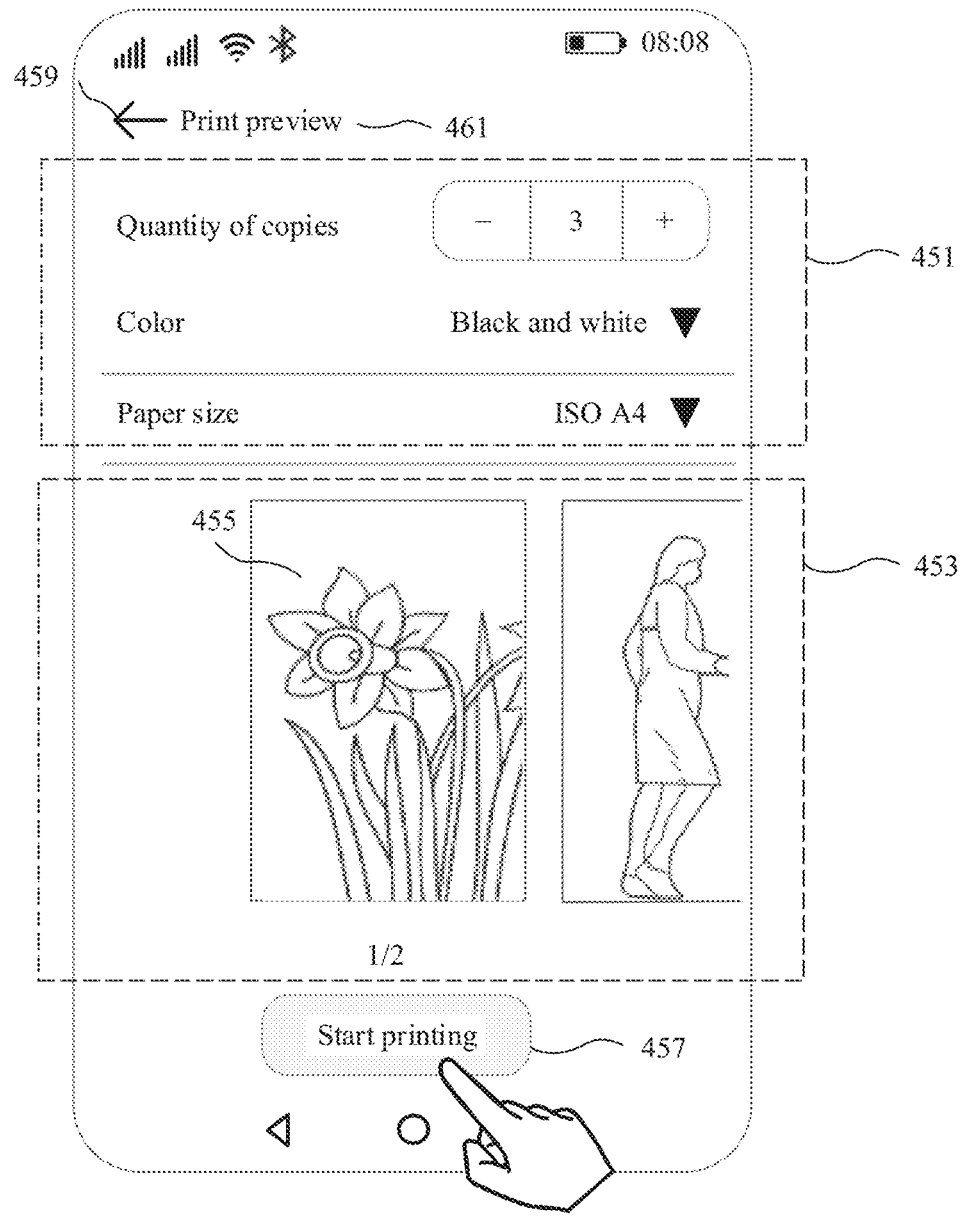

In some embodiments, the electronic device may display, in response to the detected operation (for example, a touch operation performed by the user on the printer option), a user interface 43 shown in FIG. 4D. The user interface 43 may be used by the user to perform a print setting.

As shown in FIG. 4D, the user interface 43 may include but is not limited to an area 431, an area 453, and a control 457.

The area 431 may be used by the user to perform a print setting, for example, set a quantity of to-be-printed copies, a paper size, and a print color. The area 453 may display a selected picture (for example, a picture 455), and may support the user in selecting (for example, selecting by performing a leftward or rightward swipe operation) a picture on which a print setting needs to be performed. It should be understood that the picture 455 in the area 453 may be a thumbnail. An original picture corresponding to the picture 455 may be a picture stored in the electronic device, or may be stored in a cloud server. In some embodiments, the user interface 43 may alternatively be used for a print preview. For example, a display state (for example, a color or a paper size) of the picture 455 may be determined based on the print setting selected by the user in the area 431. In this way, the user can view a print effect in advance, thereby improving user experience.

The control 457 may be used to listen to an operation used to trigger a selected printer to perform printing based on the existing print setting. Text information "Start printing" may be displayed on the control 457. In addition, prompt information in another form may be further displayed on the control 457 to prompt the user to trigger the selected printer to perform printing based on the existing print setting, for example, text information "Setting completed". The electronic device may trigger, in response to the operation (for example, a touch operation performed by the user on the control 457) detected on the control 457, the selected printer "JIAPUWEI TH880" to print the selected picture based on the existing print setting (namely, the print setting selected by the user in the area 431).

It can be learned from the foregoing descriptions that in the foregoing embodiment, when the user triggers printing, the user interface 43 used by the user to perform the print setting may be provided, so that the user performs the print setting, for example, sets the quantity of to-be-printed copies, the paper size, and the print color. In this way, the electronic device can provide personalized selection that meets different user requirements for a print service, thereby improving user experience.

In some other embodiments, the electronic device may trigger, in response to a detected operation (for example, a touch operation performed on the printer icon) performed on the printer option, the selected printer (for example, "JIAPUWEI TH880") to print the selected picture based on a default print setting. For example, the default print setting may include: A quantity of to-be-printed copies is 1, a default paper size is A4, a default print color is black and white, and the like. It can be learned that in the foregoing embodiment, when the user triggers printing, a print service based on the default print setting may be provided, and the user interface 43 shown in FIG. 4D may not need to be displayed. This simplifies an operation of printing a file by using the electronic device, and improves print efficiency of the electronic device.

The following describes an embodiment of selecting a plurality of printers for printing at a time.

In some embodiments, the electronic device may detect, in the "moment share interface", an operation of dragging selected pictures to a plurality of printer options, and the electronic device may trigger, in response to the operation, printers corresponding to the plurality of printer options to respectively print pictures allocated to the printers. A picture allocated to a printer corresponding to a printer option may be a picture dragged to the printer option.

For example, in the "moment share interface" shown as an example in FIG. 4C, when the selected pictures are the picture 406 and the picture 407, and the electronic device detects an operation of dragging the picture 406 to an icon of "Yunpeng's Canon TS318 . . . ", and detects an operation of dragging the picture 407 to an icon of "JIAPUWEI TH880", in response to the two operations, the electronic device may trigger the printer "Yunpeng's Canon TS318 . . . " to print the picture 406, and may trigger the printer "JIAPUWEI TH880" to print the picture 408. To be specific, the user may drag the selected pictures to different printer options in the "moment share interface", to allocate the selected pictures to different printers for printing, thereby improving print efficiency and user experience. In addition to the selected pictures, the user may further drag an unselected picture to a printer option in the "moment share interface". In addition to the drag operation, in the "moment share interface", the operation used to allocate the pictures to the plurality of printers may be further presented in another form. This is not limited in this application.

In some other embodiments, the electronic device may detect, in the "moment share interface", an operation of selecting a plurality of printer options, for example, detect an operation of consecutively tapping the plurality of printer options. Herein, the consecutive tapping may be a plurality of tap operations performed in a preset time period (for example, 1 second). Printers corresponding to the plurality of printer options selected in the operation are selected printers. The electronic device may trigger, in response to the operation according to a preset allocation policy, the selected printer to print the selected picture, thereby improving print efficiency and user experience. The preset allocation policy may be randomly allocating the selected pictures to the printers corresponding to the plurality of printer options for printing, or evenly allocating the selected pictures to the printers corresponding to the plurality of printer options for printing. The preset allocation policy may alternatively be that each selected printer prints all selected pictures. The preset allocation policy is not limited in this application.

In some embodiments, after triggering the printer to perform printing, the electronic device may further display a notification window 471 shown as an example in one or more of FIG. 4E to FIG. 4H, and may display, in the notification window 471, prompt information 475 indicating a print status of selected data (for example, a selected picture). For example, as shown in FIG. 4E to FIG. 4H, the prompt information 475 may be "Print task is queuing . . . ", "JIAPUWEI TH880 is printing . . . ", "Printing is completed", "Printing fails", or the like. In this way, the user can very intuitively view a current print status, thereby improving user experience.

In some other embodiments, the prompt information 475 in the user interface may not be displayed on the touchscreen, but may be audio played by using the speaker 170A.

User Interface Used to Feed Back a Print Status

In some embodiments, after the printer is triggered to perform printing, as shown in one or more of FIG. 4E to FIG. 4H, the electronic device may display the notification window 471 in the user interface 21 shown as an example in FIG. 2A. The user interface 21 may be a home screen. In this way, the user may return to the home screen to perform another transaction, for example, open another application. The notification window 471 may be used to prompt the user with the print status of the selected picture.

Figure 4E:
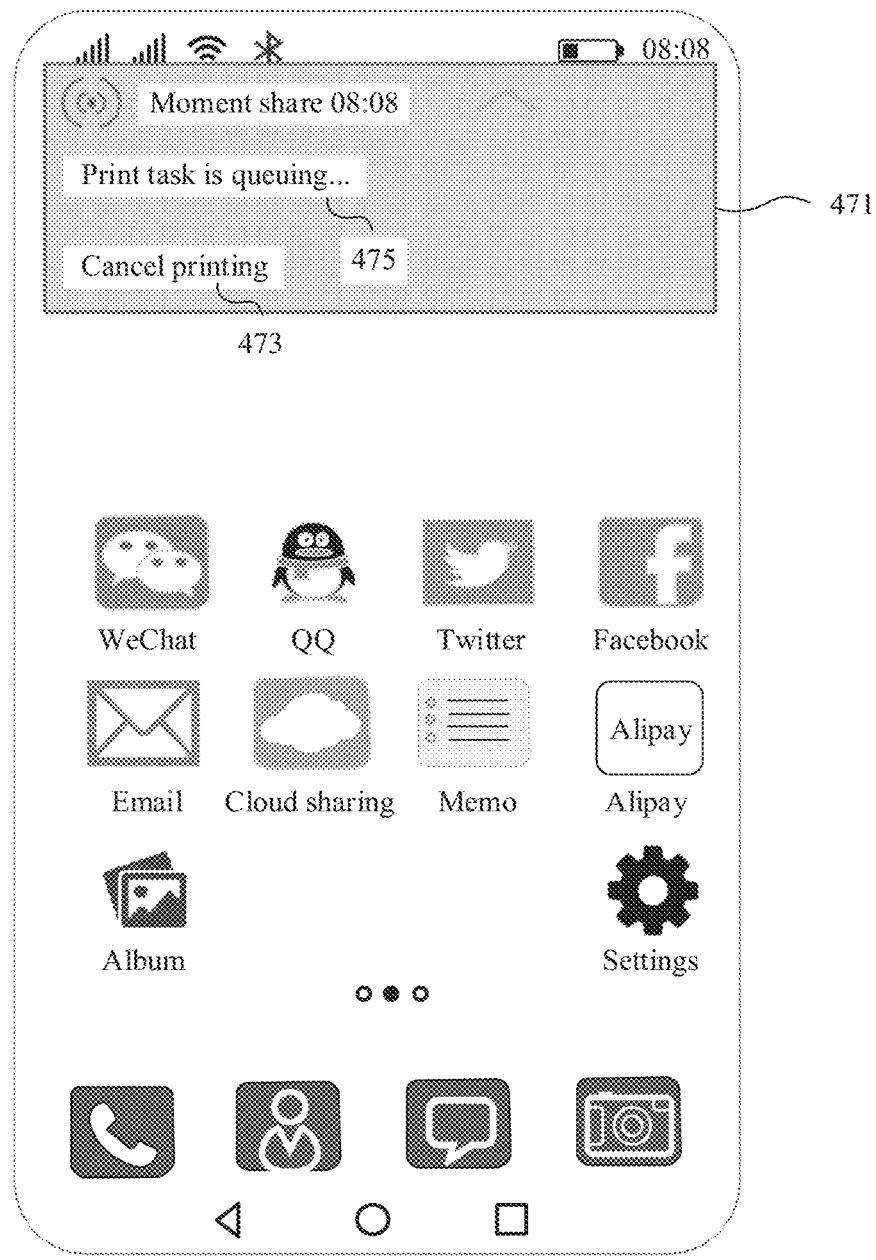

As shown in FIG. 4E, the electronic device may display the prompt information 475 in the notification window 471, where the prompt information 475 may be used to indicate that the print status of the selected picture is a first print state. The first print state may indicate that a print task of the selected picture is in a print task queue of a printer, and is waiting in the queue to be processed by the printer. The prompt information 475 may be text information "Print task is queuing . . . ", and is not limited thereto. The prompt information 475 may alternatively be information in another form such as a picture or an animation.

In some embodiments, as shown in FIG. 4E, when the printer state prompted by the prompt information 475 in the notification window 471 is the first print state, the electronic device may further display a control 473 in the notification window 471. Text information "Cancel printing" may be displayed on the control 473. When the electronic device detects an operation (for example, a touch operation performed by the user on the control 473) performed on the control 473, the electronic device may cancel printing of the selected picture in response to the operation. Herein, canceling printing is canceling the print task. To be specific, the print task of the selected picture is deleted from the print task queue of the printer, and therefore the printer does not print the selected picture.

Figure 4F:
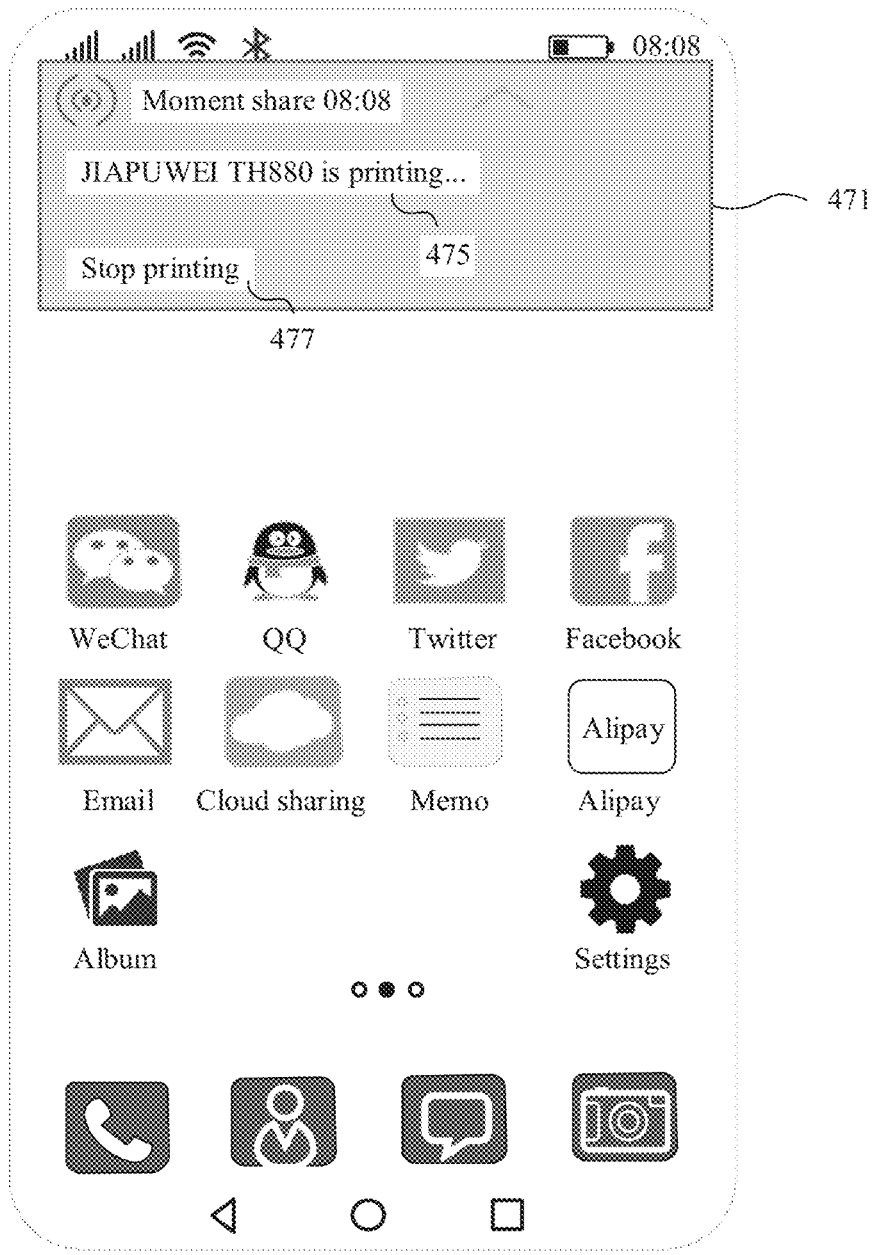

As shown in FIG. 4F, the electronic device may display the prompt information 475 in the notification window 471, where the prompt information 475 may be used to prompt the user with a fact that the print status of the selected picture is a second print state. The second print state may indicate that the printer is printing the selected picture. The prompt information 475 may be text information "Printing . . . ", and is not limited thereto. The prompt information 475 may alternatively be information in another form such as a picture or an animation.

In some embodiments, as shown in FIG. 4F, when the printer state prompted by the prompt information 475 in the notification window 471 is the second print state, the electronic device may further display a control 477 in the notification window 471. Text information "Stop printing" may be displayed on the control 477. When the electronic device detects an operation (for example, a touch operation performed on the control 477) performed on the control 477, the electronic device may stop printing of the selected picture in response to the operation. Herein, stopping printing is stopping a current printing task. In other words, the printer may have finished partial printing. In some other embodiments, when detecting an operation performed on the control 477, the electronic device may further display, in response to the operation, another piece of prompt information (not shown in the figure) in the notification window 471, where the prompt information may indicate which selected pictures have been printed and which selected pictures have not been printed.

Figure 4G:
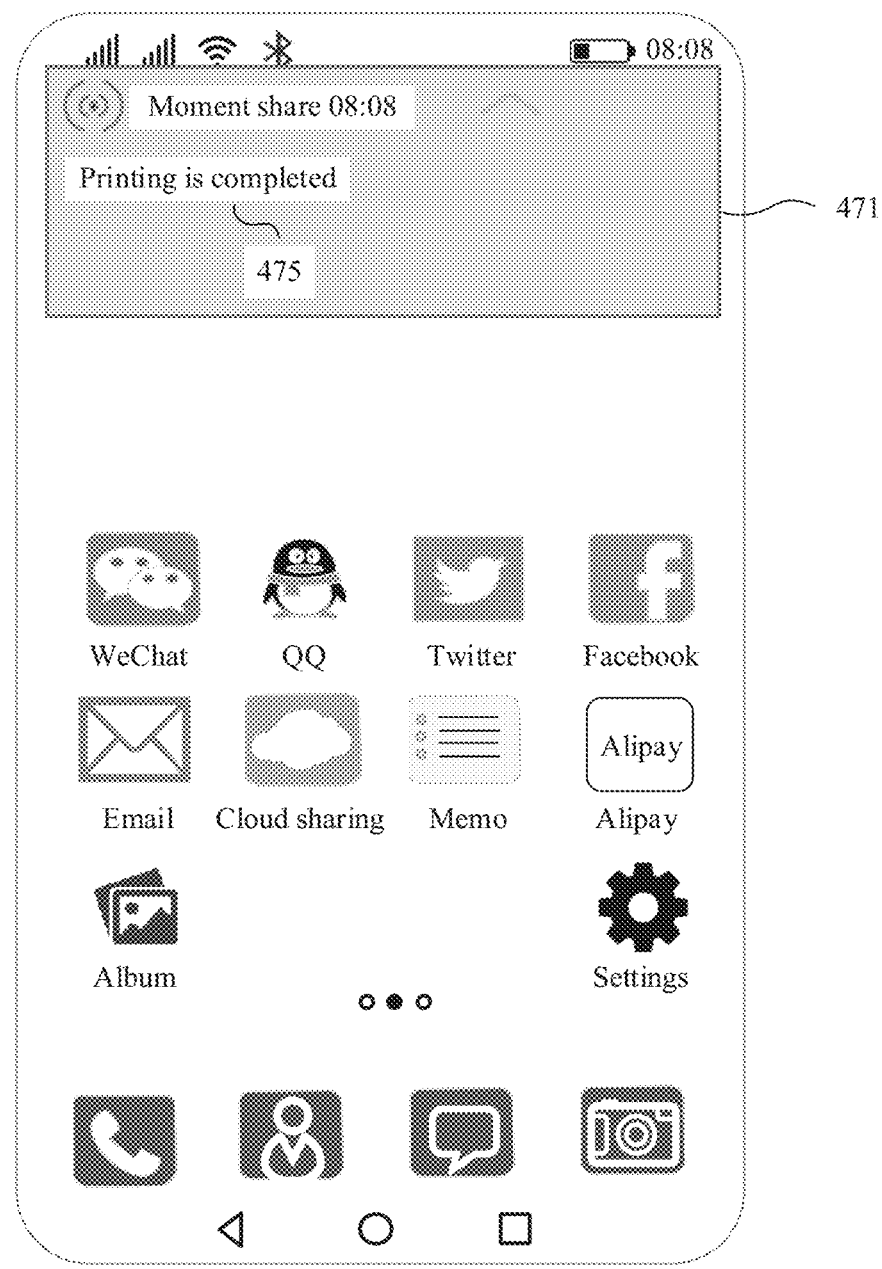

As shown in FIG. 4G, the electronic device may display the prompt information 475 in the notification window 471, where the prompt information 475 may be used to indicate that the print status of the selected picture is a third print state. The third print state may indicate that printing of the selected picture is complete. The prompt information 475 may be text information "Printing is completed", and is not limited thereto. The prompt information 475 may alternatively be information in another form such as a picture or an animation.

Figure 4H:
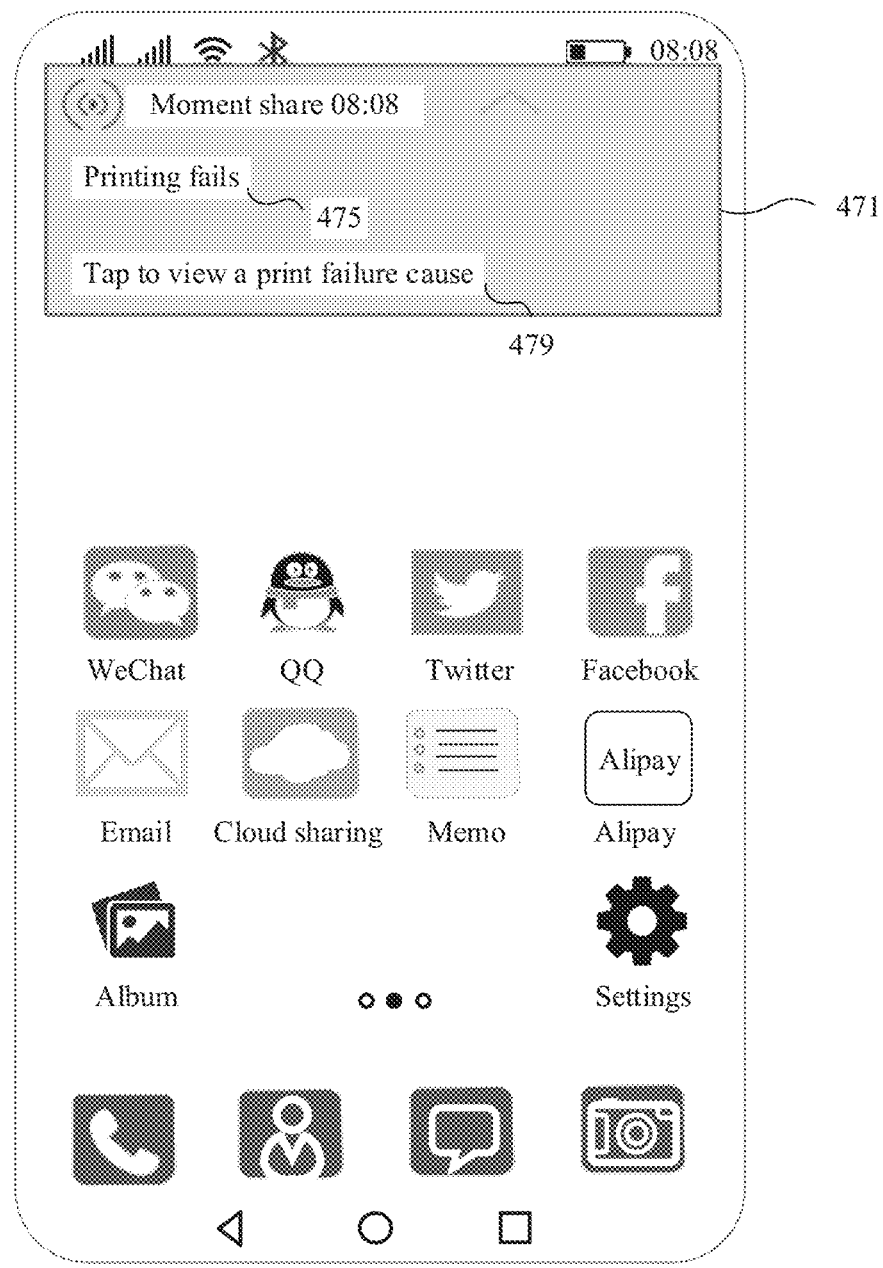

As shown in FIG. 4H, the electronic device may display the prompt information 475 in the notification window 471, where the prompt information 475 may be used to indicate that the print status of the selected picture is a fourth print state. The fourth print state may indicate that the printer fails to print the selected picture. The prompt information 475 may be text information "Printing fails", and is not limited thereto. The prompt information 475 may alternatively be information in another form such as a picture or an animation.

In some embodiments, as shown in FIG. 4H, when the printer state prompted by the prompt information 475 in the notification window 471 is the fourth print state, the electronic device may further display a control 479 in the notification window 471. Text information "Tap to view a print failure cause" may be displayed on the control 479. When the electronic device detects an operation (for example, a touch operation performed by the user on the control 479) performed on the control 479, the electronic device may display a detailed print failure cause in response to the operation. In this way, the electronic device can more accurately prompt the user with a specific print failure cause, so that the user can perform correction in time when printing is performed next time.

In addition to the control 479 shown in FIG. 4H, the electronic device may further display the specific print failure cause in the notification window 471, for example, a failure cause such as a paper jam, exhaustion of consumables, an incorrect picture format, a low battery level, or overheating. In some other embodiments, the prompt information 475 may be used to prompt the user with the specific print failure cause.

In this application, the notification window 471 may be referred to as a first notification window.

According to the UI embodiments shown as the examples in FIG. 4A to FIG. 4H, the electronic device may automatically discover the printer when the user needs to share the picture, and intuitively present the discovered printer to the user, so that the user can tap the printer option to trigger the printer to print the picture selected by the user, and user experience is intuitive and simple, thereby greatly improving efficiency of performing a print service by using the electronic device.

UI Embodiments Shown as Examples in FIG. 5A to FIG. 5J

In the UI embodiments shown as the examples in FIG. 5A to FIG. 5J, the user may select a printer near the electronic device that is discovered by the electronic device to print a picture. The picture selected by the user may be a picture stored in the electronic device, or may be a picture in a cloud server accessed by the electronic device.

"Moment share" may be used to support the user in sharing data with a device near the electronic device. The nearby device may include a nearby first device, for example, a nearby printer, a nearby projector, or a nearby display, or may include a nearby second device, for example, a nearby mobile phone, a nearby tablet computer, or a nearby personal computer. Enabling "Moment share" may be enabling one or more of a WLAN or Bluetooth. After enabling "Moment share", the electronic device may discover the device near the electronic device by using a communications technology such as Bluetooth, Wi-Fi direct (such as Wi-Fi P2P), Wi-Fi SoftAP, or a Wi-Fi LAN.

Different from the UI embodiments shown as the examples in FIG. 4A to FIG. 4H, in the embodiments, to improve data security of a print service, authentication may also need to be performed on a print service of a printer, that is, only after verifying validity of the electronic device, the printer can start to process the print service related to the electronic device. In some embodiments, authentication may be performed by requesting, by the printer, the electronic device to pay a print service fee. To be specific, the fee needs to be paid for the printer selected by the user, and the electronic device is authorized for printing only after the fee is successfully paid. In some other embodiments, authentication may be performed in a manner of a whitelist or a blacklist, and only an electronic device in the whitelist is authorized for printing, or only an electronic device that is not in the blacklist is authorized for printing. In some other embodiments, authentication may be performed by entering a dynamic verification code (sent to the electronic device) on the printer, and the electronic device is authorized for printing only after the dynamic verification code is correctly entered. In some embodiments, the printer may further set a plurality of authentication levels, and the authentication level may be determined based on a print setting selected by the user. For example, a more complex print setting indicates a higher authentication level of the print service, that is, an authentication process is more complex. For another example, a more complex print setting indicates a lower authentication level of the print service, that is, an authentication process is simpler.

The Following Describes User Interfaces Provided in the Examples of the UI Embodiments Shown in FIG. 5A to FIG. 5J.

"Moment Share Interface"

Figure 5A:
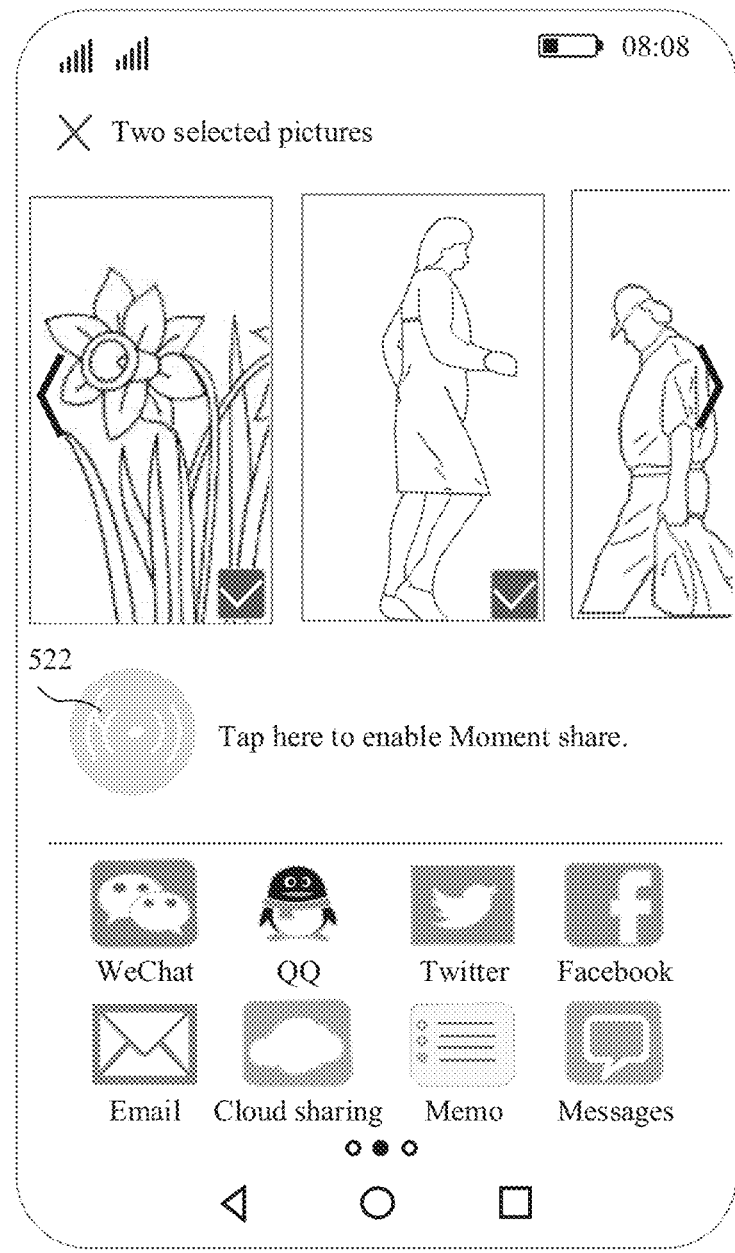
FIG. 5A to FIG. 5J show some other user interfaces of a data sharing method according to an embodiment.
Figure 5B:
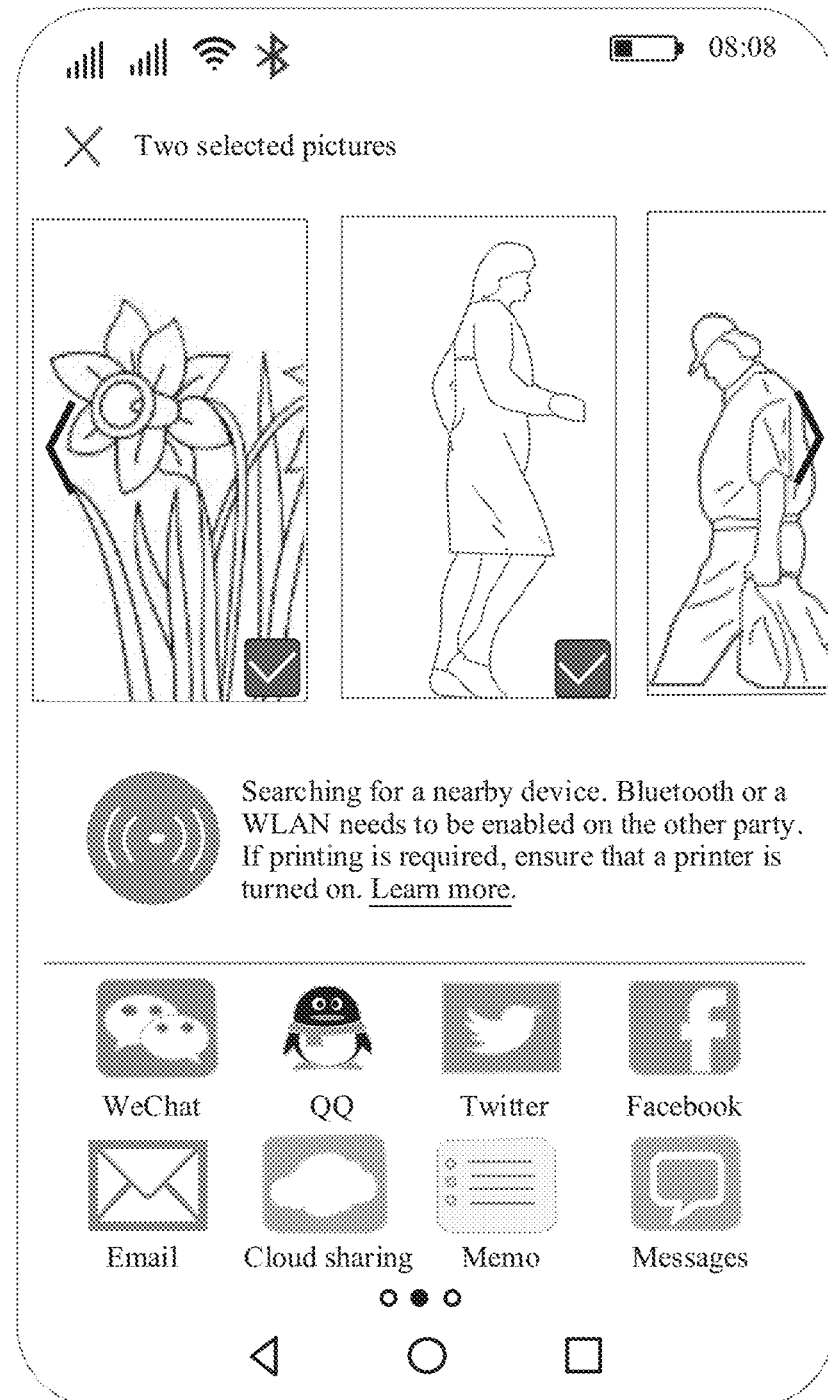
Figure 5C:
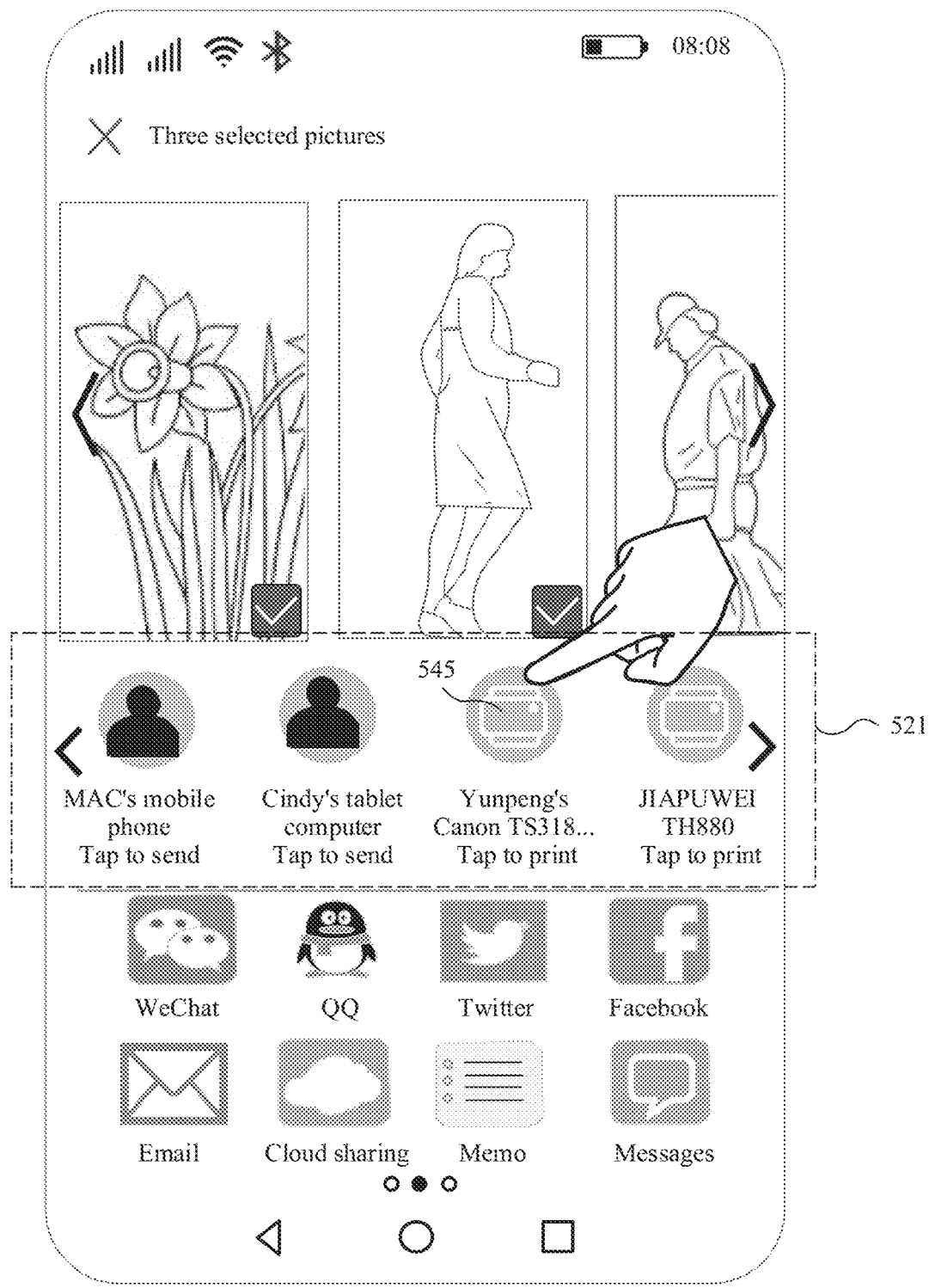

A user interface 51 shown as an example in FIG. 5A to FIG. 5C may be the "moment share interface" mentioned in the foregoing content. For an embodiment of the user interface 51, refer to the user interface 41 shown in FIG. 4A to FIG. 4C. Details are not described herein again.

In the "moment share interface" shown in FIG. 5A to FIG. 5C, an area used to display one or more pictures may be referred to as a first area, an area used to display a service option (for example, a WeChat icon or a Mailbox icon) may be referred to as a second area, and an area (for example, an area 521) used to display a user option and a device option may be referred to as a third area. An interactive element (for example, an icon 522) that is displayed in the third area and that is used to enable "Moment share" may be referred to as a first interactive element.

Related User Interface Used to Select a Printer for Printing

As shown in FIG. 5C, the electronic device may detect, in the area 521, a touch operation performed on a printer icon. In other words, the electronic device may detect, in the area 521, an operation (for example, a touch operation performed by the user on the printer icon) performed on the printer option. The operation is an operation of selecting the printer for printing, and can be used to trigger printing. The printer corresponding to the printer option on which the operation is performed is a selected printer, namely, a printer selected by the user.

In some embodiments, for the detected operation in the area 521, if authentication needs to be performed on the printer (for example, "Yunpeng's Canon TS318 . . . ") selected by the user, in response to the detected operation (for example, a touch operation performed by the user on the printer option), the electronic device may first display a user interface (for example, a user interface 53) used by the user to perform a print setting, and after the print setting is completed, the electronic device displays a user interface used for authentication. After the authentication succeeds, the printer selected by the user may print the selected picture based on the print setting selected by the user.

Figure 5D:
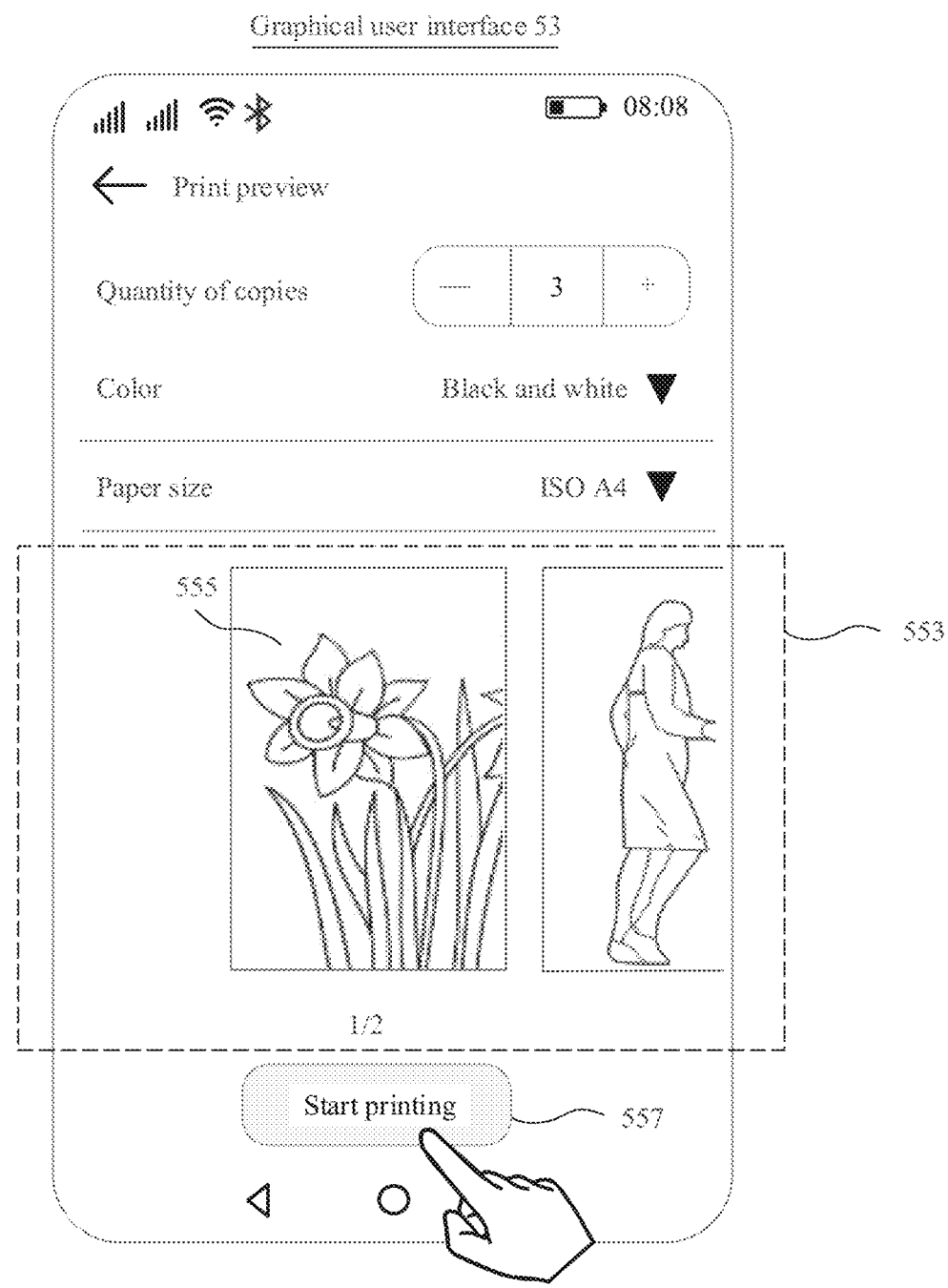

FIG. 5D shows an example of the user interface 53 that may be used by the user to perform the print setting. For display content in the user interface 53, refer to the user interface 43 described in FIG. 4D. Details are not described herein again. The electronic device may display, in response to an operation (for example, a touch operation performed by the user on a control 557) detected on the control 557, a user interface used for authentication, for example, related user interfaces used to pay a print fee that are shown as examples in FIG. 5E and FIG. 5F.

Figure 5E:
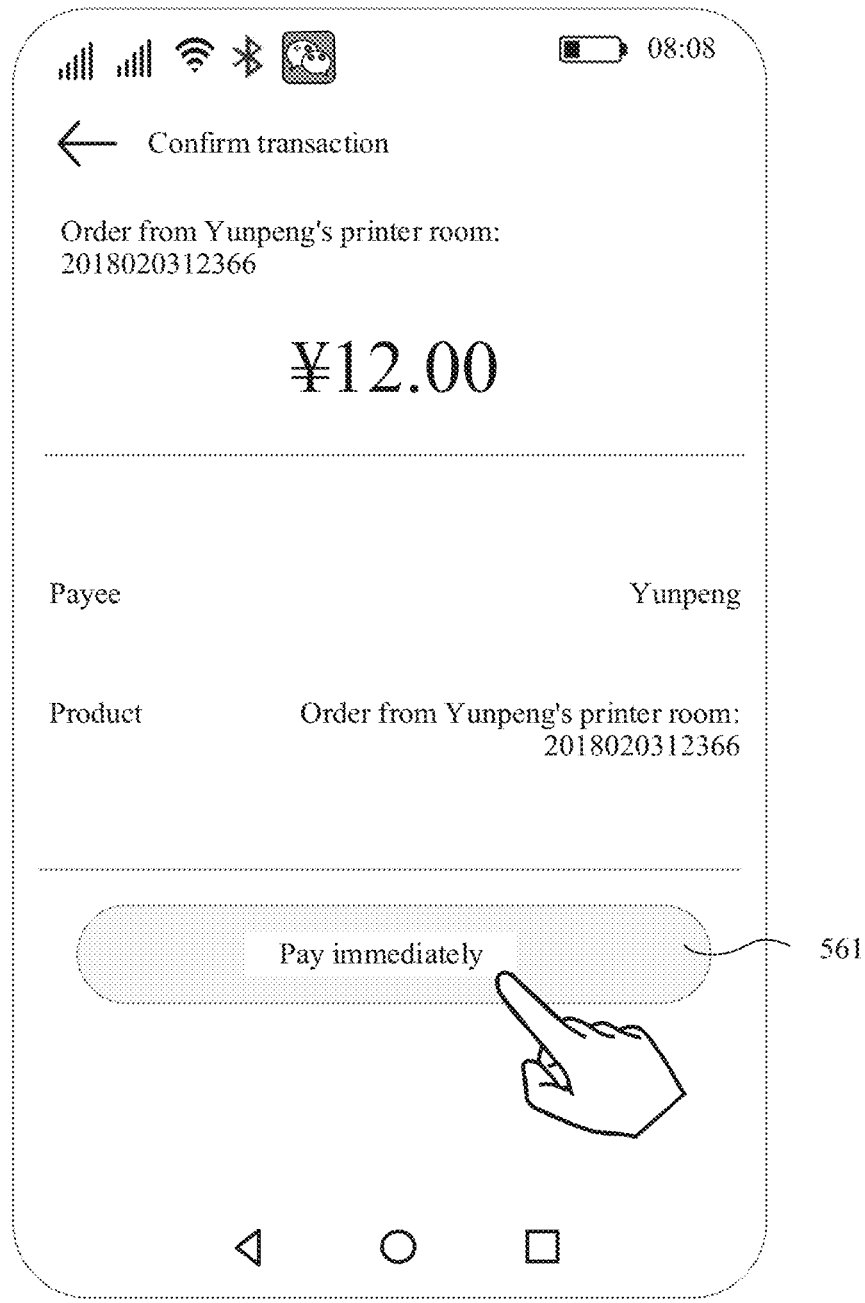
Figure 5F:
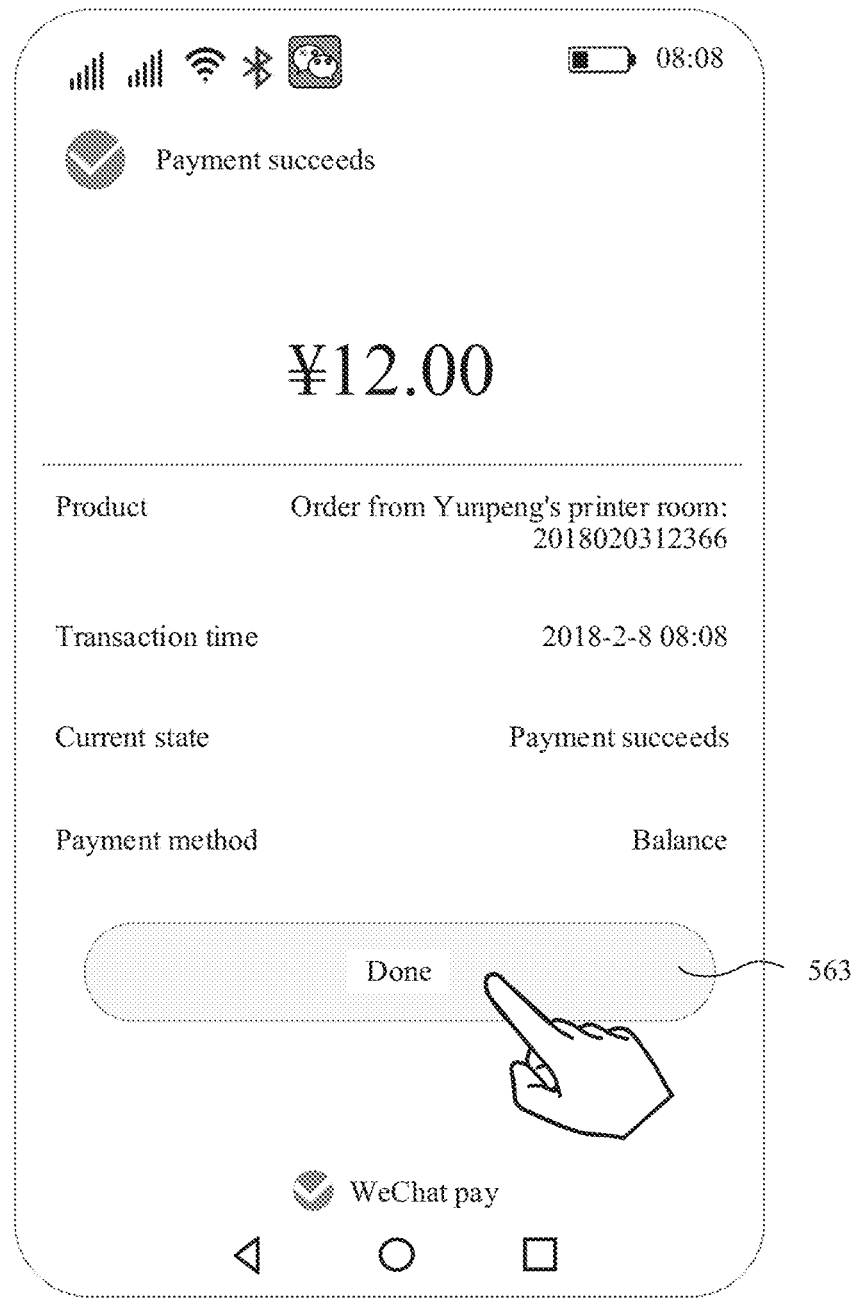
Figure 5G:
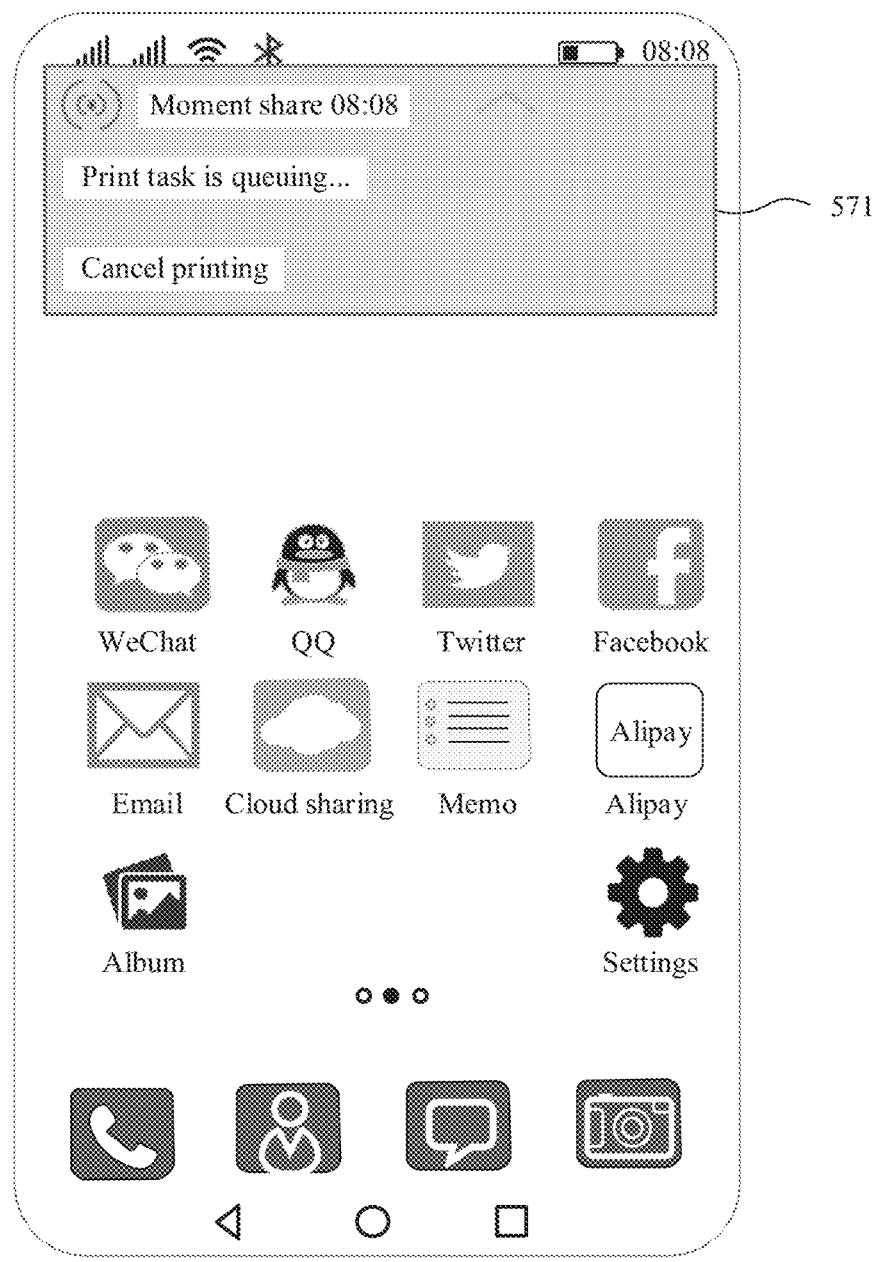
Figure 5H:
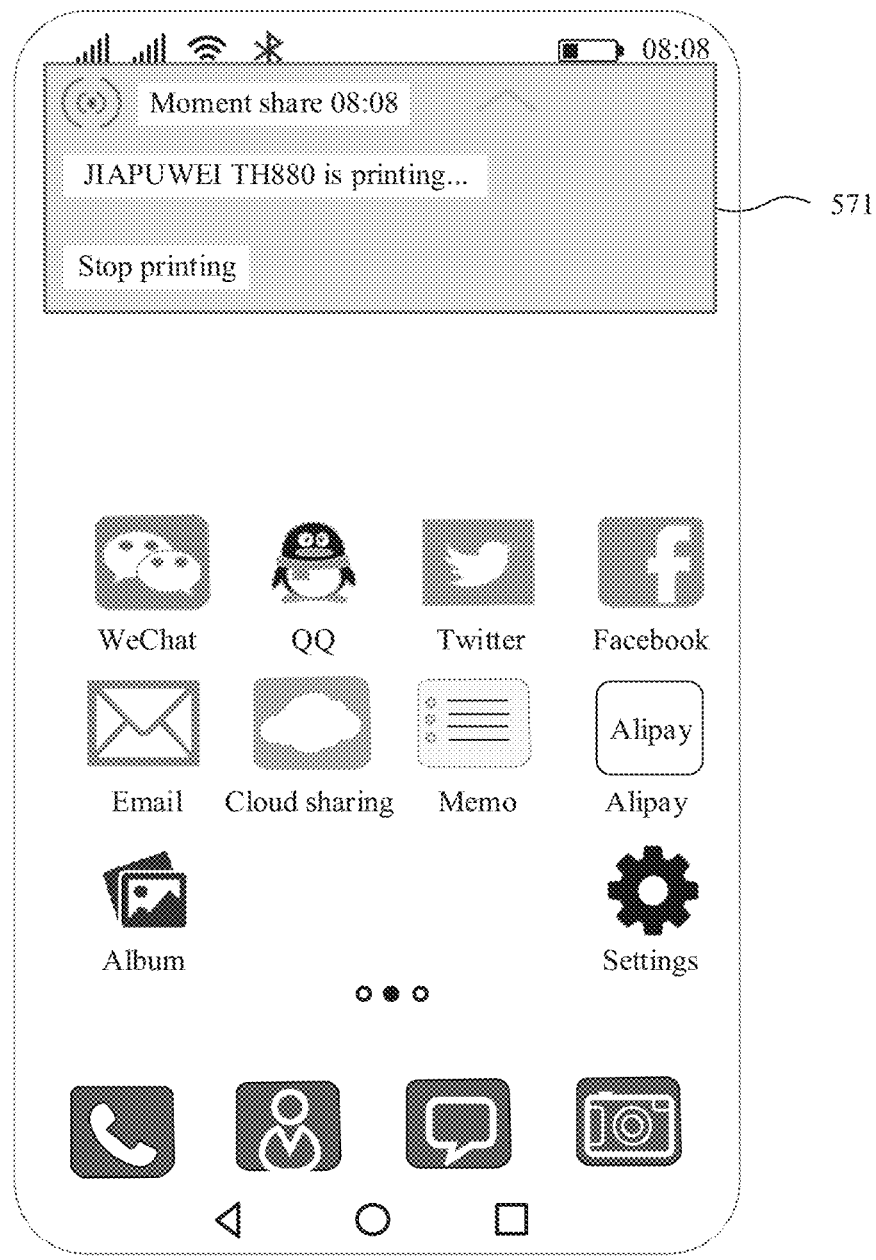
Figure 5I:
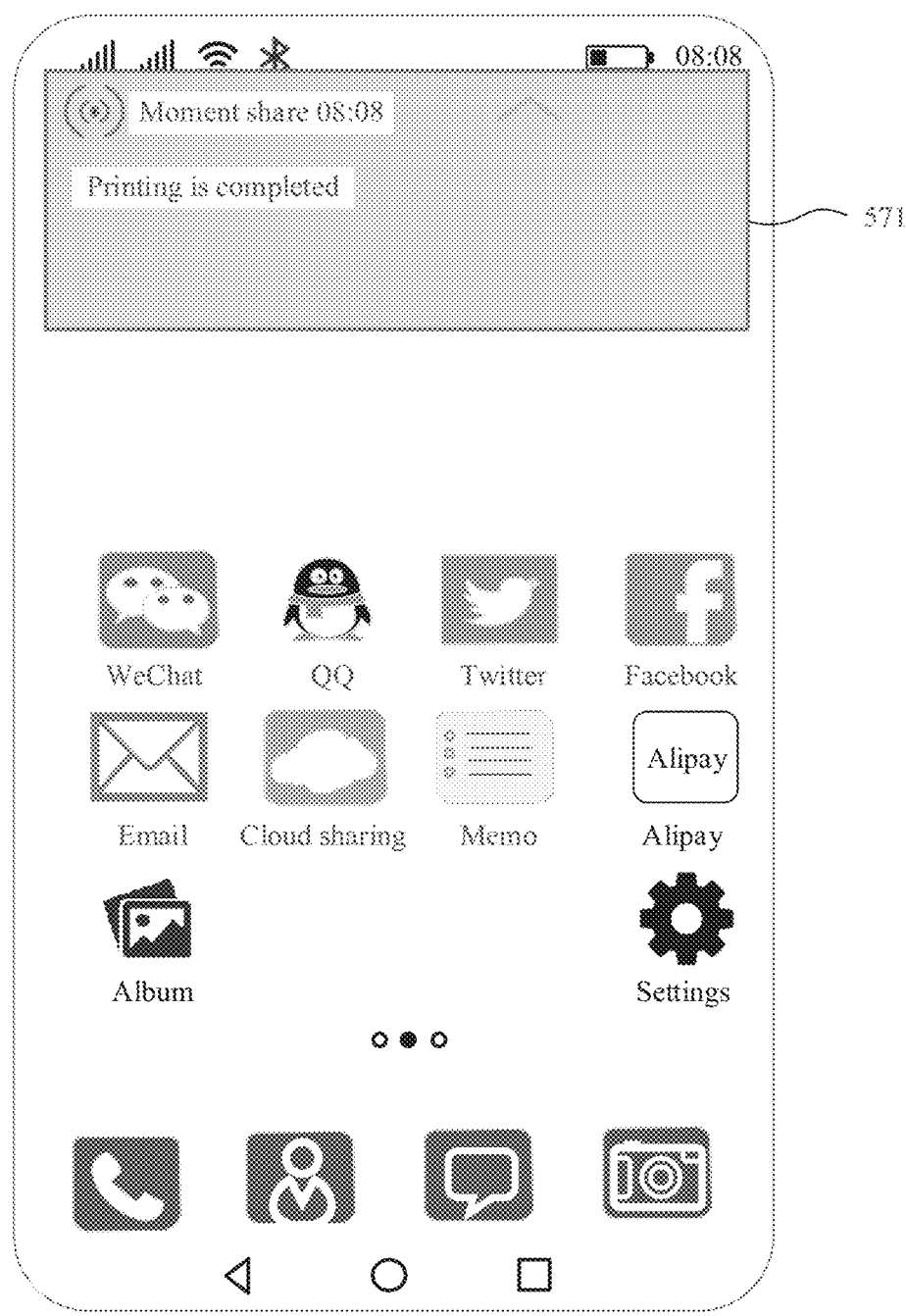
Figure 5J:
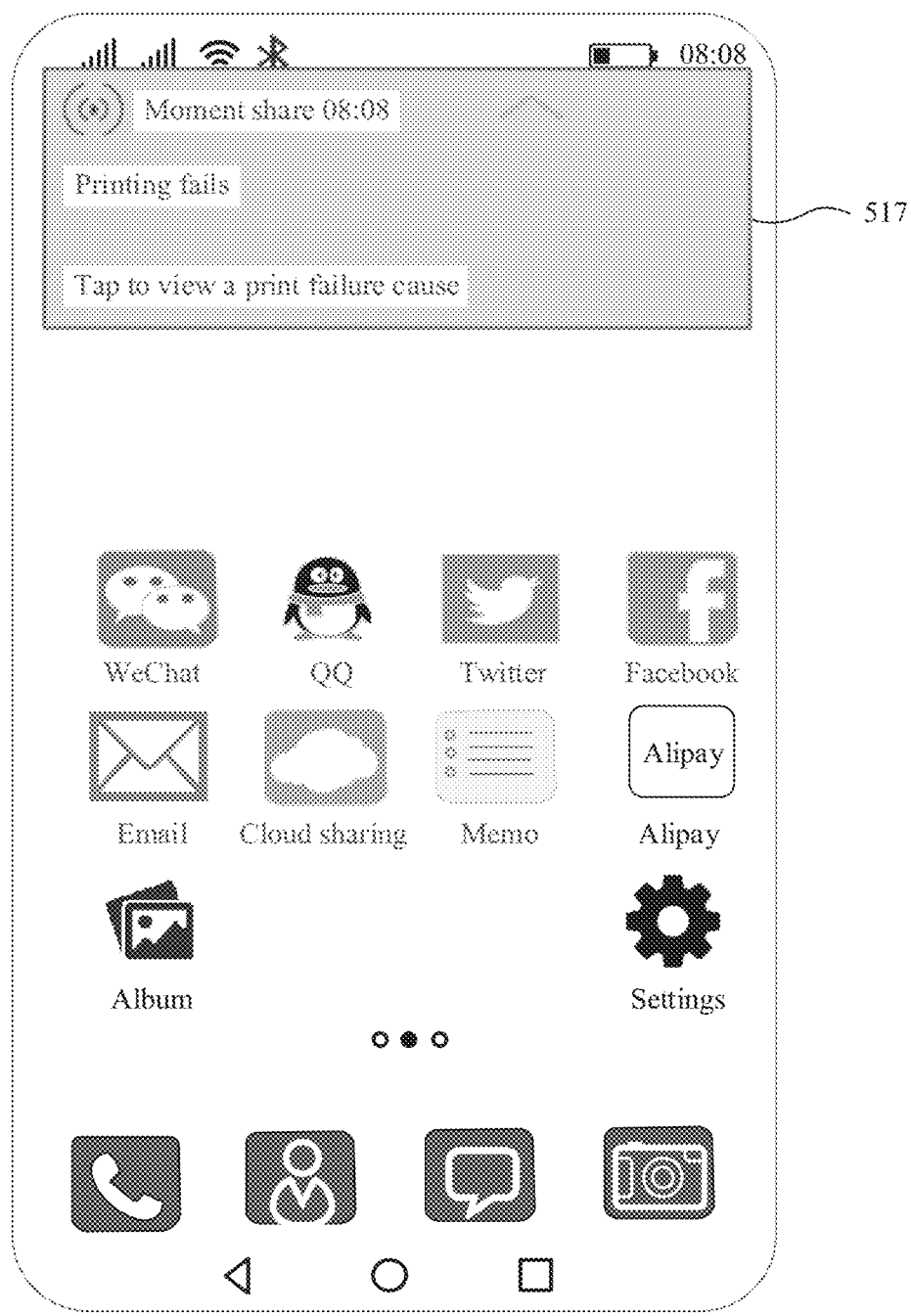

In some other embodiments, for the detected operation performed on the printer option in the area 521, if authentication needs to be performed on the printer selected by the user, the electronic device may display, in response to the detected operation, a user interface used for authentication, for example, related user interfaces used to pay a print fee that are shown as examples in FIG. 5E and FIG. 5F. After the authentication succeeds (for example, the payment succeeds), the electronic device may trigger the printer to print the selected picture based on a default print setting. For example, the print fee may be determined based on the default print setting. For example, a default quantity of to-be-printed copies is 1, a default paper size is A4, and a default print color is black and white.

An embodiment of the user interface used for authentication is not limited in this application. The following uses the related user interface used by the user to pay the print fee as an example for description.

FIG. 5E and FIG. 5F show examples of the related user interfaces used by the user to pay the print fee.

As shown in FIG. 5E, order information and a control 561 that correspond to a selected picture may be displayed in a user interface 55. The order information may include a print fee that needs to be paid by the user, for example, "¥12.00". The order information may further include one or more of the following: indication information of a payee, a number of an order, and the like. For example, the indication information of the payee may be "Yunpeng", and the number of the order may be "2018020312366". The electronic device may display, in response to an operation (for example, a touch operation performed by the user on the control 561) detected on the control 561, a user interface (not shown) used by the user to enter a payment password. An embodiment of the user interface is not limited in an embodiment.

After the payment succeeds, the electronic device may display a user interface 57 shown in FIG. 5F. As shown in FIG. 5F, one or more of order information, a transaction time (for example, "2018-2-8 08:08") of an order, indication information (for example, "Payment succeeds") of a transaction status, indication information (for example, "Balance") of a payment method, and the like may be displayed in the user interface 57. In some cases, a control 563 may be further displayed in the user interface 57. The control 563 may be used to determine an operation of completing payment. The control 563 may be a button or another interactive element. This is not limited in this embodiment.

In some embodiments, the electronic device may trigger, in response to a detected operation (for example, a tap operation performed on the control 563) performed on the control 563, the printer (for example, "Yunpeng's Canon TS318 . . . ") to print the selected picture. In some other embodiments, the electronic device may display only the user interface 57 for a predetermined period of time (for example, 2 seconds), and when the period of time ends, the printer selected by the user may print the selected picture. In other words, the electronic device may not need to listen to an operation performed on the control 563, and the user interface 57 may not include the control 563. In this way, a quantity of operations is reduced, and user experience is improved.

FIG. 5E and FIG. 5F merely show the examples of the related user interfaces used by the user to pay the print fee. In actual application, the related user interfaces may be different, and should not be construed as a limitation.

According to the UI embodiments shown as the examples in FIG. 5A to FIG. 5J, selecting a plurality of printers for printing at a time may also be supported. For an embodiment of selecting the plurality of printers for printing at a time, refer to the related descriptions in the UI embodiments shown as the examples in FIG. 4A to FIG. 4H. Details are not described herein again.

User Interface Used to Feed Back a Print Status

In some embodiments, after the printer (for example, "Yunpeng's Canon TS318 . . . ") selected by the user starts to print a picture, the electronic device may further display the user interface used to feed back the print status. As shown in one or more of FIG. 5G to FIG. 5J, the user interface may be the user interface 21 in which a notification window 571 is displayed and that is shown as the example in FIG. 2A. In other words, after the printer starts to print the picture, the electronic device may further display the notification window 571 shown as an example in one or more of FIG. 5G to FIG. 5J, and may display, in the notification window 571, prompt information 575 indicating a print status. For example, as shown in FIG. 5G to FIG. 5J, the prompt information 575 may be "Print task is queuing . . . ", "JIAPUWEI TH880 is printing . . . ", "Printing is completed", "Printing fails", or the like. It may be understood that for related descriptions of the notification window 571, the prompt information 575, and the like, reference may be made to the related descriptions of the notification window 471, the prompt information 475, and the like shown in FIG. 4E to FIG. 4H in the foregoing embodiment. Details are not described herein again.

In some other embodiments, the prompt information 575 in the user interface may not be displayed on the touchscreen, but may be audio played by using the speaker 170A.

It may be understood that a difference between the UI embodiments shown as the examples in FIG. 5A to FIG. 5J and the UI embodiments shown as the examples in FIG. 4A to FIG. 4H lies in that in the UI embodiments shown as the examples in FIG. 5A to FIG. 5J, authentication may need to be performed on the printer selected by the user. For content that is not mentioned in the UI embodiments shown as the examples in FIG. 5A to FIG. 5J, refer to the UI embodiments shown as the examples in FIG. 4A to FIG. 4H. Details are not described herein again.

According to the UI embodiments shown as the examples in FIG. 5A to FIG. 5J, when the user needs to print the picture, the electronic device may automatically discover a nearby printer, and intuitively present, to the user, the nearby printer discovered by the electronic device. If authentication needs to be performed on (for example, a fee needs to be paid for) the printer selected by the user, the electronic device may display a payment page after the user selects the printer option corresponding to the printer, and trigger the printer for printing after the payment succeeds. In this way, the user may select the printer for which the fee needs to be paid for printing, so that an operation is intuitive and simple, and security of performing printing by using the electronic device is also improved.

UI Embodiments Shown as Examples in FIG. 6A to FIG. 6J

In the UI embodiments shown as the examples in FIG. 6A to FIG. 6J, the user may select a printer near the electronic device that is discovered by the electronic device to print a picture, or may select a cloud printer discovered by the electronic device to print a picture. The picture selected by the user may be a picture stored in the electronic device, or may be a picture in a cloud server accessed by the electronic device.

"Moment share" may be used to support the user in sharing data with a device near the electronic device, or may be used to support the user in sharing data with a cloud device. The nearby device may include a nearby first device, for example, a nearby printer, a nearby projector, or a nearby display, or may include a nearby second device, for example, a nearby mobile phone, a nearby tablet computer, or a nearby personal computer. The cloud device may include a cloud first device, for example, a cloud printer, a cloud projector, or a cloud display, or may include a cloud second device, for example, a cloud mobile phone, a cloud tablet computer, or a cloud personal computer. Enabling "Moment share" may be enabling cellular mobile data, a WLAN, and Bluetooth, or may be enabling cellular mobile data and a WLAN, or may be enabling cellular mobile data and Bluetooth, or may be enabling a WLAN and Bluetooth. After enabling "Moment share", the electronic device may discover the device near the electronic device by using one or more technologies such as Bluetooth, Wi-Fi direct (such as Wi-Fi P2P), Wi-Fi SoftAP, and a Wi-Fi LAN, or may discover the cloud device by using a cellular mobile communications network technology or a wide area network technology.

The Following Describes User Interfaces Provided in the Examples of the UI Embodiments Shown in FIG. 6A to FIG. 6J.

"Moment Share Interface"

The "moment share interface" is displayed on a touch-screen of the electronic device when the electronic device detects an operation of selecting a picture for sharing.

In some embodiments, the "moment share interface" may be used to display one or more device options. The one or more device options may include one or more nearby device options and/or one or more cloud device options. The nearby device option may include one or more of the following: a nearby printer option, a nearby projector option, and a nearby display option. The cloud device option may include one or more of the following: a cloud printer option, a cloud projector option, and a cloud display option.

The electronic device may trigger, in response to a detected operation performed on the device option, a first device corresponding to the device option selected in the operation to process the selected picture. The processing may include one or more of the following: printing, projection, and screen mirroring.

The "moment share interface" may be further used to display one or more user options and one or more service options. The service option may correspond to an application or a protocol used to share data. In other words, the user may share the data by using the application or the protocol corresponding to the service option.

One or more pictures in "Gallery" may be further displayed in the "moment share interface", and the one or more pictures may include the picture selected by the user.

Figure 6A:
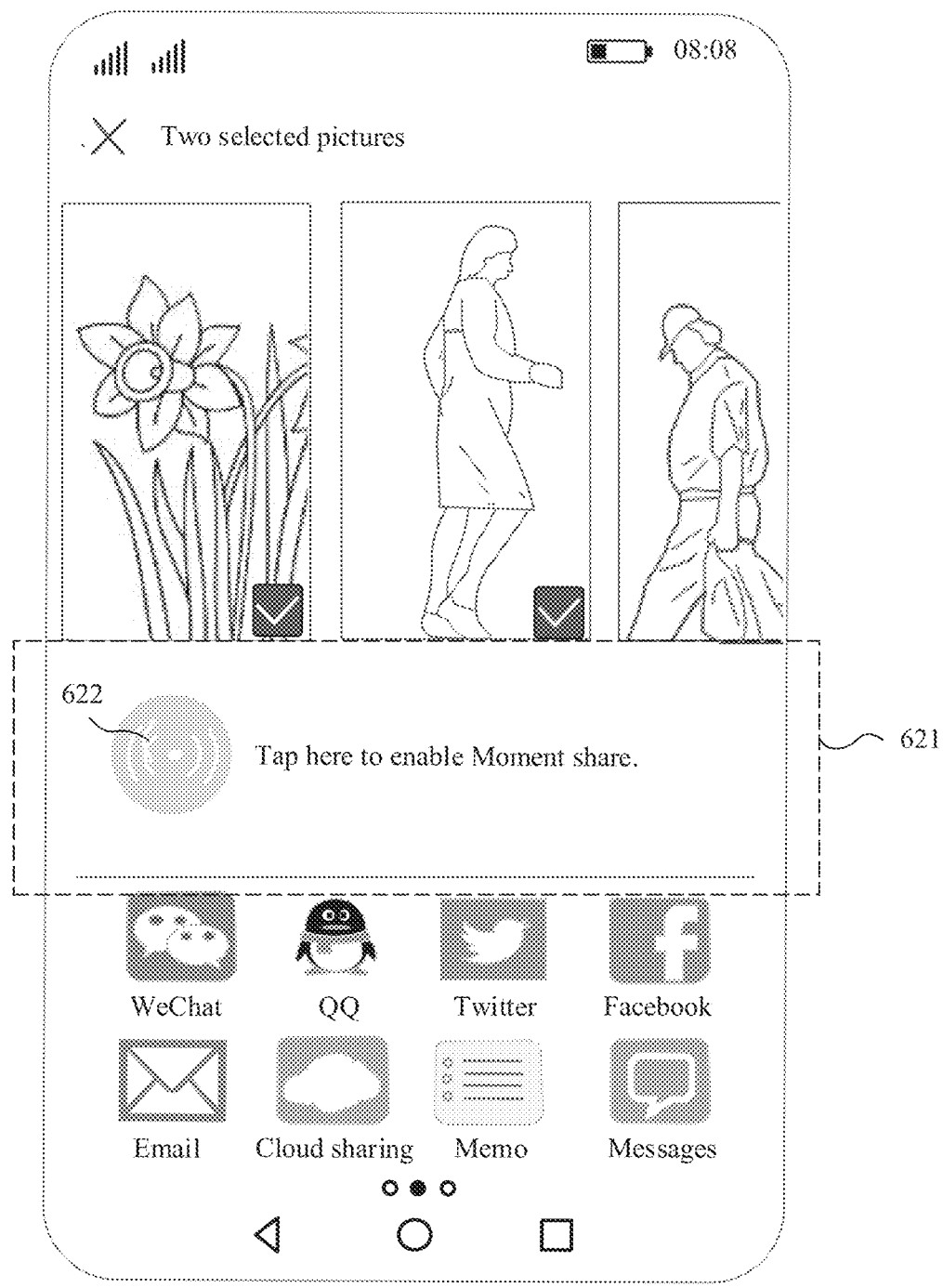
FIG. 6A to FIG. 6J show a series of user interfaces of a data sharing method according to another embodiment.
Figure 6B:
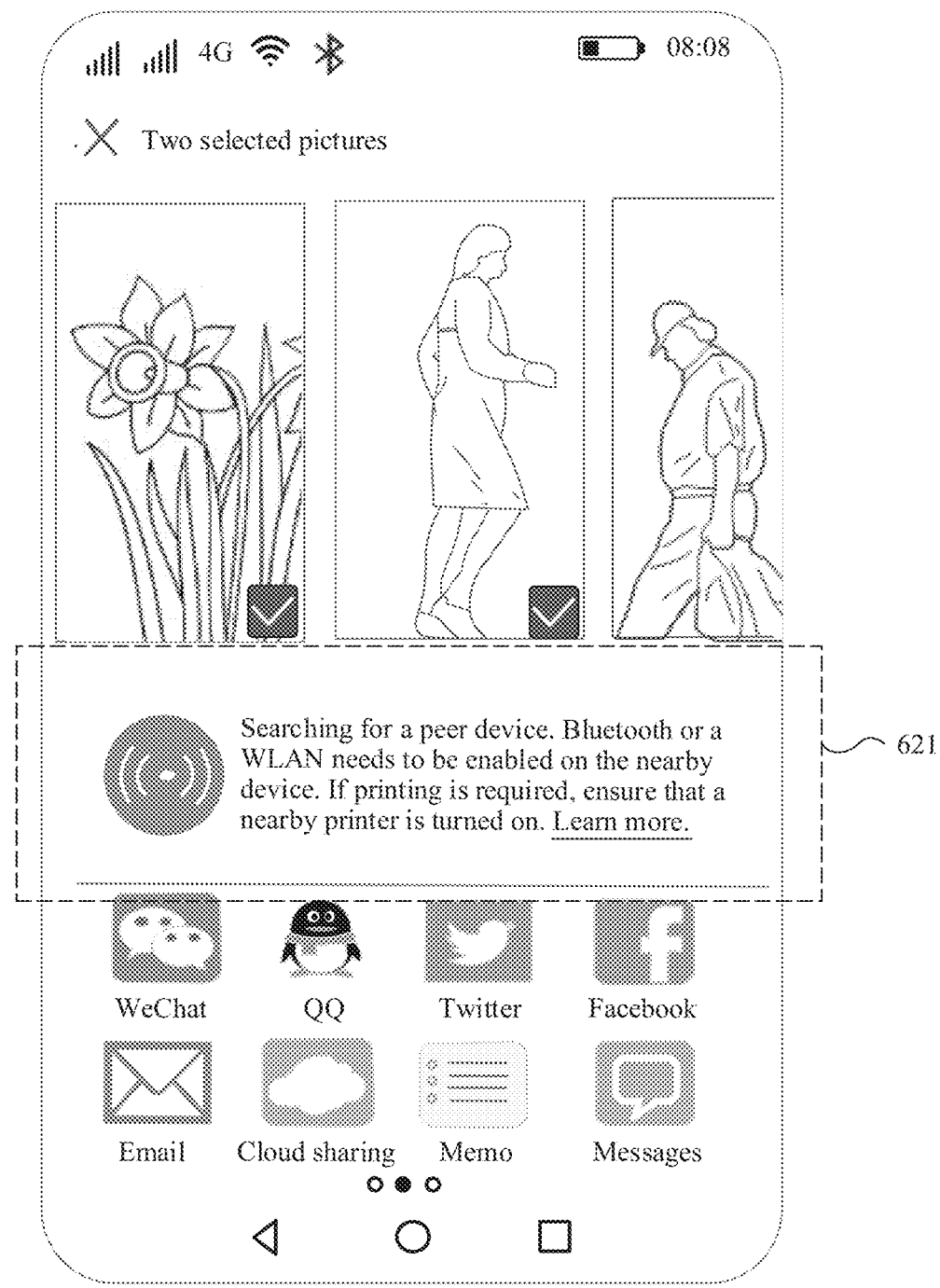
Figure 6C:
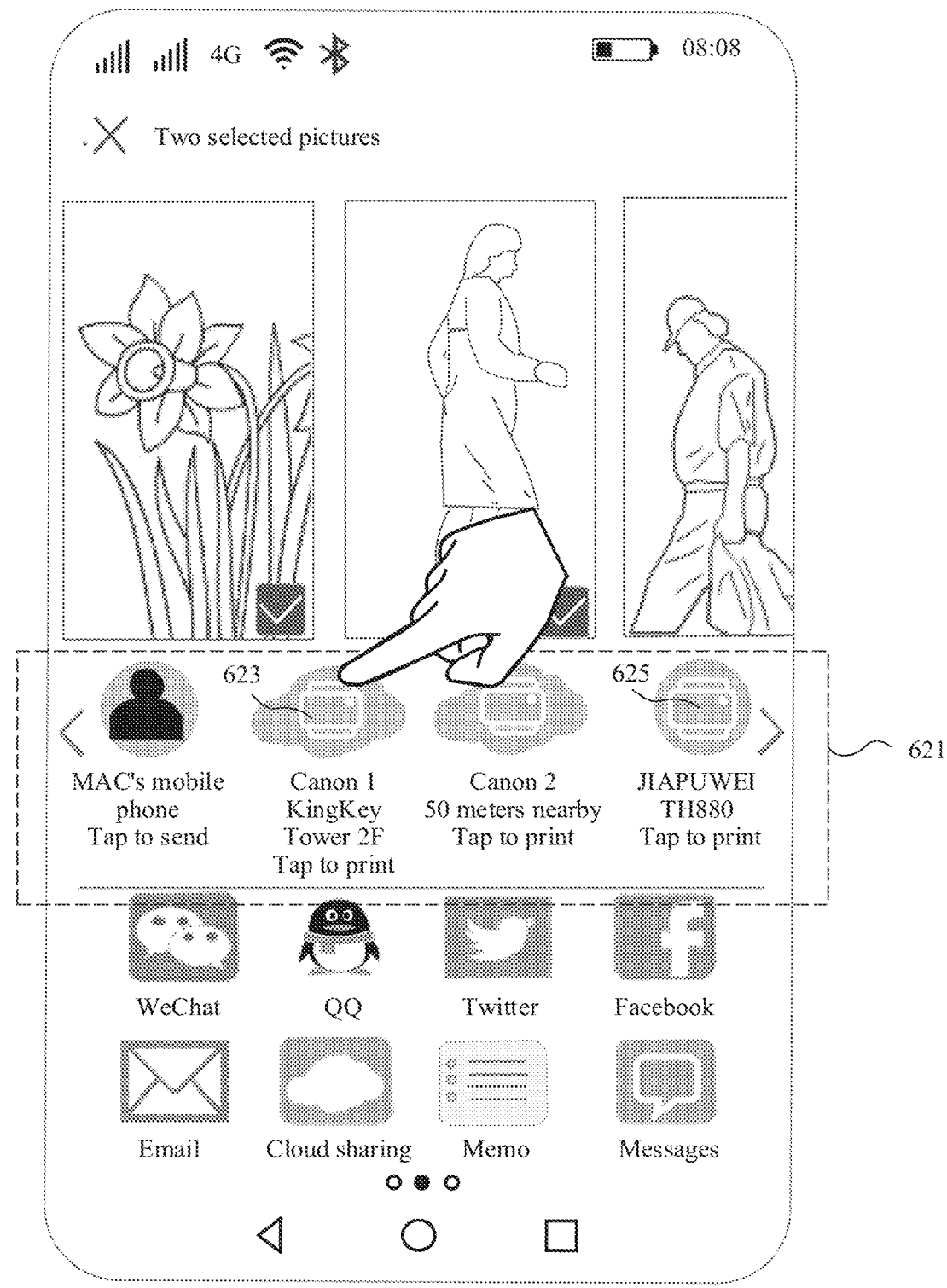

In an embodiment, a user interface 61 shown as an example in FIG. 6A to FIG. 6C may be the "moment share interface". For an embodiment of the user interface 61, refer to the user interface 41 shown in FIG. 4A to FIG. 4C described in the foregoing embodiments. Different from the user interface 41, as shown in FIG. 6C, not only one or more user options and a nearby device option may be displayed in an area 621 in the user interface 61, but also a cloud device option may be displayed in the area 621 in the user interface 61.

In some embodiments, as shown in FIG. 6C, when the electronic device discovers a cloud first device, the electronic device may display the cloud device option in the area 621, for example, a cloud printer icon 623. In some embodiments, the cloud device option and the nearby device option may be presented in different representation forms in the user interface, so that the user can very intuitively distinguish between the cloud device option and the nearby device option, thereby helping the user select a proper printer. For example, as shown in FIG. 6C, the cloud device option may be an icon in a cloud shape, and the nearby device option may be a round icon. The example is merely an embodiment provided in this application. In actual application, the cloud device option and the nearby device option may alternatively be represented in other forms in the user interface. This is not specifically limited in this embodiment.

In some other embodiments, as shown in FIG. 6C, the electronic device may further display location information of the discovered cloud first device (for example, a cloud printer). In this way, it is convenient for the user to know the location of the cloud printer. For example, location information corresponding to a printer "Canon 1" is "KingKey Tower 2F". For another example, location information corresponding to "Canon 2" is "50 meters nearby". The examples are merely some examples provided in this application, and should not be construed as a limitation. There may be different examples in actual application.

Figures 1, 6D:
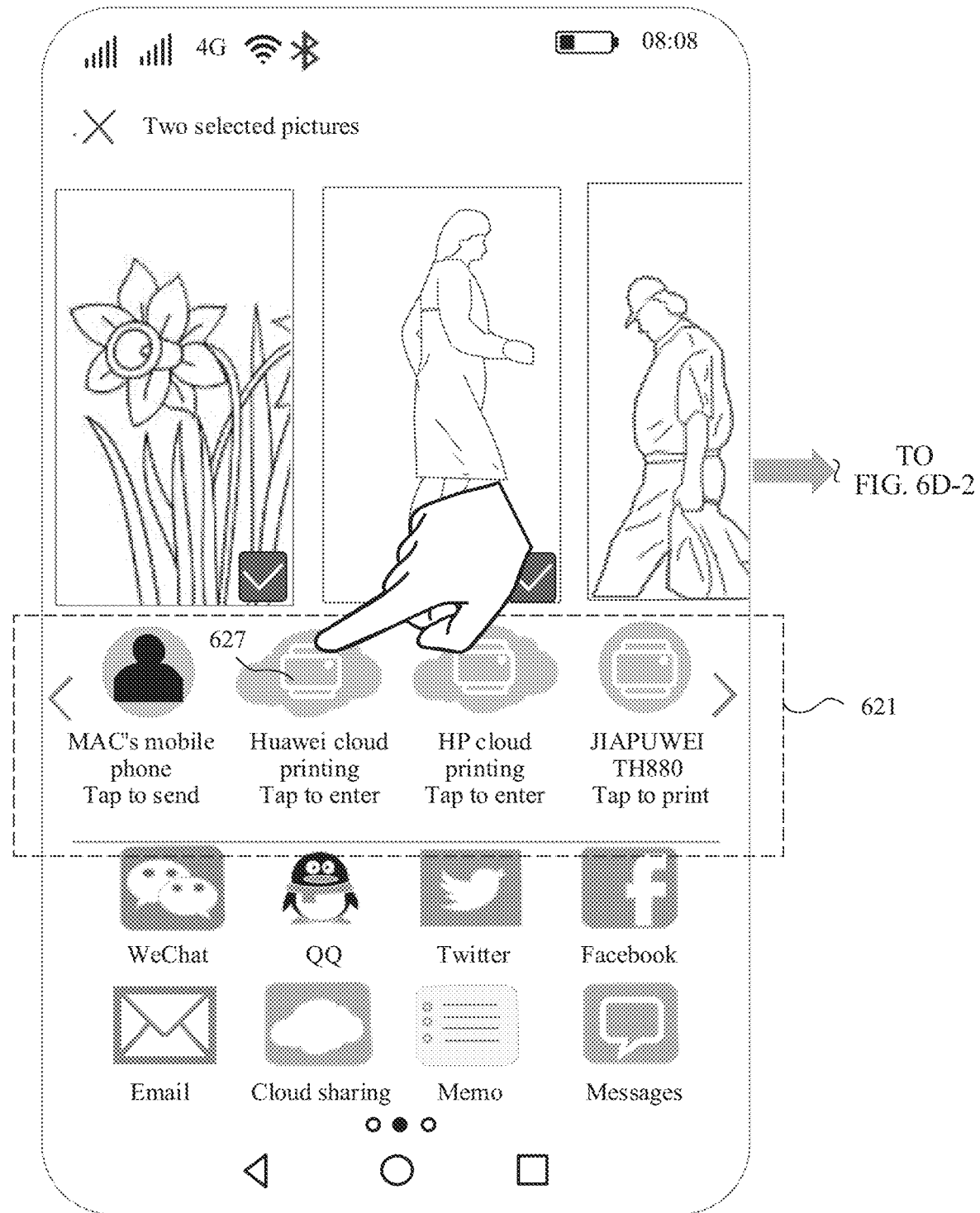
Figures 2, 6D:
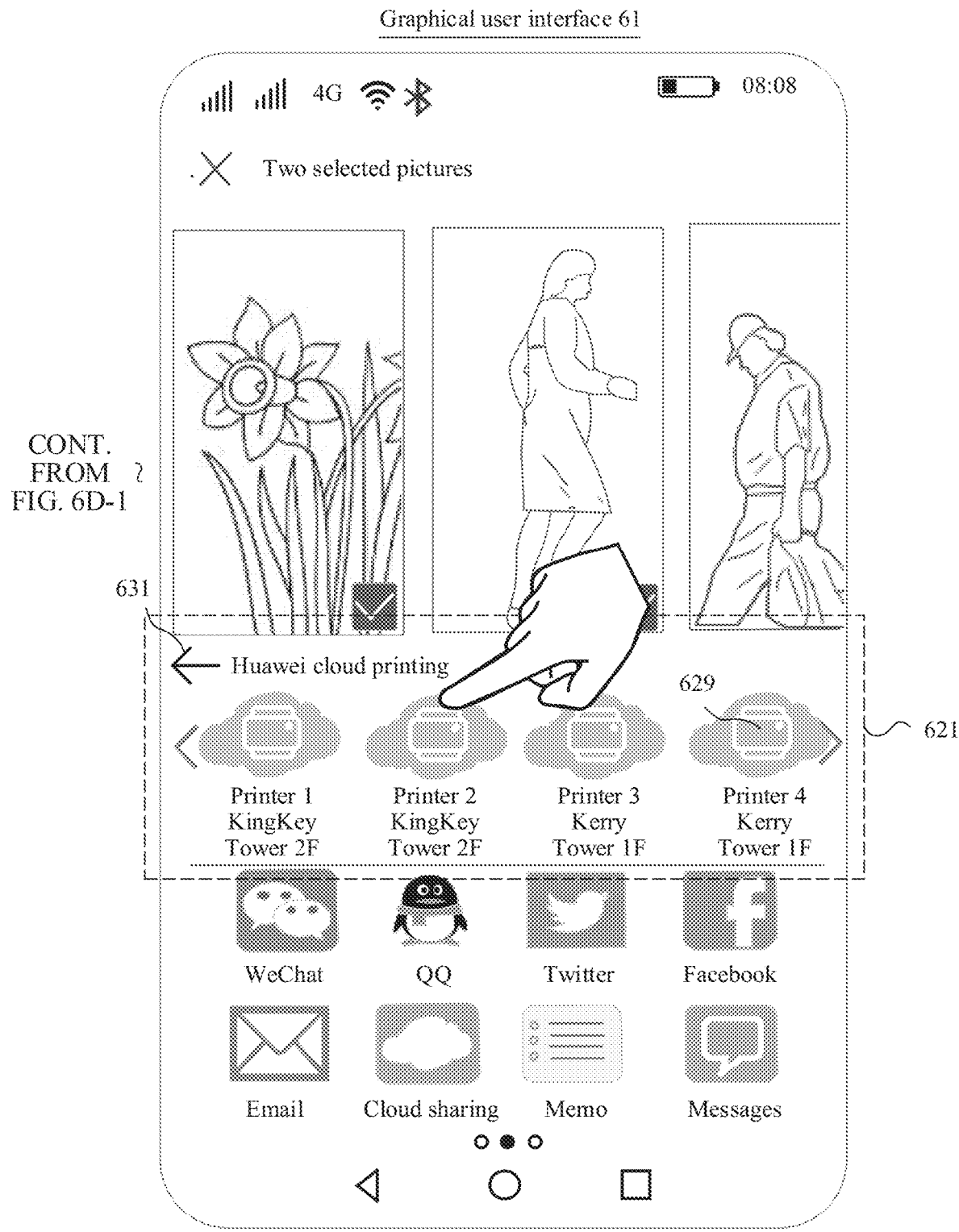
Figure 6E:
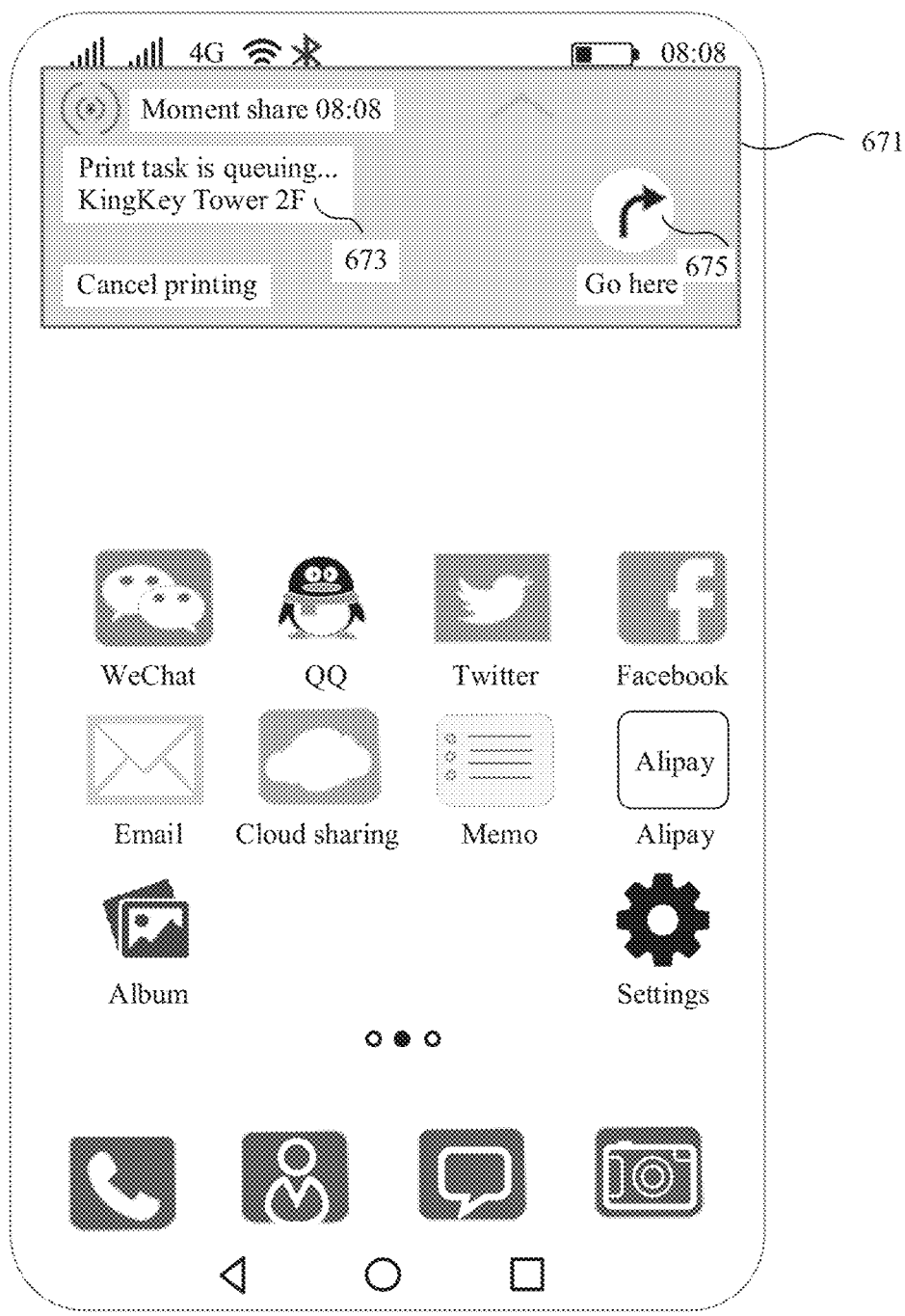
Figure 6F:
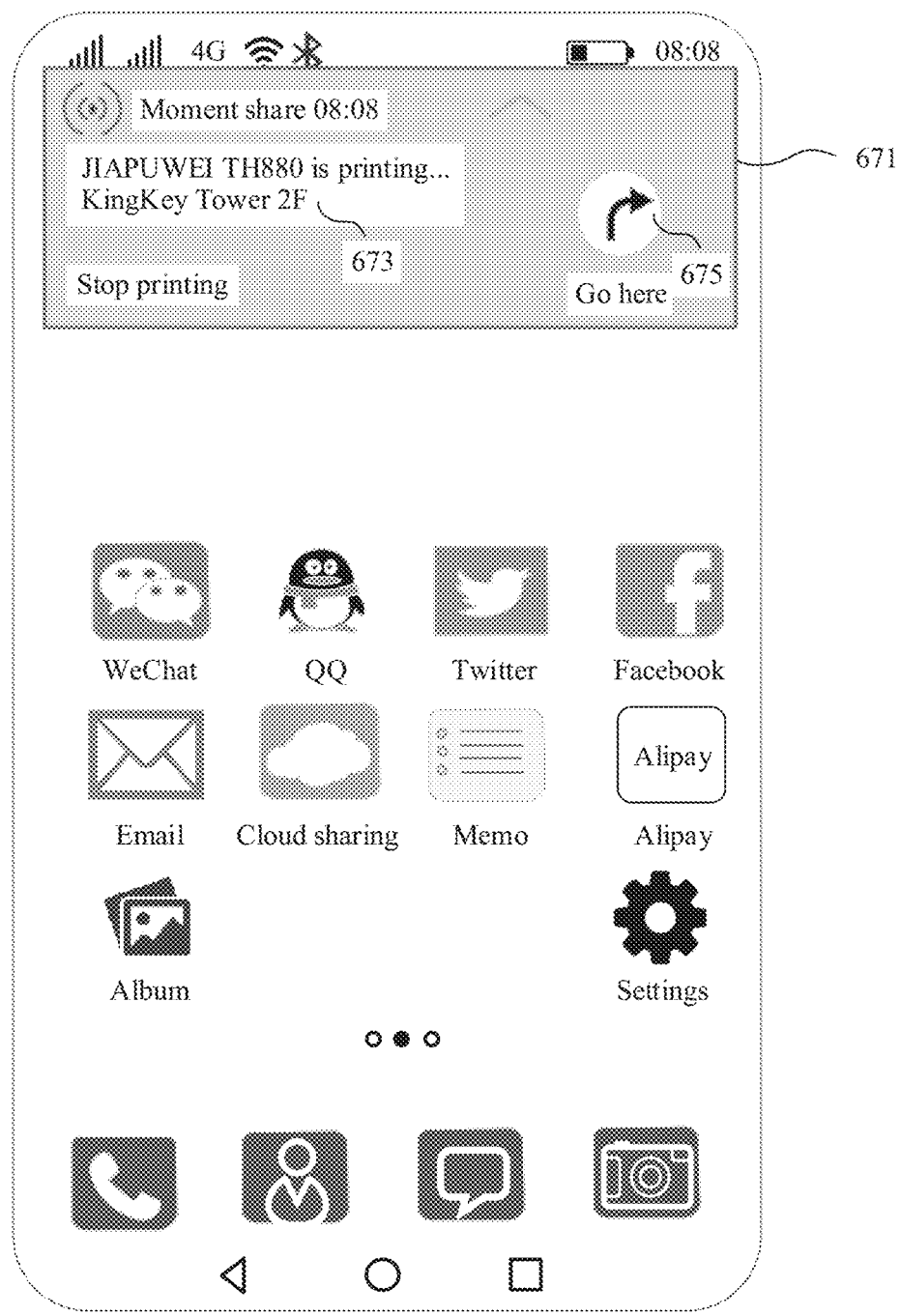
Figure 6G:
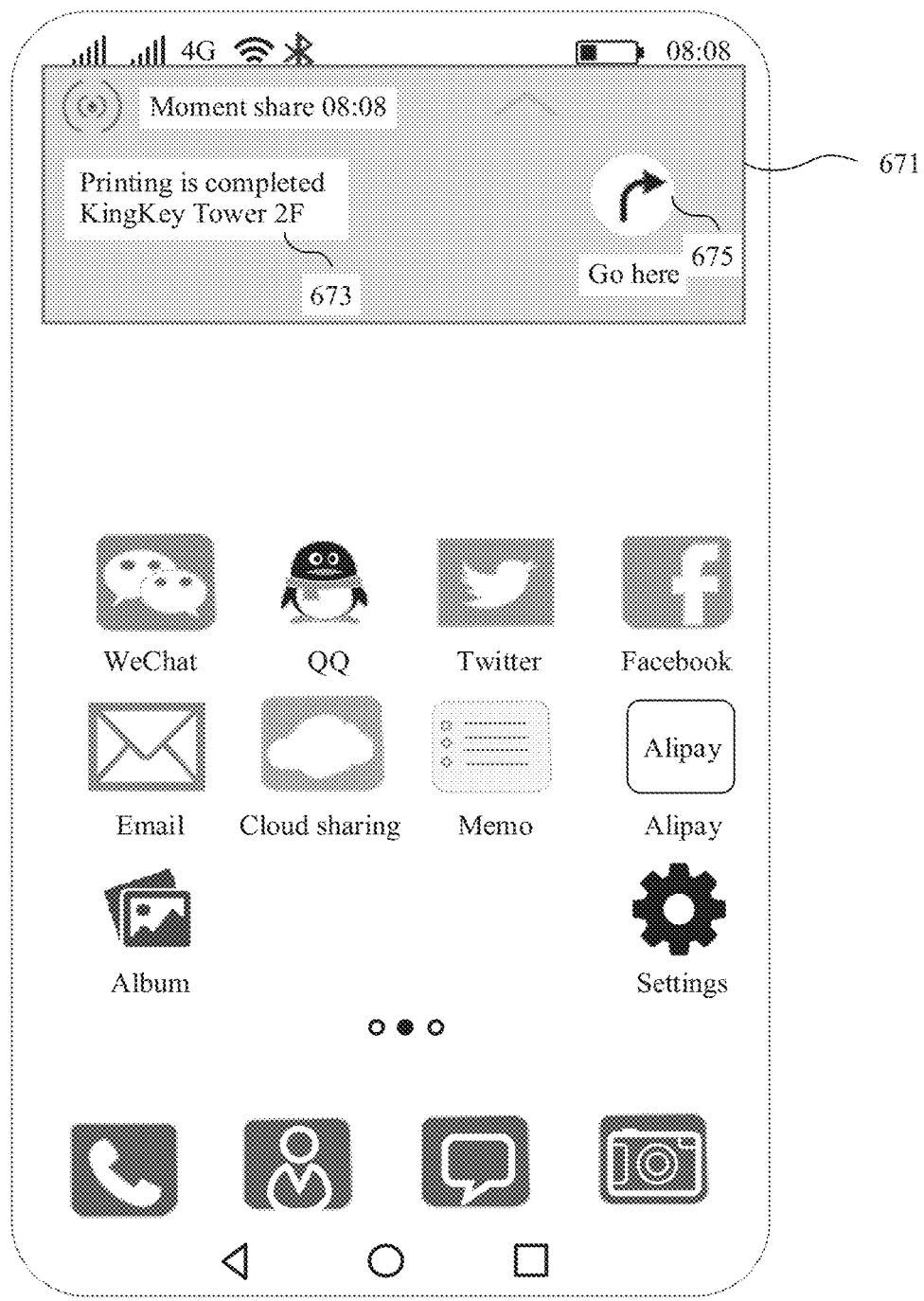
Figure 6H:
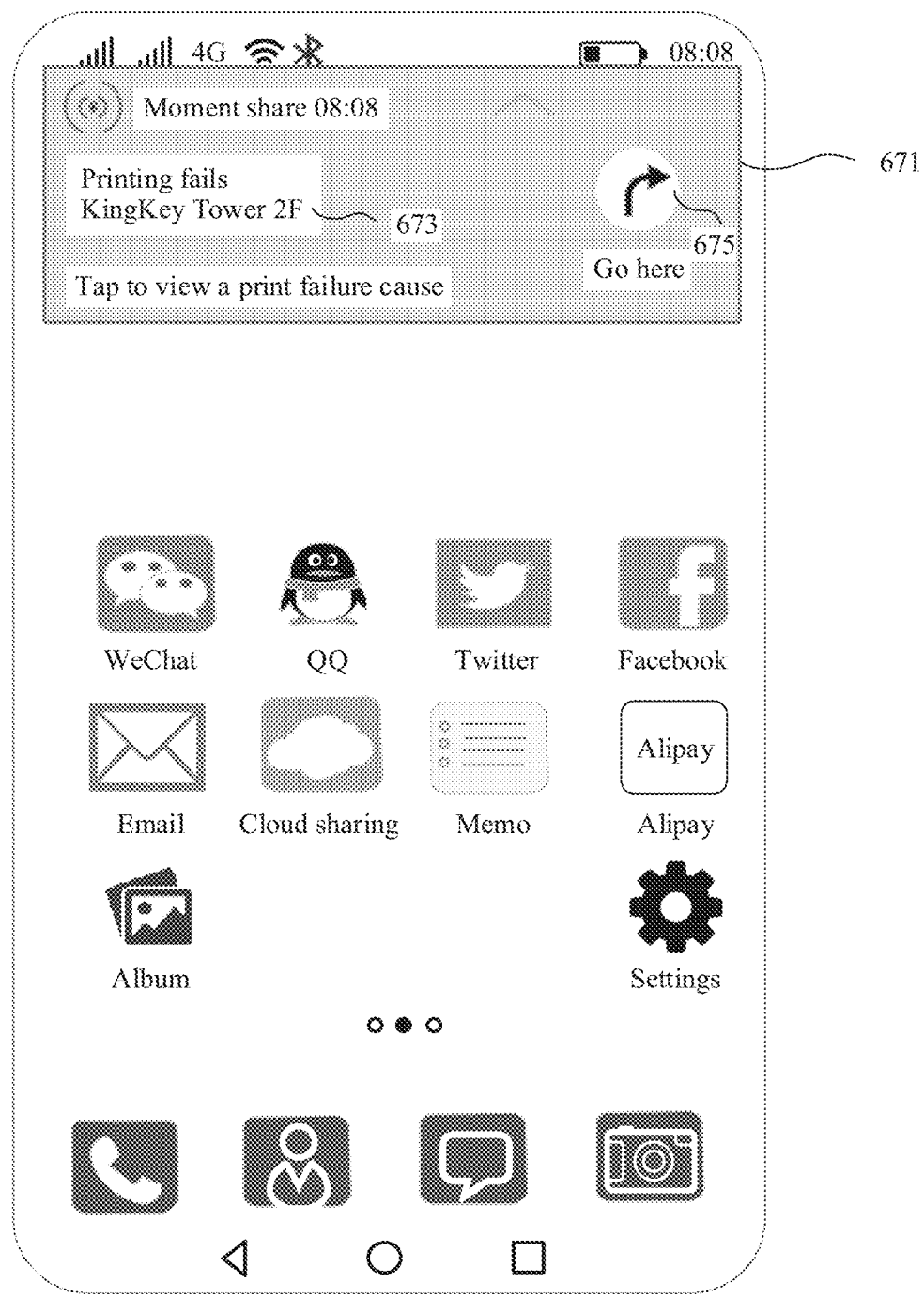

In some other embodiments, as shown in FIG. 6D-1 and FIG. 6D-2, the electronic device may further display one or more cloud printing service options in the area 621, for example, an icon 627 of "Huawei cloud printing" and an icon 627 of "HP cloud printing". The electronic device may automatically update, in response to a detected operation (for example, a touch operation performed by the user on the icon 627 of the cloud printing service) performed on the cloud printing service option, information displayed in the area 621. A printer option, for example, an icon 629, corresponding to each of one or more cloud printers provided by the cloud printing service (for example, "HUAWEI cloud printing") selected by the user may be displayed in the updated area 621. In some other embodiments, the cloud printers may be printers that are closest to the electronic device and that are provided by the cloud printing service selected by the user. In addition, a back button 631 may be further displayed in the updated area 621. In this way, the user may tap the back button 631 to back, and reselect another cloud printing service or select another device discovered by the electronic device.

In some embodiments, the one or more user options displayed in the area 621 may include one or more nearby user options and/or one or more cloud user options. The nearby user option corresponds to a nearby second device discovered by the electronic device, and the cloud user option corresponds to a cloud second device discovered by the electronic device.

In the "moment share interface" shown in FIG. 6A to FIG. 6C, an area used to display one or more pictures may be referred to as a first area, an area used to display a service option (for example, a WeChat icon or a Mailbox icon) may be referred to as a second area, and an area (for example, the area 621) used to display a user option and a device option may be referred to as a third area. An interactive element (for example, an icon 622) that is displayed in the third area and that is used to enable "Moment share" may be referred to as a first interactive element.

Related User Interface Used to Select a Printer for Printing

As shown in FIG. 6C or FIG. 6D-1 and FIG. 6D-2, the electronic device may detect, in the area 621, an operation (for example, a touch operation performed by the user on the printer icon) performed on the printer option corresponding to the nearby printer or the cloud printer. The printer option may be used to listen to an operation used to trigger printing of a selected picture.

For a manner in which the electronic device responds to the operation detected in the area 621, specifically refer to the related descriptions in FIG. 4D and the related embodiments, or refer to the related descriptions in FIG. 5D to FIG. 5F and the related embodiments. Details are not described herein again.

According to the UI embodiments shown as the examples in FIG. 6A to FIG. 6J, selecting a plurality of printers (for example, a nearby printer and a cloud printer that are discovered by the electronic device) for printing at a time may also be supported. For an embodiment of selecting the plurality of printers for printing at a time, refer to the related descriptions in the UI embodiments shown as the examples in FIG. 4A to FIG. 4H. Details are not described herein again.

User Interface Used to Feed Back a Print Status

After triggering the printer (for example, "Canon 1" shown in FIG. 6C or "Printer 2" shown in FIG. 6D-2) selected by the user to print the picture selected by the user, the electronic device may display the user interface used to feed back the print status of the picture selected by the user.

If the printer selected by the user is a nearby printer, the user interface may be shown in one or more of FIG. 5G to FIG. 5J. For details, refer to the related descriptions in the embodiments in FIG. 5G to FIG. 5J. Details are not described herein again.

If the printer selected by the user is a cloud printer, the user interface may be shown as the example in one or more of FIG. 6E to FIG. 6H. Detailed descriptions are provided below.

As shown in FIG. 6E to FIG. 6H, the user interface may be the user interface 21 in which a notification window 671 is displayed and that is shown as the example in FIG. 2A, and the user interface 21 may be a home screen. The notification window 671 may be used to prompt the user with the print status of the selected picture. For details, refer to the related descriptions in the embodiments in FIG. 6E to FIG. 6H. Details are not described herein again.

In some other embodiments, as shown in the example in one or more of FIG. 6E to FIG. 6H, prompt information 673 may be further displayed in the notification window 671, and the prompt information 673 may be used to prompt the user with a location of the cloud printer configured to print the picture selected by the user. The prompt information 673 may be text information, for example, characters "KingKey Tower 2F". In addition to the text information, the prompt information 673 may be further information in another form such as a picture or an animation. This is not limited in this embodiment.

In some other embodiments, as shown in one or more of FIG. 6E to FIG. 6H, a control 675 may be further displayed in the notification window 671. The electronic device may display, in response to a detected operation (for example, a touch operation performed by the user on the control 675) performed on the control 675, a user interface (not shown) used to navigate a user's way to the location of the cloud printer. For example, as shown in FIG. 6E to FIG. 6H, when detecting that the user taps the control 675, the electronic device may display a user interface used to navigate a user's way to the location "KingKey Tower 2F", and a route used by the user to go to the location "KingKey Tower 2F" may be displayed in the user interface. In this way, the user can be intuitively and effectively guided to the location of the cloud printer, and user experience is simple and effective.

In some embodiments, as shown in one or more of FIG. 6E to FIG. 6H, the electronic device may display operation prompt information corresponding to the control 675, for example, display text information "Go here" below the control 675, to prompt the user to tap the control 675 to open the user interface (not shown) used to navigate the user's way to the location of the cloud printer. The example is merely an embodiment provided in an embodiment, and should not be construed as a limitation.

FIG. 6E to FIG. 6H merely show an example of an embodiment of this application. The prompt information 673 and the control 675 may alternatively be implemented in other forms. This is not limited in this application. For example, only one control may be displayed in the notification window 671, and text information "Go to 'KingKey Tower 2F'" may be displayed on the control. When detecting a touch operation performed on the control, the electronic device may display a user interface used to navigate a user's way to the location "KingKey Tower 2F". In other words, the prompt information 673 may be displayed on the control 675.

In some embodiments, the user interface used to navigate the user's way to the location of the cloud printer may be provided by a third-party map application. For example, after the user taps the control 675, the electronic device may display a navigation interface of the third-party map application. An embodiment of the navigation interface is not limited in this application.

Figure 6I:
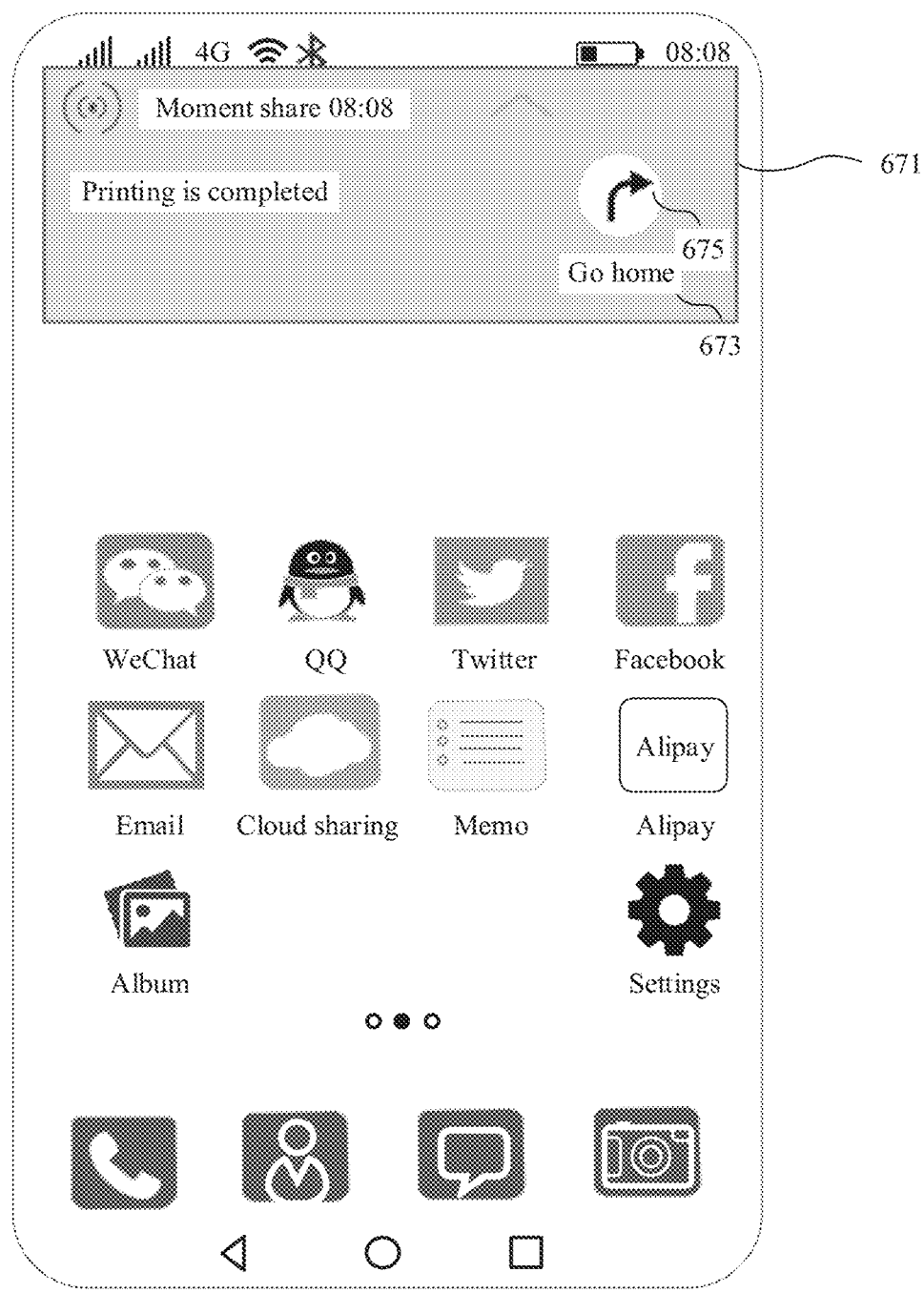
Figure 6J:
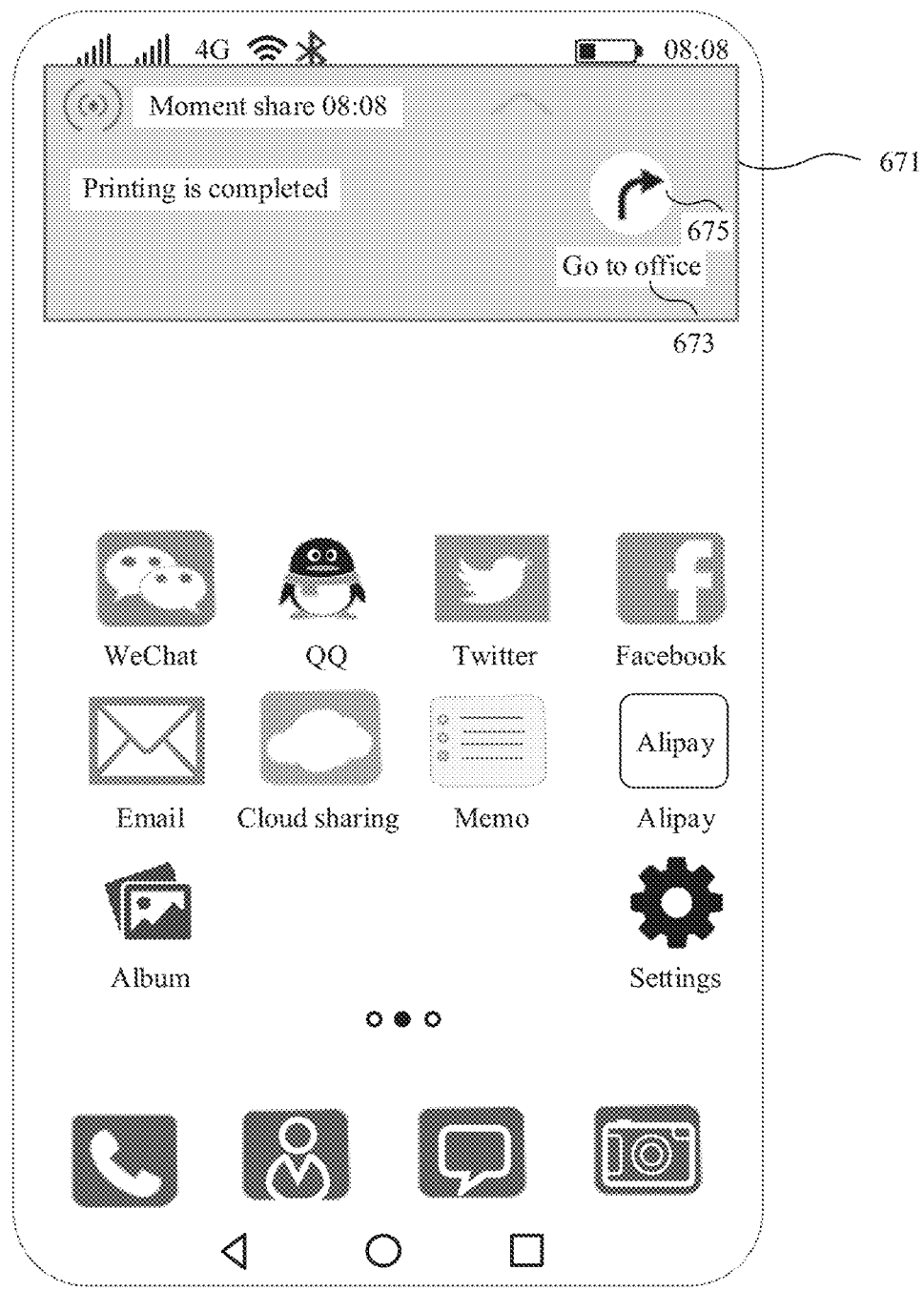

In some embodiments, when the location of the cloud printer that prints the picture selected by the user is the same as a preset location, the prompt information 673 may be used to prompt the user with the preset location. For example, as shown in FIG. 6I, when the location of the cloud printer that prints the picture selected by the user is the same as a home location that is preset by the user, the prompt information 673 may be text information "Go home". For another example, as shown in FIG. 6J, when the location of the cloud printer that prints the picture selected by the user is the same as an office location that is preset by the user, the prompt information 673 may be text information "Go to office". In this way, the location of the cloud print can be more intuitively indicated. The preset location may be set by the user in the third-party map application. FIG. 6I and FIG. 6J merely show examples of some embodiments of this application. The prompt information 673 may alternatively be implemented in another form such as a picture or an animation, and the prompt information 673 may alternatively be displayed in different locations. This is not limited in this application.

In some other embodiments, the electronic device may alternatively discover only the cloud first device, for example, the cloud printer. In this case, only the cloud device option may be displayed in the area 621.

It may be understood that a difference between the UI embodiments shown as the examples in FIG. 6A to FIG. 6J and each of the UI embodiments shown as the examples in FIG. 4A to FIG. 4H and the UI embodiments shown as the examples in FIG. 5A to FIG. 5J lies only in that in the UI embodiments shown as the examples in FIG. 6A to FIG. 6J, the "moment share interface" may be further used to display the cloud device discovered by the electronic device, for example, the cloud printer. For content that is not mentioned in the UI embodiments shown as the examples in FIG. 6A to FIG. 6J, refer to the UI embodiments shown as the examples in FIG. 4A to FIG. 4H and the UI embodiments shown as the examples in FIG. 5A to FIG. 5J. Details are not described herein again.

According to the UI embodiments shown as the examples in FIG. 6A to FIG. 6J, when identifying the scenario in which the user shares the picture, the electronic device may automatically discover the nearby printer and/or the cloud printer, and intuitively present, to the user, the nearby printer and/or the cloud printer discovered by the electronic device, so that the user taps the nearby printer option or the cloud printer option (for example, the icon) to trigger the nearby printer or the cloud printer to print the picture selected by the user, and user experience is intuitive and simple.

Figure 7A:
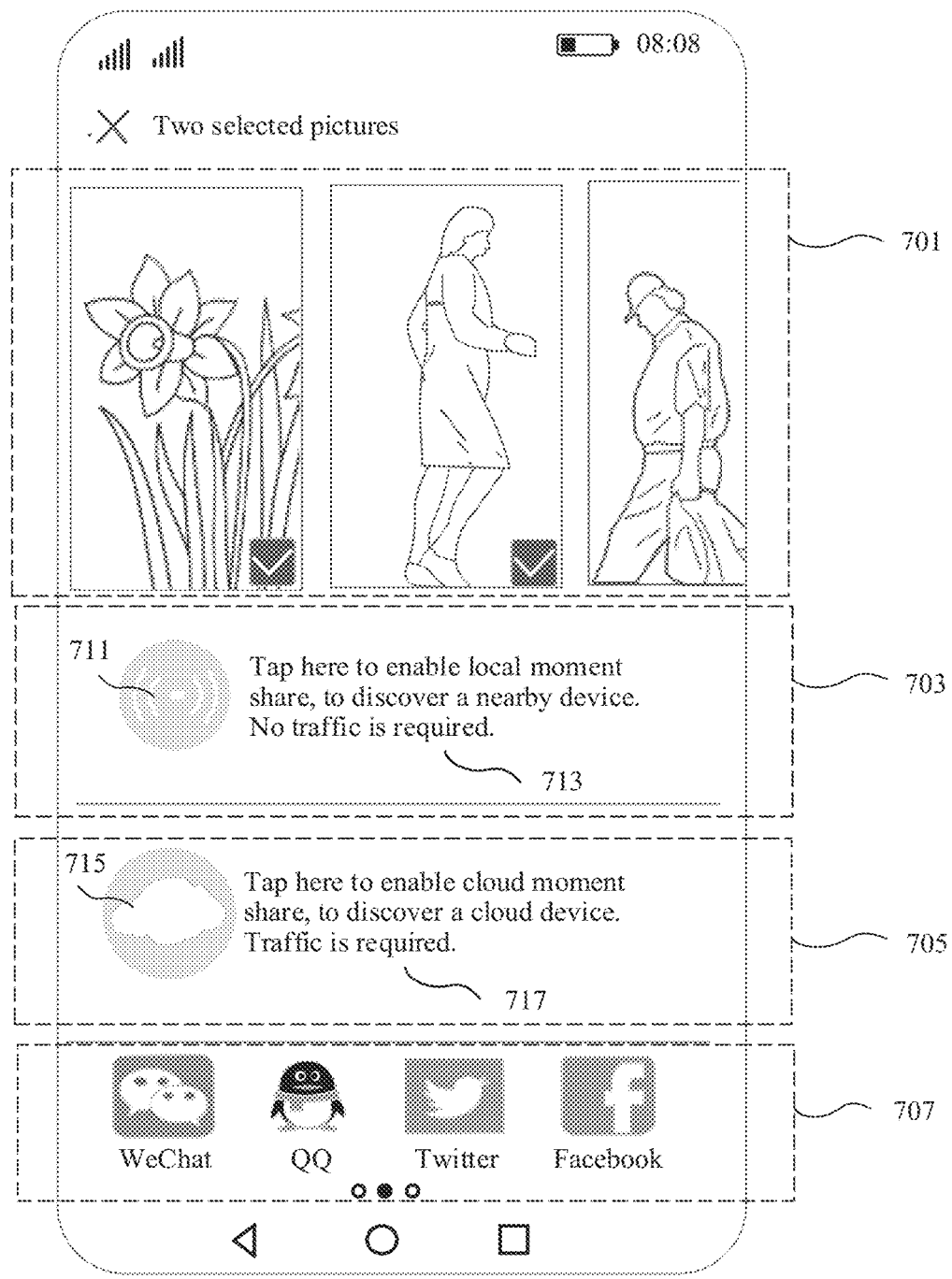
FIG. 7A to FIG. 7C show a series of user interfaces of a data sharing method according to another embodiment.
Figure 7B:
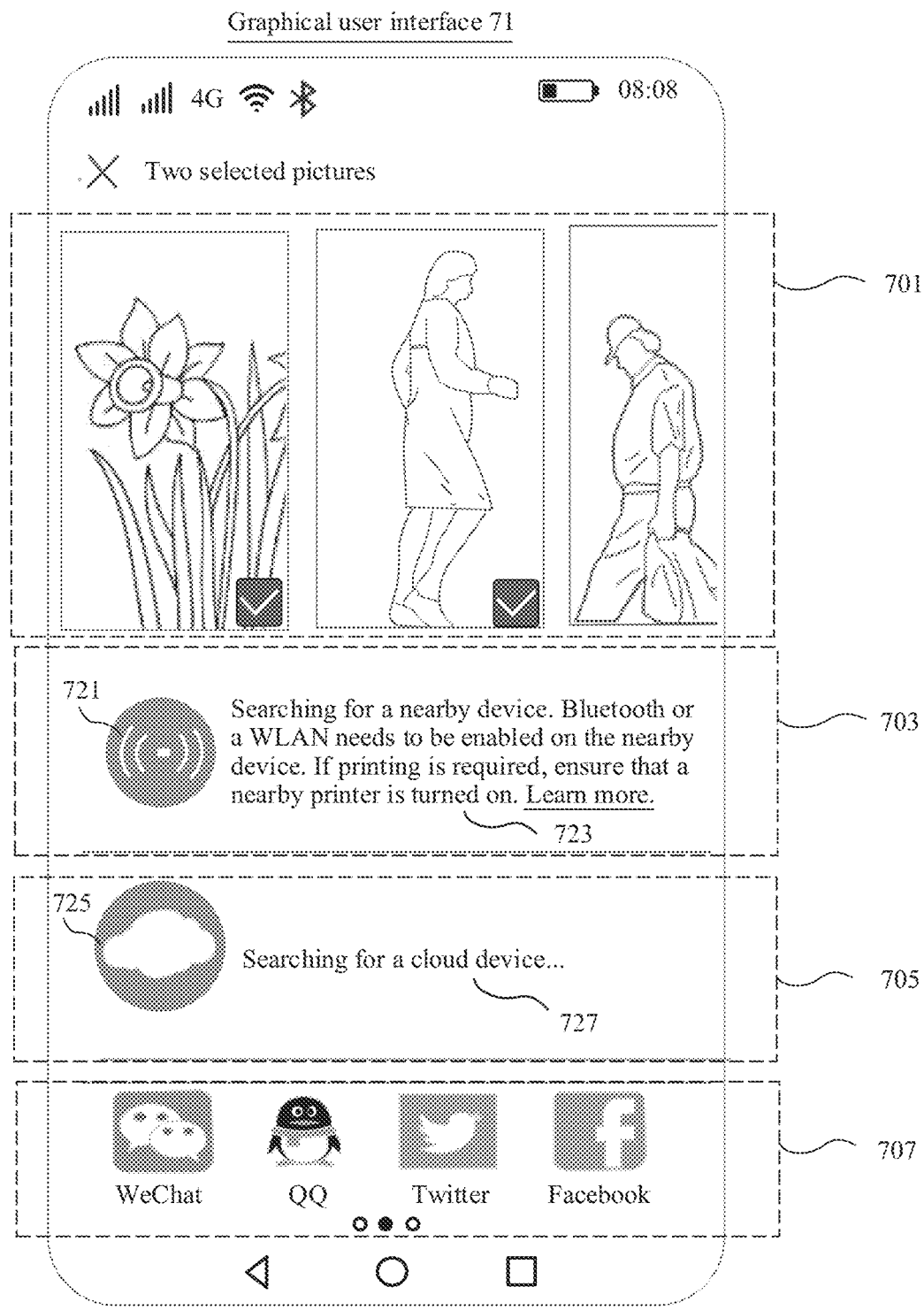
Figure 7C:
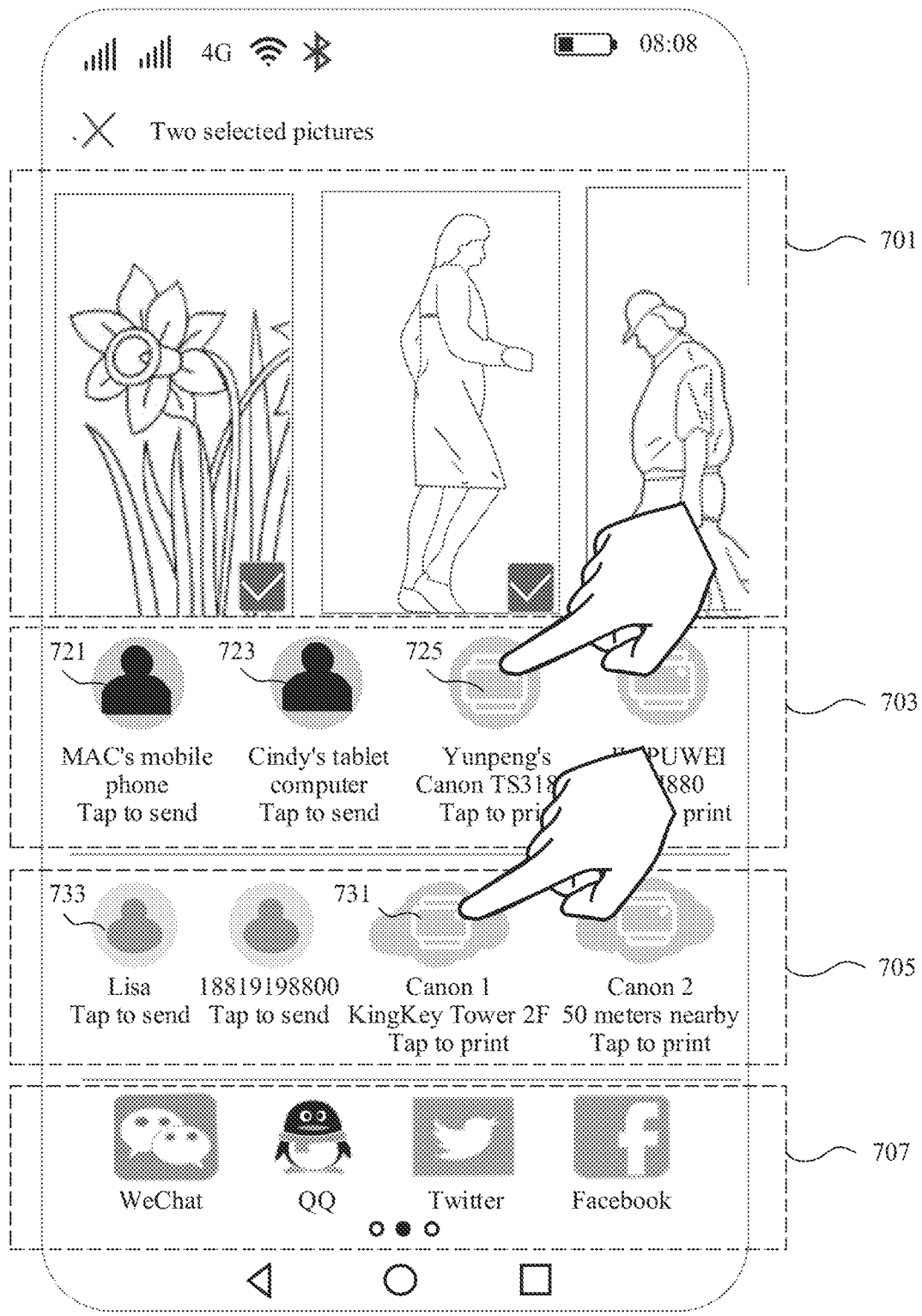
Figure 8A:
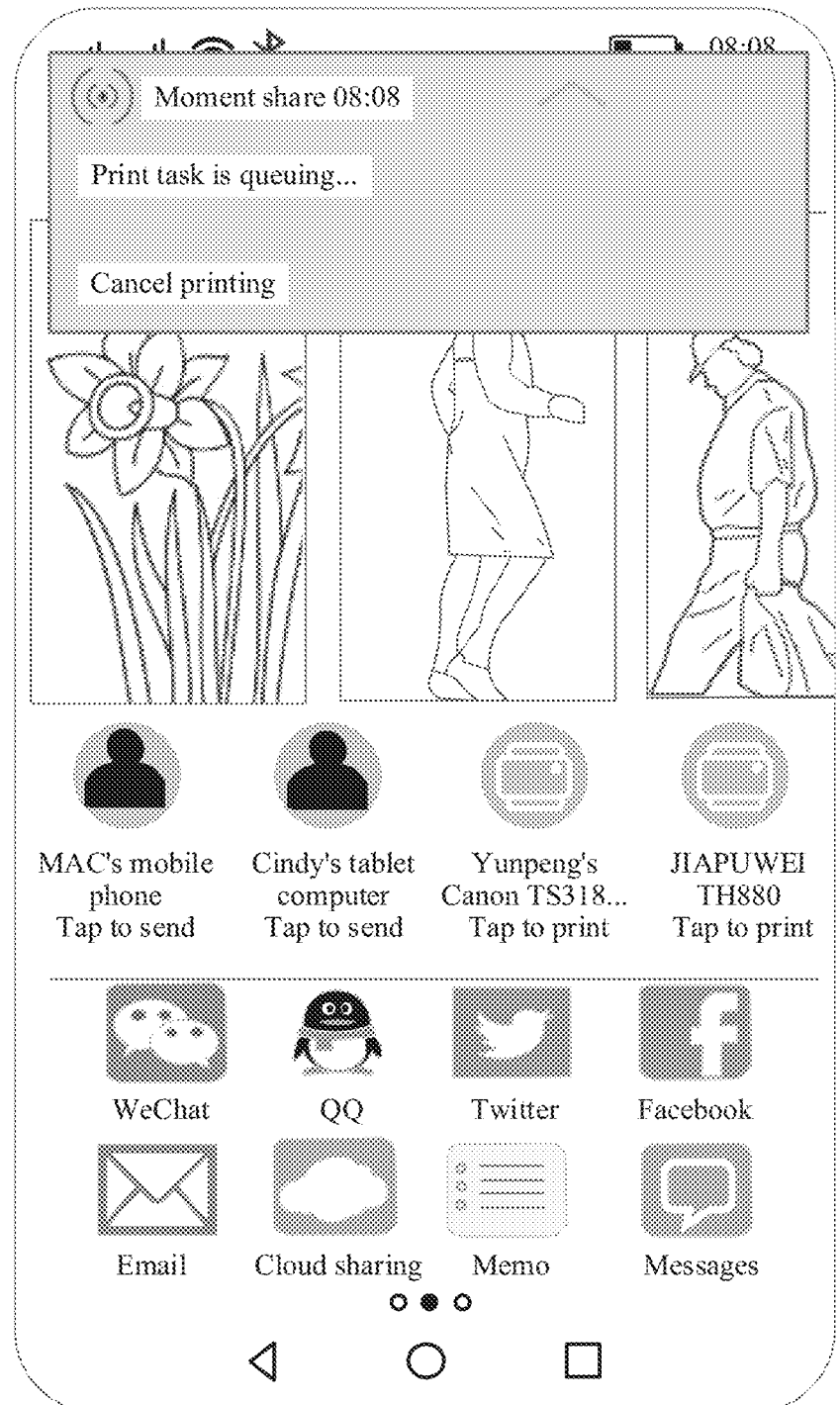
FIG. 8A to FIG. 8D show a series of user interfaces of a notification window according to an embodiment.
Figure 8B:
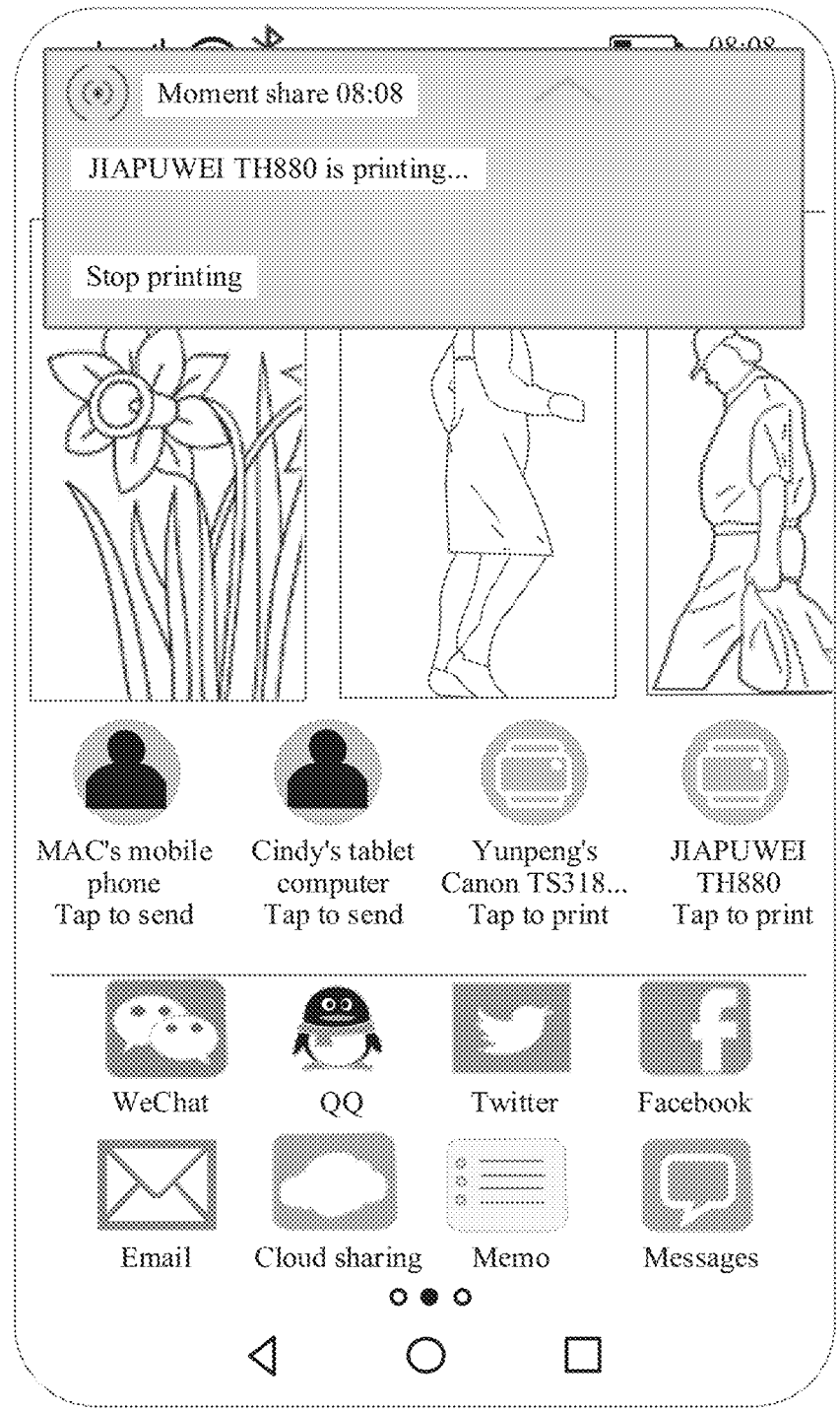
Figure 8C:
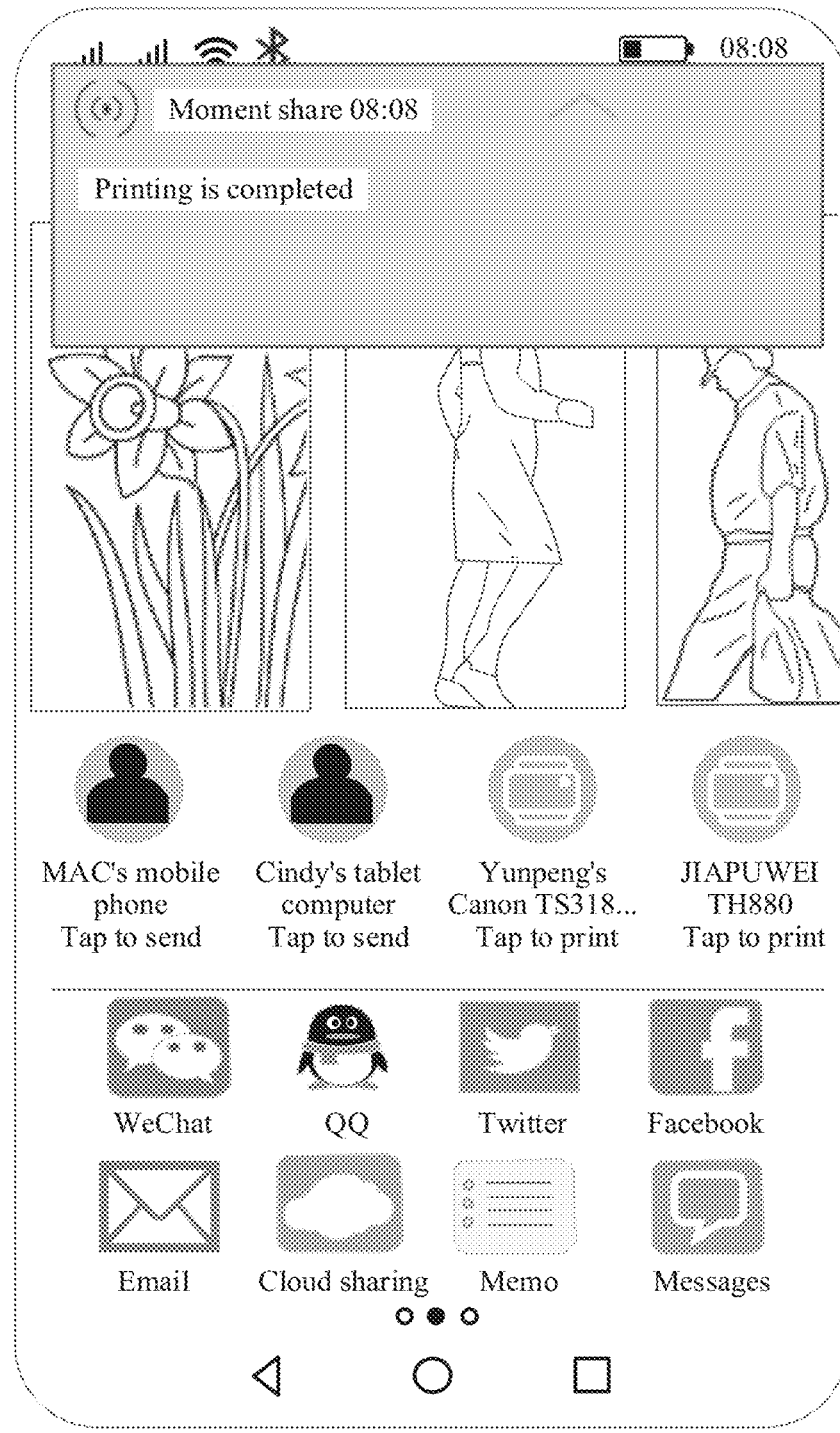
Figure 8D:
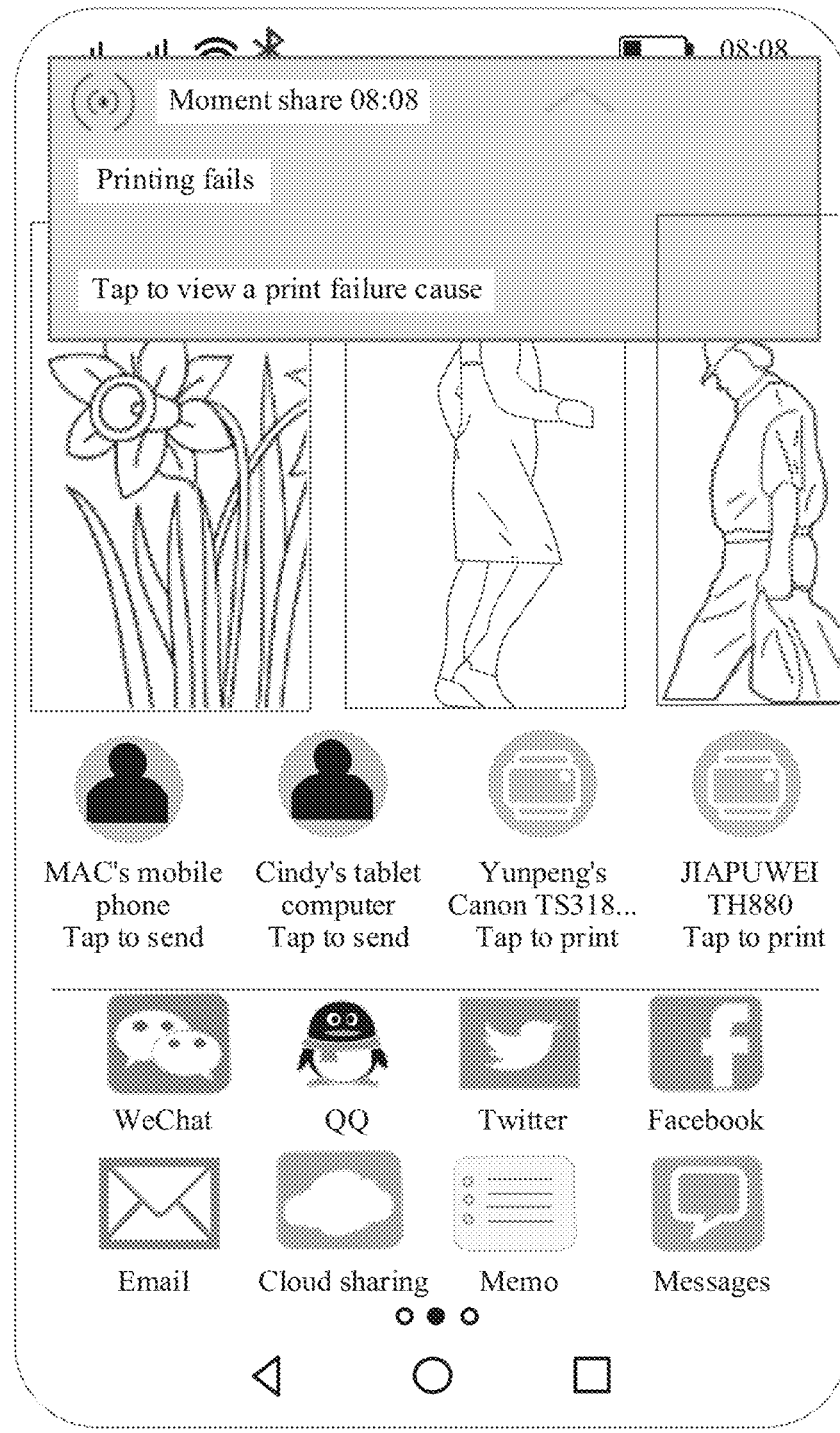
Figure 9A:
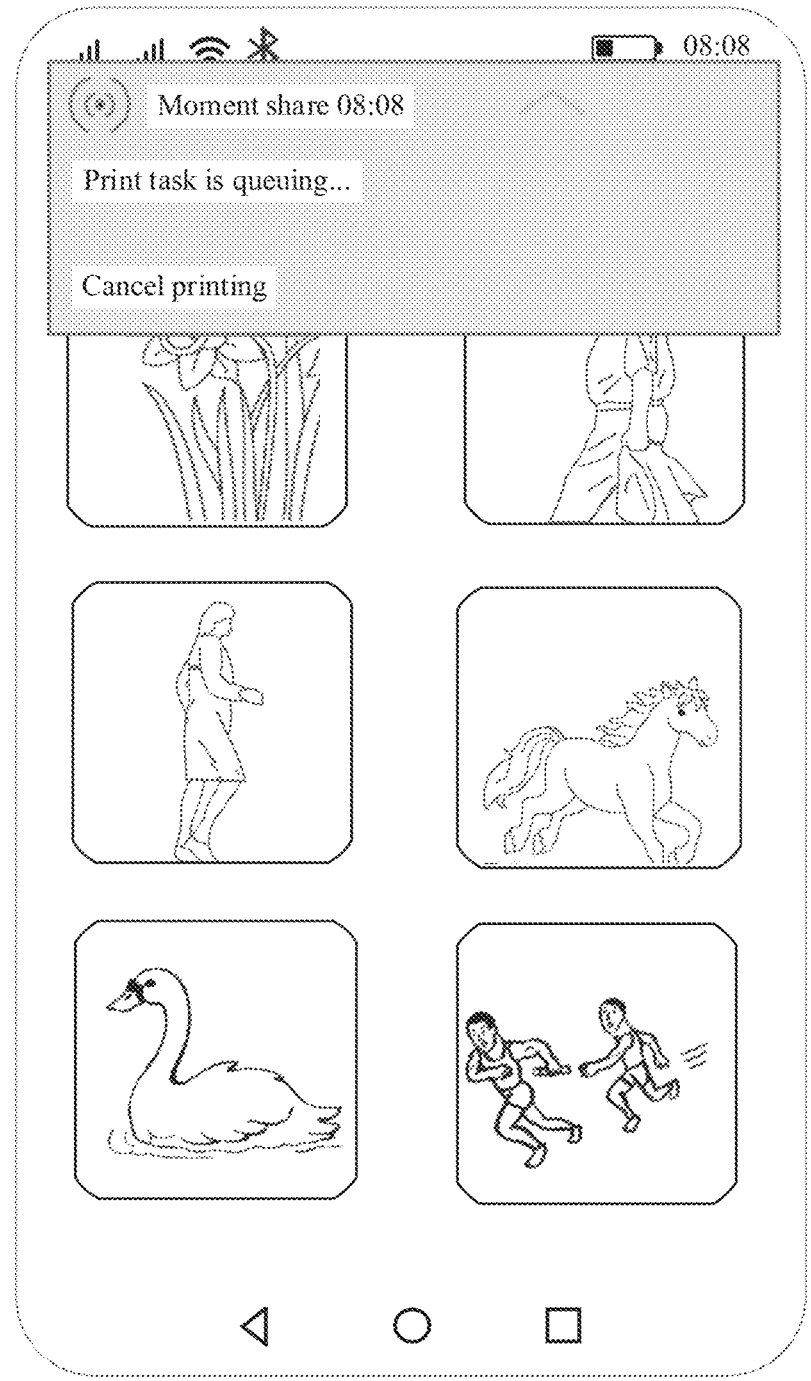
FIG. 9A to FIG. 9D show a series of user interfaces of a notification window according to an embodiment.
Figure 9B:
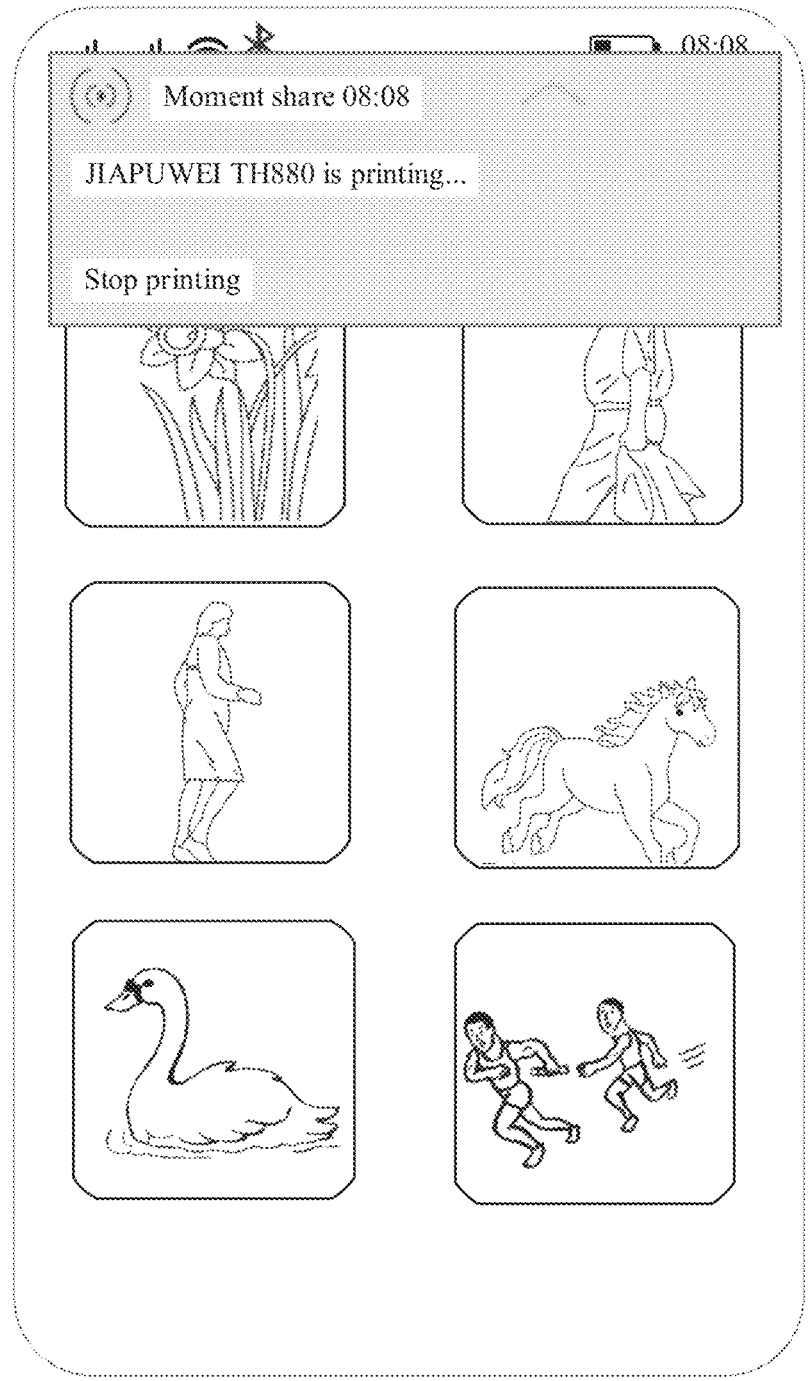
Figure 9C:
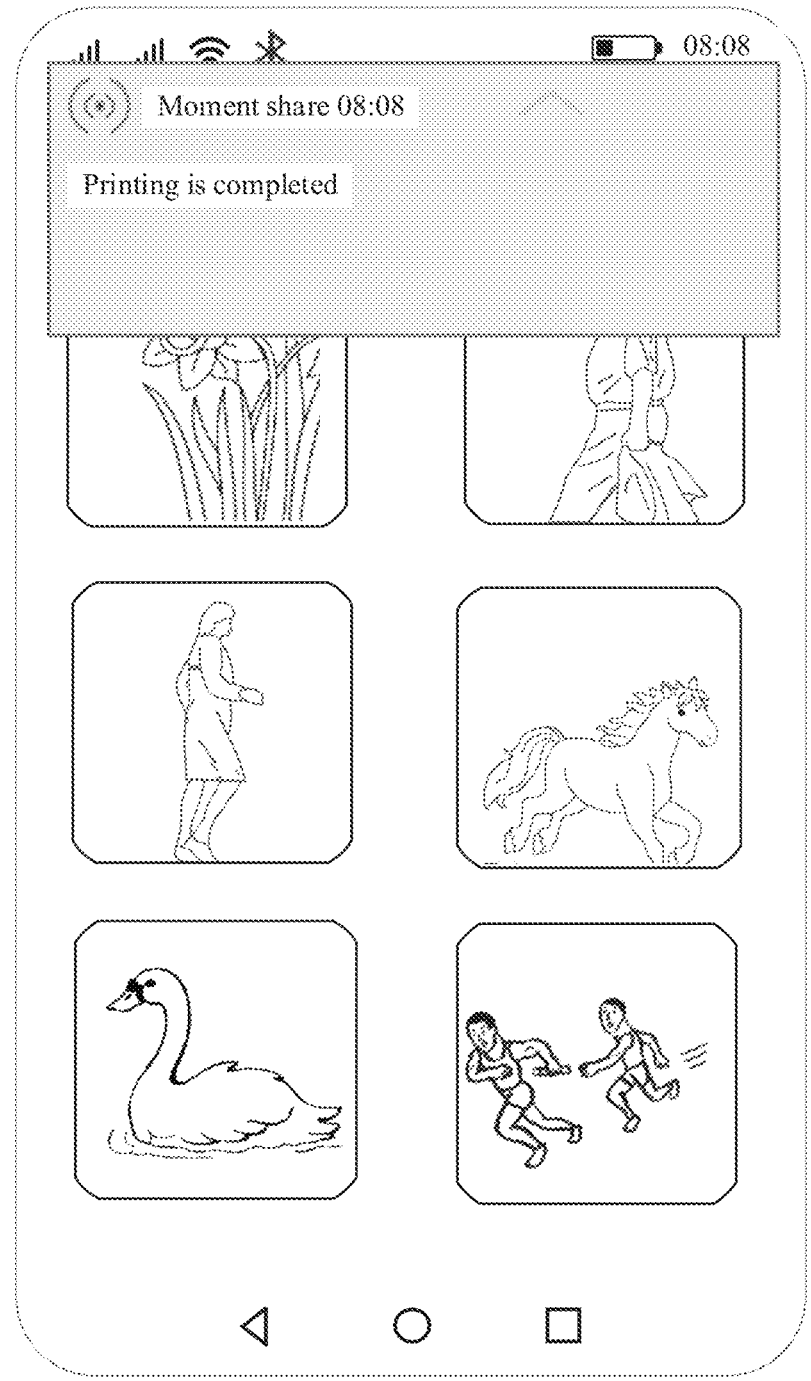
Figure 9D:
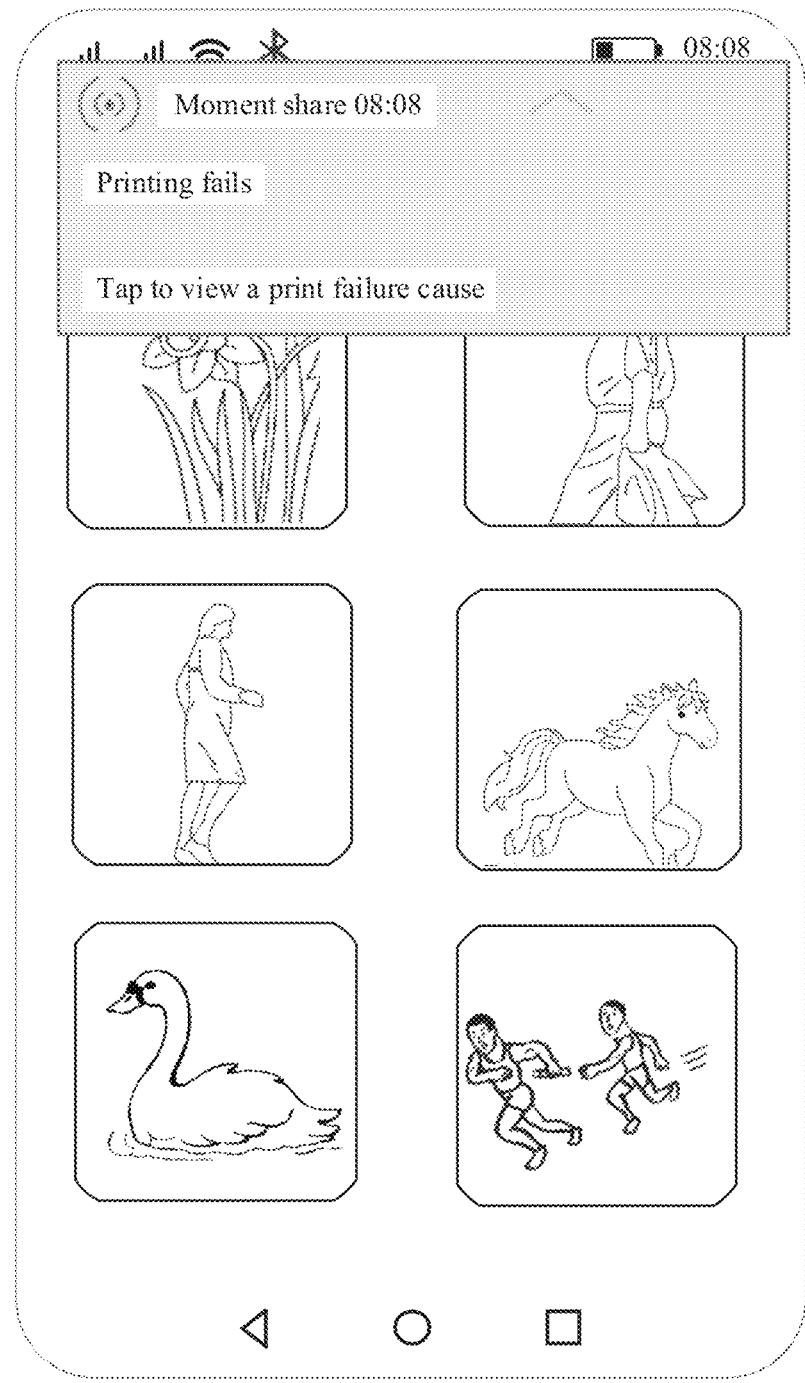
Figure 10A:
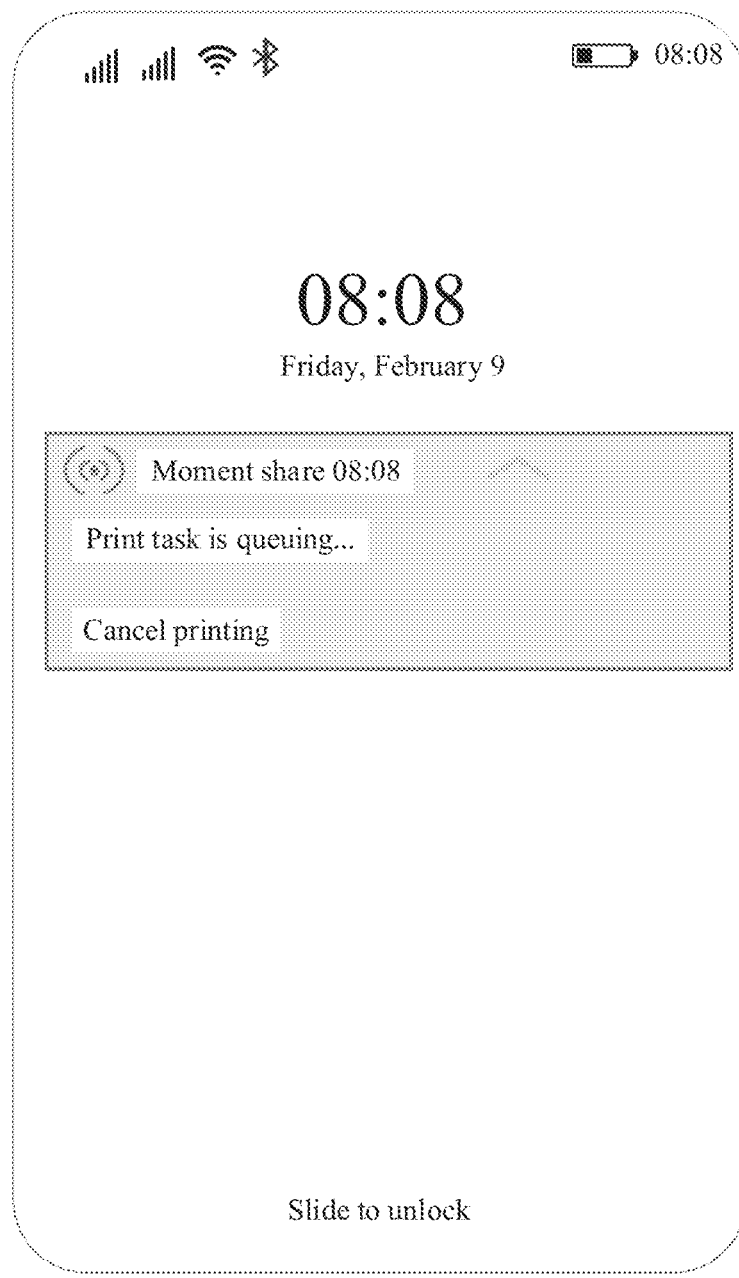
FIG. 10A to FIG. 10D show a series of user interfaces of a notification window according to an embodiment.
Figure 10B:
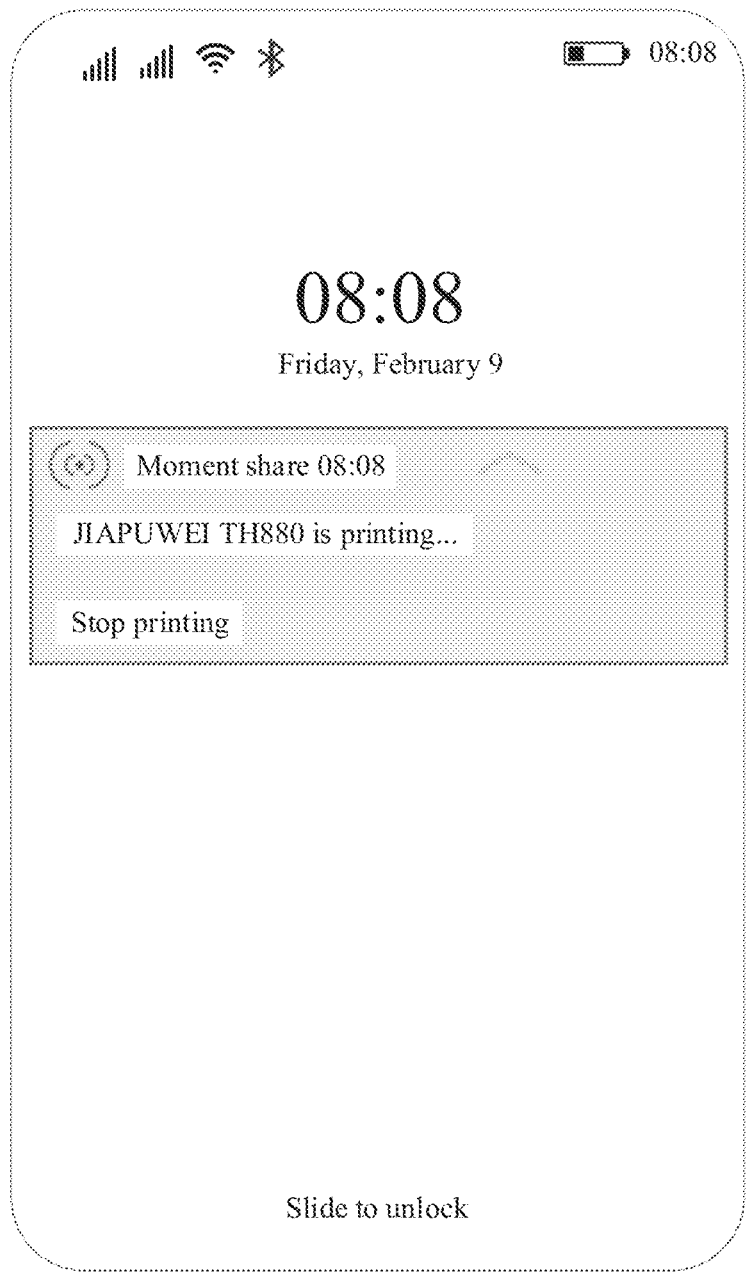
Figure 10C:
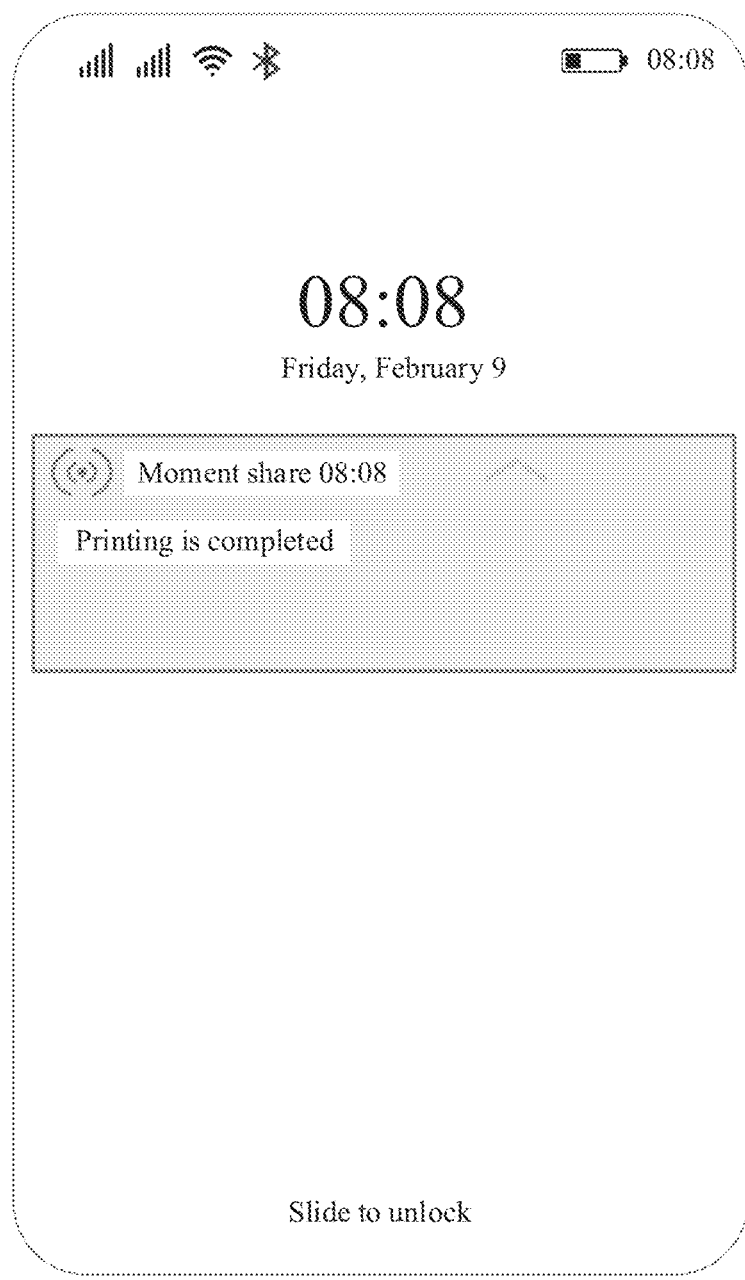
Figure 10D:
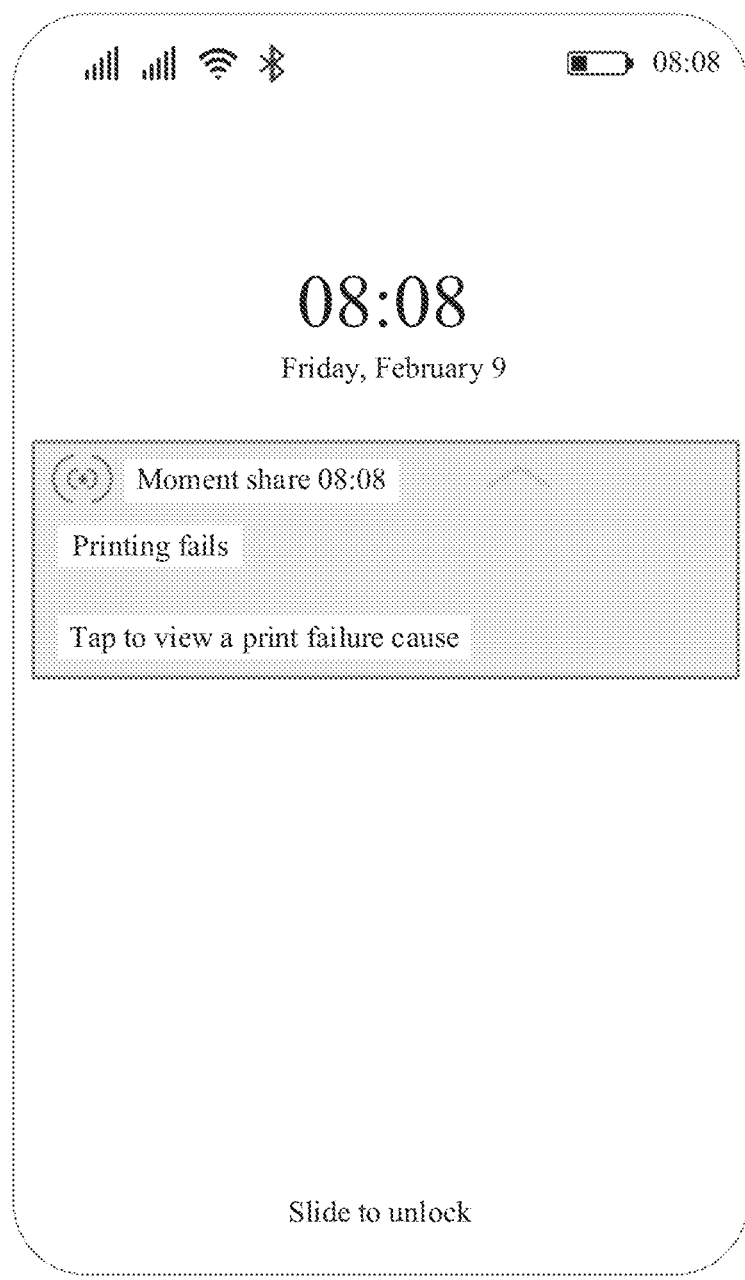
Figures 1, 11A:
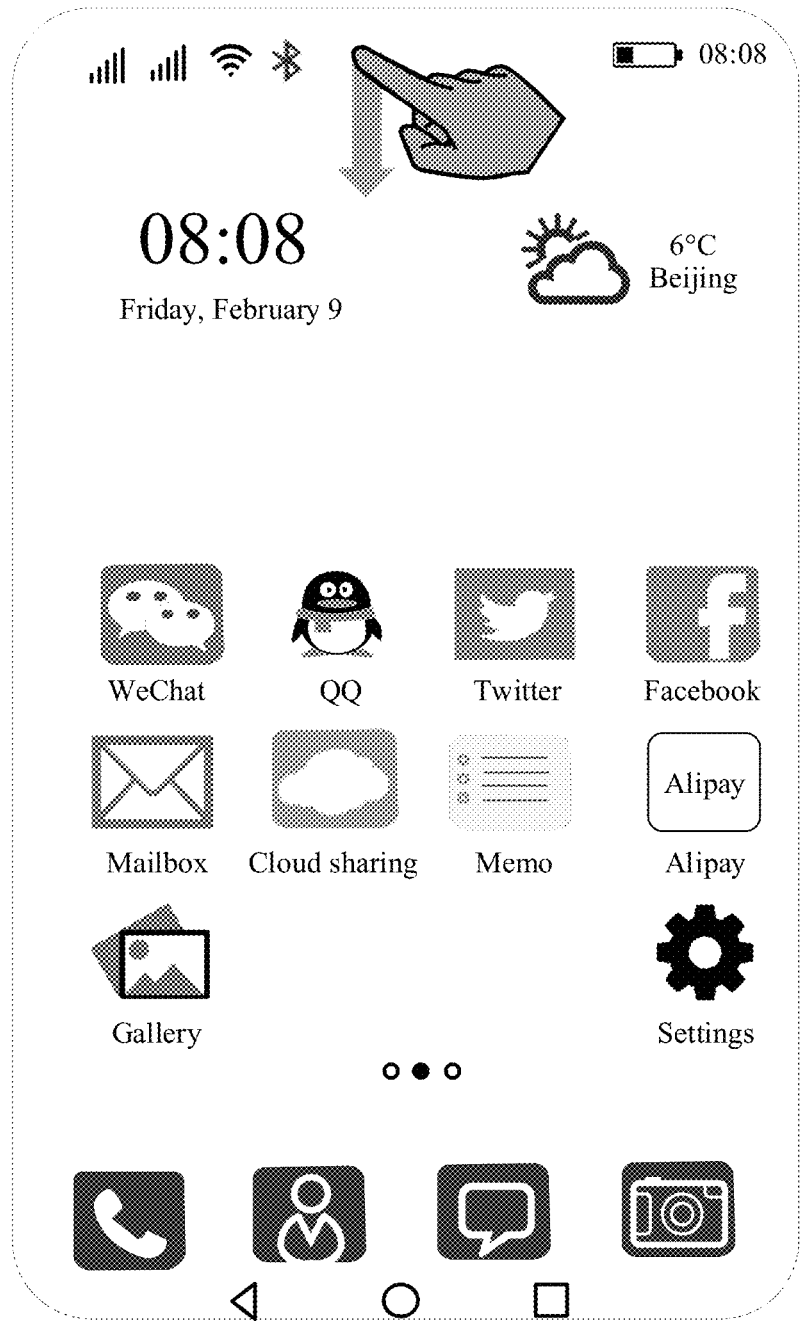
Figures 2, 11A:
Figures 1, 11B:
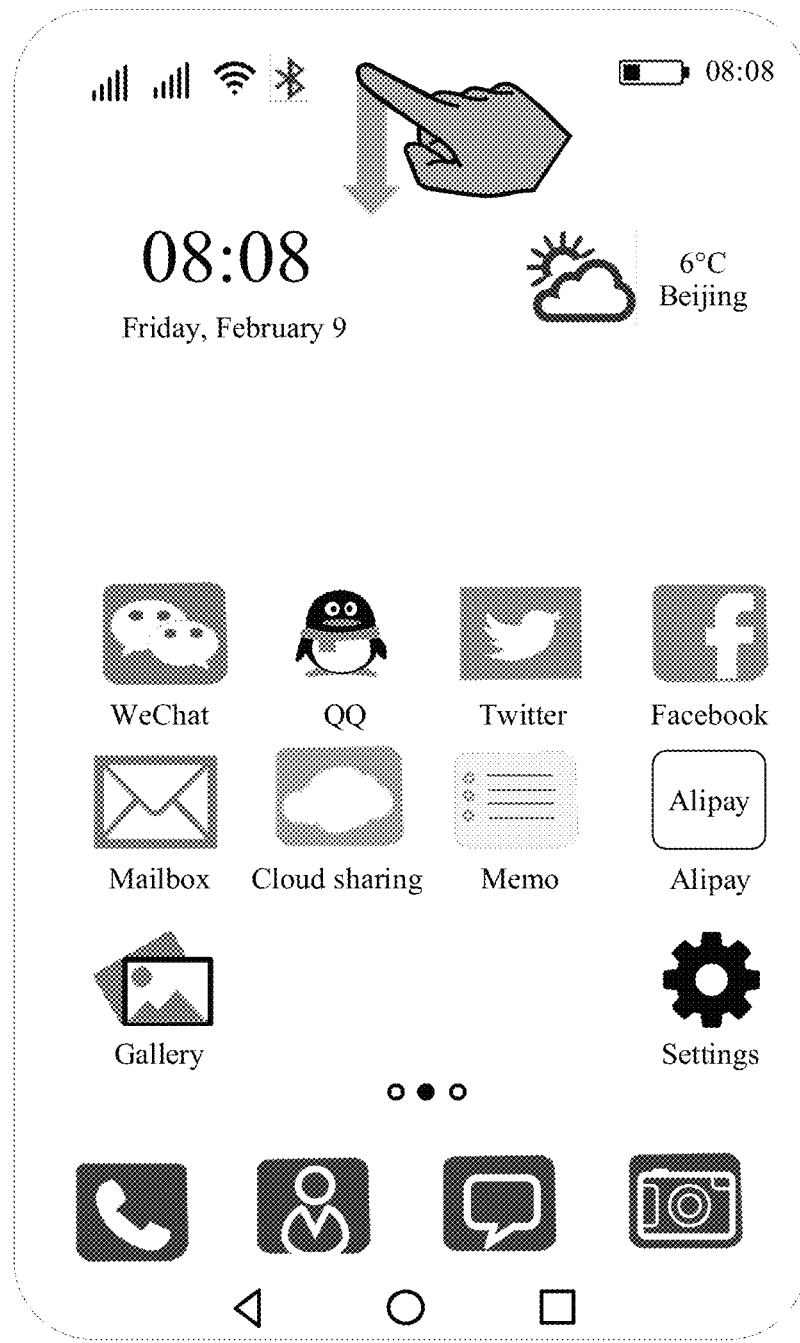
Figures 2, 11B:
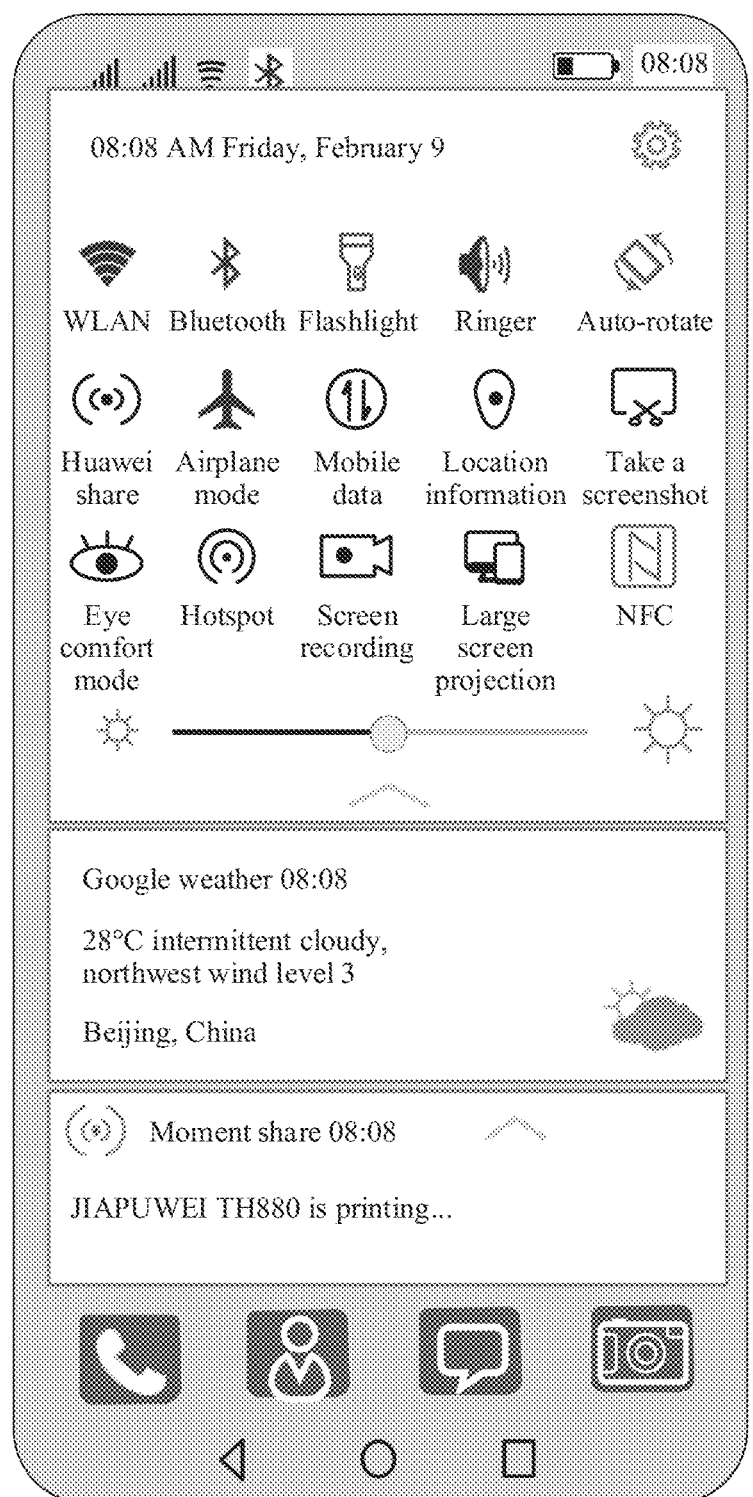
Figures 1, 11C:
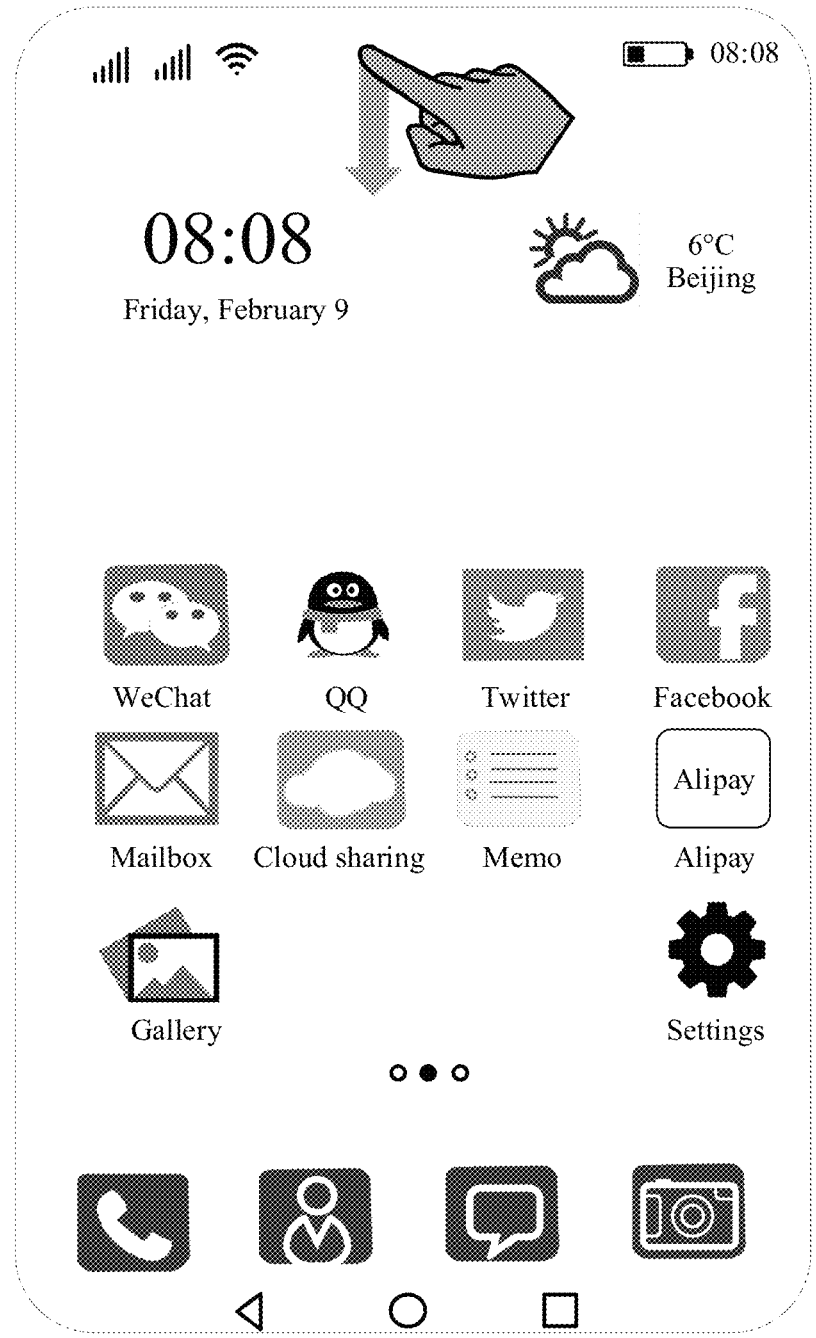
Figures 2, 11C:
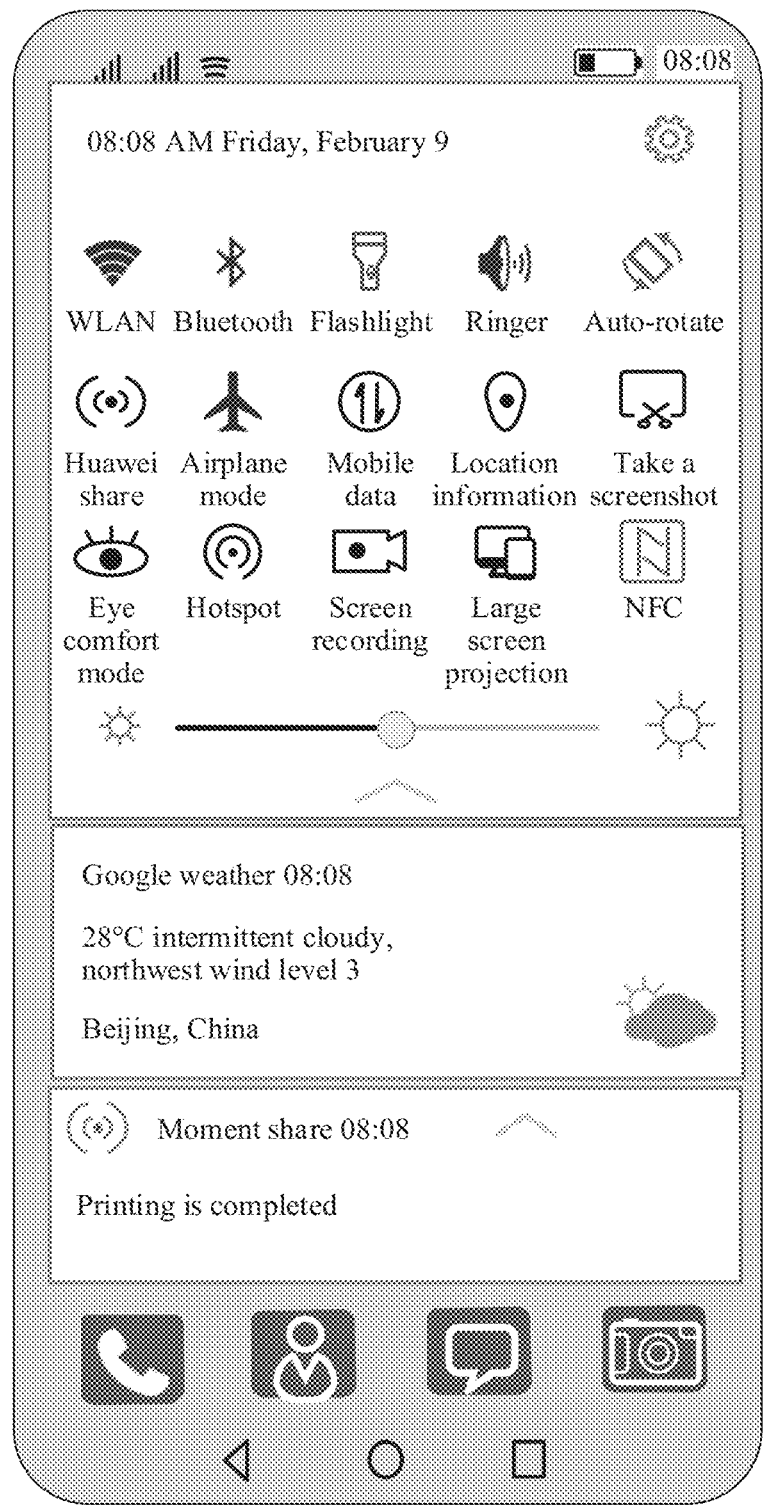
Figures 1, 11D:
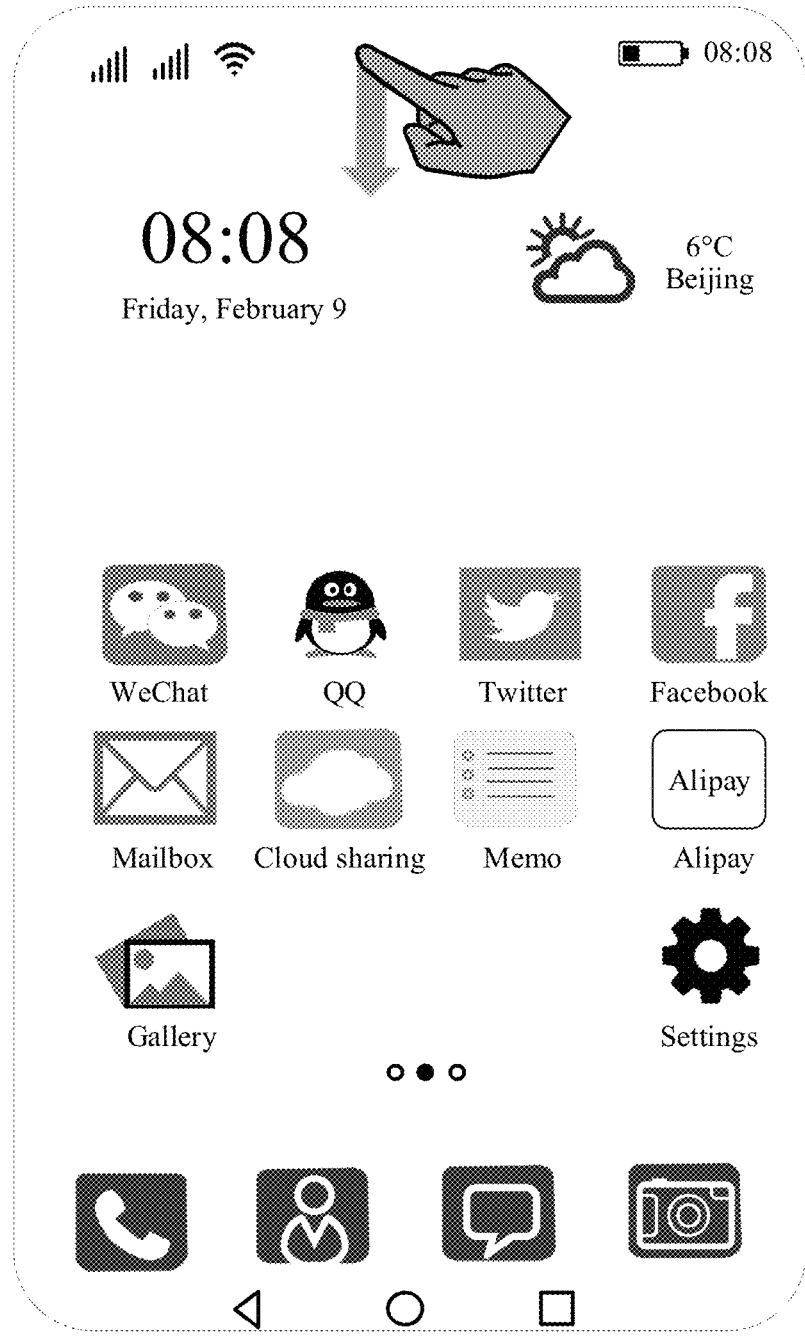
Figures 2, 11D:

UI Embodiments Shown as Examples in FIG. 7A to FIG. 7C

In the UI embodiments shown as the examples in FIG. 7A to FIG. 7C, the user may select a printer near the electronic device that is discovered by the electronic device to print a picture, or may select a cloud printer discovered by the electronic device to print a picture. The picture selected by the user may be a picture stored in the electronic device, or may be a picture in a cloud server accessed by the electronic device.

"Moment share" may be classified into "local moment share (local moment share)" and "cloud moment share (remote moment share)". "Local moment share" may be used to support the user in sharing data with a device near the electronic device. "Cloud moment share" may be used to support the user in sharing data with a cloud device. The nearby device may include a nearby first device, for example, a nearby printer, a nearby projector, or a nearby display, or may include a nearby second device, for example, a nearby mobile phone, a nearby tablet computer, or a nearby personal computer. The cloud device may include a cloud first device, for example, a cloud printer, a cloud projector, or a cloud display, or may include a cloud second device, for example, a cloud mobile phone, a cloud tablet computer, or a cloud personal computer. Enabling "local moment share" may be enabling any one or more of Bluetooth or a WLAN, and enabling "cloud moment share" may be enabling any one or more of cellular mobile data or a WLAN. After enabling "local moment share", the electronic device may discover the device near the electronic device by using one or more technologies such as Bluetooth, Wi-Fi direct (such as Wi-Fi P2P), Wi-Fi SoftAP, and a Wi-Fi LAN. After enabling "cloud moment share", the electronic device may discover the cloud device by using a cellular mobile communications network technology or a wide area network technology.

Different from the UI embodiments shown as the examples in FIG. 6A to FIG. 6J, in the UI embodiments, the electronic device may separately display a nearby device option and a cloud device option in different areas, and may distinctively present the nearby device option and the cloud device option. This is clearer and more intuitive.

The Following Describes a User Interface Provided in the Examples of the UI Embodiments Shown in FIG. 7A to FIG. 7C.

"Moment Share Interface"

The "moment share interface" is displayed on a touchscreen of the electronic device when the electronic device detects an operation of selecting a picture for sharing.

In an embodiment, a user interface 71 shown as an example in FIG. 7A to FIG. 7C may be the "moment share interface". As shown in FIG. 7A to FIG. 7C, the user interface 71 may include an area 701, an area 703, an area 705, and an area 707.

The area 701 may be used to display a picture. For an embodiment of the area 701, refer to the related descriptions of the area 405 in FIG. 4A to FIG. 4C and the embodiments corresponding to FIG. 4A to FIG. 4C. Details are not described herein again.

One or more service options (for example, an application icon) may be displayed in the area 707. An application or a protocol corresponding to the service option may be used to support sharing the picture selected by the user with a cloud contact or a cloud server. For an embodiment of the area 707, refer to the related descriptions of the area 431 in FIG. 4A to FIG. 4C and the embodiments corresponding to FIG. 4A to FIG. 4C. Details are not described herein again.

The area 703 may be used to display a nearby device option, and may be further used to display a nearby user option. The nearby user option corresponds to a nearby second device discovered by the electronic device. For example, when "local moment share" is enabled, as shown in FIG. 7C, the electronic device may display, in the area 703, a device option (for example, a printer icon 725) corresponding to the discovered nearby printer, and may further display a user option (for example, a user icon 721) corresponding to the discovered nearby mobile phone, and a user option (for example, a user icon 723) corresponding to the discovered nearby tablet computer.

For an embodiment of the area 703, refer to the related descriptions of the area 421 in FIG. 4A to FIG. 4C and the embodiments corresponding to FIG. 4A to FIG. 4C. Details are not described herein again. For example, for an embodiment of the area 703 (including an icon 711 and prompt information 713) shown in FIG. 7A, refer to the related descriptions of the area 421 in the embodiment in FIG. 4A. Details are not described herein again. For an embodiment of the area 703 (including an icon 721 and prompt information 723) shown in FIG. 7B, refer to the related descriptions of the area 421 in the embodiment in FIG. 4B. Details are not described herein again. For an embodiment of the area 703 (including the option of the discovered nearby device) shown in FIG. 7C, refer to the related descriptions of the area 421 in the embodiment in FIG. 4C. Details are not described herein again.

The area 705 may be used to display a cloud device option, and may be further used to display a cloud user option. The following describes embodiments of the area 705 in the following cases.

When "cloud moment share" is not enabled, as shown in FIG. 7A, both an icon 715 and prompt information 717 may be displayed in the area 705. The icon 715 may be used to receive an operation of enabling "cloud moment share". The prompt information 717 may be used to prompt the user to enable "cloud moment share". The prompt information 717 may be text information, for example, "Tap here to enable cloud moment share, to discover a cloud device. Traffic is required". In addition to the text information, the prompt information 717 may be further in another form such as a picture. This is not limited in this embodiment.

It may be understood that in some other embodiments, in addition to the icon 715, the electronic device may further listen to an operation of enabling "cloud moment share" by using an interactive element (IE) in another form. This is not limited in this application. For example, some or all of the prompt information 717 may also be used to receive the operation of enabling "cloud moment share". For example, some characters "Tap here" in the prompt information 717 "Tap here to enable cloud moment share" may be used to receive the operation of enabling "cloud moment share".

In some other embodiments, the prompt information 717 in the user interface may not be displayed on the touchscreen, but may be audio played by using the speaker 170A.

As shown in FIG. 7A, the electronic device may detect an operation (for example, an operation performed by the user on the icon 715, such as tapping, heavy pressing, or touching and holding) performed on the icon 715, and in response to the operation, the electronic device may enable "cloud moment share", and update the area 705. The updated area 705 may be shown in FIG. 7B.

When "Moment share" is enabled but the electronic device has not discovered a cloud device, as shown in FIG. 7B, both an icon 725 and prompt information 727 may be displayed in the area 705. The icon 725 may indicate that "cloud moment share" is enabled. In some embodiments, when the electronic device detects an operation performed on the icon 725, in response to the operation, the electronic device may disable "Moment share", and the icon 711 and the prompt information 713 shown in FIG. 7A may be displayed in the area 705.

The prompt information 727 may be used to prompt the user with a fact that the electronic device is searching for a cloud device. For example, the prompt information 727 may be text information "Searching for a cloud device . . . " In addition to the text information, the prompt information 727 may be further in another form such as a picture. This is not limited in this embodiment.

It may be understood that in addition to the interactive elements (the icon 725 and the prompt information 727) shown as an example in FIG. 7B, an interactive element in another form may be further used in the area 705 to indicate that "cloud moment share" is enabled and the user is prompted with a fact that the electronic device is searching for a cloud device.

In some embodiments, when the electronic device does not discover a cloud device, the electronic device may not present any content in the area 705, that is, the area 705 is blank. Therefore, this may indicate that the cloud device is not discovered currently.

If the electronic device discovers the cloud device after a period of time, the electronic device may update the area 705, where a cloud device option and/or a cloud user option may be displayed in the updated area 705. For details, refer to FIG. 7C.

When "cloud moment share" is enabled and the electronic device discovers the cloud device, as shown in FIG. 7C, the cloud device option, for example, a cloud printer icon 731, and/or the cloud user option, for example, a cloud user icon 733, may be displayed in the area 705.

In other words, the area 705 may be used to display the option of the cloud device discovered by the electronic device, and may be further used to display the cloud user option. In addition to the device icon (for example, the cloud printer icon 731), the cloud device option may be further represented in another form, for example, text information "Cloud printer". In addition to the user icon, the cloud user option may be further represented in another form, for example, a user name "Lisa" or a phone number "18819198800".

A cloud printer option may be used to listen to an operation used to trigger printing. The operation used to trigger printing may be an operation (for example, a touch operation performed on the cloud printer icon) performed on the cloud printer option. For how the electronic device processes the detected operation used to trigger printing, refer to the following related descriptions in a related user interface used to select a printer for printing.

In some embodiments, as shown in FIG. 7C, location information corresponding to the option of the discovered cloud device may be further displayed in the area 705. In this way, it is convenient for the user to know a location of a cloud printer corresponding to the cloud device option. For example, location information corresponding to a printer "Canon 1" is "KingKey Tower 2F". For another example, location information corresponding to "Canon 2" is "50 meters nearby". The examples are merely some examples provided in this application, and should not be construed as a limitation. There may be different examples in actual application.

In some embodiments, as shown in FIG. 7C, operation prompt information corresponding to the cloud device option may be further displayed in the area 705. The operation prompt information may be used to prompt the user with an operation that can be used to trigger the electronic device to share data with the discovered cloud first device, or trigger the discovered cloud first device to perform corresponding processing on shared data, for example, printing, projection, or screen mirroring. For an embodiment of the operation prompt information, refer to the related content in the embodiment in FIG. 4C. Details are not described herein again.

In some embodiments, a page turning arrow may be further displayed in the area 705. The user may switch, by using the page turning arrow, the cloud device option displayed in the area 705, so that more cloud device options can be browsed. In addition to the page turning arrow, another interactive element may also be used by the user to switch the cloud device option displayed in the area 705. In some embodiments, the user may alternatively switch, in the area 705 by performing a leftward or rightward swipe gesture, the option of the cloud device discovered by the electronic device.

In some embodiments, one or more cloud printing service options, for example, an icon of "Huawei cloud printing" and an icon of "HP cloud printing", may be further displayed in the area 705. The electronic device may refresh the area 705 in response to an operation (for example, a touch operation performed on the icon) performed on the cloud printing service option. An option, for example, an icon, of each of one or more cloud printers provided by a cloud printing service (for example, "HUAWEI cloud printing") selected by the user may be displayed in the refreshed area 705. In some embodiments, the one or more cloud printers may be printers that are closest to the electronic device and that are provided by the cloud printing service selected by the user.

When neither "local moment share" nor "cloud moment share" is enabled, in some embodiments, the electronic device may detect both an operation (for example, a touch operation performed on the icon 711) used to enable "local moment share" and an operation (for example, a touch operation on the icon 713) used to enable "cloud moment share". The electronic device may enable "local moment share" and "cloud moment share" in response to the two detected operations. After enabling "local moment share", the electronic device may discover a nearby device such as a nearby printer or a nearby projector, and may display a nearby device option in the area 703. After enabling "cloud moment share", the electronic device may discover a cloud device such as a cloud printer or a cloud projector, and may display a cloud device option in the area 705.

In addition to the area 701, the area 703, the area 705, and the area 707, the user interface 71 may further include a title bar, both an interactive element used by the user to cancel picture sharing and indication information may be displayed in the title bar, and the indication information may be used to indicate a quantity of pictures selected by the user. For details, refer to the user interface 41 described in the embodiments in FIG. 4A to FIG. 4C. Details are not described herein again.

In addition to page layouts shown in FIG. 7A to FIG. 7C, a page layout of the "moment share interface" may be further presented in another form. This is not limited in this application.

It can be learned that the area 703 and the area 705 in FIG. 7A may enable the user to separately enable "local moment share" and "cloud moment share". The user may enable only "local moment share" or "cloud moment share", or may enable both "local moment share" and "cloud moment share".

In some embodiments, the area 703 and the area 705 in FIG. 7A may alternatively be implemented as one area, for example, may be the area 621 shown in FIG. 6A. The area 703 and the area 705 in FIG. 7A may alternatively be implemented as one area, for example, may be the area 621 shown in FIG. 6B. To be specific, "local moment share" and "cloud moment share" may not be separately enabled. The user may enable "local moment share" and "cloud moment share" by performing one operation (for example, a tap operation). For details, refer to FIG. 6A and FIG. 6B.

In the "moment share interface" shown in FIG. 7A to FIG. 7C, an area (for example, the area 701) used to display one or more pictures may be referred to as a first area, an area (for example, the area 707) used to display a service option (for example, a WeChat icon or a Mailbox icon) may be referred to as a second area, an area (for example, the area 703) used to display a nearby user option and a nearby device option may be referred to as a third area, and an area (for example, the area 705) used to display a cloud device option may be referred to as a fourth area. An interactive element (for example, the icon 711) that is displayed in the third area and that is used to enable "local moment share" may be referred to as a second interactive element. An interactive element (for example, the icon 715) that is displayed in the fourth area and that is used to enable "cloud moment share" may be referred to as a third interactive element.

Related User Interface Used to Select a Printer for Printing

As shown in FIG. 7C, the electronic device may detect, in the area 703, an operation (for example, a touch operation performed by the user on the nearby printer icon) performed on the nearby printer option, or may detect, in the area 705, an operation (for example, a touch operation performed by the user on the cloud printer icon) performed on the cloud printer option. The printer option may be used to listen to an operation used to trigger printing.

For a manner in which the electronic device responds to the operation detected in the area 703 or the operation detected in the area 705, refer to the related descriptions in FIG. 4D and the related embodiments, or refer to the related descriptions in FIG. 5D to FIG. 5F and the related embodiments. Details are not described herein again.

According to the UI embodiments shown as the examples in FIG. 7A to FIG. 7C, selecting a plurality of printers (for example, a nearby printer and a cloud printer that are discovered by the electronic device) for printing at a time may also be supported. For an embodiment of selecting the plurality of printers for printing at a time, refer to the related descriptions in the UI embodiments shown as the examples in FIG. 4A to FIG. 4H. Details are not described herein again. A difference lies in that in the UI embodiments shown as the examples in FIG. 7A to FIG. 7C, the nearby printer option and the cloud printer option may be displayed in different areas in the "moment share interface".

User Interface Used to Feed Back a Print Status

After triggering the printer selected by the user to print the picture selected by the user, the electronic device may display the user interface used to feed back the print status of the selected picture (namely, the picture selected by the user).

If the printer selected by the user is a nearby printer, the user interface may be shown in one or more of FIG. 5G to FIG. 5J. For details, refer to the related descriptions in the embodiments in FIG. 5G to FIG. 5J. Details are not described herein again. If the printer selected by the user is a cloud printer, the user interface may be shown as example in one or more of FIG. 6E to FIG. 6H. For details, refer to the related descriptions in the embodiments in FIG. 6E to FIG. 6H. Details are not described herein again.

It may be understood that a difference between the UI embodiments shown as the examples in FIG. 7A to FIG. 7C and the UI embodiments shown as the examples in FIG. 6A to FIG. 6J lies only in that in the UI embodiments shown as the examples in FIG. 7A to FIG. 7C, the nearby device and the cloud device that are discovered by the electronic device are displayed in different areas in the "moment share interface". For content that is not mentioned in the UI embodiments shown as the examples in FIG. 7A to FIG. 7C, refer to the UI embodiments shown as the examples in FIG. 6A to FIG. 6J. Details are not described herein again.

According to the UI embodiments shown as the examples in FIG. 7A to FIG. 7C, when identifying the scenario in which the user shares the picture, the electronic device may automatically discover the nearby printer, and display the nearby printer option and the cloud printer option in different areas, so that a process in which the user selects the nearby printer or the cloud printer for printing is clearer and more intuitive.

Related Extensions of the Foregoing UI Embodiments

Extension 1: Related Extension of a Notification Window Used to Prompt the User with a Print Status As described in the embodiments shown as the examples in FIG. 4A to FIG. 4H to the embodiments shown as the examples in FIG. 7A to FIG. 7C, the notification window may be displayed in a home screen (for example, may be the user interface 21). The notification window may be the notification window 471 shown in one or more of FIG. 4E to FIG. 4H, or may be the notification window 571 shown in one or more of FIG. 5G to FIG. 5J, or may be the notification window 671 shown as an example in one or more of FIG. 6E to FIG. 6J.

The Notification Window May be Further Displayed in Another User Interface.

In some embodiments, as shown in an example in one or more of FIG. 8A to FIG. 8D, the electronic device may display the notification window in a user interface displayed when the electronic device automatically discovers a device. In this way, the user can continue to stay in the user interface and select a printer to print a picture. The user interface may be the user interface 41 shown as an example in one or more of FIG. 4A to FIG. 4C, or may be the user interface 51 shown as an example in one or more of FIG. 5A to FIG. 5C, or may be the user interface 61 shown as an example in one or more of FIG. 6A to FIG. 6D-1 and FIG. 6D-2, or may be the user interface 71 shown as an example in one or more of FIG. 7A to FIG. 7C.

In some embodiments, as shown in an example in one or more of FIG. 9A to FIG. 9D, the electronic device may display the notification window in a user interface used by the user to select a picture for sharing. In this way, the user may return to the user interface to perform another picture-related operation. The user interface may be the user interface 31 shown as an example in FIG. 3A or FIG. 3B. In addition, the user interface may alternatively be a user interface provided by another application such as File browser or a picture beautification application. The user interface may alternatively be a user interface that is provided by a cloud server and that is used by the user to browse a picture.

In some embodiments, as shown in an example in one or more of FIG. 10A to FIG. 10D, the electronic device may display the notification window on a lock screen. FIG. 10A to FIG. 10D merely show examples of lock screens, and should not constitute a limitation on the lock screen. In some other embodiments, the electronic device may further display the notification window in a screen-off state. Herein, the screen-off state is a state in which the electronic device powers off a display screen. In this way, even in a screen-locked state or the screen-off state, the user can learn of a print status of a picture selected by the user.

In some embodiments, as shown in an example in one or more of FIG. 11A-1 and FIG. 11A-2 to FIG. 11D-1 and FIG. 11D-2, when detecting an operation (for example, a downward swipe gesture performed on a status bar) performed on the status bar, in response to the operation, the electronic device may display both the window 261 shown in FIG. 2B-2 and a notification window. In some embodiments, prompt information used to indicate a print status may be displayed in the notification window. For example, as shown in FIG. 11A-1 and FIG. 11A-2 to FIG. 11D-1 and FIG. 11D-2, the prompt information may be text information "Print task is queuing . . . ", "Printing . . . ", "Printing is completed", "Printing fails", or the like. For details, refer to the related descriptions of the notification window 471 in the embodiments in FIG. 4E to FIG. 4H. Details are not described herein again. In some other embodiments, if a printer selected by the user is a cloud printer, prompt information used to prompt the user with a location of the cloud printer may be further displayed in the notification window. For details, refer to the related descriptions of the prompt information 673 in the notification window 671 in the embodiments in FIG. 6E to FIG. 6H. Details are not described herein again. In some other embodiments, if a printer selected by the user is a cloud printer, a control may be further displayed in the notification window. The electronic device may display, in response to a detected operation performed on the control, a user interface used to navigate a user's way to a location of the cloud printer. For an embodiment of the control, refer to the related descriptions of the control 675 in the notification window 671 in the embodiments in FIG. 6E to FIG. 6H. Details are not described herein again.

Related Extension of Display Content in the Notification Window

Figure 12:
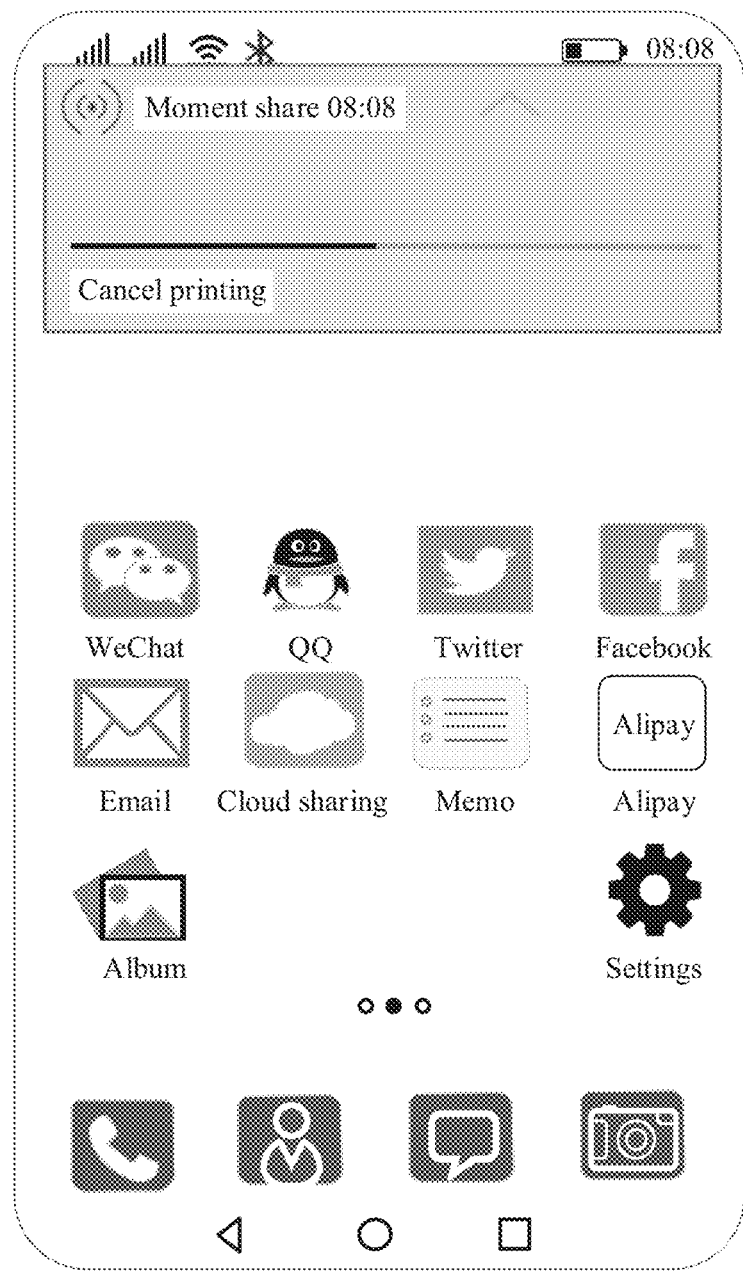

In some embodiments, prompt information used to prompt the user with a print progress may be displayed in the notification window. In other words, the second print state mentioned in the foregoing UI embodiments may be further refined to the print progress. For example, as shown in an example in FIG. 12, the prompt information may be text information "JIAPUWEI TH880 is printing 2018020335.jpg". The example is merely an embodiment provided in this application. In addition to a name of a picture that is being printed, the prompt information may be further used to prompt the user with a picture that is being printed, a page (applicable to file printing) that is being printed, a percentage of current printing, or the like. In this way, it may be convenient for the user to learn of the print progress. This is more convenient.

Figure 13:
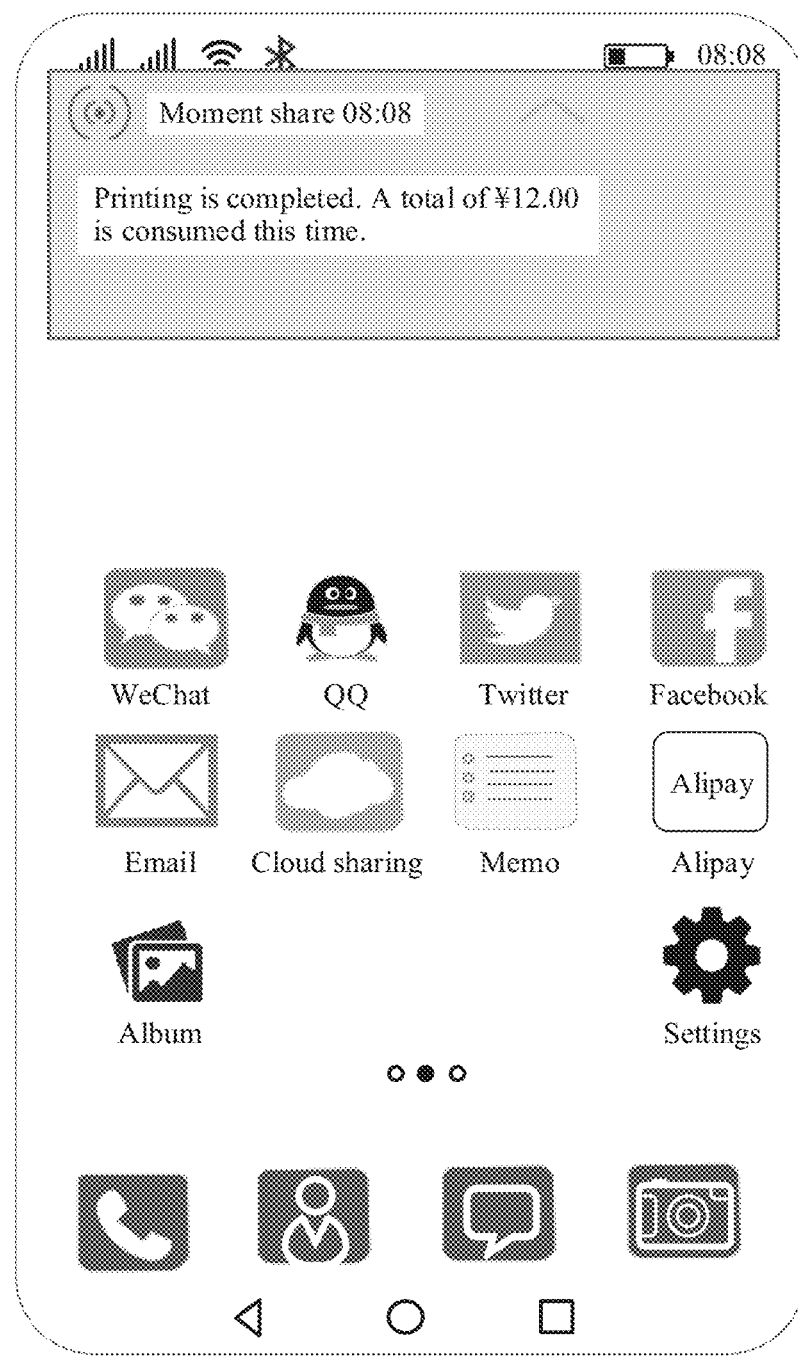

In some embodiments, if a fee needs to be paid for the printer selected by the user, prompt information used to prompt the user with a print fee may be further displayed in the notification window. For example, as shown in an example in FIG. 13, the prompt information may be text information "A total of ¥12.00 is consumed this time". The embodiment shown as an example in FIG. 13 is applicable to a scenario in which a print fee is automatically paid. The scenario in which the print fee is automatically paid may mean that a print service provider may provide a recharge service such as "Personal wallet", and an account-recharged user may perform automatic payment each time the user performs print consumption. In this way, the user does not need to enter a payment password each time. In other words, for the scenario in which the print fee is automatically paid, the related user interfaces used by the user to pay the print fee that are shown as examples in FIG. 5E and FIG. 5F may not be necessary. In this way, an operation can be simplified, and user experience can be improved.

Figure 14A:
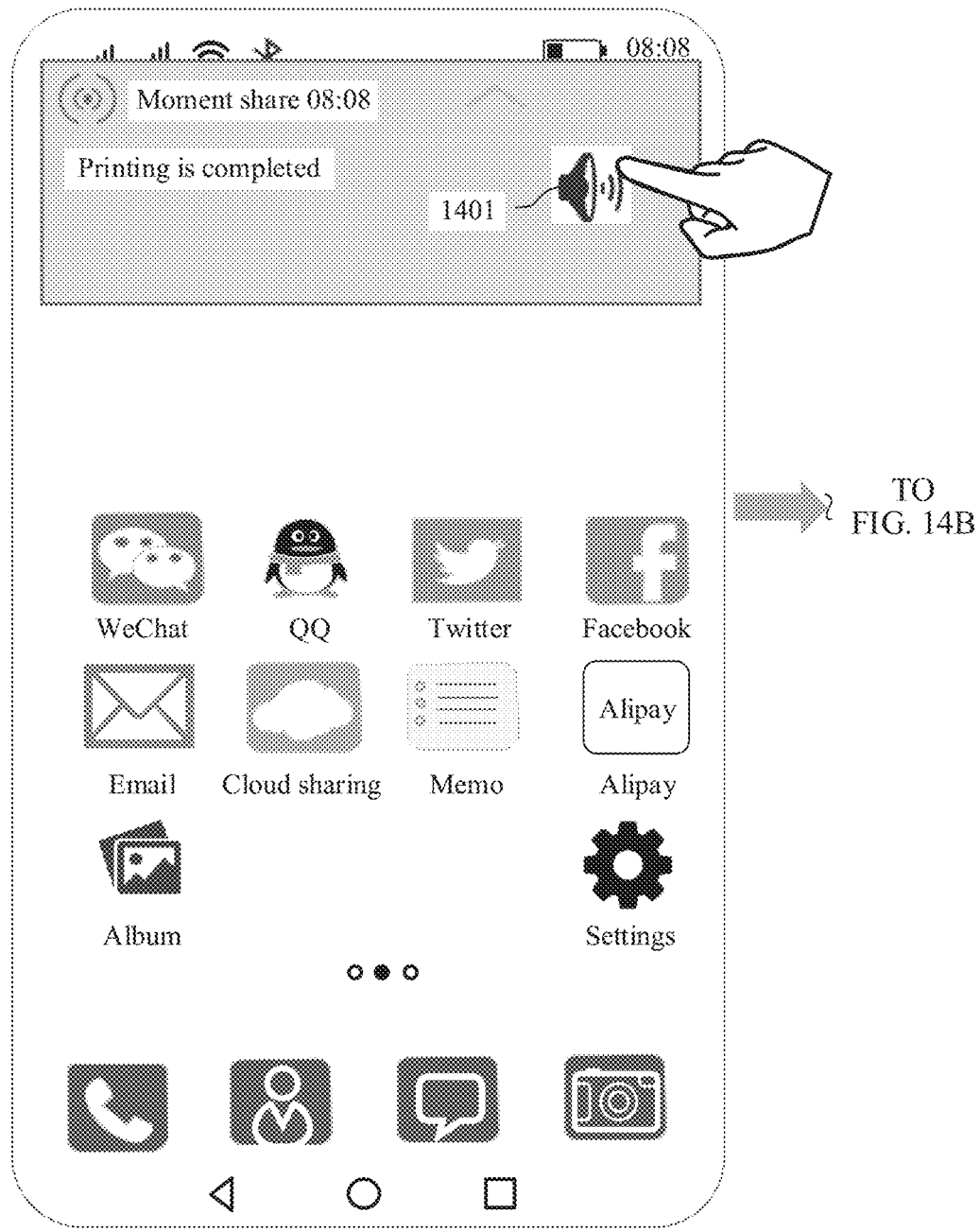
Figure 14B:
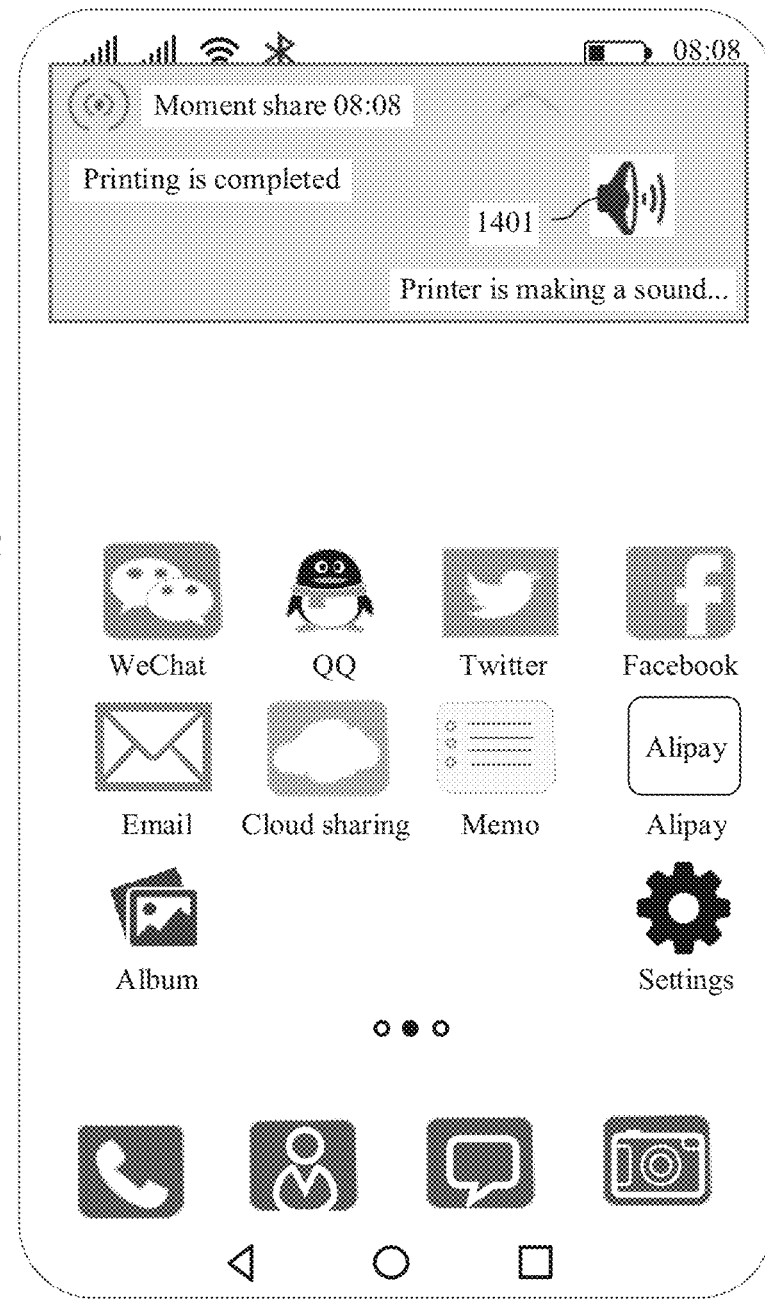

In some embodiments, as shown in an example in FIG. 14A and FIG. 14B, if a printer selected by the user is a printer near the electronic device, a control 1401 may be further displayed in the notification window. The electronic device may trigger, in response to a detected operation (for example, a touch operation performed on the control 1401) performed on the control 1401, the printer selected by the user to make a sound (which may be briefly referred to as a sound), so that the user can find a location of the printer based on the sound made by the printer. Therefore, it is convenient for the user to retrieve printed paper. In some embodiments, operation prompt information, for example, text information "Tap to make a sound for positioning", corresponding to the control 1401 may be further displayed in the notification window. In other words, the operation prompt information may be used to prompt the user to trigger, through an operation performed on the control 1401, the printer to make a sound. FIG. 14A and FIG. 14B merely show an example of an embodiment provided in this application. The control 1401 may alternatively be presented in another interface representation form. This is not limited in this application. For example, characters "Tap here" in the text information "Tap to make a sound for positioning" may be used to listen to a tap operation performed by the user. In other words, the control 1401 may also be in an interface representation form of the characters "Tap here".

Figure 15A:
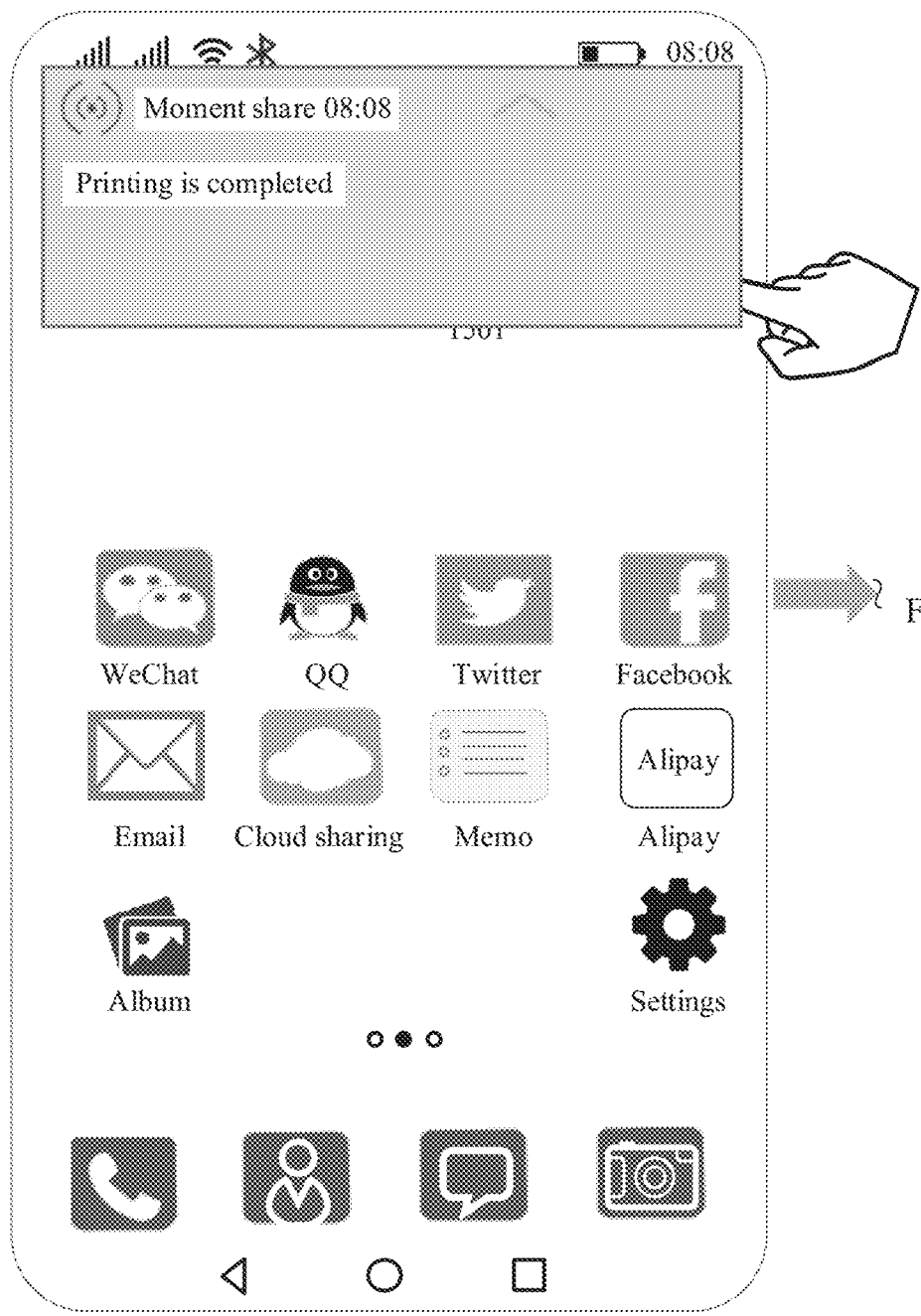
Figure 15B:
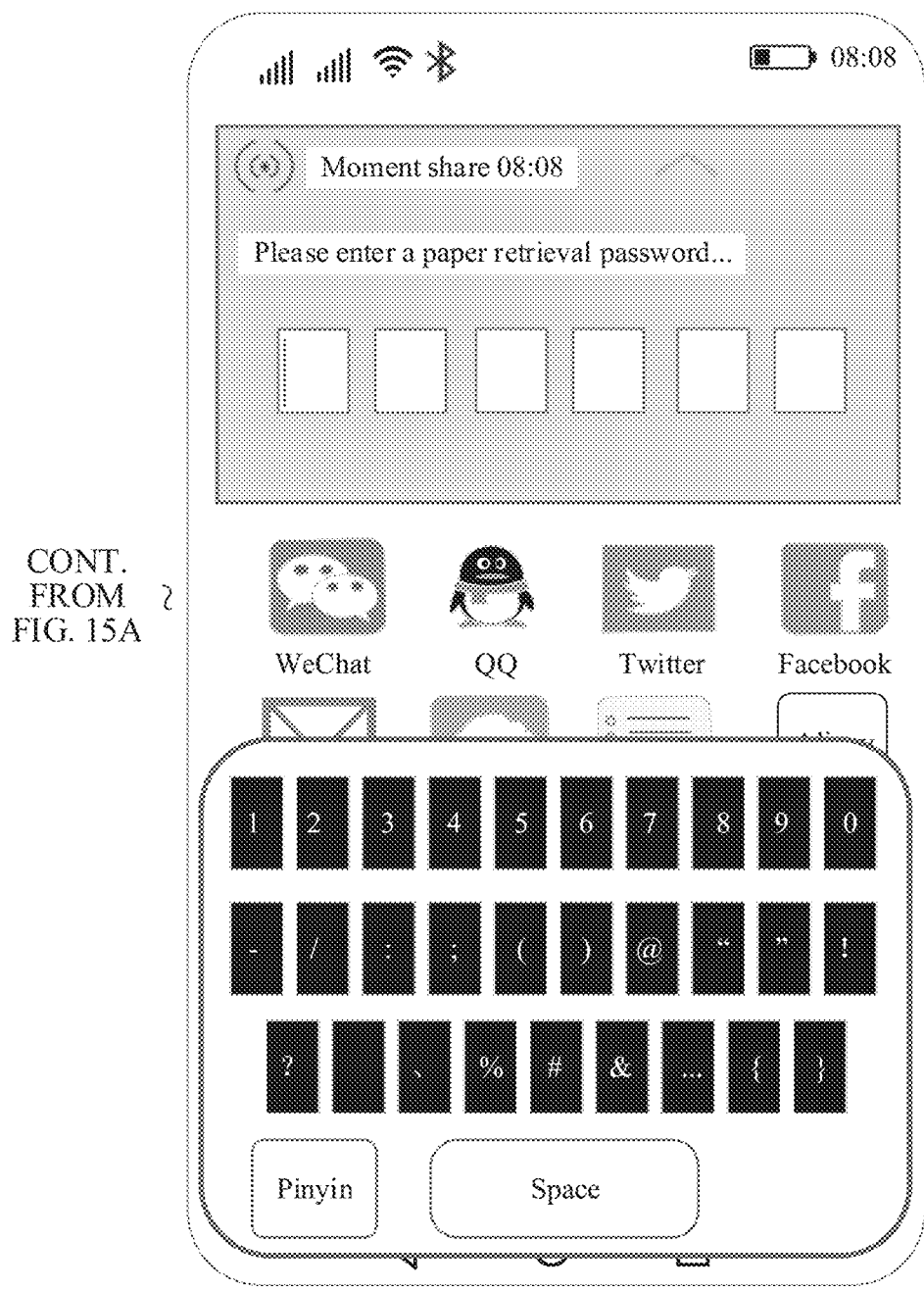

In some embodiments, as shown in an example in FIG. 15A and FIG. 15B, a control 1501 may be further displayed in the notification window, and text information "Tap to retrieve paper" may be displayed on the control 1501. In response to a detected operation (for example, a touch operation performed on the control 1501) performed on the control 1501, the electronic device may display a user interface used by the user to enter a paper retrieval password, and after determining that the paper retrieval password entered by the user is correct, trigger the printer to deliver printed paper of the user. In this way, the printed paper of the user can be prevented from being exposed, and data leakage is avoided. In some other embodiments, the paper retrieval password may alternatively be entered on the printer. The electronic device may display prompt information, to prompt the user to enter the paper retrieval password on the printer. The prompt information may be further used to prompt the user with the paper retrieval password entered on the printer.

Figure 16A:
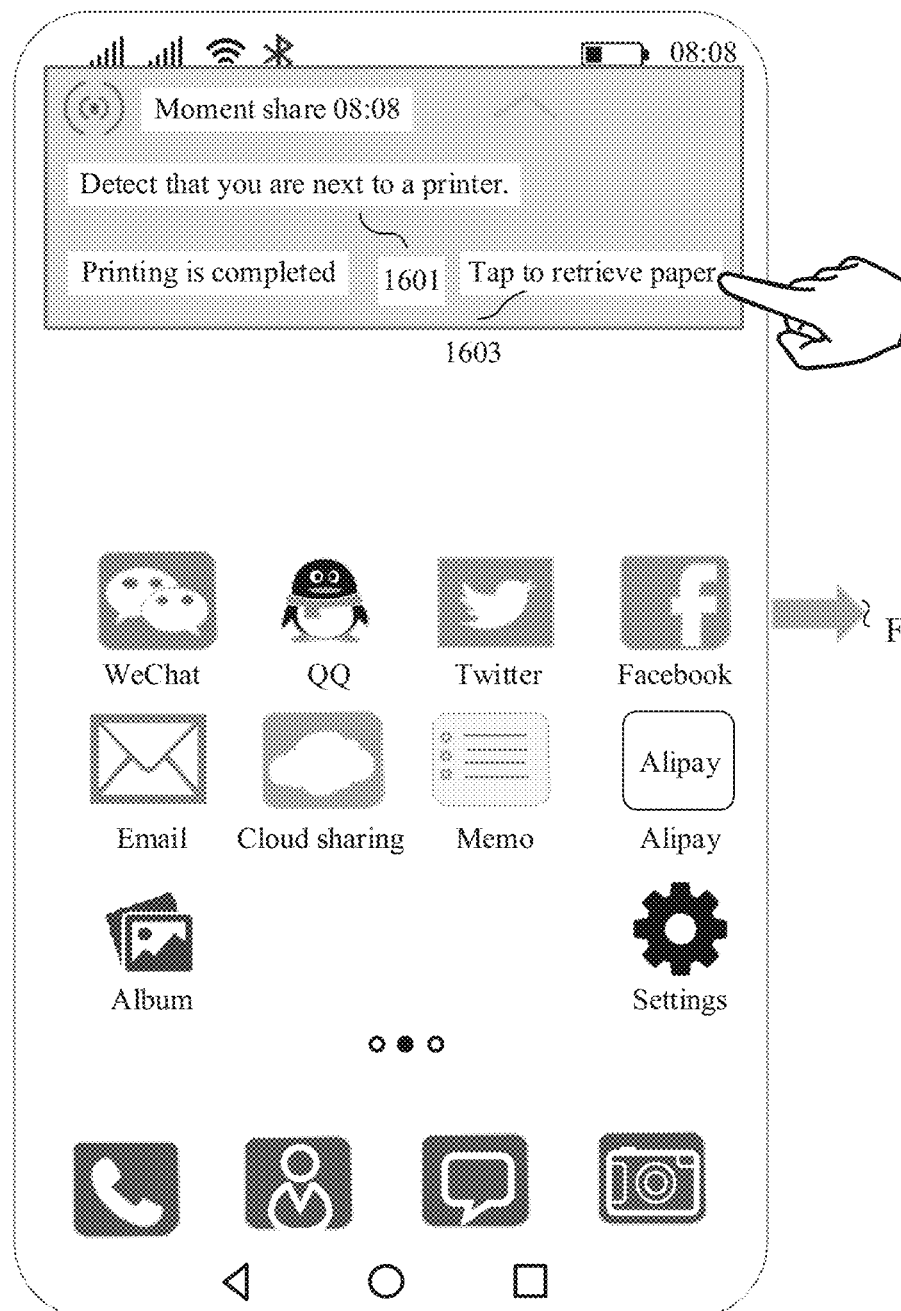
Figure 16B:
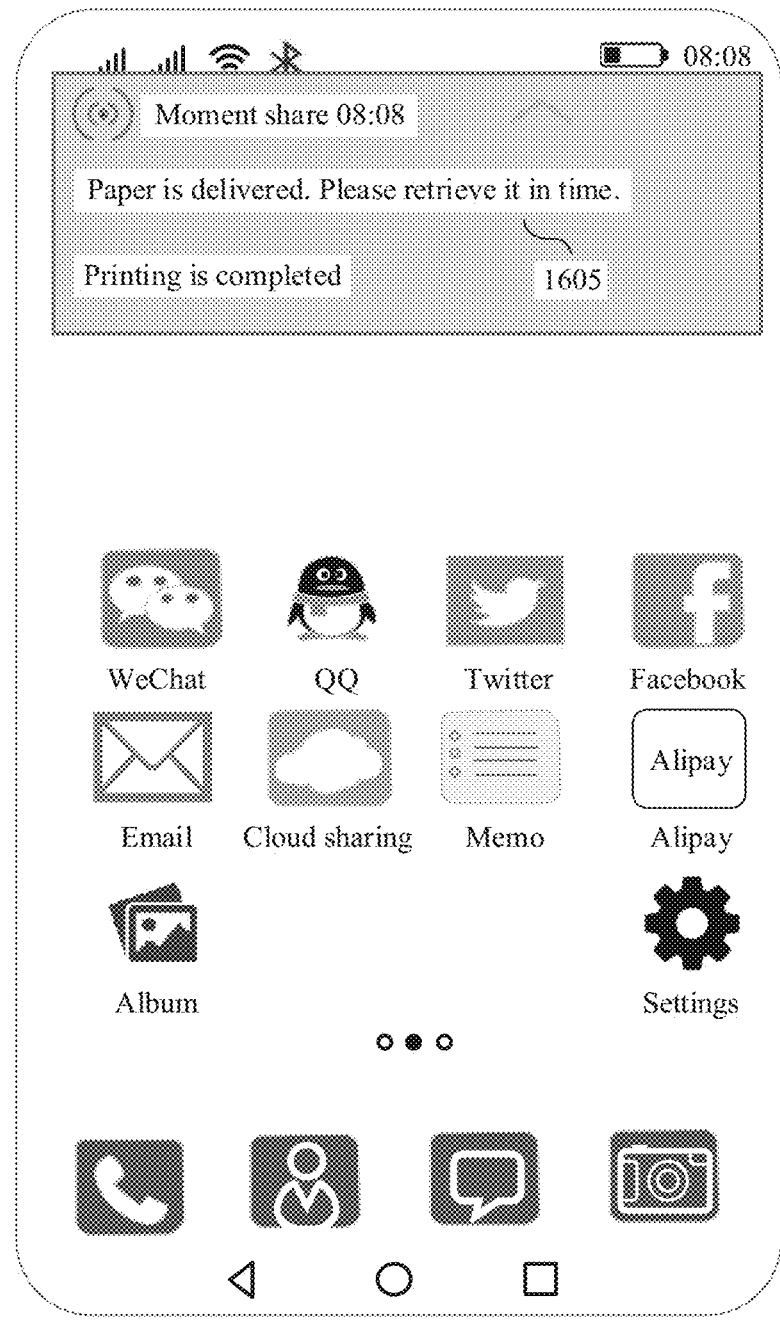

In some other embodiments, as shown in an example in FIG. 16A and FIG. 16B, when the electronic device is near a printer (for example, within a distance of 2 meters), prompt information 1601 and a control 1603 may be further displayed in the notification window. The prompt information 1601 may be used to prompt the user with a fact that the user is next to the printer, for example, may be text information "Detect that you are next to a printer". Text information "Tap to retrieve paper" may be displayed on the control 1603. The electronic device may trigger, in response to a detected operation (for example, a touch operation performed on the control 1603) performed on the control 1603, the printer to deliver printed paper of the user. In this way, the printed paper of the user can be prevented from being exposed, and data leakage is avoided. Prompt information 1605 may be further displayed in the notification window, and the prompt information 1605 may be used to prompt the user that the printer has delivered the printed paper of the user, for example, may be text information "Paper is delivered.

Please retrieve it in time". In this way, the user can be reminded to retrieve the paper in time to avoid data leakage.

With reference to the embodiment in FIG. 15A and FIG. 15B or the embodiment in FIG. 16A and FIG. 16B, the printer may be provided with a paper retrieval apparatus. The paper retrieval apparatus may store the printed paper, and may deliver the paper according to an instruction of the printer. FIG. 15A and FIG. 15B merely show an example of an embodiment provided in this application. The user interface used by the user to enter the paper retrieval password may alternatively be presented in another interface representation form. This is not limited in this application. The control 1501 may alternatively be presented in another interface representation form. For example, the control 1501 may be in an interface representation form of an icon indicating paper retrieval. The user may tap the icon to open the user interface used by the user to enter the paper retrieval password. FIG. 16A and FIG. 16B also merely show an example of an embodiment provided in this application. The prompt information 1601 and the control 1603 each may alternatively be presented in another interface representation form, and should not be construed as a limitation.

A Manner Used to Prompt the User with a State of the Printer Detected by the Electronic Device (for Example, the Printer is Busy or Consumables are Used Up)

Figure 17A:
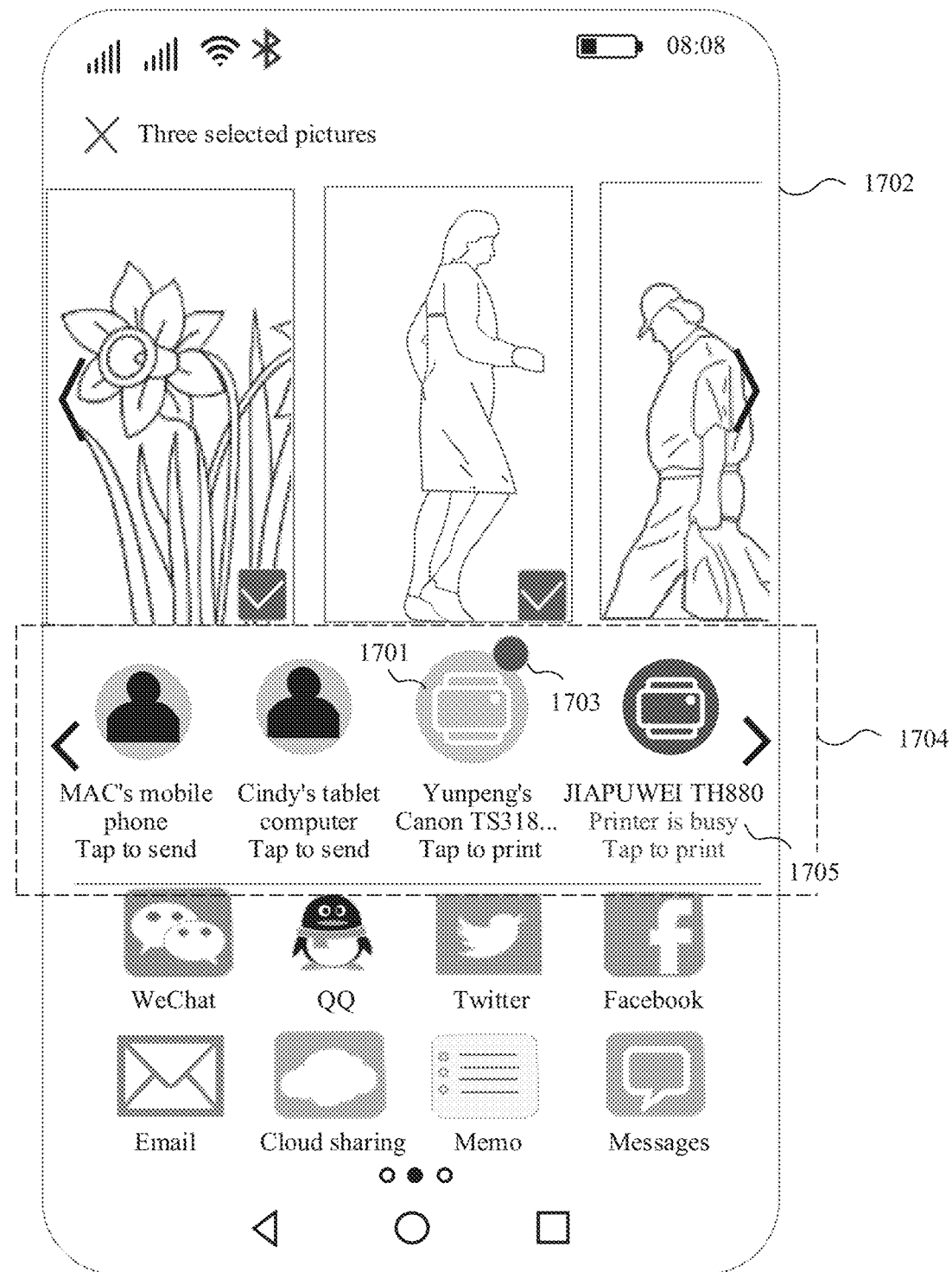

As shown in an example in FIG. 17A, the electronic device may display a current state of the printer in the "moment share interface" (namely, a user interface 1702). For example, the printer is busy or the consumables are used up.

The "moment share interface" may be the user interface 41 shown as an example in FIG. 4C, or may be the user interface 51 shown as an example in FIG. 5C, or may be the user interface 61 shown as an example in FIG. 6C or FIG. 6D-1 and FIG. 6D-2, or may be the user interface 71 shown as an example in FIG. 7C. An area 1704 may be the area 421 in the user interface 41, or may be the area 521 in the user interface 51, or may be the area 621 in the user interface 61, or may be the area 703 or the area 705 in the user interface 71.

In some embodiments, if the printer (a nearby printer or a cloud printer) discovered by the electronic device is busy, the electronic device may display, in the area 1704 in the user interface 1702 shown as example in FIG. 17A, indication information used to indicate that the printer is busy. Herein, the area 1704 in the user interface 1702 may be used to display device options/a device option corresponding to a nearby first device and/or a cloud first device discovered by the electronic device.

For example, as shown in an example in FIG. 17A, the indication information may be a red circular indicator 1703 displayed in the upper right corner of a printer icon 1701, which indicates that the printer is busy. For another example, as shown in an example in FIG. 17A, the indication information may alternatively be text information "Printer is busy" in red font displayed below a printer icon 1701, which indicates that the printer is busy. These examples are merely some embodiments provided in this application, and may be different in actual application. For example, a display state of the printer icon 1701 may alternatively be set to indicate that the printer is busy. For example, the printer icon is presented in red, or the printer icon is presented in an animation effect similar to a heartbeat, and should not be construed as a limitation.

In some embodiments, if consumables of the printer (a nearby printer or a cloud printer) discovered by the electronic device are used up, for example, the printer is out of paper or the printer is out of ink, the electronic device may display indication information used to indicate that the consumables of the printer are used up. For example, as shown in an example in FIG. 17B-1 and FIG. 17B-2, the indication information may be an indicator 1707 displayed in the upper right corner of a printer icon 1701, which indicates that consumables of the printer are used up. For another example, as shown in an example in FIG. 17B-1 and FIG. 17B-2, the indication information may alternatively be text information "Printer is out of ink" in red font displayed below a printer icon 1701, which indicates that the printer is out of ink. These examples are merely some embodiments provided in this application, and may be different in actual application. For example, a display state of the printer icon 1701 may alternatively be set to indicate that the consumables of the printer are used up. This should not be construed as a limitation.

Figures 1, 17B:
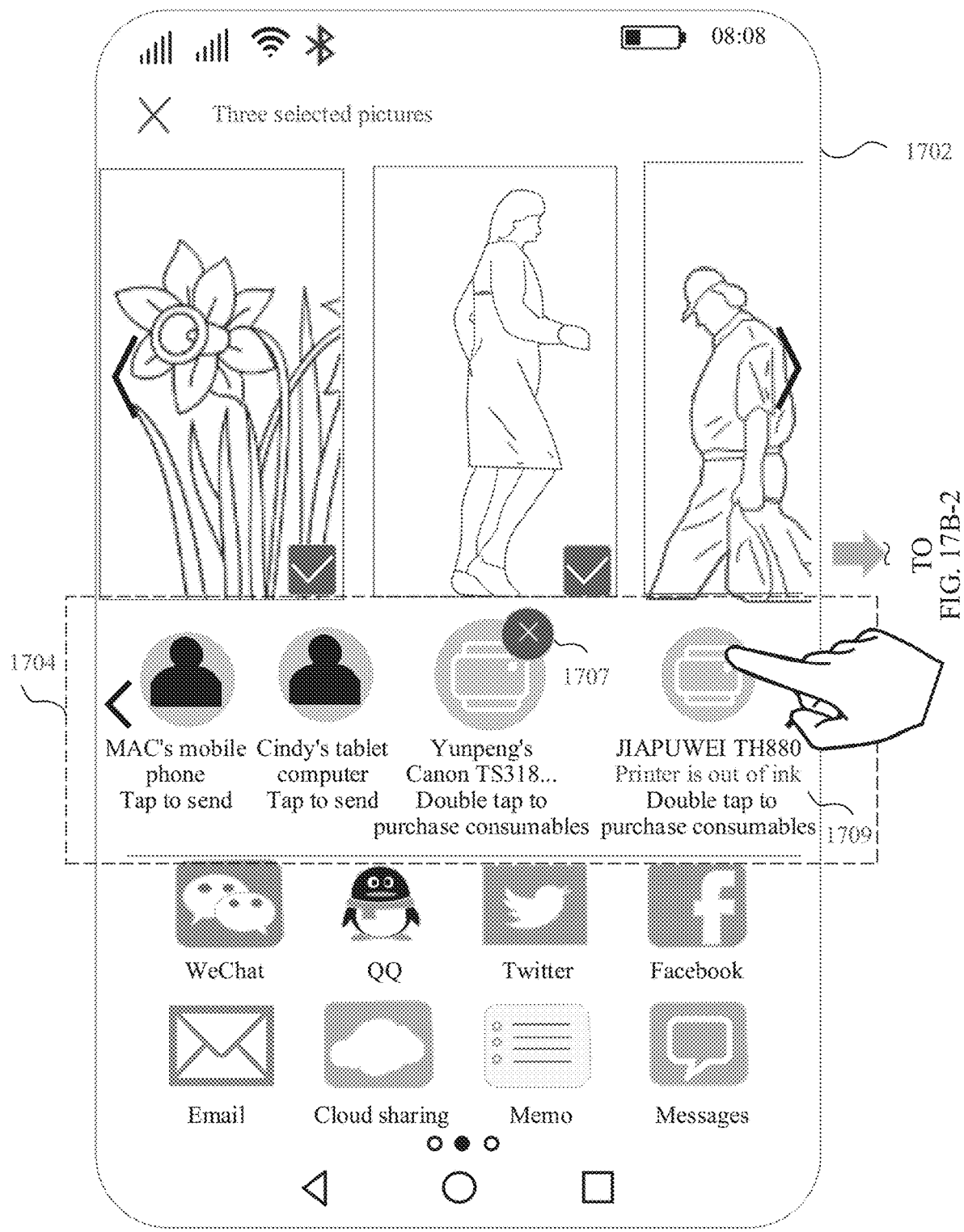
Figures 2, 17B:
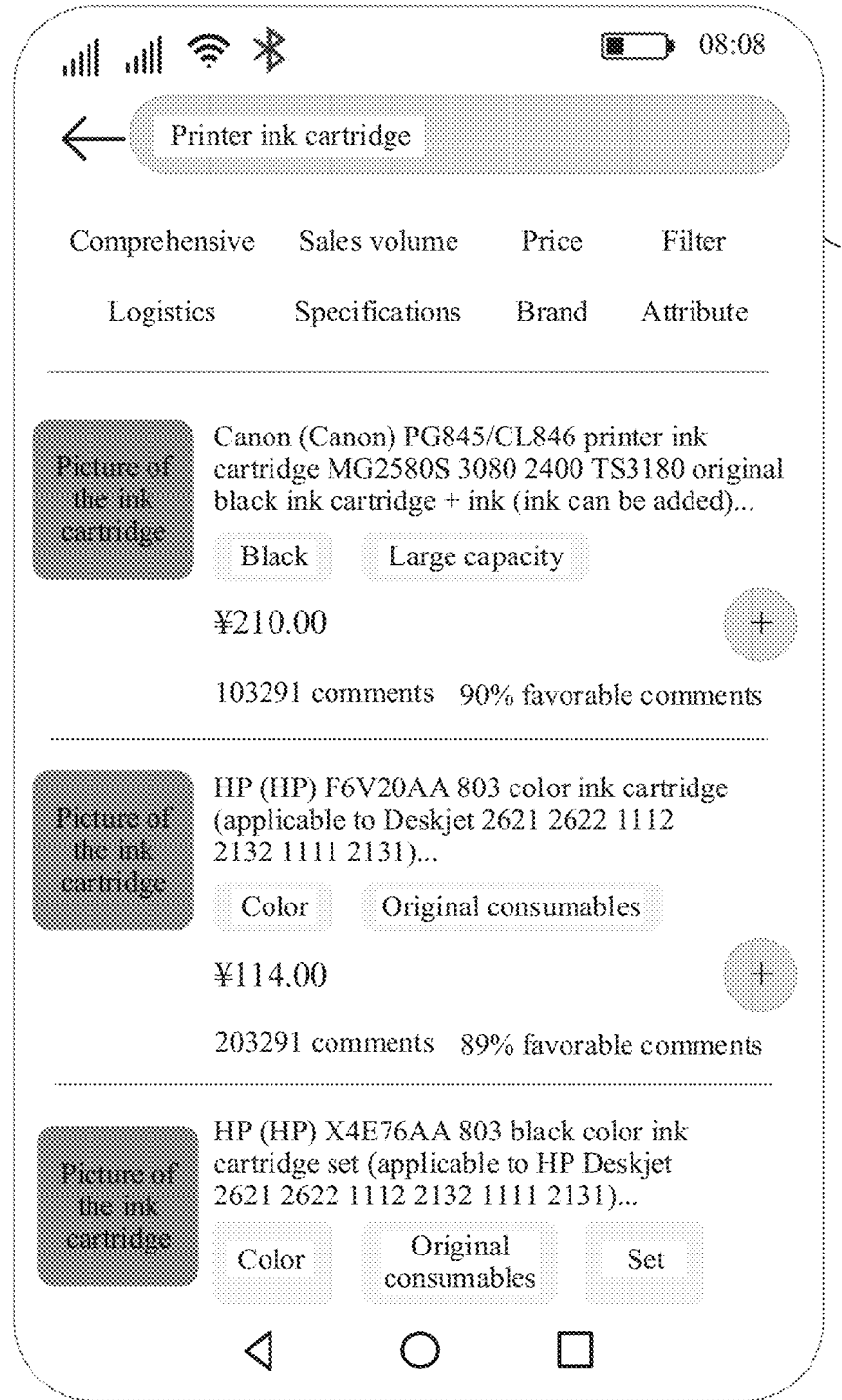

In some other embodiments, as shown in an example in FIG. 17B-1 and FIG. 17B-2, if the consumables of the printer discovered by the electronic device are used up, in response to a detected operation (for example, a double-tap operation performed by the user on the printer icon) performed on a printer option corresponding to the printer, the electronic device may jump to and display a user interface 1711 used by the user to purchase the consumables of the printer, where the user interface 1711 may be an interface of a shopping application (for example, Taobao). In this way, it may be convenient for the user to purchase the consumables of the printer. This is simple and convenient. Herein, the operation needs to be different from the operation (for example, the touch operation performed on the printer icon) that is mentioned in the embodiments shown as examples in FIG. 4A to FIG. 4H to the embodiments shown as examples in FIG. 7A to FIG. 7C and that is performed on the printer option. FIG. 17B-1 and FIG. 17B-2 merely show examples of some embodiments provided in this application. The user interface used by the user to purchase the consumables of the printer may alternatively be presented in another interface representation form, and should not be construed as a limitation.

In some embodiments, if an exception such as an excessively low battery level or an abnormal temperature occurs on the printer discovered by the electronic device, the electronic device may further display indication information used to indicate the exception. An interface representation form of the indication information is not limited in this application.

Another Manner Used to Prompt the User with a Print Status (for Example, a Print Progress or a Print Result) of the Selected Picture In the foregoing embodiments shown as examples in FIG. 4A to FIG. 4H to the embodiments shown as examples in FIG. 7A to FIG. 7C, the electronic device may display, in the notification window, prompt information used to prompt the user with the print status of the selected picture, for example, "Print task is queuing", "JIAPUWEI TH880 is printing . . . ", "Printing is completed", or "Printing fails".

Figure 18A:
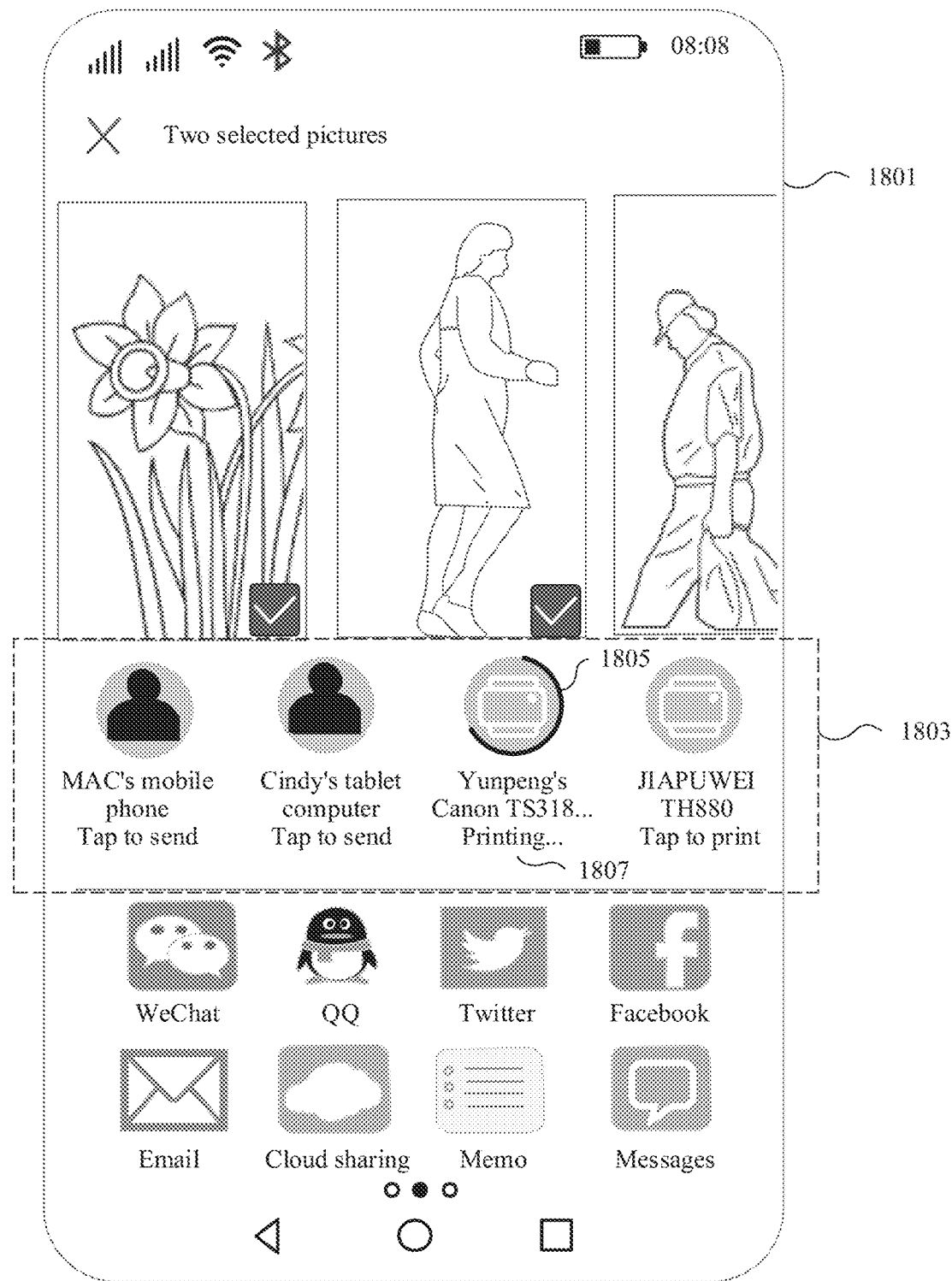
FIG. 18A and FIG. 18B show a series of user interfaces indicating a print status according to an embodiment.
Figure 18B:
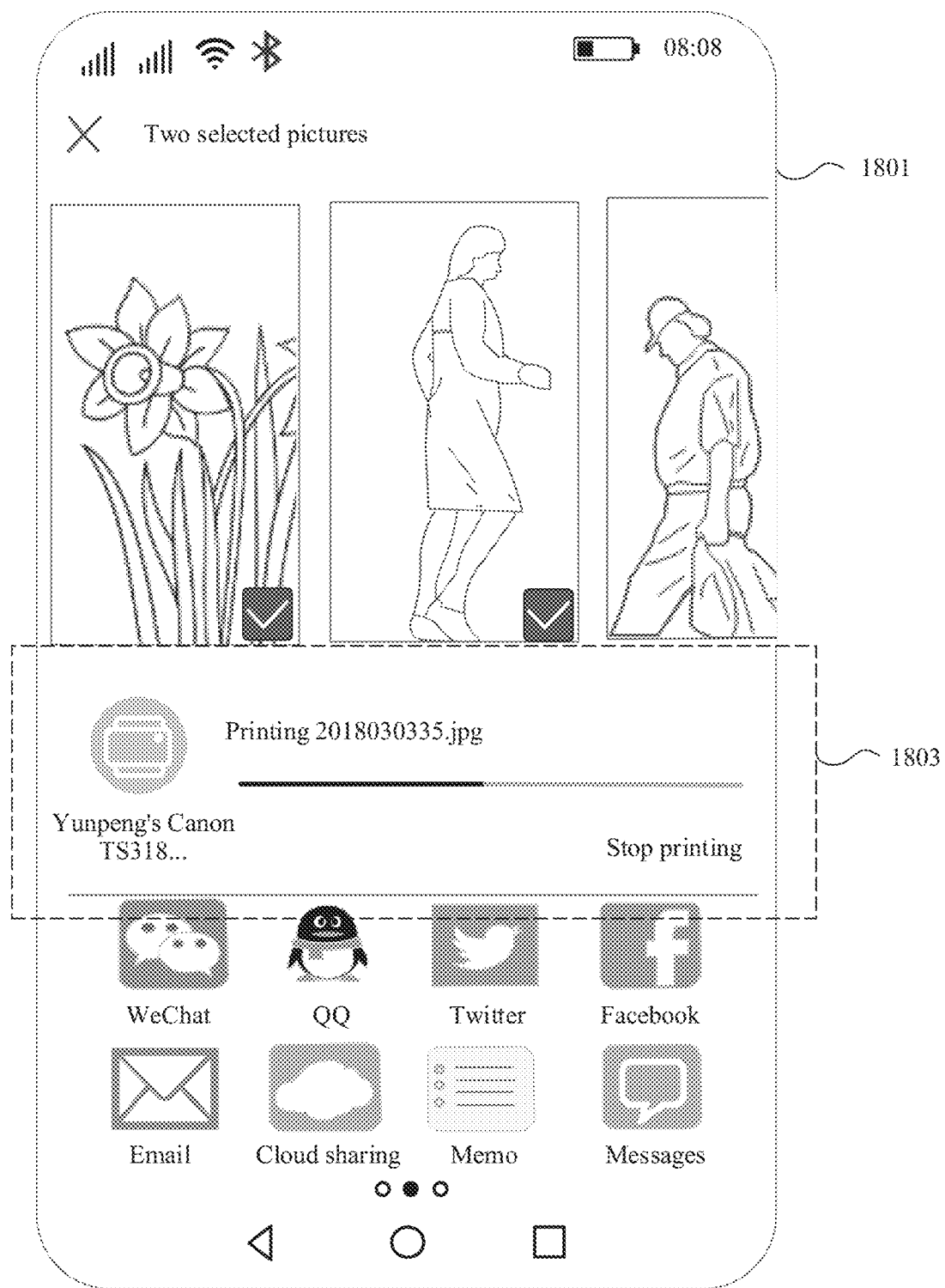

In addition to the manner mentioned in the foregoing UI embodiments, in some embodiments, as shown in an example in one or more of FIG. 18A and FIG. 18B, the electronic device may also display the prompt information in an area 1803 in a user interface 1801, where the prompt information may be used to prompt the user with the print status of the selected picture. Herein, the area 1803 in the user interface 1801 may be used to display device options/a device option corresponding to a nearby first device and/or a cloud first device discovered by the electronic device.

The user interface 1801 may be the user interface 41 shown as an example in FIG. 4C, or may be the user interface 51 shown as an example in FIG. 5C, or may be the user interface 61 shown as an example in FIG. 6C or FIG. 6D-1 and FIG. 6D-2, or may be the user interface 71 shown as an example in FIG. 7C. The area 1803 may be the area 421 in the user interface 41, or may be the area 521 in the user interface 51, or may be the area 621 in the user interface 61, or may be the area 703 or the area 705 in the user interface 71.

In some embodiments, as shown in an example in FIG. 18A, the prompt information may be progress information displayed on a ring progress bar 1805 around a printer icon. The progress information displayed on the ring progress bar 1805 may be used to prompt the user with print states, for example, "Print task is queuing . . . ", "Printing . . . ", and "Printing is completed".

In some embodiments, as shown in an example in FIG. 18A, the prompt information may alternatively be text information 1807 displayed below a printer icon. The text information 1807 may be used to describe print states, for example, "Print task is queuing . . . ", "Printing . . . ", "Printing is completed", and "Printing fails".

In some embodiments, as shown in an example in FIG. 18B, only a printer option selected by the user, for example, an icon 1809 and text information "Yunpeng's Canon TS318 . . . ", and a print status in which the printer prints the picture selected by the user, for example, a progress bar 1811 and text information "2018030335.jpg is being printed" may be displayed in the area 1803.

An Existing Printer Application or Service is Opened in Response to a Detected Operation Used to Trigger Printing.

Figure 19A:
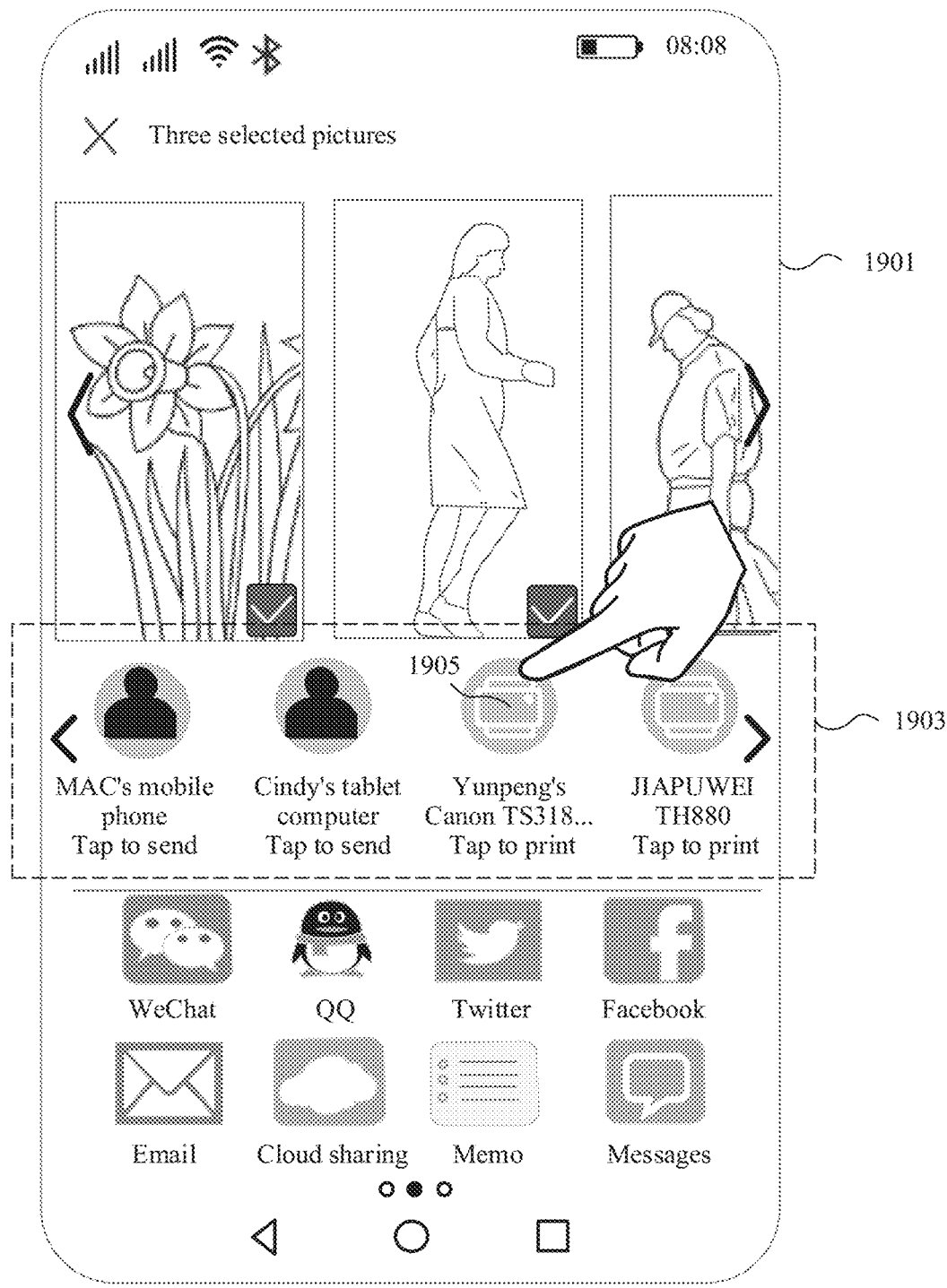
FIG. 19A to FIG. 19C show a series of user interfaces of a data sharing method according to another embodiment.

As shown in FIG. 19A, an option such as a printer icon 1905 of a device discovered by the electronic device may be displayed in an area 1903 in a user interface 1901. Herein, the area 1903 in the user interface 1901 may be used to display device options/a device option corresponding to a nearby first device and/or a cloud first device discovered by the electronic device. The user interface 1901 may be the "moment share interface" mentioned in the foregoing content. The user interface 1901 may be the user interface 41 shown as an example in FIG. 4C, or may be the user interface 51 shown as an example in FIG. 5C, or may be the user interface 61 shown as an example in FIG. 6C or FIG. 6D-1 and FIG. 6D-2, or may be the user interface 71 shown as an example in FIG. 7C. The area 1903 may be the area 421 in the user interface 41, or may be the area 521 in the user interface 51, or may be the area 621 in the user interface 61, or may be the area 703 or the area 705 in the user interface 71.

Figure 19B:
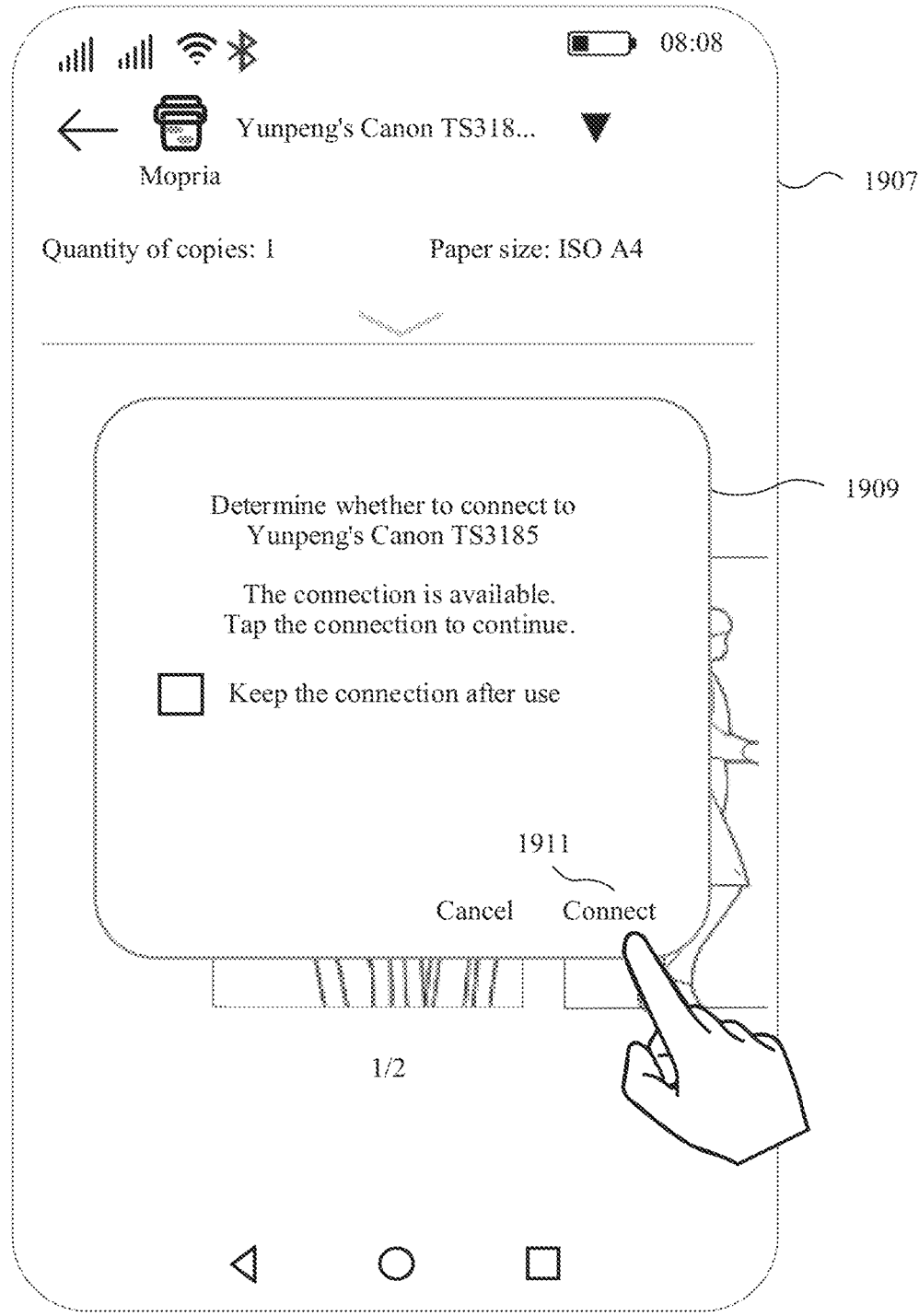
Figure 19C:
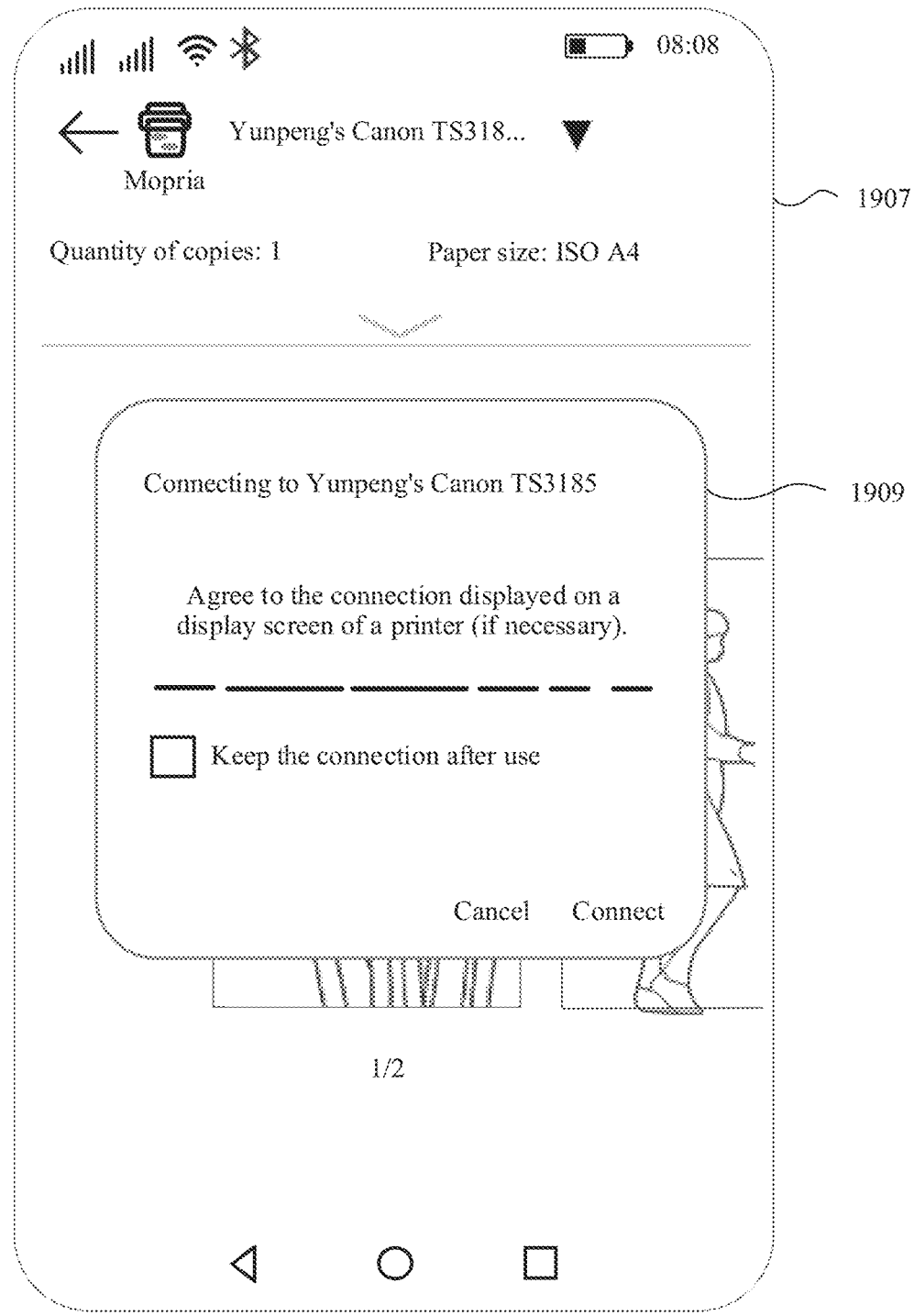

In some embodiments, as shown in examples in FIG. 19B and FIG. 19C, in response to a detected operation (for example, a touch operation performed on the icon 1905) performed on the printer option, where the operation may be used to trigger a printer corresponding to the printer option to print a picture selected by the user, the electronic device may open an existing printer application or service (for example, a "Mopria" print service).

For example, as shown in examples in FIG. 19B and FIG. 19C, a user interface 1907 provided by the "Mopria" print service may be used by the user to connect the electronic device to the printer discovered by the electronic device, for example, "Yunpeng's Canon TS318 . . . ". The user may connect the electronic device to the printer by tapping a control 1911 in a window 1909. The example is merely used to explain this application, and the user interface provided by the existing printer application or service is not limited in this application.

It can be learned from the foregoing UI embodiments that the electronic device may automatically discover the printer when identifying the scenario in which the user shares the picture. If the user expects to print data, the user may select the discovered printer for printing, so that a process of printing the picture by using the electronic device is intuitive and simple for the user.

UI Embodiments in which Projection or Screen Mirroring is Performed by Using the Electronic Device in the Scenario in which the User Shares the Picture that are Provided in this Application A user interface displayed when the electronic device automatically discovers a device (for example, a projector or a display) is first described.

Figure 20A:
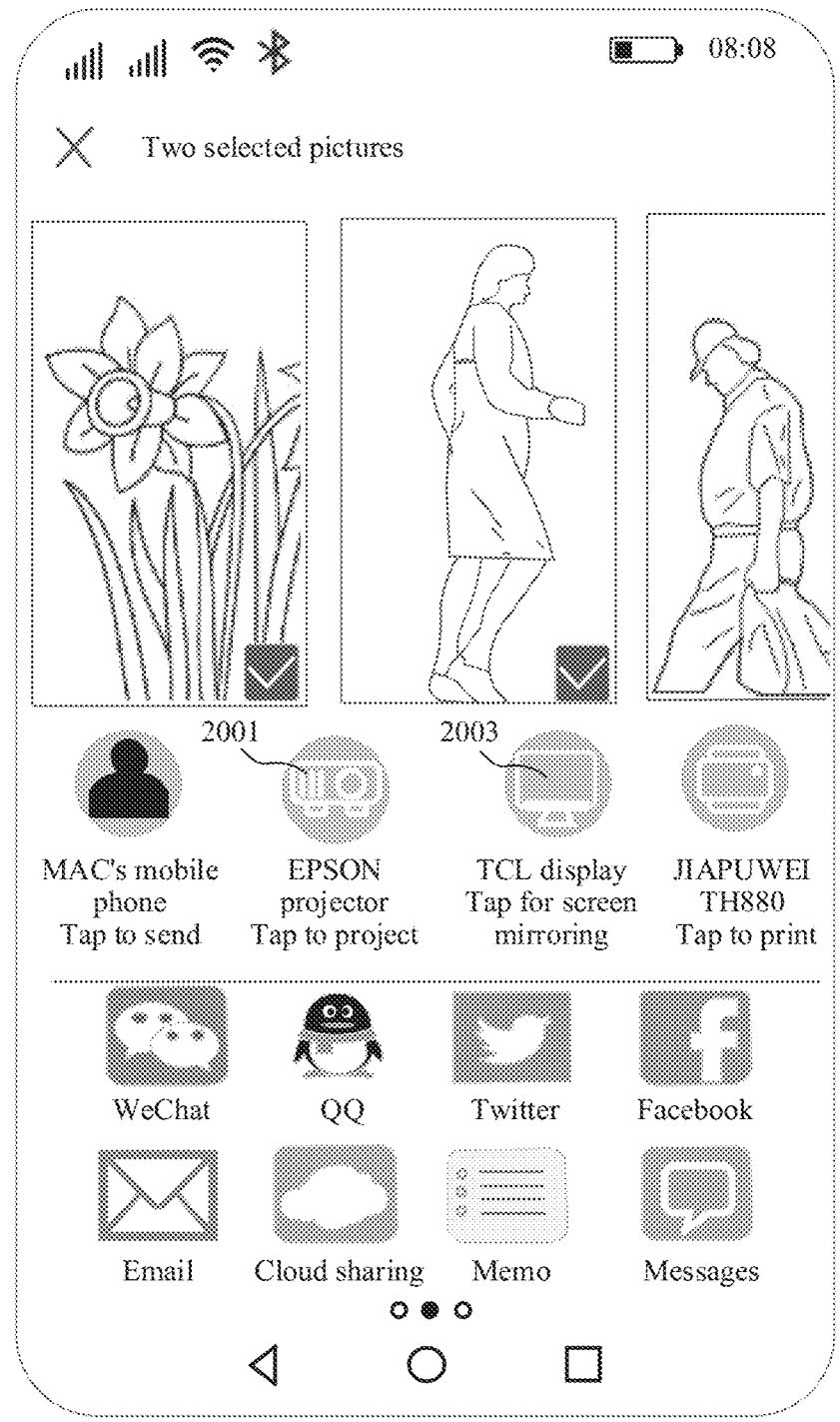
FIG. 20A to FIG. 20C, FIG. 21A to FIG. 21D, FIG. 22A to FIG. 22D, and FIG. 23A to FIG. 23D are schematic diagrams of some data sharing scenarios according to another embodiment.

As shown in an example in FIG. 20A, a projector option (for example, a projector icon 2001) and/or a display option (for example, a display icon 2003) may be displayed in the user interface.

FIG. 20A merely shows an example of an embodiment of the user interface. The user interface is the "moment share interface" mentioned above, and is displayed when the electronic device detects an operation of selecting a picture for sharing. For an embodiment of the user interface, refer to the user interface that is displayed when the electronic device automatically discovers the nearby device and/or the cloud device and that is mentioned in the foregoing UI embodiments. Details are not described herein again. For screen mirroring or projection, the foregoing manner used to prompt the user with the current state of the printer is also applicable to prompting the user with a current state of the projector or the display.

Second, a related user interface used by the user to select a projector for projection or used by the user to select a display for screen mirroring is described.

For example, the related user interface used by the user to select the projector for projection may be the same as the related user interface used by the user to select the display for screen mirroring. An example in which the user selects the display for screen mirroring is used below for description.

Figure 20B:
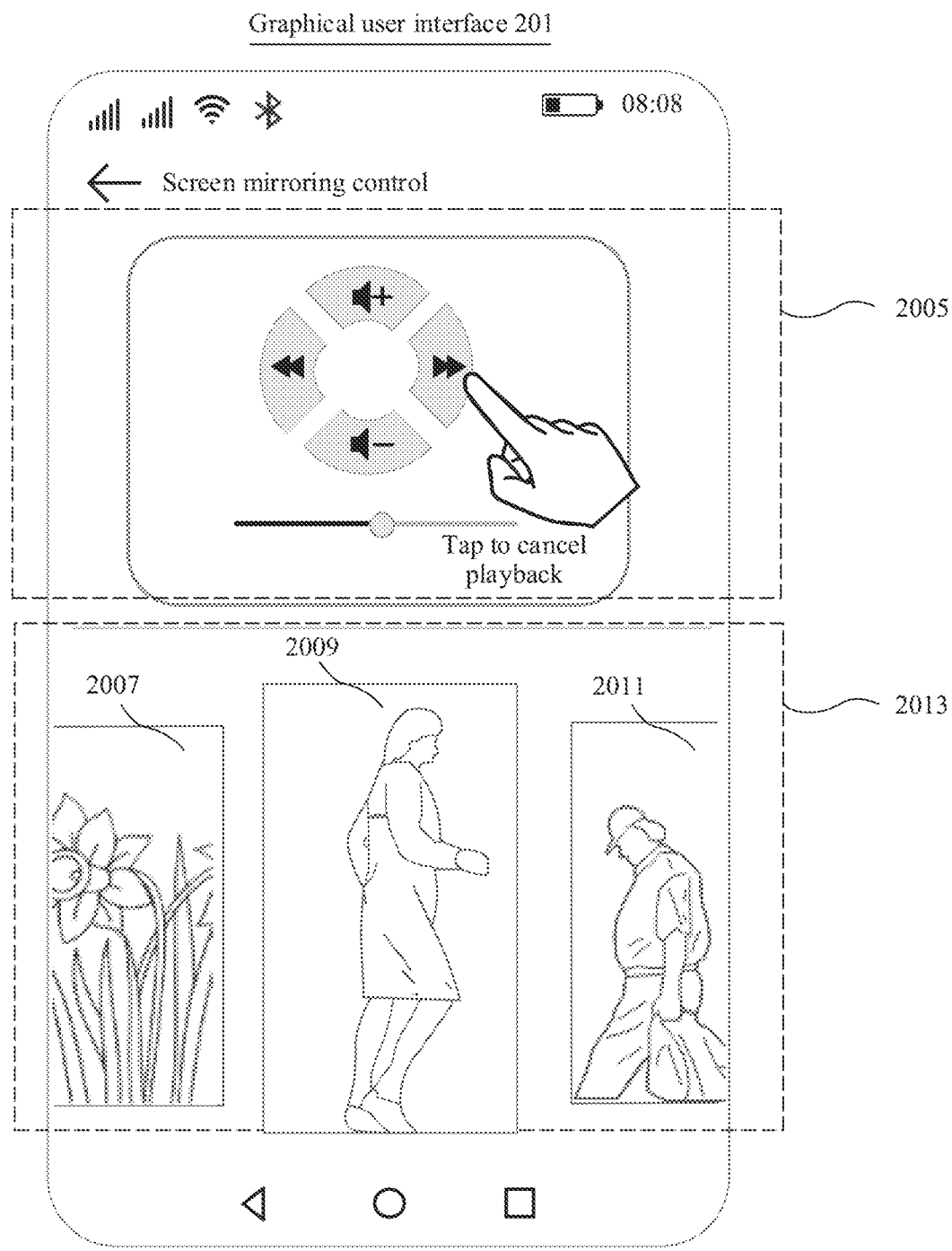
Figure 20C:
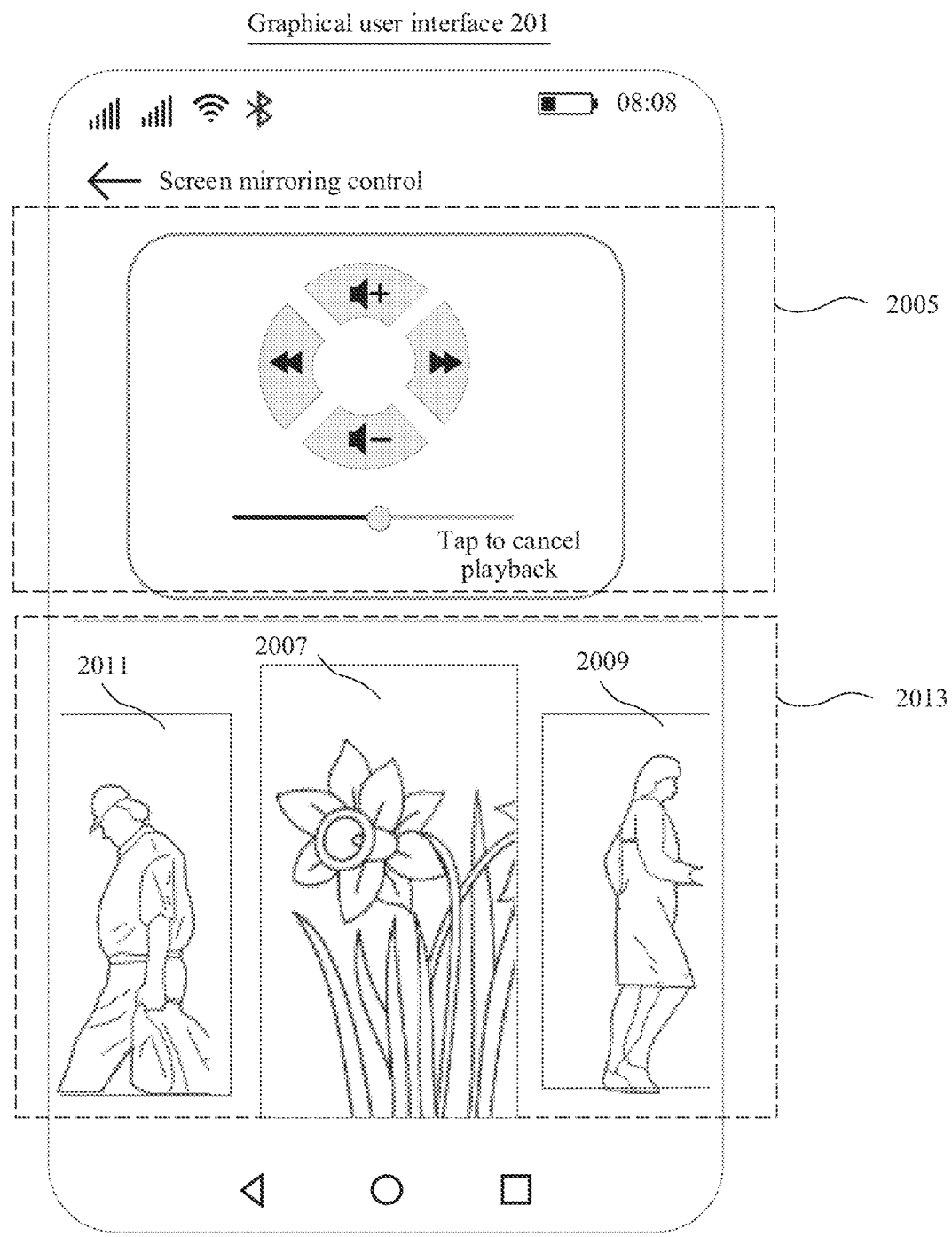

In some embodiments, in the user interface shown as an example in FIG. 20A, in response to a detected operation (for example, a touch operation performed on the display icon 2003) performed on the display option, where the operation may be used to trigger screen mirroring, the electronic device may trigger a display corresponding to the display option to display a picture selected by the user, and may further display a user interface 201 shown as an example in FIG. 20B. The user interface 201 may be used by the user to perform screen mirroring control, for example, start content, pause content, stop content, play content in a previous page, play content in a next page, turn up a volume, or turn down a volume.

As shown in FIG. 20B, the user interface 201 may include but is not limited to an area 2005 and an area 2003. The area 2005 may support the user in performing screen mirroring control, for example, starting content, pausing content, stopping content, playing content in a previous page, playing content in a next page, turning up a volume, or turning down a volume. A process in which the display plays the picture selected by the user may be displayed in the area 2013, for example, a picture that is being currently played is a picture

2009, a next to-be-played picture is a picture 2011, and a previous played picture is a picture 2007. FIG. 20B merely shows an example of an embodiment provided in this application, and an embodiment of the user interface used by the user to perform screen mirroring control is not limited in this application.

In some other embodiments, in response to a detected operation (for example, a touch operation performed on the display icon 2003) performed on the display option, where the operation may be used to trigger screen mirroring, the electronic device may trigger a display (for example, a "TCL display") corresponding to the display option to display, based on a default display setting, a picture selected by the user. For example, a next picture is switched to for playing every 2 seconds by default.

Similar to an embodiment of selecting the printer by the user to print the data such as the picture, in an embodiment, in the "moment share interface", in response to a detected operation performed on the projector option, where the operation may be used to trigger a projector corresponding to the projector option to project data selected by the user, the electronic device may trigger the projector corresponding to the projector option to project the data selected by the user.

In addition, similar to the foregoing embodiments shown as examples in FIG. 5A to FIG. 5J, in response to a detected operation used to trigger screen mirroring or projection, the electronic device may further display a user interface used to pay a screen mirroring fee or a projection fee, where the user interface may be similar to the user interface used to pay the print fee that is shown as an example in FIG. 5E and FIG. 5F. An embodiment of the user interface used to pay the screen mirroring fee or the projection fee is not limited in this application.

Third, a user interface used to feed back a screen mirroring status or a projection status of the picture selected by the user is described.

For example, the user interface is similar to the user interface used to feed back the print status of the selected picture. For screen mirroring or projection, the prompt information in the notification window may be used to prompt the user with the screen mirroring status or the projection status of the selected picture. For example, the prompt information in the notification window may be text information "Screen mirroring task is queuing", "TCL display is displaying . . . ", "Screen mirroring is completed", "Screen mirroring fails", or the like. In addition to the text information, the prompt information may be further information in another form such as a picture or an animation. For an embodiment of the user interface used to feed back the screen mirroring status or the projection status of the picture selected by the user, refer to the user interface used to feed back the print status of the selected picture. Details are not described herein again. For screen mirroring or projection, related extensions of the notification window may also be used to prompt the user with the screen mirroring status or the projection status. The foregoing embodiment used to prompt the user with the print status is also applicable to prompting the user with the screen mirroring status or the projection status.

It may be understood that for content that is not mentioned in the UI embodiments in which projection or screen mirroring is performed by using the electronic device, refer to the foregoing UI embodiments in which printing is performed by using the electronic device. Details are not described herein again.

It can be learned that similar to the embodiment of selecting the printer by the user to print the data such as the picture, in this embodiment, when identifying the scenario in which the user shares the picture, the electronic device may automatically discover the nearby projector or display, and intuitively present, to the user, the option of the nearby projector or display discovered by the electronic device, so that the user taps the nearby projector or display option (for example, the icon) to trigger the nearby projector or display to perform projection or screen mirroring on the picture selected by the user, and user experience is intuitive and simple.

Other Scenarios in this Application

Another Scenario in this Application: A Scenario in which a User Shares a File

Figure 21A:
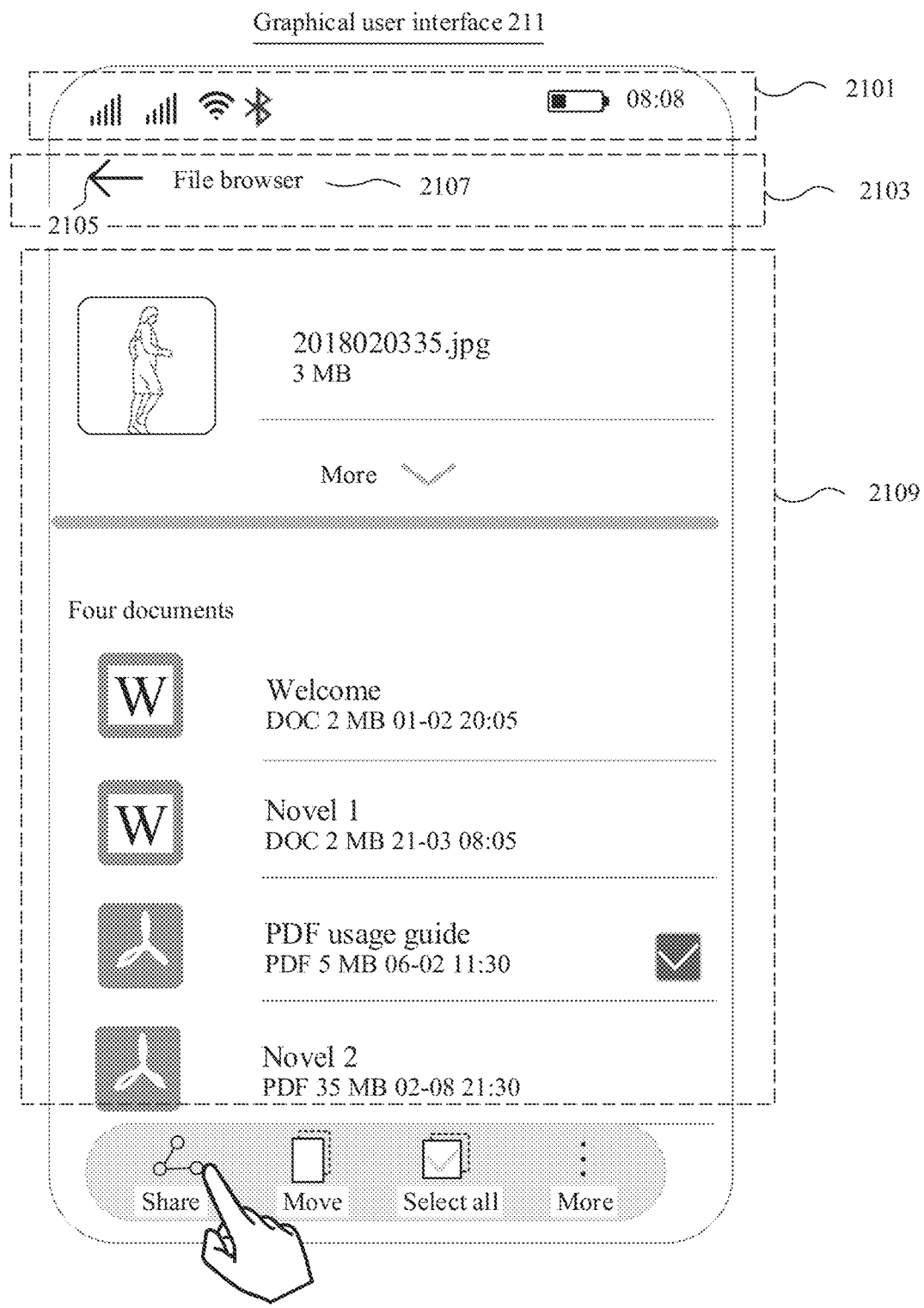

FIG. 21A shows an example of a user interface 211 of "File browser" displayed by an electronic device such as a smartphone. "File browser" may support the user in viewing a file stored in the electronic device, or may support the user in browsing a file in a cloud server. "File browser" is a file management application on an electronic device such as a smartphone, and may also be referred to as "File manager". A name of the application is not limited in this application. As shown in FIG. 21A, the user interface 211 may include a status bar 2101, an application title bar 2103, and a file area 2109.

For the status bar 2101, refer to the status bar 201 in the user interface 21 shown in FIG. 2A. Details are not described herein again.

The application title bar 2103 may include a back button 2105 and a current page indicator 2107. The back button 2105 is an app-level back button, and may be used to back to a logical upper level. The current page indicator 2107 may be used to indicate a current page, for example, may be text information "File browser". In addition to the text information, the current page indicator 2107 may be further an icon.

One or more files, for example, a file in a WORD format, a file in a PDF format, and a file in a PPT format, may be displayed in the file area 2109. When the electronic device detects an upward swipe operation or a downward swipe operation in the file area 2109, the electronic device may update the file displayed in the file area 2109, so that the user browses the file. For example, the user may swipe up or down in the file area 2109 to browse the file. In addition to performing the upward swipe operation or the downward swipe operation, the user may further swipe left or right in the file area 2109 to browse the file.

The user interface 211 may further include a navigation bar (not shown). For the navigation bar, refer to the navigation bar 251 in the user interface 21 shown in FIG. 2A. Details are not described herein again.

As shown in FIG. 21A, the electronic device detects, in the user interface 211, an operation of selecting one or more files for sharing. In this case, the electronic device may identify that a current scenario is the scenario in which the user shares the file. The electronic device may display a "moment share interface" in response to the operation detected by the electronic device. A device option (for example, information such as an icon or text information) corresponding to a device such as a printer, a projector, or a display discovered by the electronic device may be displayed in the "moment share interface". In this way, the user may select, in the "moment share interface", the printer for printing by performing an operation such as tapping a printer option, or may select, in the "moment share interface", the projector for projection or the display for screen mirroring by performing an operation such as tapping a projector option or a display option. An embodiment of the operation of selecting the file for sharing is not limited in this application.

In other words, the user may select an object such as a file in "File browser" for sharing, and may print the object such as the selected file, or project the object such as the selected file, or perform screen mirroring on the object such as the selected file, or the like. In this application, an operation of sharing the object such as the selected file may be referred to as a first operation.

In addition to the file in "File browser", the scenario in which the user shares the file may further include that the user shares a file in another application, for example, a file in an application such as an e-book. In addition to the file in the electronic device, the scenario in which the user shares the file may further include that the user shares the file in the cloud server.

Figure 21B:
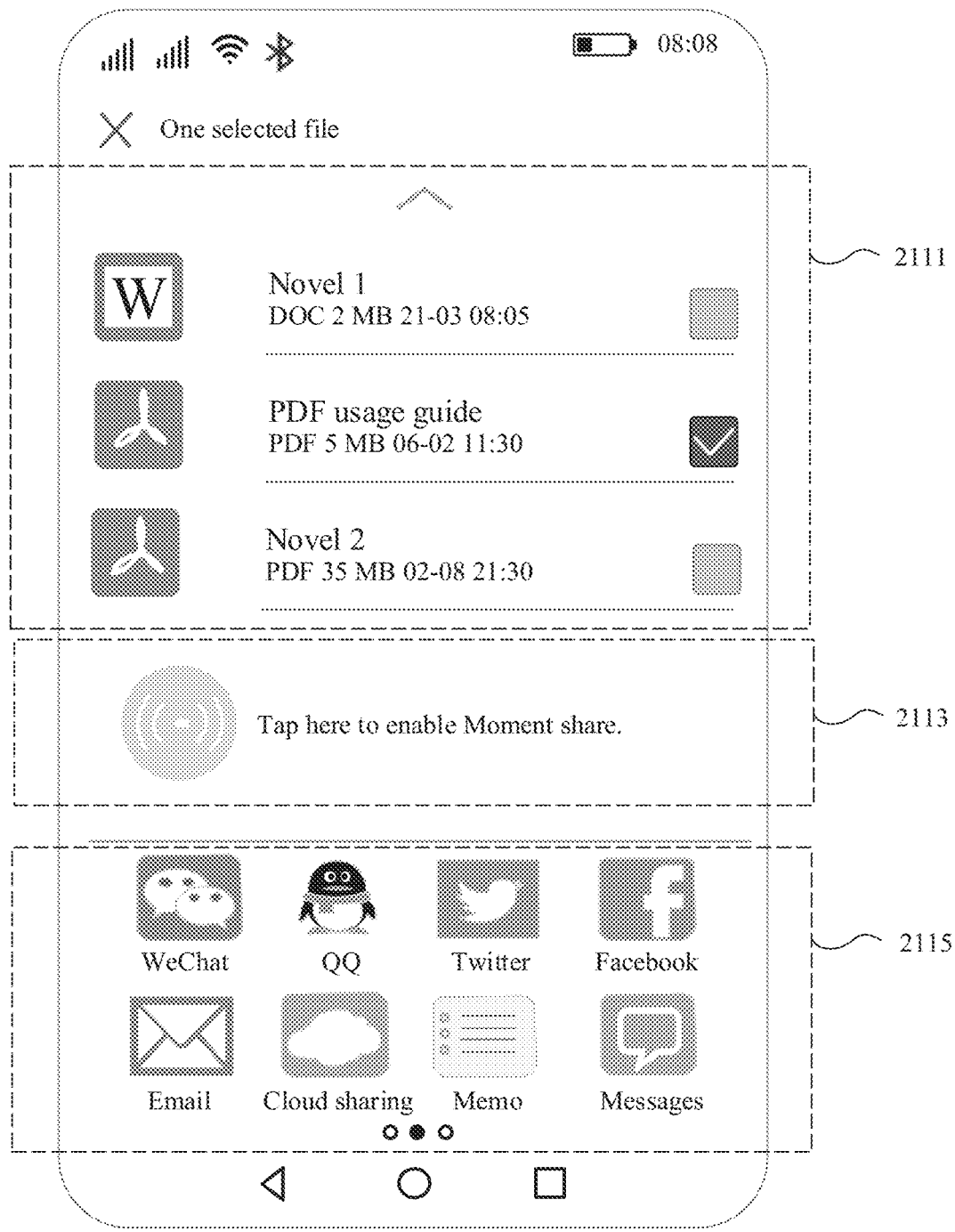
Figure 21C:
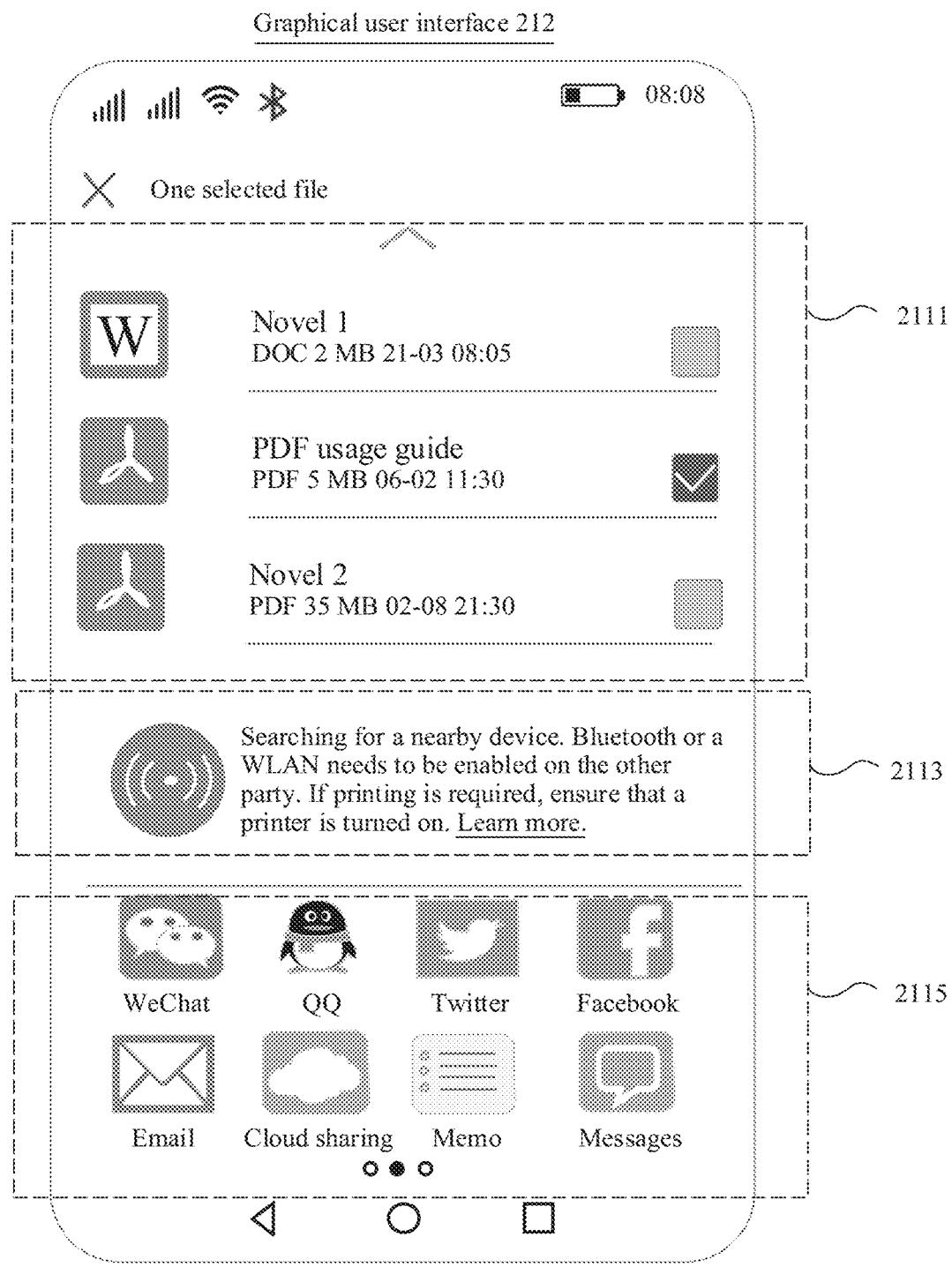
Figure 21D:
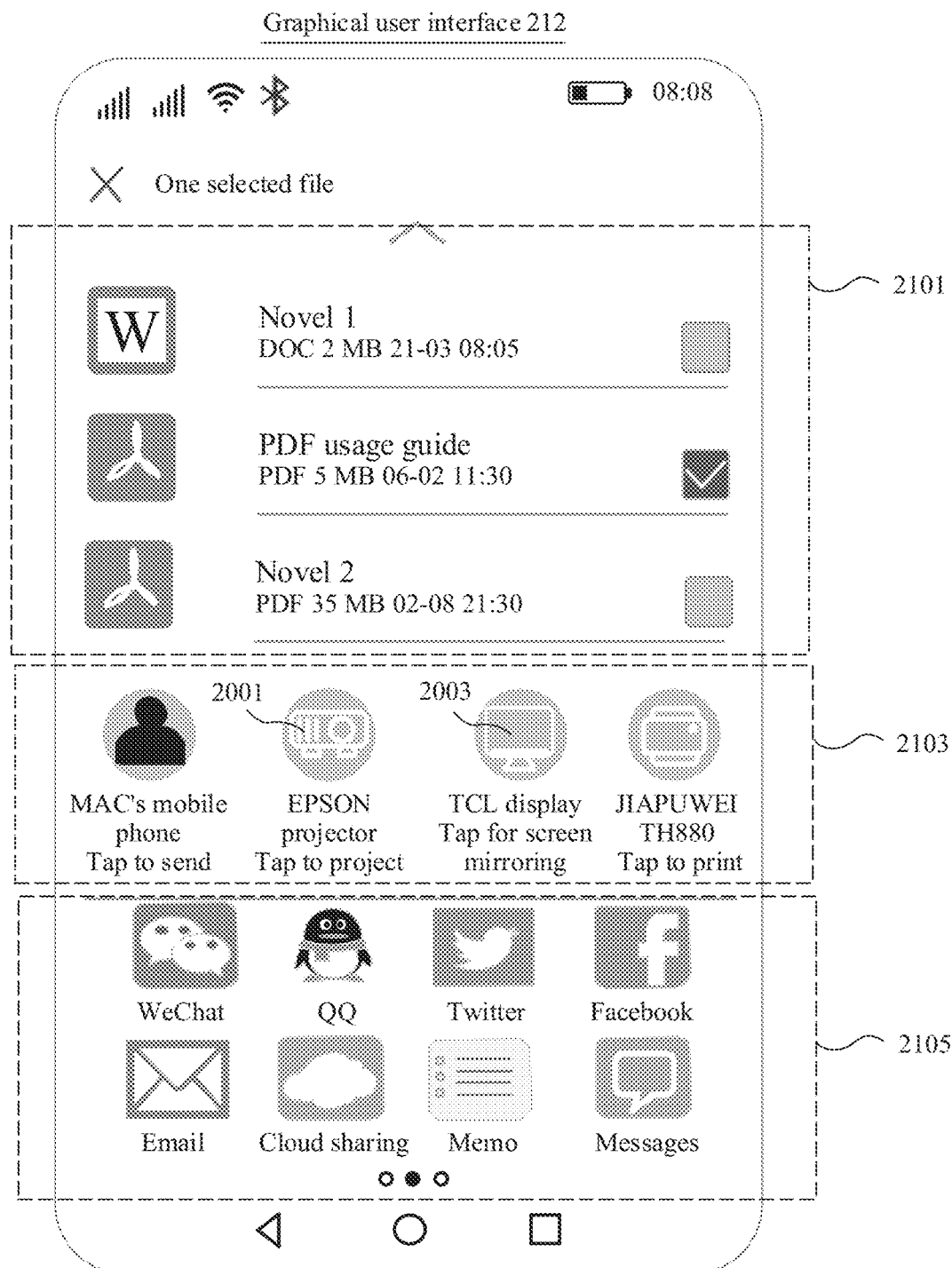

One or more of FIG. 21B to FIG. 21D shows an example of a "moment share interface", namely, a user interface 212, in the scenario in which the user shares the file. Same as the "moment share interface" in the foregoing scenario in which the user shares the picture, the user interface 212 may also include an area, namely, an area 2115, used to display one or more applications, and may further include an area, namely, an area 2113, used to display a nearby device option and/or a cloud device option. A difference lies in that for the scenario in which the user shares the file, an area 2111 in the user interface 212 may be used to display one or more files.

For an embodiment of the "moment share interface" in the scenario in which the user shares the file, refer to the "moment share interface" in the foregoing scenario in which the user shares the picture. Details are not described herein again. A page layout of the "moment share interface" in the scenario in which the user shares the file is not limited in this application.

Figure 22A:

Still another scenario in this application: a scenario in which a user shares a web page FIG. 22A shows an example of a user interface 221 of "Web browser" displayed by an electronic device such as a smartphone. "Web browser" may support the user in browsing a web page in a cloud server, or may support the user in viewing a web page stored in the electronic device. "Web browsing" is a file management application on an electronic device such as a smartphone. A name of the application is not limited in this application. As shown in FIG. 22A, the user interface 221 may include a status bar 2201 and an area 2203. For the status bar 2201, refer to the status bar 201 in the user interface 21 shown in FIG. 2A. Details are not described herein again. A web page may be displayed in the file area 2203.

The user interface 221 may further include a navigation bar. For the navigation bar, refer to the navigation bar 251 in the user interface 21 shown in FIG. 2A. Details are not described herein again.

As shown in FIG. 22A, the electronic device detects, in the user interface 221, an operation of selecting the web page for sharing. In this case, the electronic device may identify that a current scenario is the scenario in which the user shares the web page. The electronic device may display a "moment share interface" in response to the operation detected by the electronic device. A device option (for example, information such as an icon or text information) corresponding to a device such as a printer, a projector, or a display discovered by the electronic device may be displayed in the "moment share interface". In this way, the user may select, in the "moment share interface" by performing an operation such as tapping a printer option, the printer to print the web page, or may select, in the "moment share interface" by performing an operation such as tapping a projector option or a display option, the projector to project the web page projection or the display to perform screen mirroring on the web page. An embodiment of the operation of selecting the web page for sharing is not limited in this application.

In other words, the user may select an object such as a web page in "Web browser" for sharing, and may print the object such as the selected web page, or project the object such as the selected web page, or perform screen mirroring on the object such as the selected web page, or the like. In this application, an operation of sharing the object such as the selected web page may be referred to as a first operation.

Figure 22B:
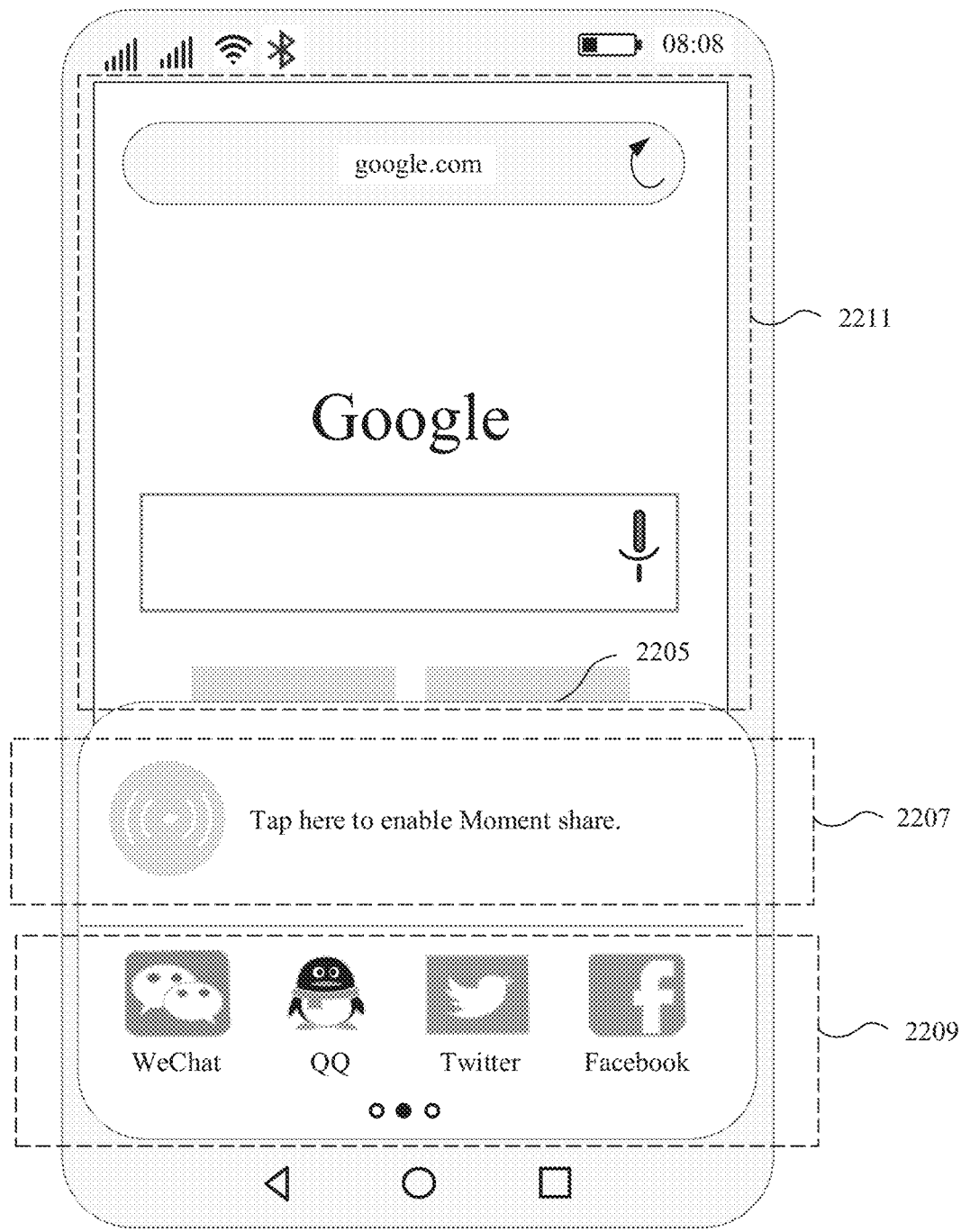
Figure 22C:
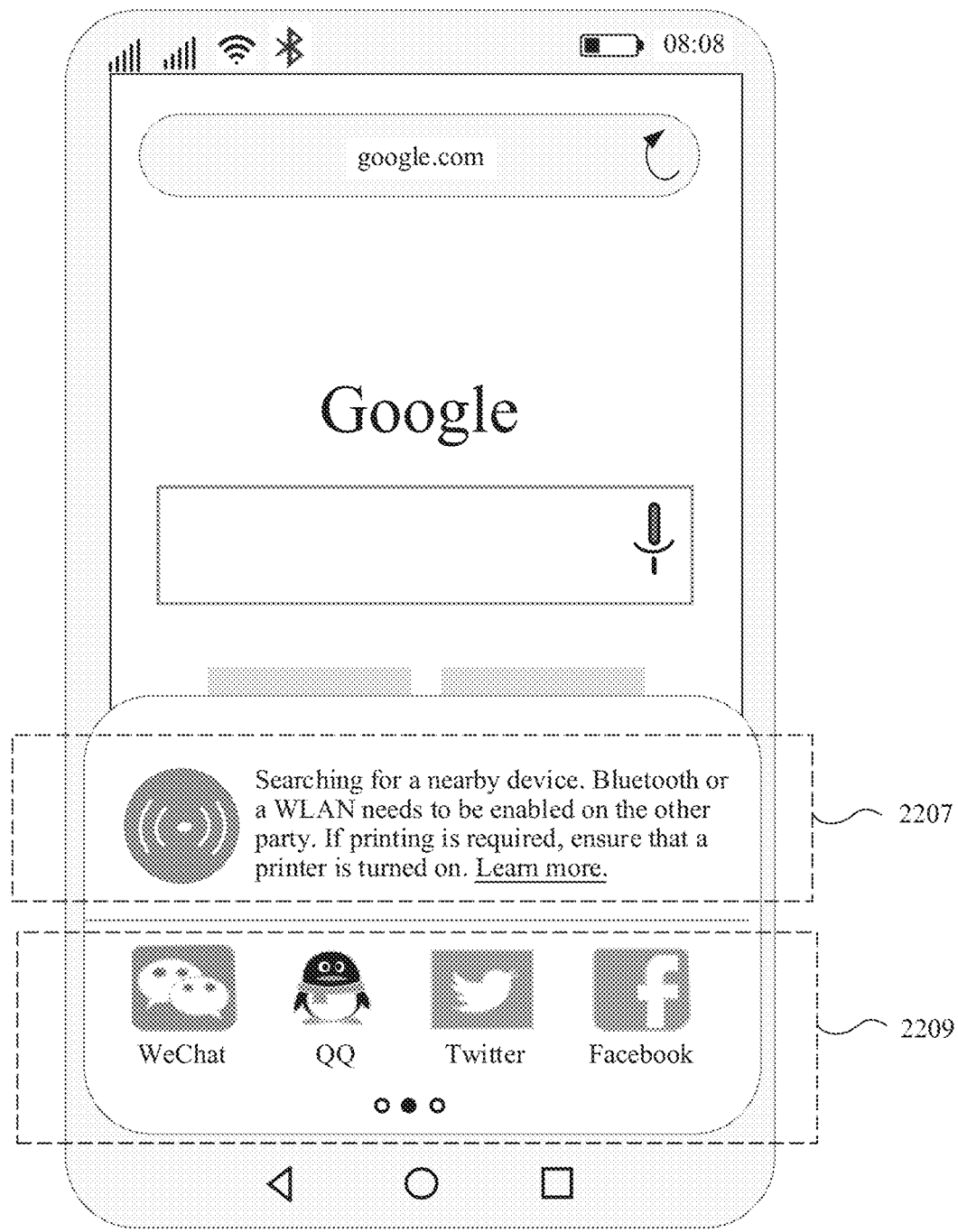
Figure 22D:
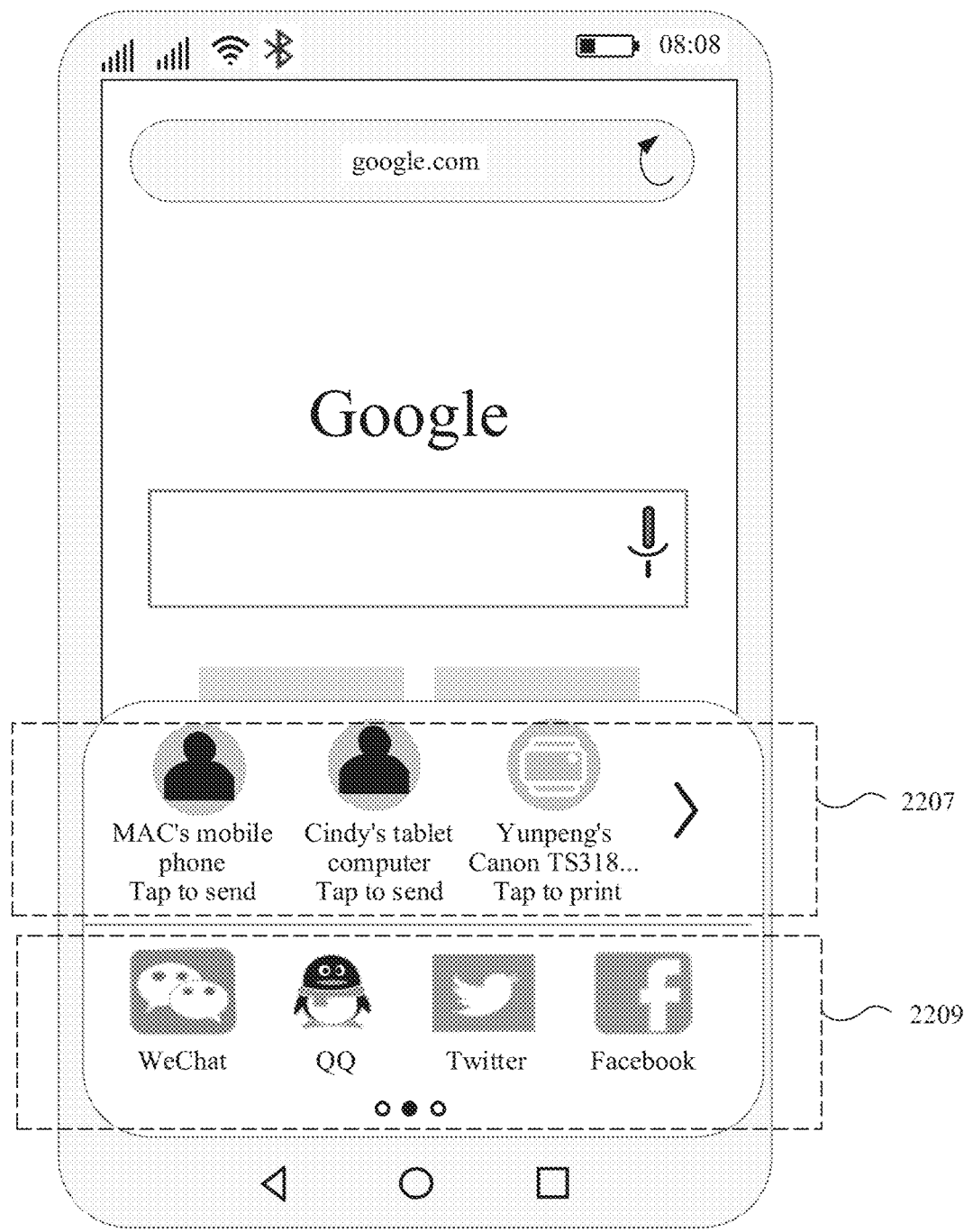

One or more of FIG. 22B to FIG. 22D shows an example of a "moment share interface", namely, a user interface 221, in the scenario in which the user shares the web page. Same as the "moment share interface" in the foregoing scenario in which the user shares the picture, the user interface 221 may also include an area, namely, an area 2209, used to display one or more applications, and may further include an area, namely, an area 2207, used to display a nearby device option and/or a cloud device option. For an embodiment of the area 2207 in the "moment share interface" in the scenario in which the user shares the web page, refer to the "moment share interface" in the foregoing scenario in which the user shares the picture. Details are not described herein again.

The user interface 221 shown as an example in FIG. 22B to FIG. 22D and the "moment share interface" in the scenario in which the user shares the web page are different in terms of a page layout. A page layout of the "moment share interface" in the scenario in which the user shares the web page is not limited in this application.

Figure 23A:
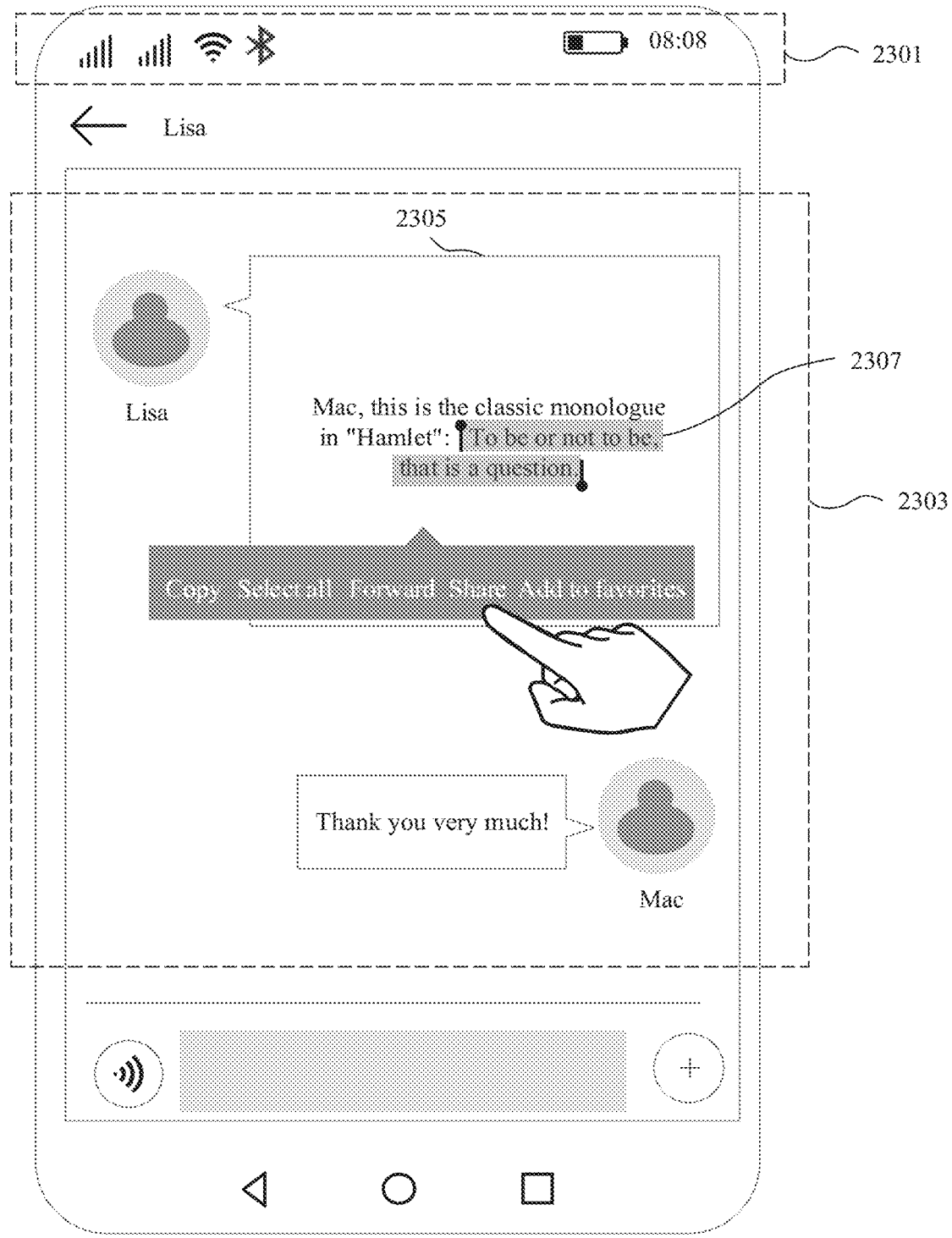

Yet Another Scenario in this Application: A Scenario in which a User Shares Characters FIG. 23A shows an example of a user interface 231 provided by an instant messaging application (for example, WeChat or QQ) on an electronic device such as a smartphone. As shown in FIG. 23A, the user interface 231 may include a status bar 2301 and an area 2303. For the status bar 2301, refer to the status bar 201 in the user interface 21 shown in FIG. 2A. Details are not described herein again. One or more text messages 2305 may be displayed in the area 2303.

As shown in FIG. 23A, the electronic device detects, in the user interface 231, an operation of selecting characters 2307 for sharing. In this case, the electronic device may identify that a current scenario is the scenario in which the user shares the characters. The electronic device may display a "moment share interface" in response to the operation detected by the electronic device. A device option (for example, information such as an icon or text information) corresponding to a device such as a printer, a projector, or a display discovered by the electronic device may be displayed in the "moment share interface". In this way, the user may select, in the "moment share interface" by performing an operation such as tapping a printer option, the printer to print the characters selected by the user, or may select, in the "moment share interface" by performing an operation such as tapping a projector option or a display option, the projector to project the characters selected by the user or the display to perform screen mirroring on the characters selected by the user. An embodiment of the operation of selecting the characters for sharing is not limited in this application.

In other words, the user may select an object such as characters for sharing, and may print the object such as the selected characters, or project the object such as the selected characters, or perform screen mirroring on the object such as the selected characters, or the like. The characters may be characters in various text display interfaces, for example, characters in a chat window of instant messaging, characters on a web page, or characters in an e-book. In this application, an operation of sharing the object such as the selected characters may be referred to as a first operation.

In some embodiments, the electronic device may first convert the characters selected by the user into a file (for example, a WORD file or a PDF file) or a file in a format such as a picture, and then transmit the file to the printer, the projector, or the display selected by the user, so that the printer prints the file, the projector projects the file, or the display displays the file.

In some other embodiments, the electronic device may first convert the characters selected by the user into an audio file, and then transmit the audio file to an audio playback device such as a sound box selected by the user, so that the audio playback device plays the audio file.

Figure 23B:
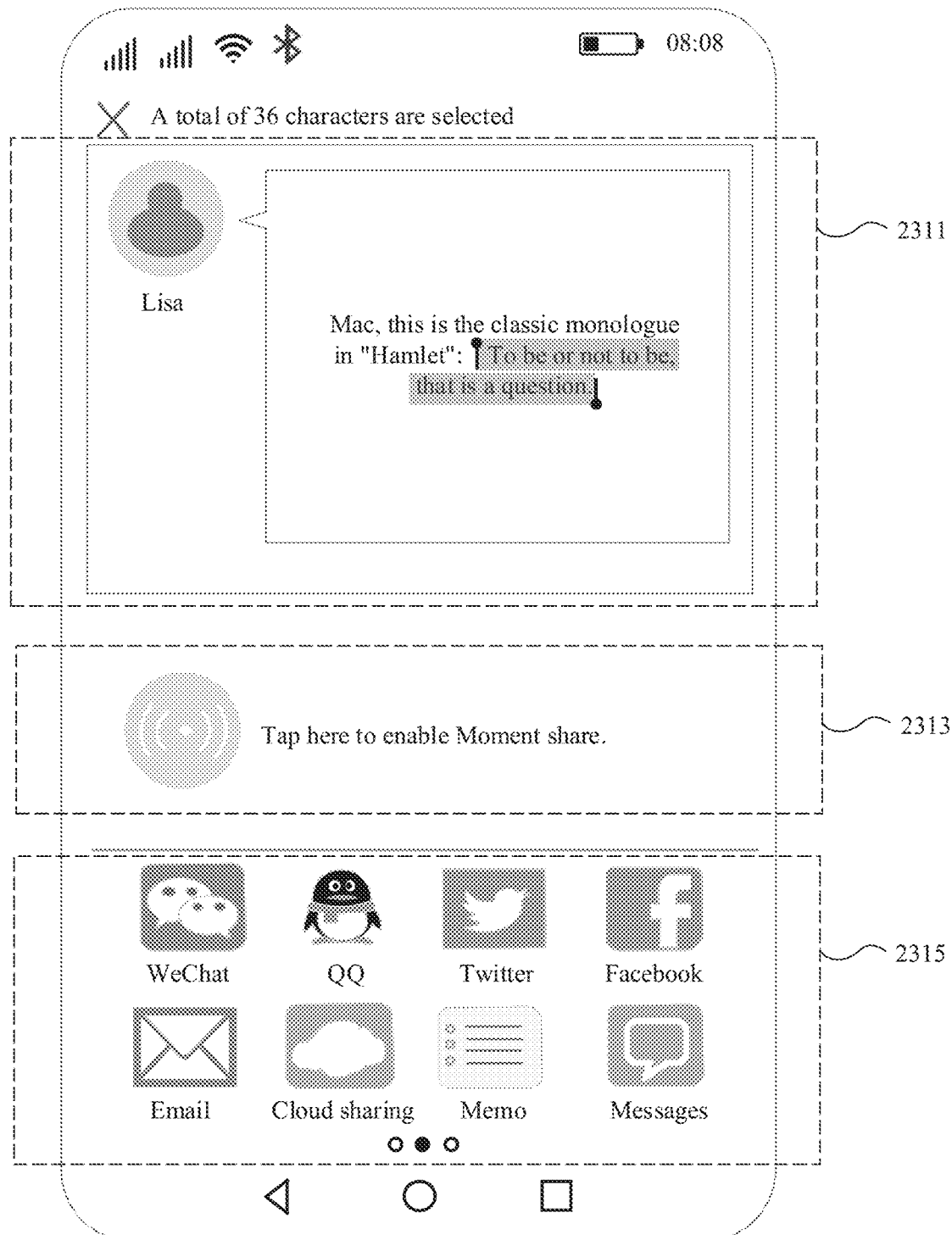
Figure 23C:
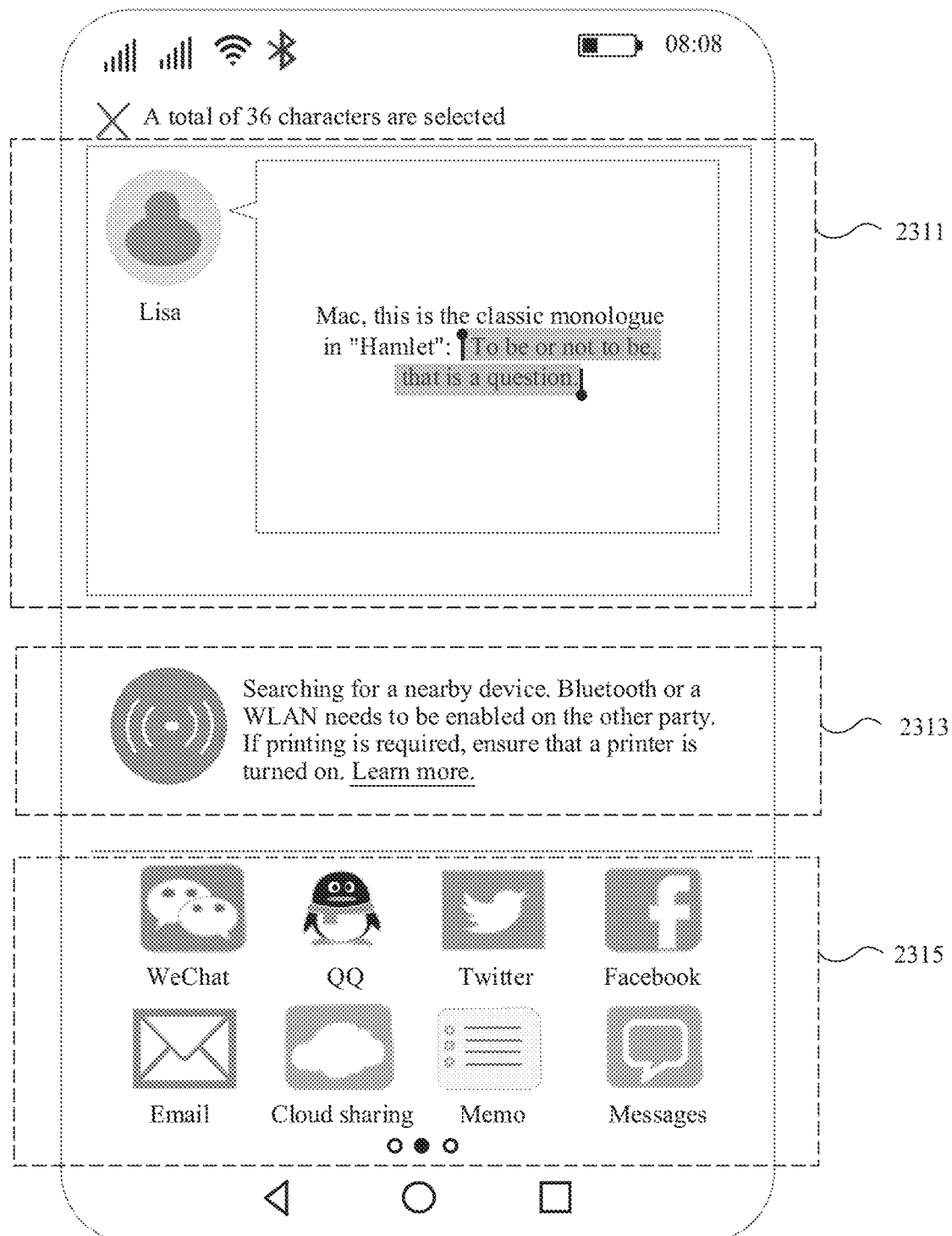
Figure 23D:
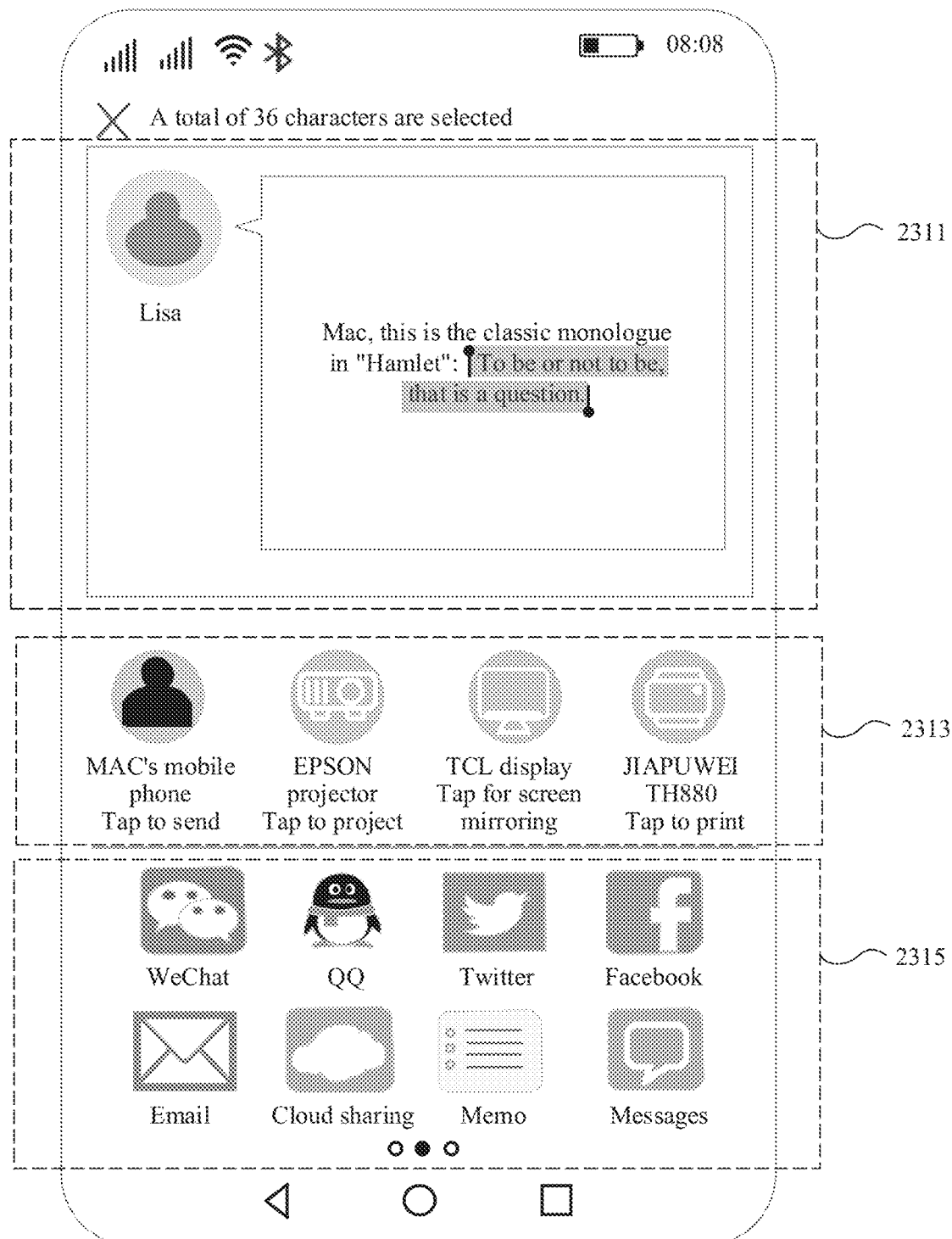

One or more of FIG. 23B to FIG. 23D shows an example of a "moment share interface", namely, a user interface 232, in the scenario in which the user shares the characters. Same as the "moment share interface" in the foregoing scenario in which the user shares the picture, the user interface 232 may also include an area, namely, an area 2315, used to display one or more applications, and may further include an area, namely, an area 2313, used to display a nearby device option and/or a cloud device option. For an embodiment of the area 2313 in the "moment share interface" in the scenario in which the user shares the characters, refer to the "moment share interface" in the foregoing scenario in which the user shares the picture. Details are not described herein again.

FIG. 23B to FIG. 23D merely show an example of an implementation of the user interface 232. A page layout of the "moment share interface" in the scenario in which the user shares the characters is not limited in this application.

In addition to the characters displayed in the "instant messaging application", the scenario in which the user shares the characters may further include that the user shares characters displayed in another application, for example, characters displayed in an application such as an e-book or characters displayed on a web page.

It can be learned that the electronic device may automatically discover the device such as the printer, the projector, or the display when identifying a scenario in which the user shares an object such as a picture, a document, a web page, or characters. If the user expects to print data such as a picture, a document, a web page, or characters, the user may select the discovered printer for printing, so that a process of printing the data by using the electronic device is intuitive and simple for the user. Similarly, if the user expects to project data such as a picture, a document, a web page, or characters, the user may select the discovered projector for projection, so that a process of projecting the data by using the electronic device is intuitive and simple for the user. If the user expects to perform screen mirroring on data such as a picture, a document, a web page, or characters, the user may select the discovered display for screen mirroring, so that a process of performing screen mirroring on the data by using the electronic device is intuitive and simple for the user.

In addition to the application scenarios described above, the application scenario in this application may further include a scenario in which the user shares multimedia data such as audio or a video. In this application, when identifying a scenario in which the user shares data (for example, an audio file, a video file, or a voice message obtained during instant messaging), the electronic device may further automatically discover a nearby multimedia playback device, for example, an audio playback device (for example, a sound box) or a video playback device. If the user expects to play multimedia data such as audio or a video, the user may select, in the "moment share interface", the multimedia playback device discovered by the electronic device to play the audio or the video selected by the user. Therefore, an operation is simple and effective.

In other words, the user may select the object such as the audio file, the video file, or the voice message obtained during instant messaging for sharing, and may print the selected object, or project the selected object, or perform screen mirroring on the selected object, or the like.

In addition to the scenarios described above, the scenario in this application may further include a scenario in which the user shares a food preparation recipe such as a recipe, or the like. In this application, when identifying the scenario in which the user shares the data, the electronic device may further automatically discover a nearby smart home device, for example, a smart cooking device. The smart cooking device may identify the recipe selected by the user, or the electronic device may convert the recipe selected by the user into a data format that can be identified by the smart cooking device. If the user expects to output dishes indicated by the recipe, the user may select, in the "moment share interface", the smart cooking device discovered by the electronic device. Therefore, an operation is simple and effective.

It can be learned that in the various scenarios in this application, when identifying a scenario in which the user shares an object such as a picture, a document, a web page, characters, audio, or a video, the electronic device may automatically discover the device such as the printer, the projector, the display, the audio playback device, or the video playback device, and display the "moment share interface", where the nearby device option and/or the cloud device option may be displayed in the "moment share interface". In this way, the user may select the device such as the printer discovered by the electronic device to perform processing such as printing on data in the electronic device or cloud data accessed by the electronic device. Therefore, an operation is simple and intuitive.

Different from the foregoing UI embodiments, in the following to-be-described UI embodiments, the user may further first select a device discovered by the electronic device, such as a printer, a projector, a display, or a multimedia playback device, and then select data on which the user needs to perform printing, projection, screen mirroring, playback, or the like.

An example in which the user prints the picture by using the electronic device is used below for description.

Figure 24A:
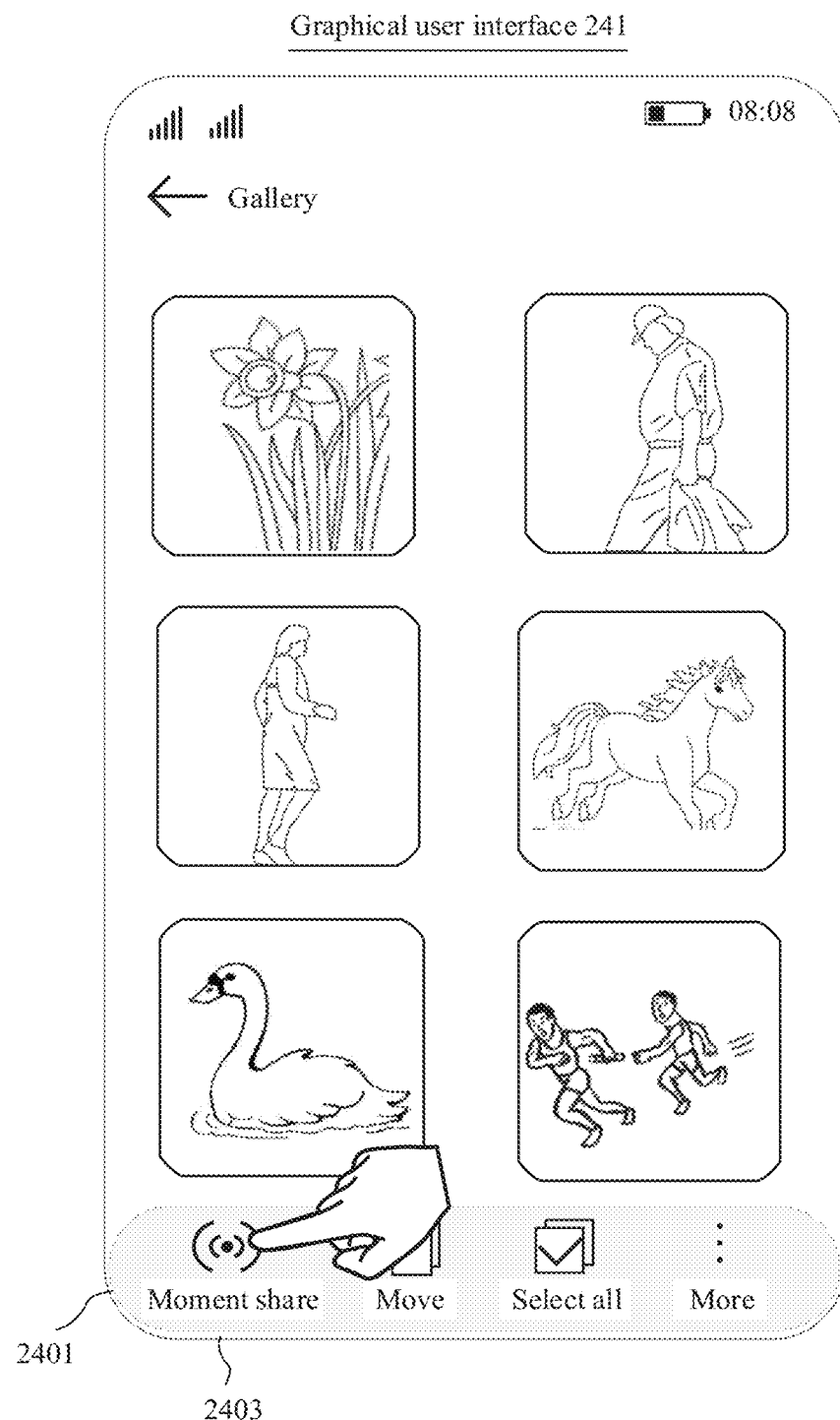
FIG. 24A to FIG. 24D show a series of user interfaces of a data sharing method according to another embodiment.

FIG. 24A shows an example of a user interface 241 of "Gallery" displayed by an electronic device such as a smartphone. Same as the user interface 31 shown in FIG. 3A, one or more pictures may also be displayed in the user interface 241. A control 2403 may be displayed in a menu 2401 in the user interface 241, and the control 2403 may be used to listen to an operation of enabling "Moment share".

Figure 24B:
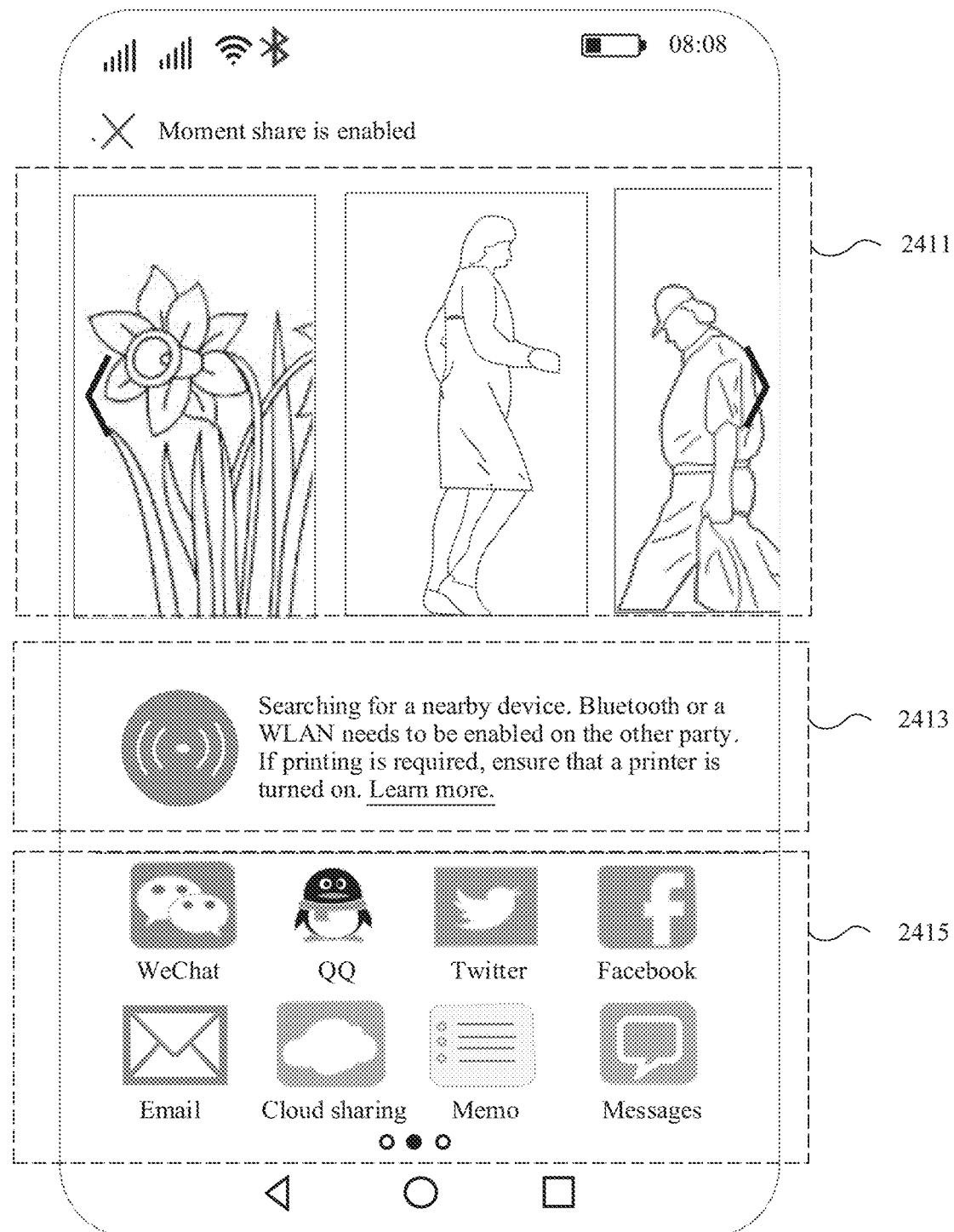
Figure 24C:
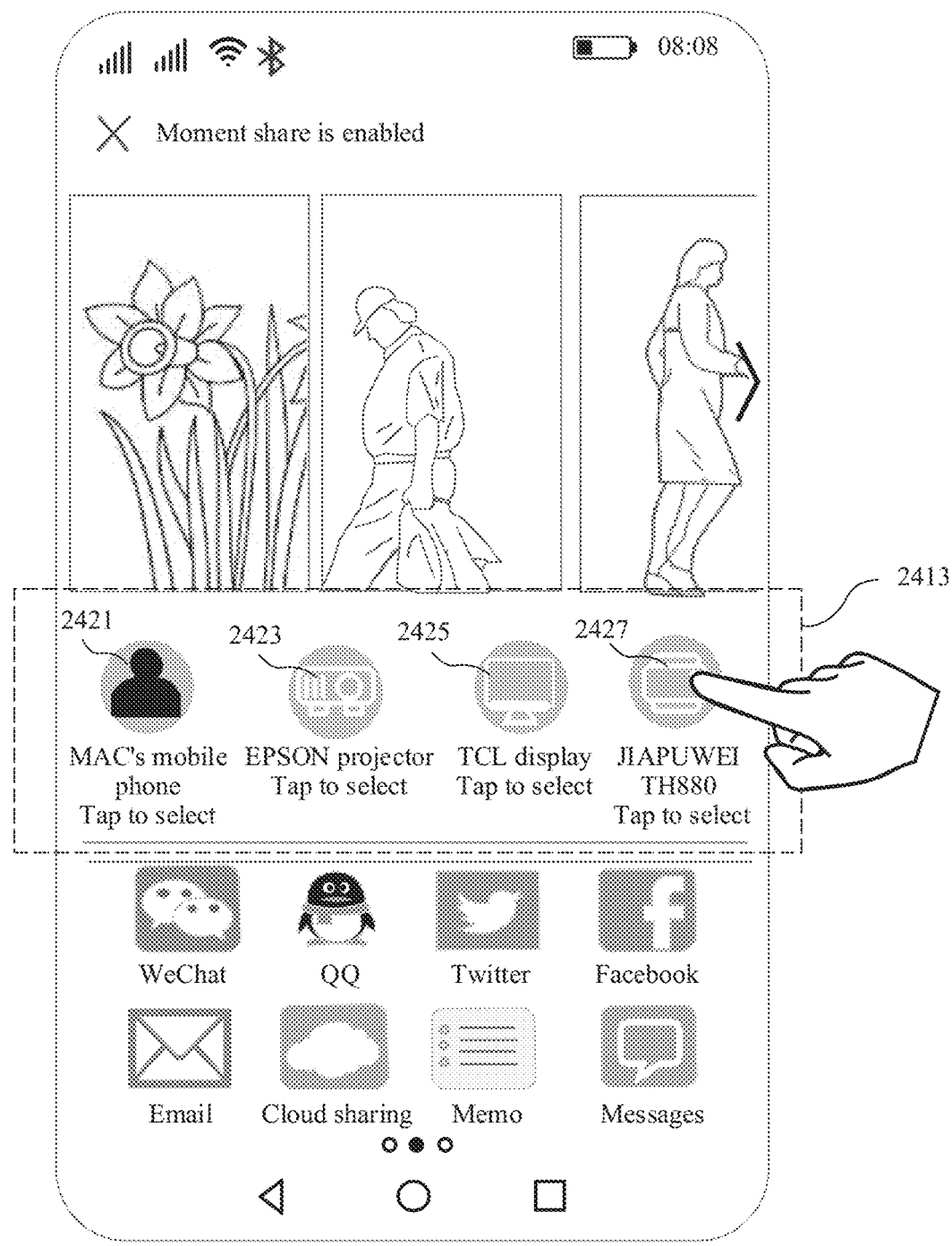

In response to an operation that is detected in the user interface 241 and that is performed on the control 2403, the electronic device may enable "Moment share", and may further display a user interface 243 shown as an example in FIG. 24B or FIG. 24C. The operation may be used to trigger enabling of "Moment share". In addition, the operation that is detected in the user interface 241 and that is used to trigger enabling of "Moment share" may be further an operation in another form, for example, a gesture operation of drawing a circle counterclockwise in the user interface 241. This is not limited in this application.

The user interface 243 shown as an example in FIG. 24B may be displayed by the electronic device when the electronic device does not discover a nearby device or a cloud device. The user interface 243 shown as an example in FIG. 24C may be displayed by the electronic device when the electronic device discovers a nearby device or a cloud device. The user interface 243 merely shows an example of an implementation of the "moment share interface". For an embodiment of the "moment share interface", refer to the user interface that is displayed when the electronic device automatically discovers the nearby device and/or the cloud device and that is mentioned in the foregoing UI embodiments. Details are not described herein again.

A difference lies in that in the UI embodiments, in the "moment share interface", the user may first select a printer discovered by the electronic device, and then select a picture that needs to be printed by the user.

Figure 24D:
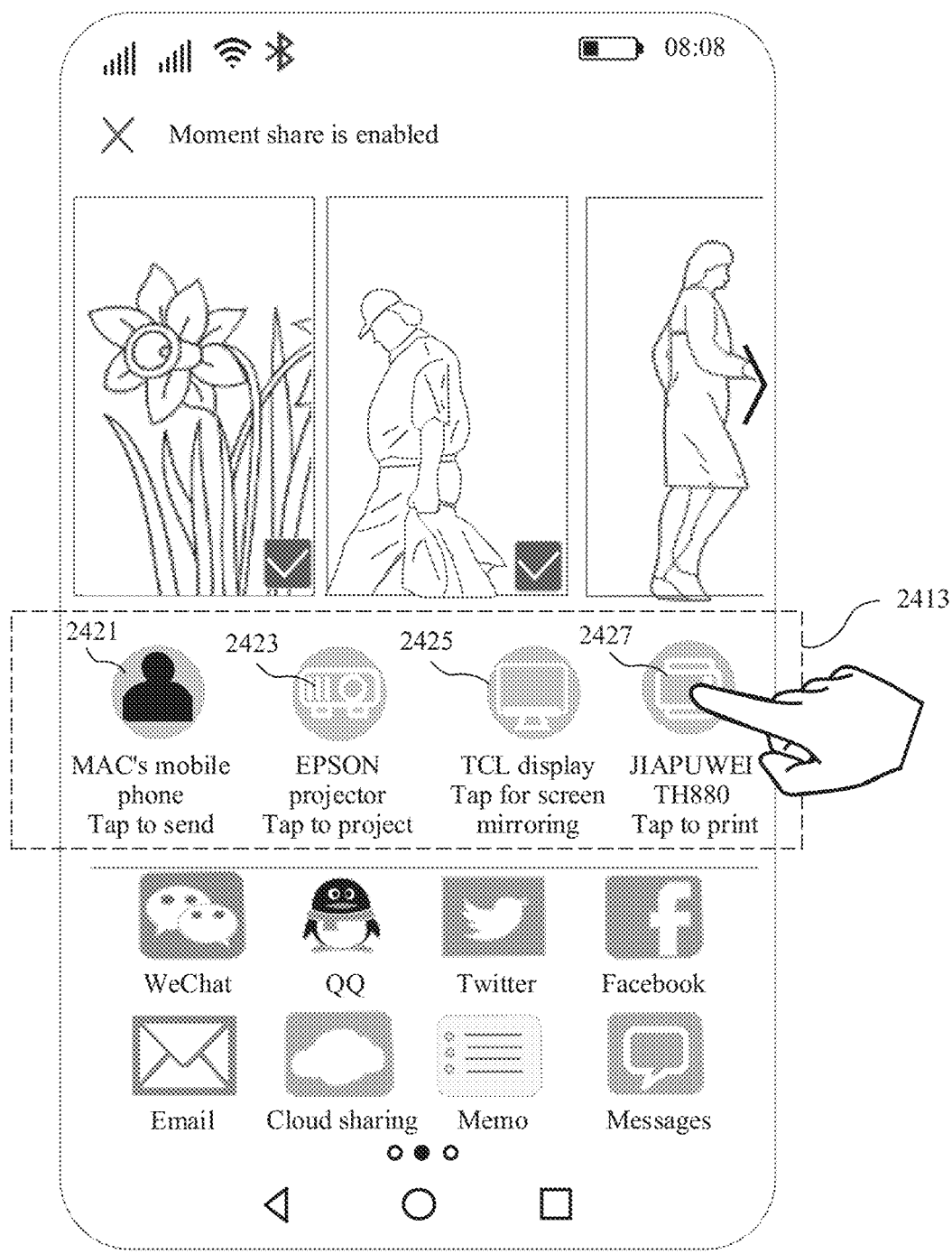

As shown in FIG. 24D, in response to an operation (for example, a touch operation performed on a printer icon 2427) that is detected in an area 2413 and that is performed on a printer option, when one or more pictures are selected, the electronic device may determine a printer corresponding to the printer option as the printer selected by the user. The electronic device may further update operation prompt information below the icon 2427 from text information "Tap to select" to text information "Tap to print".

In some embodiments, when determining the printer selected by the user, the electronic device may further update a picture displayed in an area 2411. An updated picture displayed in the area 2411 may be a picture that the printer selected by the user supports printing, for example, a picture format is supported by the printer.

When the printer is selected by the user, the electronic device may trigger, in response to the detected operation (for example, the touch operation performed on the printer icon 2427) performed on the printer option, the printer to print the one or more selected pictures.

In some embodiments, the one or more selected pictures may be set by the electronic device. For example, when detecting an operation used to select a printer, the electronic device sets, to a selected state, all pictures supported by the printer selected by the user. In some other embodiments, the one or more selected pictures may be determined by the user. The user can first tap a printer icon to select a printer, and then select a picture in the area 2411.

Similarly, in the "moment share interface", the user may alternatively first select a projector discovered by the electronic device, and then select data that needs to be projected by the user. In the "moment share interface", the user may alternatively first select a display discovered by the electronic device, and then select data on which the user needs to perform screen mirroring. In the "moment share interface", the user may alternatively first select a multimedia playback device discovered by the electronic device, and then select data that needs to be played by the user. For an embodiment, refer to the embodiment that is of printing the picture by using the electronic device and that is shown as an example in FIG. 24A to FIG. 24D. Details are not described again.

In conclusion, in this application, "Gallery" displaying a picture, "File browser" displaying a file, "Web browser" displaying a web page, an application displaying characters, or the like may be referred to as a first application. The user may share a selected object (for example, an object such as a picture, a document, a web page, or characters) in the first application with the printer for printing, with the projector for projection, or with the display for screen mirroring. The selected object may be an object selected by the user.

In this application, a user interface that is of the first application and that is used to display an object may be referred to as a first user interface, for example, a user interface that is of "Gallery" and that is used to display a picture, a user interface that is of "File browser" and that is used to display a file, or a user interface that is of "Web browser" and that is used to display a web page.

In this application, the "moment share interface" may be referred to as a second user interface. For an embodiment of the second user interface, refer to the foregoing UI embodiments. Details are not described herein again.

In this application, in the "moment share interface", an area used to display one or more objects (for example, a picture, a document, a web page, or characters) may be referred to as a first area, and an area used to display a service option (for example, an application icon such as a WeChat icon, a Mailbox icon, or a Messages icon) may be referred to as a second area. In an embodiment (for example, the embodiments in FIG. 4A to FIG. 5C), an area that is in the "moment share interface" and that is used to display a nearby device option and/or a cloud device option may be referred to as a third area. In another embodiment (for example, the embodiments in FIG. 7A to FIG. 7C), an area that is in the "moment share interface" and that is used to display a nearby device option may be referred to as a third area, and an area that is in the "moment share interface" and that is used to display a cloud device option may be referred to as a fourth area. For embodiments of the first area, the second area, the third area, and the fourth area, refer to the foregoing UI embodiments. Details are not described herein again.

In this application, an operation that is detected in the "moment share interface" and that is of selecting a first device to process (for example, print, project, or display) a selected object may be referred to as a second operation, for example, an operation of selecting a printer to print the selected object, an operation of selecting a projector to project the selected object, or an operation of selecting a display to display the selected object. The second operation may be an operation that is detected in the "moment share interface" and that is performed on a device option (for example, a printer option, a projector option, or a display option), for example, a touch operation performed on a device icon. For a form of the second operation, refer to the foregoing UI embodiments. Details are not described herein again.

In this application, an operation that is detected in the "moment share interface" and that is of selecting an application or a protocol to share data may be referred to as a third operation, for example, an operation of selecting WeChat to share data or an operation of selecting Mailbox to share data. The third operation may be an operation that is detected in the "moment share interface" and that is performed on a service option, for example, a touch operation performed on an application icon. For a form of the third operation, refer to the foregoing UI embodiments. Details are not described herein again.

In this application, an operation that is detected in the "moment share interface" and that is of selecting a user option to share data may be referred to as a fourth operation. The fourth operation may be an operation that is detected in the "moment share interface" and that is performed on a user option, for example, a touch operation performed on a user icon. For a form of the fourth operation, refer to the foregoing UI embodiments. Details are not described herein again.

In this application, an operation used to enable "Moment share" may be referred to as a fifth operation. In an embodiment, the fifth operation may be an operation that is detected by the electronic device and that is used to enable "Moment share" in the "moment share interface", and may be an operation performed on a first interactive element. In another embodiment, the fifth operation may be an operation that is detected by the electronic device and that is performed on the interactive element 263 in the window 261 shown in FIG. 2B-2.

In this application, an operation used to enable "local moment share" may be referred to as a sixth operation. In an embodiment, the sixth operation may be an operation that is detected by the electronic device and that is used to enable "local moment share" in the "moment share interface", and may be an operation performed on a second interactive element. In another embodiment, the window 261 shown in FIG. 2B-2 may include an interactive element (similar to the interactive element 263) used to enable "local moment share", and the sixth operation may be an operation that is detected by the electronic device and that is performed on the interactive element.

In this application, an operation used to enable "cloud moment share" may be referred to as a seventh operation. In an embodiment, the seventh operation may be an operation that is detected by the electronic device and that is used to enable "cloud moment share" in the "moment share interface", and may be an operation performed on a second interactive element. In another embodiment, the window 261 shown in FIG. 2B-2 may include an interactive element (similar to the interactive element 263) used to enable "cloud moment share", and the seventh operation may be an operation that is detected by the electronic device and that is performed on the interactive element.

In this application, "Moment share" may be referred to as a first communications service, and the first communications service is used by the electronic device to discover the first device and the second device by using one or more of Bluetooth, a WLAN, or cellular mobile data. "Local moment share" may be referred to as a second communications service, and the second communications service is used by the electronic device to discover the first device and the second device by using one or more of Bluetooth and a WLAN. "Cloud moment share" may be referred to as a third communications service, and the third communications service is used by the electronic device to discover the first device and the second device by using one or more of a WLAN or a cellular network.

A System Architecture and a Data Sharing Method Provided in this Application are Described in the Following Embodiments.

An Overall Procedure of the Data Sharing Method Provided in this Application is First Described. The Procedure May Include the Following Operations.

Operation 1: The electronic device may display a first graphical user interface, and one or more objects are displayed in the first user interface. For descriptions of the first user interface and the object, refer to the foregoing content. Details are not described herein again.

Operation 2: The electronic device may detect a first operation of sharing a selected object, and in response to the first operation, the electronic device may display a second user interface, and discover a first device and a second device.

The second user interface may be used to display one or more user options, one or more device options, and one or more service options, the device option corresponds to the first device discovered by the electronic device, and the user option corresponds to the second device discovered by the electronic device. The device option may include one or more of the following: a printer option, a projector option, and a display option. The first device includes one or more of the following: a printer, a projector, a display, and the like. The second device may include a mobile phone, a tablet computer, a personal computer, or the like.

Herein, for descriptions of the first operation and the first device, refer to the foregoing content. Details are not described herein again.

Operation 3: The electronic device may detect a second operation performed on the device option, and the electronic device may trigger, in response to the second operation, the first device corresponding to the device option on which the second operation is performed to process the selected object, where the processing includes one or more of the following: printing, projection, and displaying. Details are as follows:

If the device option on which the second operation is performed is the printer option, and the printer option corresponds to the printer discovered by the electronic device, the electronic device triggers the printer corresponding to the printer option to print the selected object.

If the device option on which the second operation is performed is the projector option, and the projector option corresponds to the projector discovered by the electronic device, the electronic device triggers the projector corresponding to the projector option to project the selected object.

If the device option on which the second operation is performed is the display option, and the display option corresponds to the display discovered by the electronic device, the electronic device triggers the display corresponding to the display option to display the selected object in a screen mirroring manner.

In addition, the device option displayed in the second user interface may further include an audio device option, for example, another device such as a sound box option. The user may further perform other processing on the selected object by using another device option. Therefore, an operation is simple and intuitive.

It can be learned that when detecting a scenario in which the user shares an object such as a picture, a document, or a web page, the electronic device may automatically provide the printer option, the projector option, the display option, or the like for the user. If the user expects to print the selected object, the user may select, by using the printer option, the printer discovered by the electronic device for printing. Therefore, an operation is simple and effective. Similarly, a projection process of performing projection by using the electronic device, a screen mirroring process of performing screen mirroring by using the electronic device, and the like are also more intuitive, simple, and effective for the user.

The Following Describes, in Detail by Using an Example in which Printing is Performed by Using the Electronic Device, the Data Sharing Method Provided in this Application.

Figure 25A:
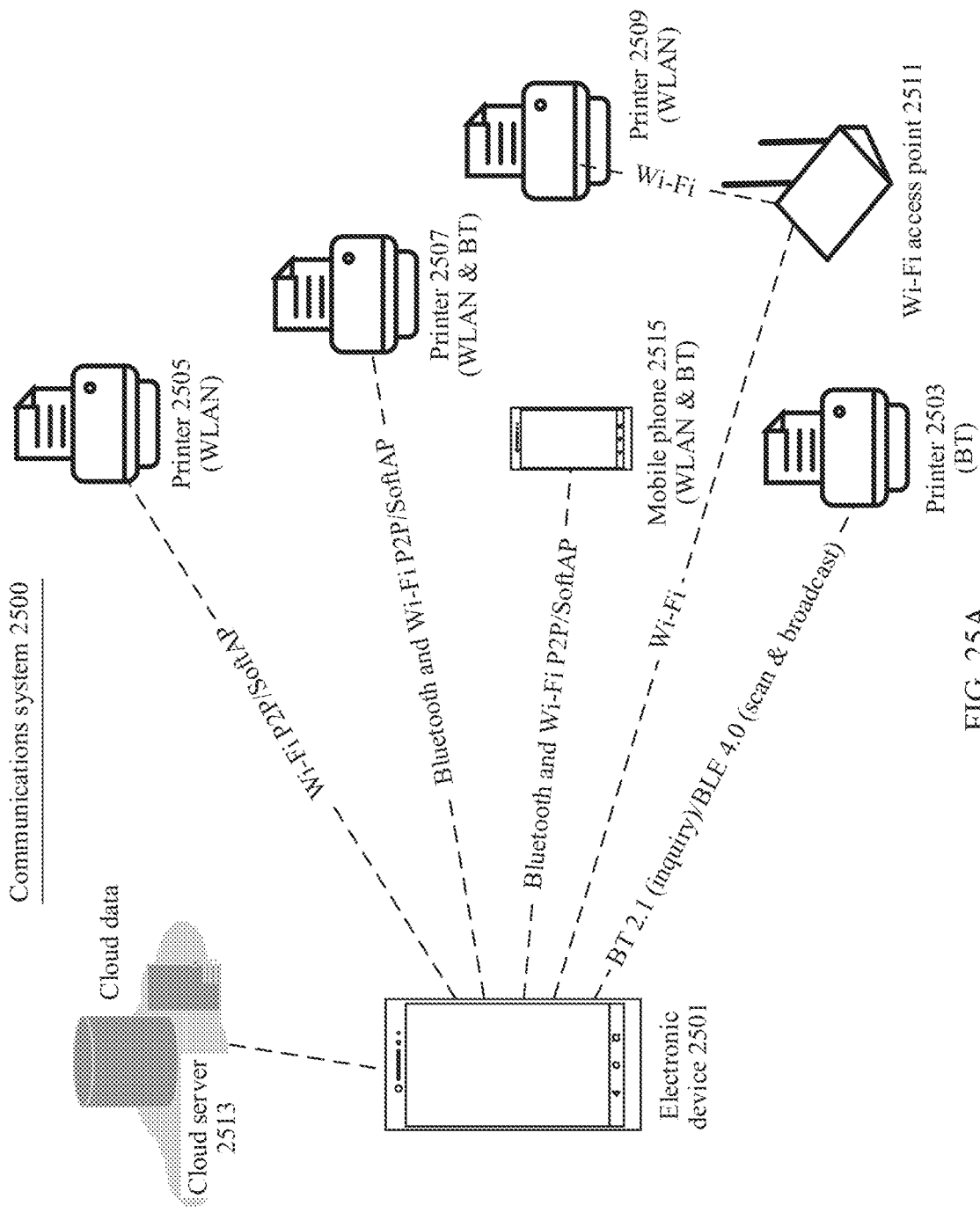
FIG. 25A is a schematic architectural diagram of a communications system according to an embodiment.
Figures 1, 25B:
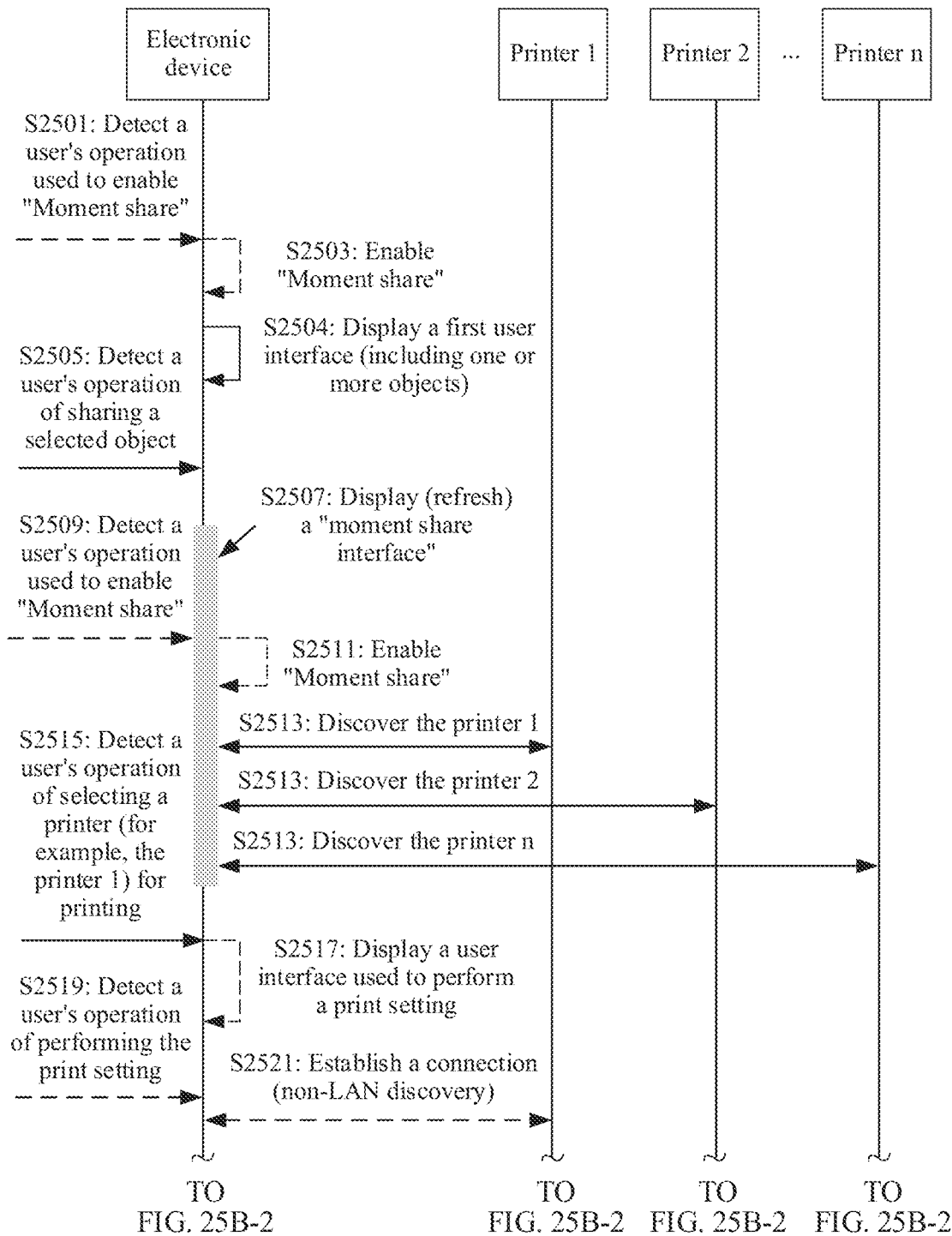
Figures 2, 25B:
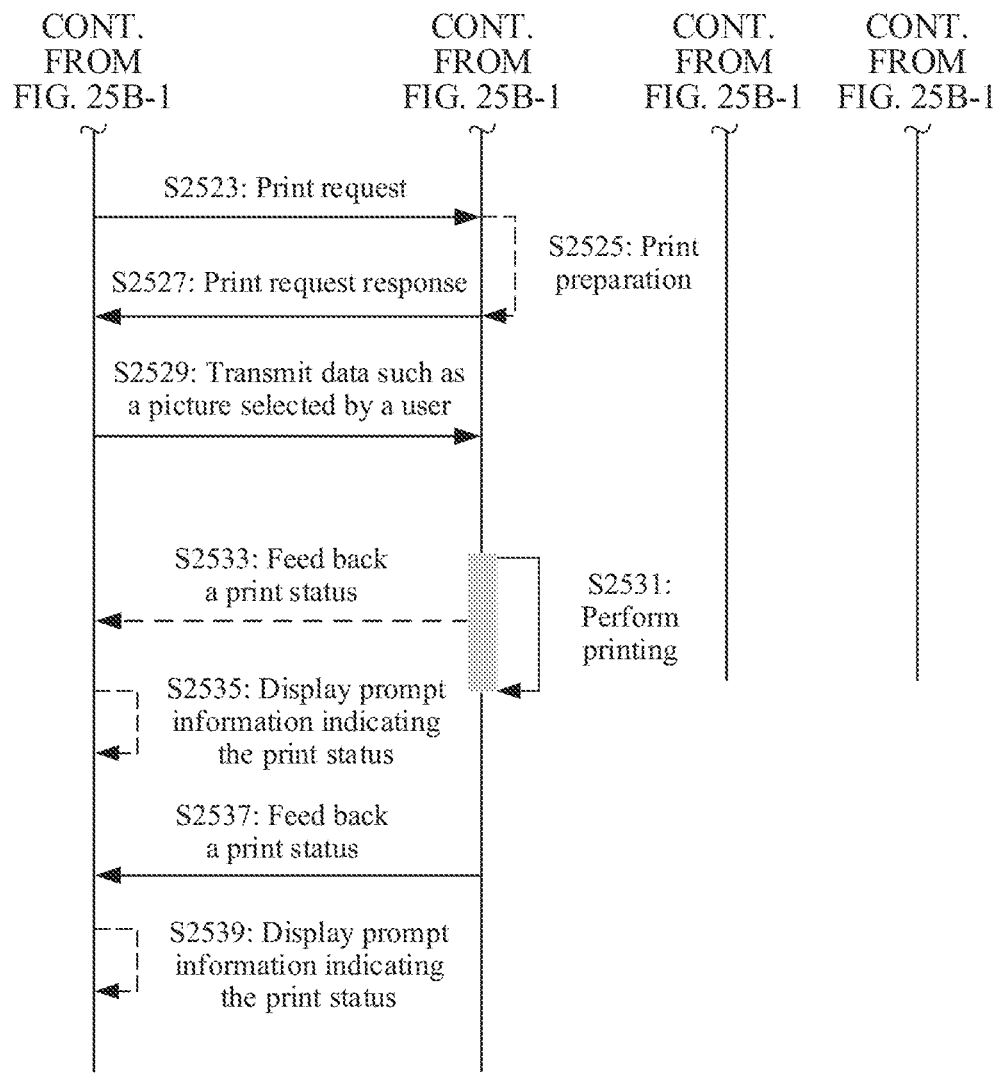

Method Embodiment in FIG. 25B-1 and FIG. 25B-2

In the method embodiment in FIG. 25B-1 and FIG. 25B-2, "Moment share" may be used to support the user in sharing data with a device near the electronic device. The nearby device may include a nearby first device, for example, a printer, a projector, or a display, or may include a nearby second device. In an embodiment, enabling "Moment share" may be enabling one or more of a WLAN or Bluetooth of the electronic device. After enabling "Moment share", the electronic device may discover the device near the electronic device by using one or more wireless communications technologies such as Bluetooth, Wi-Fi direct (such as Wi-Fi P2P), Wi-Fi SoftAP, and a Wi-Fi LAN.

The method embodiment in FIG. 25B-1 and FIG. 25B-2 corresponds to the embodiments shown as the examples in FIG. 4A to FIG. 4H. For example, the user interface displayed by the electronic device in the method embodiment in FIG. 25B-1 and FIG. 25B-2 may be each user interface described in the embodiments shown as the examples in FIG. 4A to FIG. 4H.

A Communications System 2500 for Data Sharing is First Described.

As shown in an example in FIG. 25A, the communications system 2500 may include an electronic device 2501, a mobile phone 2515, and one or more printers, such as a printer 2503, a printer 2505, a printer 2507, and a printer 2509.

The electronic device 2501 may be the electronic device mentioned in the foregoing embodiments. The electronic device 2501 may be implemented as the electronic device 100 shown as an example in FIG. 1A, and may be a portable electronic device such as a mobile phone or a tablet computer. For example, the electronic device 2501 may include one or more of a Bluetooth (BT) module and a WLAN module. The electronic device 2501 may transmit a signal by using one or more of the Bluetooth (BT) module and the WLAN module to detect or scan a device near the electronic device 2501, so that the electronic device 2501 can discover a nearby device (for example, the printer) by using one or more wireless communications technologies such as Bluetooth or a WLAN, establish a wireless communication connection to the nearby device, and share data with the nearby device (for example, the printer) by using the one or more wireless communications technologies such as Bluetooth or the WLAN. The Bluetooth (BT) module may provide a Bluetooth communication solution including one or more of classic Bluetooth (Bluetooth 2.1) or Bluetooth low energy (BLE). The WLAN module may provide a WLAN communication solution including one or more of Wi-Fi direct, a Wi-Fi LAN, or Wi-Fi SoftAP.

The printer 2503 may be a printer with a Bluetooth (BT) module. The printer 2503 may receive or transmit a wireless signal by using the Bluetooth (BT) module. The Bluetooth (BT) module in the printer 2503 may provide a Bluetooth communication solution including one or more of classic Bluetooth (Bluetooth 2.1) or Bluetooth low energy (BLE).

The printer 2505 may be a printer with a WLAN module. The printer 2505 may receive or transmit a wireless signal by using the WLAN module. The WLAN module in the printer 2505 may provide a WLAN communication solution including one or more of Wi-Fi direct, a Wi-Fi LAN, or Wi-Fi SoftAP.

The printer 2507 may be a printer with a Bluetooth (BT) module and a WLAN module. The printer 2507 may receive or transmit a wireless signal by using one or more of the Bluetooth (BT) module and the WLAN module. The Bluetooth (BT) module may provide a Bluetooth communication solution including one or more of classic Bluetooth (Bluetooth 2.1) or Bluetooth low energy (BLE). The WLAN module may provide a WLAN communication solution including one or more of Wi-Fi direct, a Wi-Fi LAN, or Wi-Fi SoftAP.

Same as the printer 2505, the printer 2509 may also be a printer with a WLAN module. The printer 2509 and the electronic device 2501 may be located in a same local area network (LAN) by accessing a Wi-Fi access point 2511.

As shown in FIG. 25A, the electronic device may discover the printer 2503 by using one or more Bluetooth communications technologies such as classic Bluetooth (Bluetooth 2.1) or Bluetooth low energy (BLE), establish a communication connection to the printer 2503, and may share data with the printer 2503 by using the one or more Bluetooth communications technologies such as classic Bluetooth (Bluetooth 2.1) or Bluetooth low energy (BLE).

As shown in FIG. 25A, the electronic device may discover the nearby printer 2505 by using one or more WLAN communications technologies such as Wi-Fi direct or Wi-Fi SoftAP, establish a communication connection to the printer 2503, and may share data with the printer 2505 by using the one or more WLAN communications technologies such as Wi-Fi direct or Wi-Fi SoftAP.

As shown in FIG. 25A, the electronic device may discover the printer 2507 by using one or more wireless communications technologies such as Bluetooth, Wi-Fi direct, or Wi-Fi SoftAP, establish a communication connection to the printer 2507, and may share data with the printer 2507 by using the one or more WLAN communications technologies such as Bluetooth, Wi-Fi direct, or Wi-Fi SoftAP.

As shown in FIG. 25A, the electronic device may discover, by using a wireless communications technology, namely, a Wi-Fi LAN, the printer 2507 that is located in the same local area network (LAN) as the electronic device, and may share data with the printer 2509 by using the local area network (LAN).

In some other embodiments, the communications system 2500 may further include a cloud server 2513, and data such as a picture or a video may be stored in the cloud server 2513. The electronic device 2501 may access the cloud server 2513, so that the user can use the electronic device 2501 to browse the data such as the picture stored in the cloud server 2513.

It may be understood that a structure shown in an embodiment does not constitute a limitation on the communications system 2500. In some other embodiments of this application, the communications system 2500 may include more or fewer devices than those shown in the figure. For example, the communications system 2500 may further include a projector with one or more of a Bluetooth (BT) module and a WLAN module, a display with one or more of a Bluetooth (BT) module and a WLAN module, and another device with one or more of a Bluetooth (BT) module and a WLAN module, for example, a sound box, and may further include a mobile phone (for example, the mobile phone 2515), a tablet computer, a personal computer, and the like.

Second, Based on the Communications System 2500 Shown in FIG. 25A, the Method Embodiment in FIG. 25B-1 and FIG. 25B-2 is Described in Detail by Using an Example in which Printing is Performed by Using the Electronic Device.

FIG. 25B-1 and FIG. 25B-2 show an overall procedure of a data sharing method. As shown in FIG. 25B-1 and FIG. 25B-2, the method may include the following operations.

S2501 and S2503: Enable "Moment share" in advance.

S2501: The electronic device may detect an operation used to enable "Moment share".

S2503: The electronic device may enable "Moment share" in response to the detected operation used to enable "Moment share". The operation may be the fifth operation. For details, refer to the related descriptions of the fifth operation in the foregoing content.

For example, enabling "Moment share" may be enabling one or more of a WLAN or Bluetooth of the electronic device. After enabling "Moment share", the electronic device may discover a first device near the electronic device and a second device near the electronic device by using one or more wireless communications technologies such as Bluetooth, Wi-Fi direct (such as Wi-Fi P2P), Wi-Fi SoftAP, and a Wi-Fi LAN.

In some embodiments, it can be learned with reference to the embodiment in FIG. 2B-1 and FIG. 2B-2 that the user may perform a downward swipe operation on the status bar 201 to open the window 261, and may tap the on/off control 263 of "Moment share" in the window 261 to enable "Moment share". In other words, the operation mentioned herein that is used to enable "Moment share" may be an operation of tapping the on/off control 263 of "Moment share" in the window 261. For example, before sharing data, the user may trigger the electronic device to enable "Moment share".

In some embodiments, S2501 and S2503 may be optional. Alternatively, after opening the "moment share interface", the user may trigger enabling of "Moment share" in the "moment share interface". For details, refer to S2509 and S2511. Enabling "Moment share" in advance may be optional.

S2504: The electronic device displays a first user interface. One or more objects may be displayed in the first user interface. The object may include a picture, a document, a web page, characters, an audio file, a video file, and the like.

For example, the first user interface is a user interface of "Gallery", and the one or more objects are one or more pictures displayed in the user interface of "Gallery". For another example, the first user interface may be a user interface of "File browser", and the one or more objects are one or more files displayed in the user interface of "File browser". For details, refer to the related descriptions in the foregoing content. Details are not described herein again.

S2505: The electronic device may detect an operation of sharing a selected object. The operation is the first operation. For details, refer to the related descriptions of the first operation in the foregoing content.

Herein, the selected object may include one or more of the following objects: a selected picture, a selected file, a selected web page, selected characters, a selected audio file, a selected video file, and the like.

Herein, for the operation of sharing the selected object, refer to the related descriptions in the foregoing UI embodiments. Details are not described herein again.

In some embodiments, the selected object may be stored in the electronic device. In some other embodiments, the selected object may alternatively be stored in a cloud server, for example, the cloud server 2513 in the communications system 2500 shown as an example in FIG. 25A, and an object such as a picture may be stored in the cloud server 2513. The electronic device 2501 may access the cloud server 2513, so that the user can use the electronic device 2501 to browse the object such as the picture stored in the cloud server 2513.

S2507: The electronic device may display a "moment share interface" in response to the detected first operation.

The "moment share interface" includes a first area, a second area, and a third area, the first area is used to display one or more selected objects, the second area is used to display one or more service options, and the third area is used to display one or more user options and one or more device options.

For descriptions of the user option, the device option, and the service option, refer to the related descriptions in the foregoing content. Details are not described herein again. The "moment share interface" is a second user interface. For an embodiment of the "moment share interface", refer to the related descriptions of the "moment share interface" in the foregoing embodiments shown as the examples in FIG. 4A to FIG. 4C. Details are not described herein again.

S2509: The electronic device may detect, in the "moment share interface", an operation used to enable "Moment share".

Herein, the operation used to enable "Moment share" is the fifth operation. For details, refer to the related descriptions of the fifth operation in the foregoing content. In some embodiments, the fifth operation may be an operation performed on a first interactive element. For descriptions of the first interactive element, refer to the related descriptions in the foregoing content. Details are not described herein again.

S2511: The electronic device may enable "Moment share" in response to the detected operation used to enable "Moment share". The operation may be the fifth operation. For details, refer to the related descriptions of the fifth operation in the foregoing content.

For example, enabling "Moment share" may be enabling one or more of a WLAN or Bluetooth of the electronic device. After enabling "Moment share", the electronic device may discover a first device near the electronic device and a second device near the electronic device by using one or more wireless communications technologies such as Bluetooth, Wi-Fi direct (such as Wi-Fi P2P), Wi-Fi SoftAP, and a Wi-Fi LAN.

S2509 and S2511 may be optional. Alternatively, the user may trigger the electronic device in advance to enable "Moment share". For details, refer to S2509 and S2511. For example, when "Moment share" is enabled, the user does not need to retrigger the electronic device to enable "Moment share".

S2513: When "Moment share" is enabled, the electronic device may discover nearby first devices, for example, a printer 1, a printer 2, . . . , and a printer n, where n is a positive integer, and N>2; and the electronic device may further discover a nearby second device, for example, a nearby mobile phone or a nearby tablet computer.

Referring to the communications system 2500 shown as an example in FIG. 25A, the printer discovered by the electronic device may be the printer 2503, the printer 2505, the printer 2507, or the printer 2509. An embodiment of discovering the printer by the electronic device is described in detail in the following content. Details are not described herein.

When the nearby first device and/or the nearby second device are/is discovered, the electronic device may refresh the "moment share interface", and, may refresh the third area in the "moment share interface". One or more of a nearby device option and a nearby user option may be displayed in the refreshed third area. The nearby device option corresponds to the nearby first device discovered by the electronic device through "Moment share", and the nearby user option corresponds to the nearby second device discovered by the electronic device through "Moment share".

For example, if the electronic device discovers the printer 1, the printer 2, . . . , and the printer n, corresponding device options—a printer option corresponding to the printer 1, a printer option corresponding to the printer 2, . . . , and a printer option corresponding to the printer n may be displayed in the refreshed third area. The user can select, by using the printer option, the printer to print the selected object.

In some embodiments, a nearby device (for example, a printer) may further feed back a current state of the nearby device to the electronic device. For example, the nearby device is busy or consumables are used up. Correspondingly, the electronic device may display indication information indicating the current state. For details about how the electronic device displays the indication information indicating the current state, refer to the foregoing UI embodiments and related extension parts. Details are not described herein again.

S2515 to S2531: Trigger, in response to a detected operation of selecting a nearby printer for printing, the printer selected by the user to print the object selected in the first operation.

For example, the operation of selecting the nearby printer for printing may be an operation performed on the printer option. The printer option may be displayed in the third area in the "moment share interface".

In some embodiments, the electronic device may provide the following manners of responding to the detected operation (for example, a touch operation performed on a printer icon) performed on the printer option.

Manner 1: The electronic device may first display, in response to the detected operation (for example, the touch operation performed on the printer icon) performed on the printer option, a user interface used by the user to perform a print setting. For details, refer to S2517. For the user interface used by the user to perform the print setting, refer to the user interface 43 shown in FIG. 4D. Details are not described herein again. In response to a detected operation of performing a print setting, the electronic device may determine, as a print setting corresponding to an object such as a picture selected by the user, the print setting (such as a color or a paper size) selected by the user. For details, refer to S2517. Then, the electronic device may trigger the printer to print, based on the print setting selected by the user, the object such as the picture selected by the user. For details, refer to S2521 to S2531.

When triggering the printer to print the object such as the picture selected by the user, the electronic device may indicate, to the printer, the print setting corresponding to the picture selected by the user, so that the printer can perform printing based on the print setting selected by the user.

It can be learned from that in Manner 1, when the user triggers printing, the user interface 43 used by the user to perform the print setting may be provided, so that the user performs the print setting, for example, sets a quantity of to-be-printed copies, a paper size, and a print color.

Manner 2: The electronic device may trigger, in response to the detected operation (for example, the touch operation performed on the printer icon) performed on the printer option, the printer (for example, the printer 1) selected by the user to print, based on a default print setting, a picture selected by the user. For details, refer to S2521 to S2531. For example, a default quantity of to-be-printed copies is 1, a default paper size is A4, and a default print color is black and white.

It can be learned that in Manner 2, when the user triggers printing, a print service based on the default print setting may be provided, and the user does not need to perform the print setting, so that a quantity of operations can be reduced.

With reference to Manner 1 or Manner 2, the following describes an embodiment in which the electronic device triggers the printer (for example, the printer 1) selected by the user to perform printing. An embodiment may include the following operations.

S2521: The electronic device may establish a communication connection to the printer (for example, the printer 1) selected by the user.

For example, if the printer selected by the user is the printer 2503 in the communications system 2500 shown as an example in FIG. 25A, the electronic device may establish a Bluetooth communication connection to the printer. If the printer selected by the user is the printer 2505 in the communications system 2500 shown as an example in FIG. 25A, the electronic device may establish a Wi-Fi direct communication connection (for example, a P2P connection), a SoftAP connection, or the like to the printer. If the printer selected by the user is the printer 2507 in the communications system 2500 shown as an example in FIG. 25A, the electronic device may establish a Bluetooth communication connection, a Wi-Fi direct communication connection (for example, a P2P connection), a SoftAP connection, and/or the like to the printer.

For example, the electronic device may send a connection establishment request to the printer, and the printer may return a connection establishment success response to the electronic device. When establishing the communication connection to the printer, the electronic device may further perform device information negotiation with the printer. The device information negotiation may be mainly used by the electronic device to know a file format supported by the printer, whether the printer is currently busy, and the like.

In some embodiments, S2521 is optional. If the printer selected by the user is the printer 2509 in the communications system 2500, and the printer 2509 and the electronic device 2501 are in a same LAN, the electronic device 2501 may transmit data to the printer, and does not need to re-establish a communication connection.

For example, when the electronic device discovers the printer by using one or more wireless communications technologies such as Bluetooth, Wi-Fi direct (such as Wi-Fi P2P), and Wi-Fi SoftAP, the electronic device needs to establish the communication connection to the printer after discovering the printer. When the electronic device discovers the printer by using a wireless communications technology, namely, a Wi-Fi LAN, data transmission may be performed because the electronic device and the printer are already in the same LAN.

S2523 to S2527: The electronic device may send a print request to the printer (for example, the printer 1) selected by the user. The print request may be used to request the printer to print an object such as a picture selected by the user. After receiving the print request sent by the electronic device, the printer may return a print request response to the electronic device.

For example, the electronic device may send the print request to the printer by using the established communication connection (for example, a Bluetooth communication connection and/or a Wi-Fi direct communication connection), or send the print request to the printer by using the LAN. For example, the printer may send the print request response to the electronic device by using the established communication connection (for example, a Bluetooth communication connection and/or a Wi-Fi direct communication connection), or send the print request response to the electronic device by using the LAN.

In some embodiments, the print request may carry indication information, and the indication information may be used to indicate a print setting corresponding to the picture selected by the user, for example, a quantity of to-be-printed copies, a color, or a paper size. The print setting may be selected and set by the user in the user interface (for example, the user interface 43 shown as an example in FIG. 4D) used to perform the print setting, or may be a default print setting.

In some embodiments, referring to S2525, after receiving the print request sent by the electronic device, the printer may perform print preparation. In some embodiments, the print preparation may include but is not limited to the following processing: performing pressurization, ink injection, bubble removal, and the like on a pipeline system of the printer. S2525 may be optional. The printer does not need to perform print preparation before performing each print task.

S2529: After receiving the print request response returned by the printer, the electronic device may transmit, to the printer, the object such as the picture selected by the user.

For example, the electronic device may transmit, to the printer by using the established communication connection (for example, a Bluetooth communication connection and/or a Wi-Fi direct communication connection), the object such as the picture selected by the user, or transmit, to the printer by using the LAN, the object such as the picture selected by the user.

S2531: After receiving the object such as the picture transmitted by the electronic device, the printer may perform printing.

In some embodiments, the printer may perform printing based on the print setting corresponding to the object such as the picture. The print setting corresponding to the object such as the picture may be carried in the print request sent by the electronic device. The print setting may be selected and set by the user in the user interface (for example, the user interface 43 shown as an example in FIG. 4D) used to perform the print setting, or may be a default print setting of the electronic device.

In some other embodiments, the printer may print the object such as the picture based on a default printer setting on a printer side.

S2533 to S2539: Feed back a print status.

Referring to S2533 to S2539, the printer may feed back, to the electronic device in a data printing process, a print status of the object such as the picture selected by the user (refer to S2533), or may feed back, to the electronic device after data printing ends, a print status of the object such as the picture selected by the user (refer to S2537). After receiving the print status fed back by the printer, the electronic device may display prompt information to prompt the user with the print status.

In some embodiments, the print status of the object such as the picture selected by the user may include but is not limited to:

a first print state, which may indicate that a print task of the object such as the picture selected by the user is in a print task queue of a printer, and is waiting in the queue to be processed by the printer;

a second print state, which may indicate that the printer is printing the object such as the picture selected by the user;

a third print state, which may indicate that printing of the object such as the picture selected by the user is complete; and a fourth print state, which may indicate that the printer fails to print the object such as the picture selected by the user.

In some embodiments, the electronic device may display, in the notification window 471 shown as an example in one or more of FIG. 4E to FIG. 4H, the prompt information 475 indicating the print status. As shown in FIG. 4E to FIG. 4H, the prompt information 475 may be text information "Print task is queuing . . . ", "Printing . . . ", "Printing is completed", "Printing fails", or the like. For a manner of displaying, in the notification window 471, the prompt information 475 indicating the print status, refer to the related content in the foregoing embodiments shown as examples in FIG. 4A to FIG. 4H and the related extensions of the notification window, or refer to the embodiments in FIG. 18A and FIG. 18B. Details are not described herein again.

In addition to the manner of displaying the prompt information that is provided in the foregoing UI embodiments, the electronic device may further display the prompt information in another manner. This is not limited in this application.

The following describes several implementations in which the electronic device discovers the nearby first device.

Manner 1: The electronic device discovers the nearby first device by using a wireless communications technology, namely, Wi-Fi direct.

In some embodiments, the electronic device may broadcast a probe request. After obtaining the probe request through listening, the nearby first device (for example, a device such as a printer) may return a probe response to notify the electronic device of existence of the nearby first device. In some other embodiments, the nearby first device (such as a printer, a projector, or a display) may periodically send a beacon frame. The electronic device may discover the nearby first device by listening to the beacon frame sent by the nearby first device.

In other words, the electronic device may actively discover the nearby first device, or may passively discover the nearby first device.

Manner 2: The electronic device discovers the nearby first device by using a wireless communications technology, namely, Bluetooth.

In some embodiments, a Bluetooth device (for example, a printer, a projector, or a display with a Bluetooth module) near the electronic device may perform Bluetooth broadcast. The electronic device may perform Bluetooth scanning to scan a broadcast frame that is broadcast by the nearby Bluetooth device, to discover the nearby Bluetooth device.

Manner 3: The electronic device discovers the device in a same Wi-Fi LAN.

In some embodiments, the electronic device may determine an IP address range of the LAN based on an IP address and a subnet mask that are of the electronic device in the LAN, and then may discover the device in the LAN in a unicast polling manner. In addition, the electronic device may further discover the device in the LAN by using a broadcast message or a multicast message in the LAN.

In addition to the foregoing several manners in which the electronic device discovers the nearby first device, in actual application, the electronic device may further discover the nearby first device based on a wireless communications technology such as Bluetooth, Wi-Fi direct, or a Wi-Fi LAN in another manner. This is not limited in this application.

It can be learned that in the embodiment in FIG. 25B-1 and FIG. 25B-2, if "Moment share" is enabled, when detecting the operation of selecting the object such as the picture for sharing, the electronic device automatically discovers the nearby device, updates the "moment share interface", and displays the device option in the "moment share interface". In addition, in some embodiments, when detecting that "Moment share" is enabled, the electronic device may further automatically discover the nearby device without waiting until the operation of selecting the object such as the picture for sharing is detected. When detecting the operation of selecting the object such as the picture for sharing, the electronic device may display the nearby device option in the "moment share interface", so that the user can more quickly see, in the "moment share interface", a nearby device discovered by the electronic device, thereby improving efficiency of performing printing, projection, displaying, or the like by the user by using the electronic device.

Similar to the method for printing the data by using the nearby printer discovered by the electronic device that is shown in FIG. 25B-1 and FIG. 25B-2, in a method for projecting data by using a nearby projector discovered by the electronic device, the electronic device may discover the nearby projector in a manner of discovering the nearby printer, and then the electronic device may trigger, in response to an operation that is detected in the "moment share interface" and that is of selecting the projector to project an object such as a picture selected by the user, the projector to perform projection. A difference lies in that to trigger the projector to perform projection, the electronic device sends a projection request instead of the print request to the projector selected by the user. The projector may perform projection based on the projection request.

Similar to the method for printing the data by using the nearby printer discovered by the electronic device that is shown in FIG. 25B-1 and FIG. 25B-2, in a method for performing screen mirroring on data by using a nearby display discovered by the electronic device, the electronic device may discover the display near the electronic device in a manner of discovering the nearby printer, and then the electronic device may trigger, in response to an operation that is detected in the "moment share interface" and that is of selecting the display to display an object such as a picture selected by the user, the display to perform displaying. A difference lies in that to trigger the display to perform displaying, the electronic device sends a display request instead of the print request to the display selected by the user. The display may perform projection based on the display request.

A method for playing, by using a nearby multimedia device discovered by the electronic device, a multimedia file selected by the user, and the like may also be similar to the method for printing the data by using the nearby printer discovered by the electronic device that is shown in FIG. 25B-1 and FIG. 25B-2. Details are not described again.

In some embodiments, when detecting the operation of sharing the selected object, the electronic device may discover only a nearby device and/or a cloud device that are/is suitable for processing the selected object. An embodiment is described below.

In some embodiments, when the operation of sharing the selected object is detected, if the selected object (namely, an object selected by the user) is an object that can be printed, such as a picture, a document, a web page, or characters, in response to the operation, the electronic device may discover a nearby printer and/or a cloud printer, and display the discovered nearby printer and/or the discovered cloud printer in the "moment share interface". Otherwise, the electronic device may not discover a nearby printer and/or a cloud printer, or may discover a nearby printer and/or a cloud printer but does not display, in the "moment share interface", a device option corresponding to the nearby printer and/or a device option corresponding to the cloud printer. In this way, an interface area of the "moment share interface" can be saved, and a problem that processing fails because the user selects an inappropriate printer can also be avoided, thereby avoiding unnecessary troubles for the user, and improving use efficiency of the electronic device. Objects that cannot be printed may include one or more of the following: an audio file, a video file, an installation package of an application, an intermediate file obtained through software compilation, and the like.

In some embodiments, the objects that cannot be printed currently may also be converted by the electronic device into file formats that support printing, for example, the audio file is converted into a document. In this case, the objects may also be printed.

In some embodiments, when the operation of sharing the selected object is detected, if the selected object (namely, an object selected by the user) is an object that can be projected, such as a video file, a picture, a document, a web page, or characters, in response to the operation, the electronic device may discover a nearby projector and/or a cloud projector, and display, in the "moment share interface", a nearby projector option corresponding to the discovered nearby projector and/or a cloud projector option corresponding to the cloud projector. Otherwise, the electronic device may not discover a nearby projector and/or a cloud projector, or may discover a nearby projector and/or a cloud projector but does not display, in the "moment share interface", a device option corresponding to the nearby projector and/or a device option corresponding to the cloud projector. In this way, an interface area of the "moment share interface" can be saved, and a problem that processing fails because the user selects an inappropriate projector can also be avoided, thereby avoiding unnecessary troubles for the user, and improving use efficiency of the electronic device. Objects that cannot be projected may include one or more of the following: an installation package of an application, an intermediate file obtained through software compilation, and the like.

In some embodiments, the objects that cannot be projected currently may also be converted by the electronic device into file formats that support projection, for example, the intermediate file is converted into a file such as a picture or a video. In this case, the objects may also be printed.

In some embodiments, when the operation of sharing the selected object is detected, if the selected object (namely, an object selected by the user) is an object that can be displayed, such as a video file, a picture, a document, a web page, or characters, in response to the operation, the electronic device may discover a nearby display and/or a cloud display, and display, in the "moment share interface", a nearby display option corresponding to the discovered nearby display and/or a cloud display option corresponding to the cloud display. Otherwise, the electronic device may not discover a nearby display and/or a cloud display, or may discover a nearby display and/or a cloud display but does not display, in the "moment share interface", a device option corresponding to the nearby display and/or a device option corresponding to the cloud display.

Similarly, when the operation of sharing the selected object is detected, if the selected object (namely, an object selected by the user) can be played by a media device, the electronic device may discover a nearby media playback device and/or a cloud media playback device that can play the object, and display, in the "moment share interface", a nearby media playback device option corresponding to the discovered nearby media playback device and/or a cloud media playback device option corresponding to the cloud media playback device. Otherwise, the electronic device may not discover a nearby media playback device and/or a cloud media playback device, or may discover a nearby media playback device and/or a cloud media playback device but does not display, in the "moment share interface", a device option corresponding to the nearby media playback device and/or a device option corresponding to the cloud media playback device.

The following describes an implementation of selecting a plurality of different types of devices at a time to process selected objects.

In some embodiments, the electronic device may detect, in the "moment share interface", an operation of dragging the selected objects to a plurality of different types of device options, and the electronic device may trigger, in response to the operation, the plurality of different types of devices to respectively process data allocated to the plurality of different types of devices. Data allocated to a device may be data dragged to the device option.

Figure 25C:
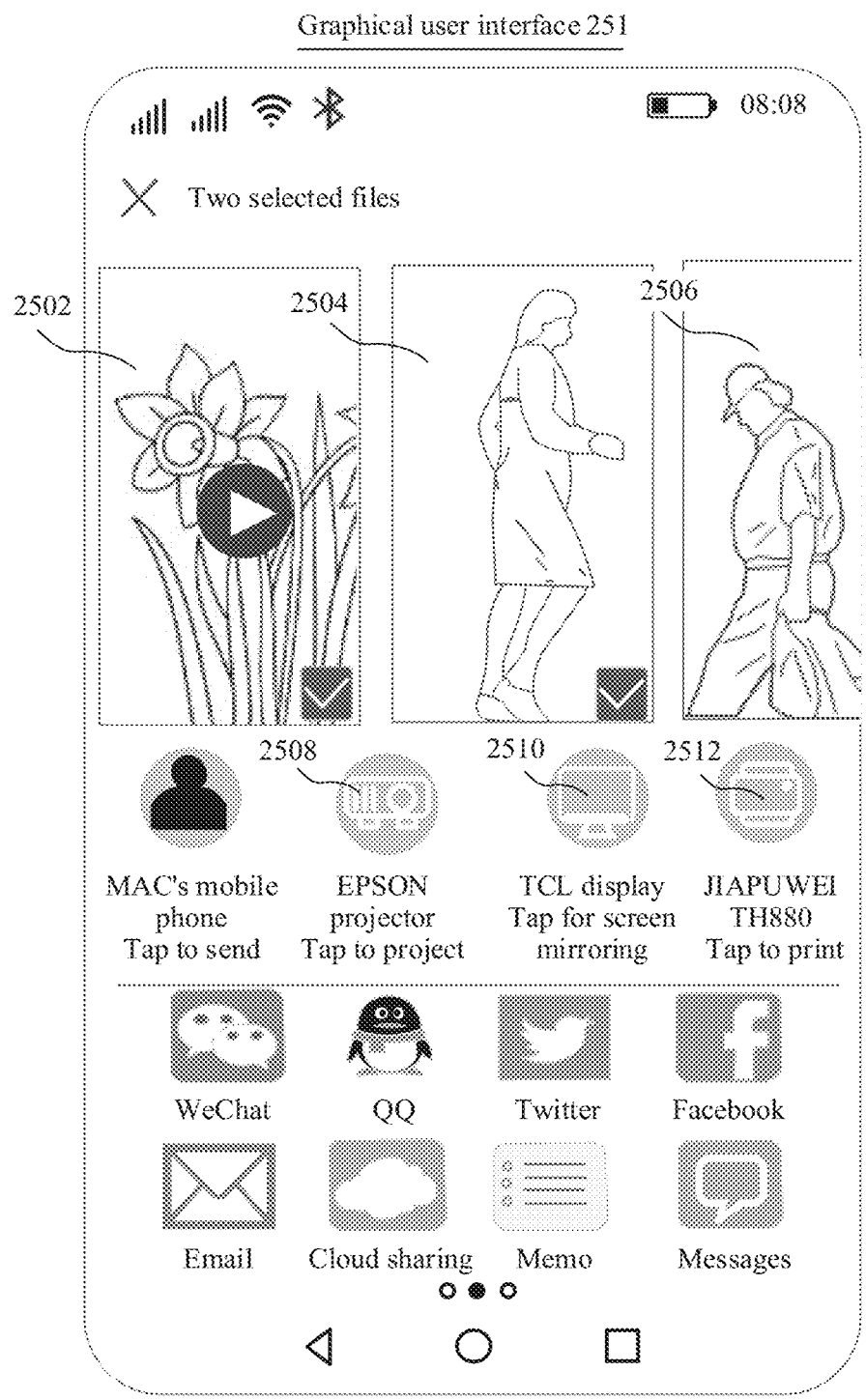
FIG. 25C shows a user interface of a data sharing method according to another embodiment.

For example, as shown in FIG. 25C, selected objects that need to be shared by the user include a video 2503 and a picture 2504. In the "moment share interface" (namely, the user interface 251), when the electronic device detects an operation of dragging the video 2503 to an icon 2508 of "EPSON projector", and detects an operation of dragging the picture 2504 to an icon 2512 of "JIAPUWEI TH880", in response to the two operations, the electronic device may trigger the projector "EPSON projector" to project the video 2503, and may trigger the printer "JIAPUWEI TH880" to print the picture 2504. In other words, the user may drag the selected objects to the different types of device options in the "moment share interface", to allocate the selected objects to the different types of devices for different processing, so that an operation of performing printing, projection, and the like in parallel can be implemented, thereby greatly improving office efficiency of the user. In addition to the selected objects, the user may further drag an unselected object to a device option in the "moment share interface". In addition to the drag operation, in the "moment share interface", the operation used to allocate the data to the plurality of different types of devices may be further presented in another form. This is not limited in this application.

In some other embodiments, the electronic device may detect, in the "moment share interface", an operation of selecting a plurality of different types of devices, for example, detect an operation of consecutively tapping a plurality of different types of device options. Herein, the consecutive tapping may be a plurality of tap operations performed in a preset time period (for example, 1 second). The plurality of different types of devices selected in the operation are selected devices. The electronic device may trigger, in response to the operation according to a preset allocation policy, the selected different types of devices to process the selected objects, thereby improving use efficiency and user experience. The preset allocation policy may be randomly allocating the selected objects to a plurality of selected printers for printing, or evenly allocating the selected objects to a plurality of selected printers for printing. The preset allocation policy may alternatively be that each selected printer prints all selected objects. The preset allocation policy is not limited in this application.

In an embodiment, the selected objects that need to be shared by the user may include a plurality of types of data, such as a picture, a video, and audio. In this case, the preset allocation policy may be allocating the selected object to a selected device that can process the selected object.

For example, as shown in FIG. 25C, selected objects that need to be shared by the user include a video 2503 and a picture 2504. In the "moment share interface" (namely, the user interface 251), when the electronic device detects an operation of consecutively tapping an icon 2508 and an icon 2512, in response to the operation, the electronic device may allocate the video 2503 to a projector "EPSON projector" and trigger the projector "EPSON projector" to project the video 2503, and further allocate the picture 2504 to a printer "JIAPUWEI TH880" and triggers the printer "JIAPUWEI TH880" to print the picture 2504. In this way, the user may select different types of discovered devices at a time to process a plurality of objects (including a picture, a video, and the like) of different data types, thereby greatly improving use efficiency and improving user experience.

It may be understood that for content that is not mentioned in the method embodiment in FIG. 25B-1 and FIG. 25B-2, reference may be made to the embodiments shown as examples in FIG. 4A to FIG. 4H and the related extensions. Details are not described herein again.

According to the method embodiment in FIG. 25B-1 and FIG. 25B-2, the electronic device may automatically discover the device such as the printer, the projector, or the display when identifying a scenario in which the user shares an object such as a picture, a document, a web page, or characters. If the user expects to print data such as a picture, a document, a web page, or characters, the user may select the discovered printer for printing, so that a process of printing the data by using the electronic device is intuitive and simple for the user. Similarly, if the user expects to project data such as a picture, a document, a web page, or characters, the user may select the discovered projector for projection, so that a process of projecting the data by using the electronic device is intuitive and simple for the user. If the user expects to perform screen mirroring on data such as a picture, a document, a web page, or characters, the user may select the discovered display for screen mirroring, so that a process of performing screen mirroring on the data by using the electronic device is intuitive and simple for the user.

Figure 26A:
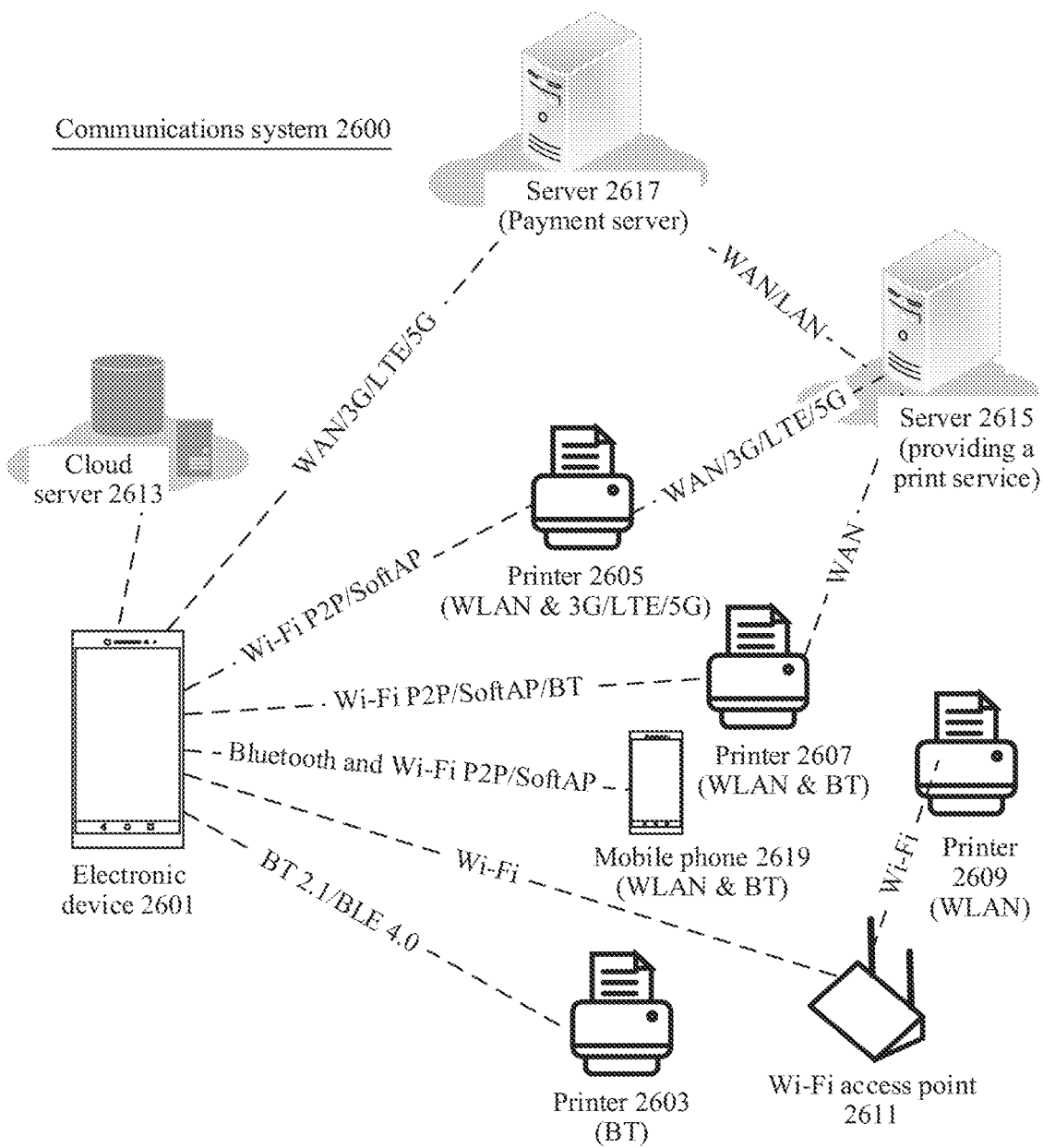
FIG. 26A is a schematic architectural diagram of a communications system according to another embodiment.
Figures 1, 26B:
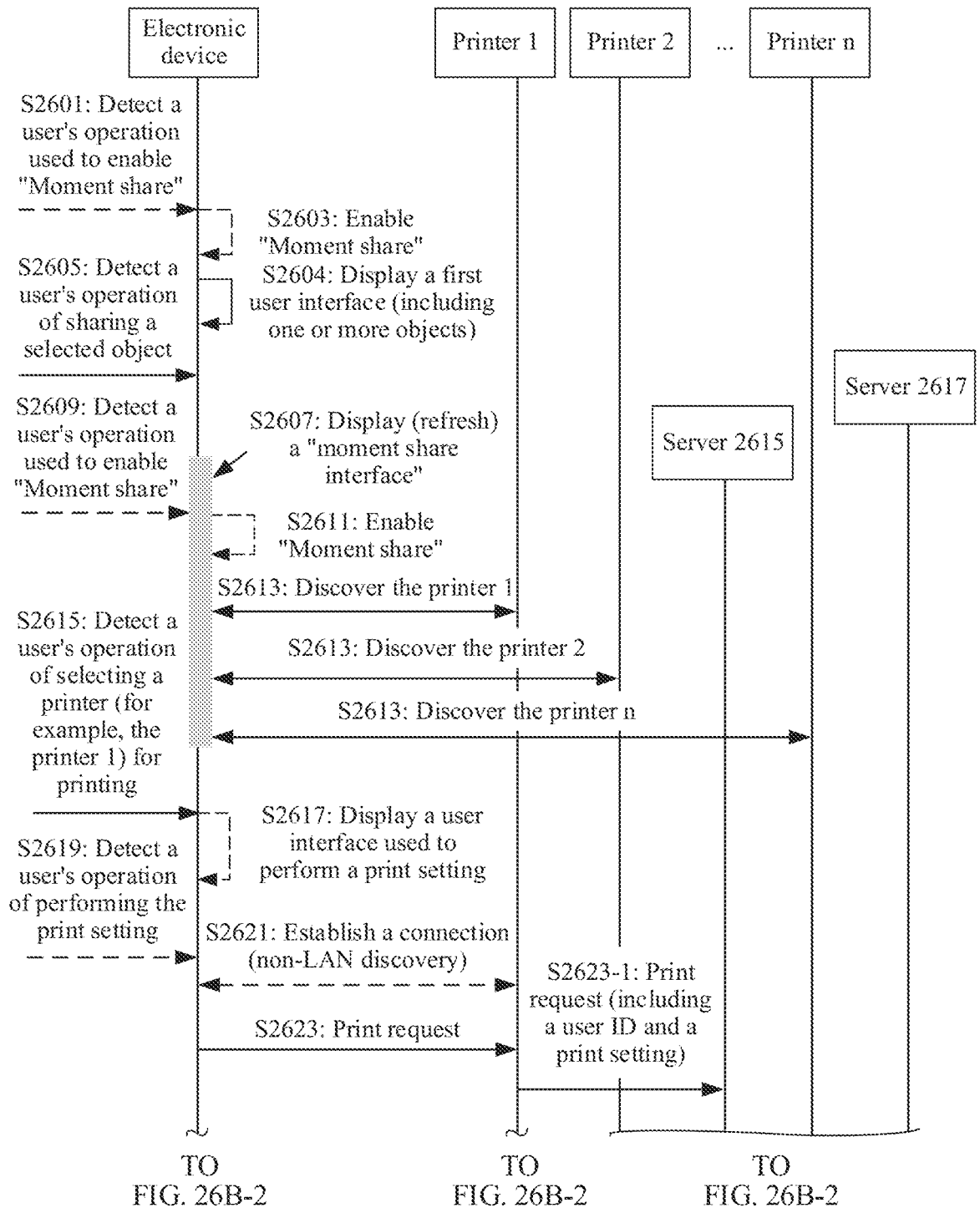
Figures 2, 26B:
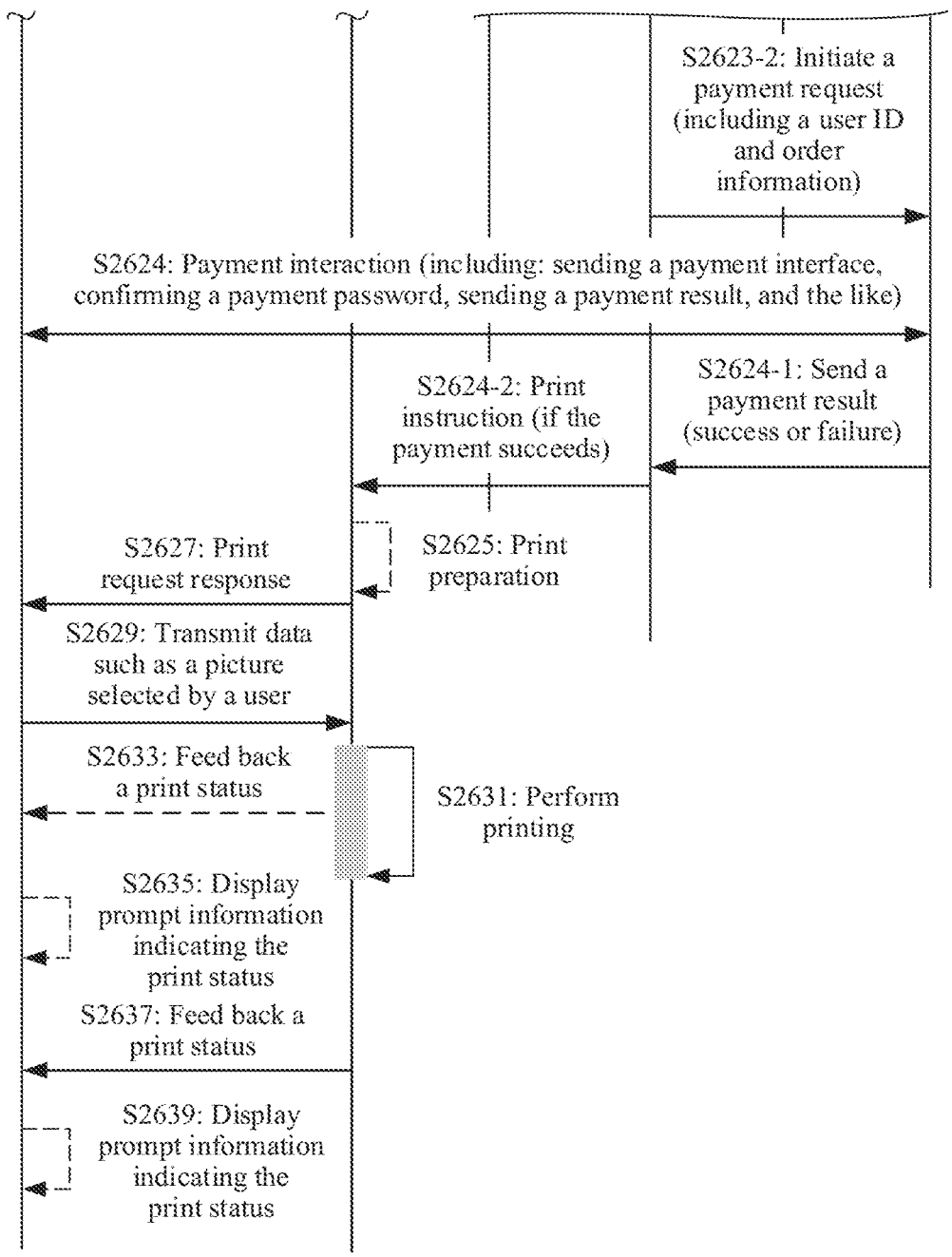

Method Embodiment in FIG. 26B-1 and FIG. 26B-2

In the method embodiment in FIG. 26B-1 and FIG. 26B-2, "Moment share" may be used to support the user in sharing data with a device near the electronic device. The nearby device may include a nearby first device, for example, a printer, a projector, or a display, or may include a nearby second device. In an embodiment, enabling "Moment share" may be enabling one or more of a WLAN or Bluetooth of the electronic device. After enabling "Moment share", the electronic device may discover the device near the electronic device by using one or more wireless communications technologies such as Bluetooth, Wi-Fi direct (such as Wi-Fi P2P), Wi-Fi SoftAP, and a Wi-Fi LAN.

The method embodiment in FIG. 26B-1 and FIG. 26B-2 corresponds to the embodiments shown as the examples in FIG. 5A to FIG. 5J. For example, the user interface displayed by the electronic device in the method embodiment in FIG. 26B-1 and FIG. 26B-2 may be each user interface described in the embodiments shown as the examples in FIG. 5A to FIG. 5J.

A communications system 2600 for data sharing is first described.

As shown in an example in FIG. 26A, the communications system 2600 may include a server 2615, a server 2617, an electronic device 2601, a mobile phone 2619, and one or more printers, such as a printer 2603, a printer 2605, a printer 2607, and a printer 2609.

The server 2615 may be configured to control a printer connected to the server 2615 to provide a print service, and the server 2617 may be configured to provide a payment settlement service between the user and a print service provider. The server 2615 may be a server of the print service provider. The server 2617 may be a payment server of the print service provider, or may be a payment server of a third-party payment service provider. The server 2615 and the server 2617 may be connected by using a LAN or WAN communications technology, so that the server 2615 initiates payment to the server 2617, and the server 2617 sends a payment result to the server 2615. For details, refer to the related content in the method embodiment in FIG. 25B-1 and FIG. 25B-2. Details are not described herein again.

The electronic device 2601 may be the electronic device mentioned in the foregoing UI embodiments. For details, refer to the electronic device 2501 in the communications system 2500 shown in FIG. 25A. Details are not described herein again. The electronic device may be connected to the server 2617 by using a cellular mobile communications technology or a WAN communications technology, to facilitate payment interaction with the server 2617. For details, refer to the related content in the method embodiment in FIG. 25B-1 and FIG. 25B-2. Details are not described herein again.

The printer 2603 may be a printer with a Bluetooth (BT) module. For details, refer to the printer 2503 in the communications system 2500 shown in FIG. 25A. Details are not described herein again.

The printer 2605 may be a printer with a WLAN module. For details, refer to the printer 2505 in the communications system 2500 shown in FIG. 25A. Details are not described herein again. As shown in FIG. 26A, the printer 2605 may be a printer for which a fee needs to be paid. The printer 2605 may further include a cellular mobile communications module (for example, a 3G/LTE/5G communications module). The printer 2605 may be connected to the server 2615 and the server 2617 by using one or more of a cellular mobile communications technology or a WAN communications technology.

The printer 2607 may be a printer with a Bluetooth (BT) module and a WLAN module. For details, refer to the printer 2507 in the communications system 2500 shown in FIG. 25A. Details are not described herein again. As shown in FIG. 26A, the printer 2607 may also be a printer for which a fee needs to be paid. The printer 2607 may be connected to the server 2615 and the server 2617 by using one or more of a WAN communications technology and Bluetooth.

Same as the printer 2605, the printer 2609 may also be a printer with a WLAN module. The printer 2609 and the electronic device 2601 may be located in a same local area network (LAN) by accessing a Wi-Fi access point 2611.

As shown in FIG. 26A, the electronic device 2601 may discover the printer 2603 by using one or more Bluetooth communications technologies such as classic Bluetooth (Bluetooth 2.1) or Bluetooth low energy (BLE), establish a communication connection to the printer 2603, and may share data with the printer 2603 by using the one or more Bluetooth communications technologies such as classic Bluetooth (Bluetooth 2.1) or Bluetooth low energy (BLE).

As shown in FIG. 26A, the electronic device 2601 may discover the nearby printer 2605 by using one or more WLAN communications technologies such as Wi-Fi direct or Wi-Fi SoftAP, establish a communication connection to the printer 2605, and may share data with the printer 2605 by using the one or more WLAN communications technologies such as Wi-Fi direct or Wi-Fi SoftAP.

As shown in FIG. 26A, the electronic device 2601 may discover the printer 2607 by using one or more wireless communications technologies such as Bluetooth, Wi-Fi direct, or Wi-Fi SoftAP, establish a communication connection to the printer 2607, and may share data with the printer 2607 by using the one or more WLAN communications technologies such as Bluetooth, Wi-Fi direct, or Wi-Fi SoftAP.

As shown in FIG. 26A, the electronic device 2601 may discover, by using a wireless communications technology, namely, a Wi-Fi LAN, the printer 2609 that is located in the same local area network (LAN) as the electronic device, and may share data with the printer 2609 by using the local area network (LAN).

In some embodiments, the communications system 2600 may further include a cloud server 2613, and data such as a picture may be stored in the cloud server 2613. The electronic device 2601 may access the cloud server 2613, so that the user can use the electronic device 2601 to browse the data such as the picture stored in the cloud server 2613.

It may be understood that a structure shown in an embodiment does not constitute a limitation on the communications system 2600. In some other embodiments of this application, the communications system 2600 may include more or fewer devices than those shown in the figure. For example, in addition to the devices shown in FIG. 26A, the communications system 2600 may further include a projector with one or more of a Bluetooth (BT) module and a WLAN module, a display with one or more of a Bluetooth (BT) module and a WLAN module, and another device with one or more of a Bluetooth (BT) module and a WLAN module, for example, a sound box, and may further include a mobile phone (for example, the mobile phone 2619), a tablet computer, a personal computer, and the like.

Second, based on the communications system 2600 shown in FIG. 26A, the method embodiment in FIG. 26B-1 and FIG. 26B-2 is described in detail by using an example in which printing is performed by using the electronic device.

FIG. 26B-1 and FIG. 26B-2 show an overall procedure of another data sharing method. As shown in FIG. 26B-1 and FIG. 26B-2, the method may include the following operations.

S2601 and S2603: Enable "Moment share" in advance.

For details, refer to S2501 and S2503 in the method embodiment in FIG. 25B-1 and FIG. 25B-2. Details are not described herein again.

S2604: The electronic device displays a first user interface.

For details, refer to S2504 in the method embodiment in FIG. 25B-1 and FIG. 25B-2. Details are not described herein again.

S2605: The electronic device may detect an operation of sharing a selected object.

For details, refer to S2505 in the method embodiment in FIG. 25B-1 and FIG. 25B-2. Details are not described herein again.

S2607: The electronic device may display a "moment share interface" in response to the detected first operation.

For details, refer to S2507 in the method embodiment in FIG. 25B-1 and FIG. 25B-2. Details are not described herein again.

S2609: The electronic device may detect, in the "moment share interface", an operation used to enable "Moment share".

For details, refer to S2509 in the method embodiment in FIG. 25B-1 and FIG. 25B-2. Details are not described herein again.

S2611: The electronic device may enable "Moment share" in response to the detected operation used to enable "Moment share". For details, refer to S2511 in the method embodiment in FIG. 25B-1 and FIG. 25B-2. Details are not described herein again.

S2613: When "Moment share" is enabled, the electronic device may discover nearby first devices, for example, a printer 1, a printer 2, . . . , and a printer n, where n is a positive integer, and N>2; and the electronic device may further discover a nearby second device, for example, a nearby mobile phone or a nearby tablet computer.

For details, refer to S2513 in the method embodiment in FIG. 25B-1 and FIG. 25B-2. Details are not described herein again.

S2615 to S2631: Trigger, in response to a detected operation of selecting a nearby printer for printing, the printer selected by the user to print the object selected in the first operation.

For example, the operation of selecting the nearby printer for printing may be an operation performed on a printer option. The printer option may be displayed in a third area in the "moment share interface".

Different from S2515 to S2531 in the method embodiment in FIG. 25B-1 and FIG. 25B-2, if a fee needs to be paid for the printer (for example, the printer 1) selected by the user, as shown in FIG. 26B-1 and FIG. 26B-2, the printer may wait for an instruction from the server 2615 in the communications system 2600 shown as an example in FIG. 26A before performing printing. After determining that the user successfully pays the print fee, the server 2615 may send a print instruction to the printer. A process may include but is not limited to the following operations.

S2623: The electronic device may send a print request to the printer (for example, the printer 1) selected by the user.

S2623-1: After receiving the print request, the printer may report the print request of the user to the server 2615, where the print request may carry identification information of the user and indication information indicating a print setting. The identification information of the user may be information that can be used to uniquely identify a user identity, such as an international mobile subscriber identity (international mobile subscriber identity, IMSI). This is not limited in this application. The print setting may be used to determine a print fee. The print setting may be selected and set by the user in a user interface (for example, the user interface 43 shown as an example in FIG. 4D) used to perform the print setting, or may be a default print setting.

S2623-2: After receiving the print request of the user that is reported by the printer, the server 2615 may initiate a payment request to the server 2617 in the communications system 2600 shown as an example in FIG. 26A. The payment request may carry identification information of the user and order information. For example, the order information may include a print fee that needs to be paid by the user, for example, "¥12.00". The order information may further include identification information of a payee, and the like.

S2624: After receiving the payment request initiated by the server 2615, the server 2617 may perform payment interaction with the electronic device.

In some embodiments, the payment interaction may include but is not limited to: The server 2617 may send, to the electronic device, the user interface used by the user to perform the print setting. The electronic device may display the user interface used by the user to perform the print setting. The payment interfaces may be shown as examples in FIG. 5E and FIG. 5F. However, an embodiment of the user interface is not limited in this application. The electronic device may send, to the server 2617, a payment password entered by the user in the user interface used by the user to perform the print setting, so that the server 2617 confirms the payment password. The server 2617 may return a payment result to the electronic device, for example, a payment success or failure.

S2624-1: After the payment is completed, the server 2617 may feed back a payment result to the server 2615.

S2624-2: After determining that the user successfully pays the print fee, the server 2615 may send the print instruction to the printer (for example, the printer 1) selected by the user.

For content that is not mentioned in Phase 5, refer to Phase 5 in the embodiment in FIG. 25B-1 and FIG. 25B-2. Details are not described herein again.

In addition to S2623 to S2624-2 shown in FIG. 26B-1 and FIG. 26B-2, if the server 2617 is a payment server of a print service provider to which the server 2615 belongs, the print service provider may provide a recharge service such as "Personal wallet". If balances of an account-recharged user are sufficient, the server 2617 may perform automatic payment each time the user performs print consumption. If the payment succeeds, the server 2617 may feed back, to the server 2615, a payment result that the payment succeeds. In this way, the user does not need to enter the payment password each time.

S2633 to S2639: Feed back a print status.

For details, refer to S2533 to S2539 in the method embodiment in FIG. 25B-1 and FIG. 25B-2. Details are not described herein again.

It may be understood that for content that is not mentioned in the method embodiment in FIG. 26B-1 and FIG. 26B-2, reference may be made to the embodiments shown as examples in FIG. 5A to FIG. 5J and the related extensions, or reference may be made to the method embodiment in FIG. 25B-1 and FIG. 25B-2. Details are not described herein again.

According to the method embodiment in FIG. 26B-1 and FIG. 26B-2, when identifying a scenario in which the user shares a picture, the electronic device may automatically discover a nearby printer, and intuitively present, to the user, the nearby printer discovered by the electronic device. If a fee needs to be paid for the printer selected by the user, the electronic device may display a payment page after the user selects the printer, and trigger the printer for printing after the payment succeeds. In this way, the user may select the printer for which the fee needs to be paid for printing, so that an operation is intuitive and simple.

In addition, a method for projecting data by using a nearby projector for which a fee needs to be paid, a method for displaying data by using a nearby display for which a fee needs to be paid, a method for playing data by using a nearby multimedia device for which a fee needs to be paid, and the like may be similar to the method for printing the data by using the nearby printer for which the fee needs to be paid that is shown in FIG. 26B-1 and FIG. 26B-2. Details are not described again. In this way, the user may select the projector for which the fee needs to be paid for projection, may select the display for which the fee needs to be paid for screen mirroring, and the like, so that an operation is intuitive and simple.

Figures 1, 27A:
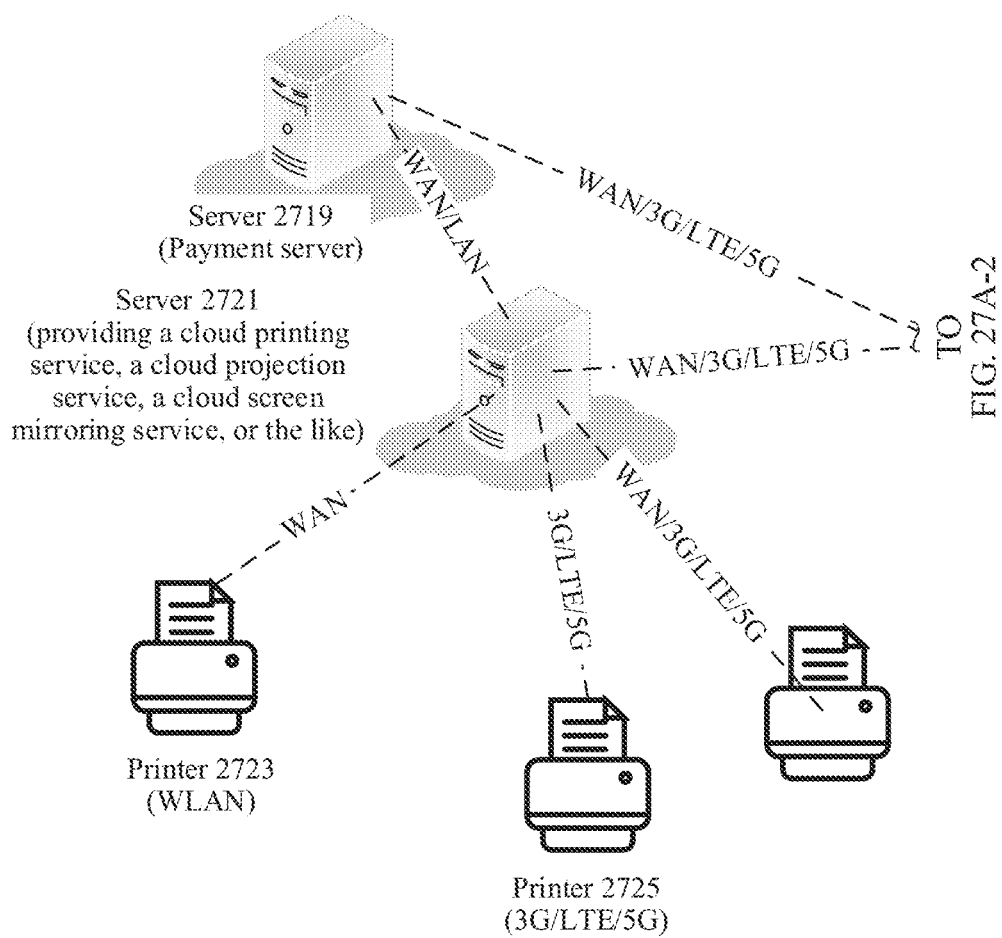
Figures 2, 27A:
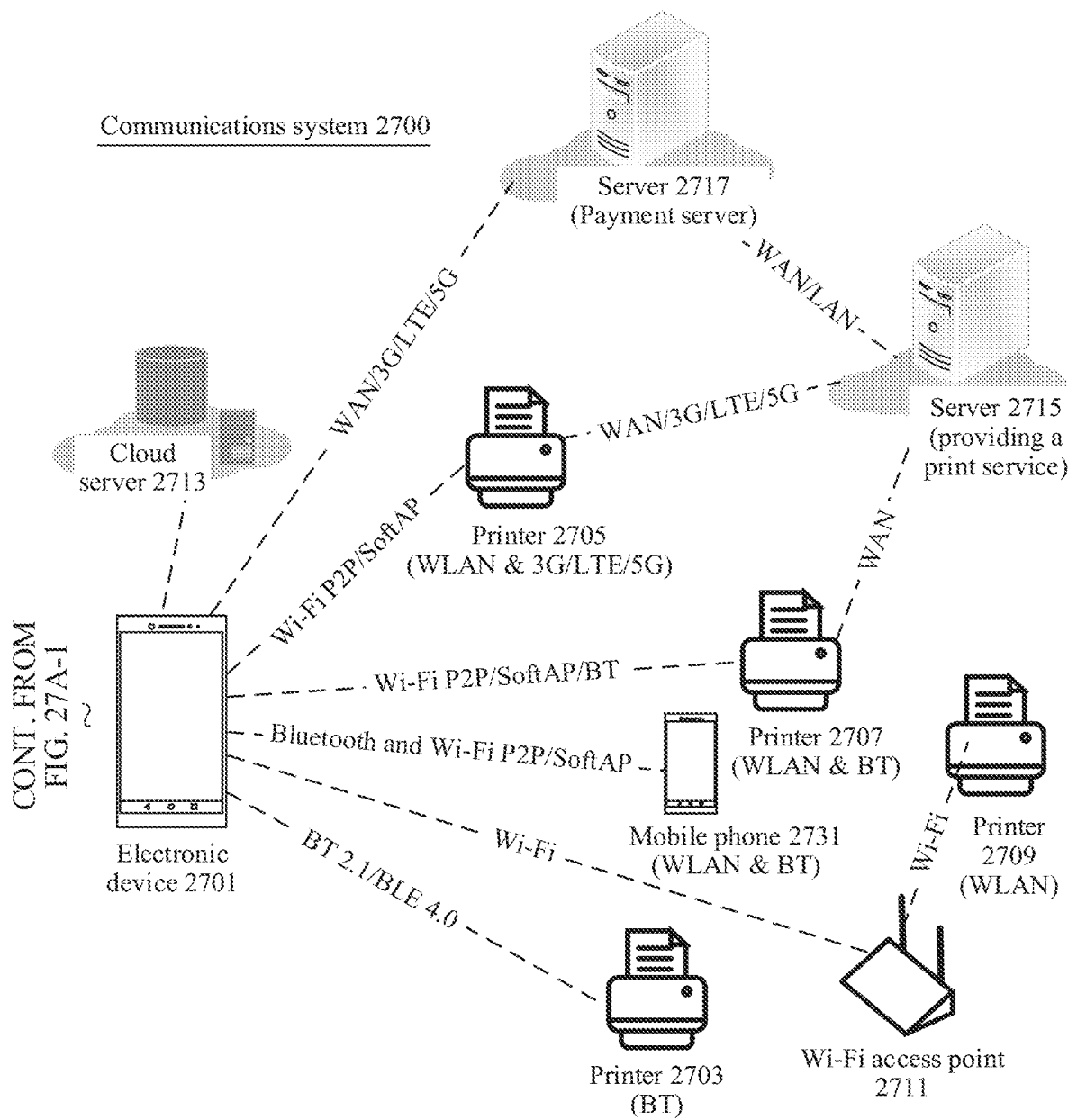
Figures 1, 27B:
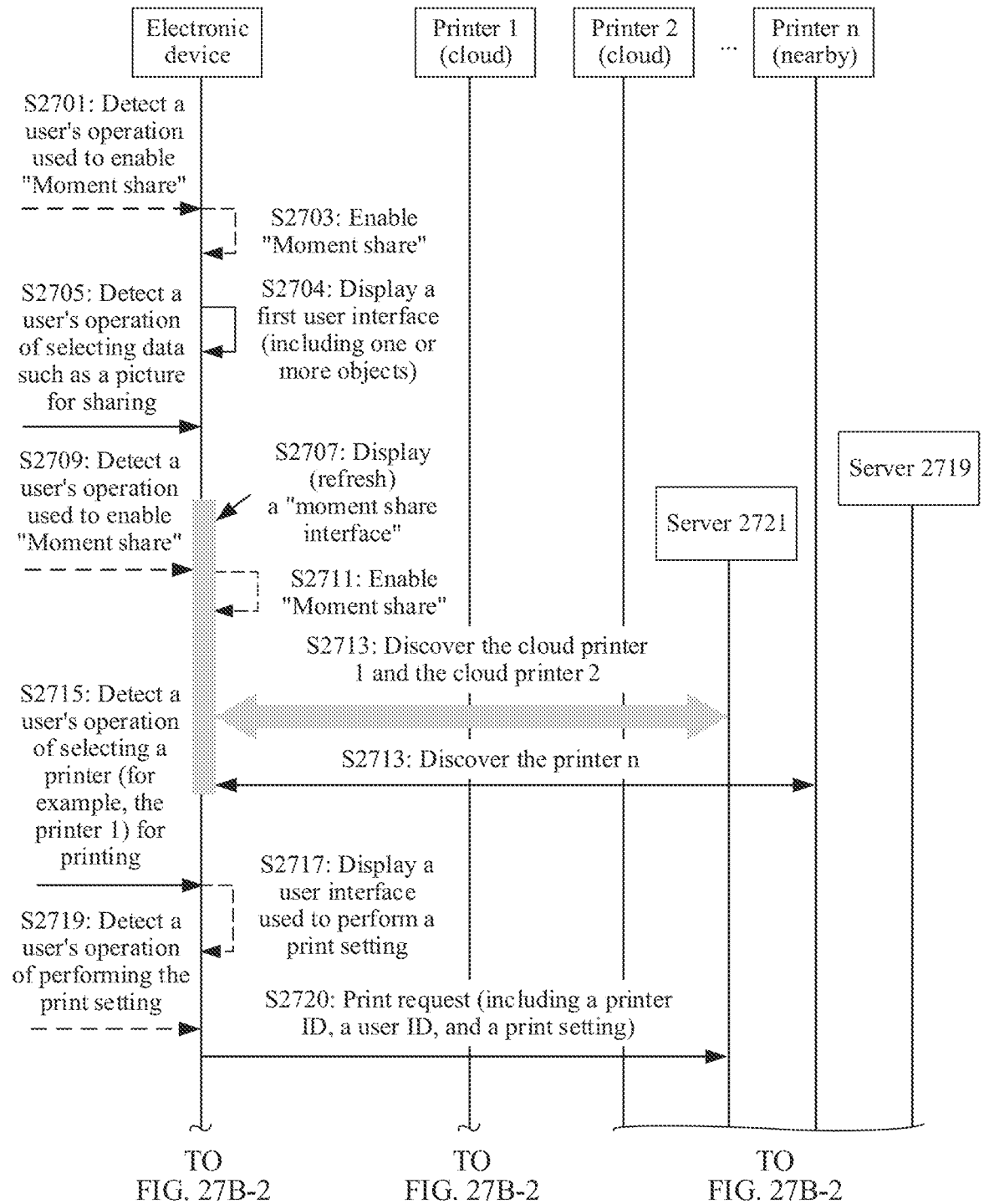
Figures 2, 27B:
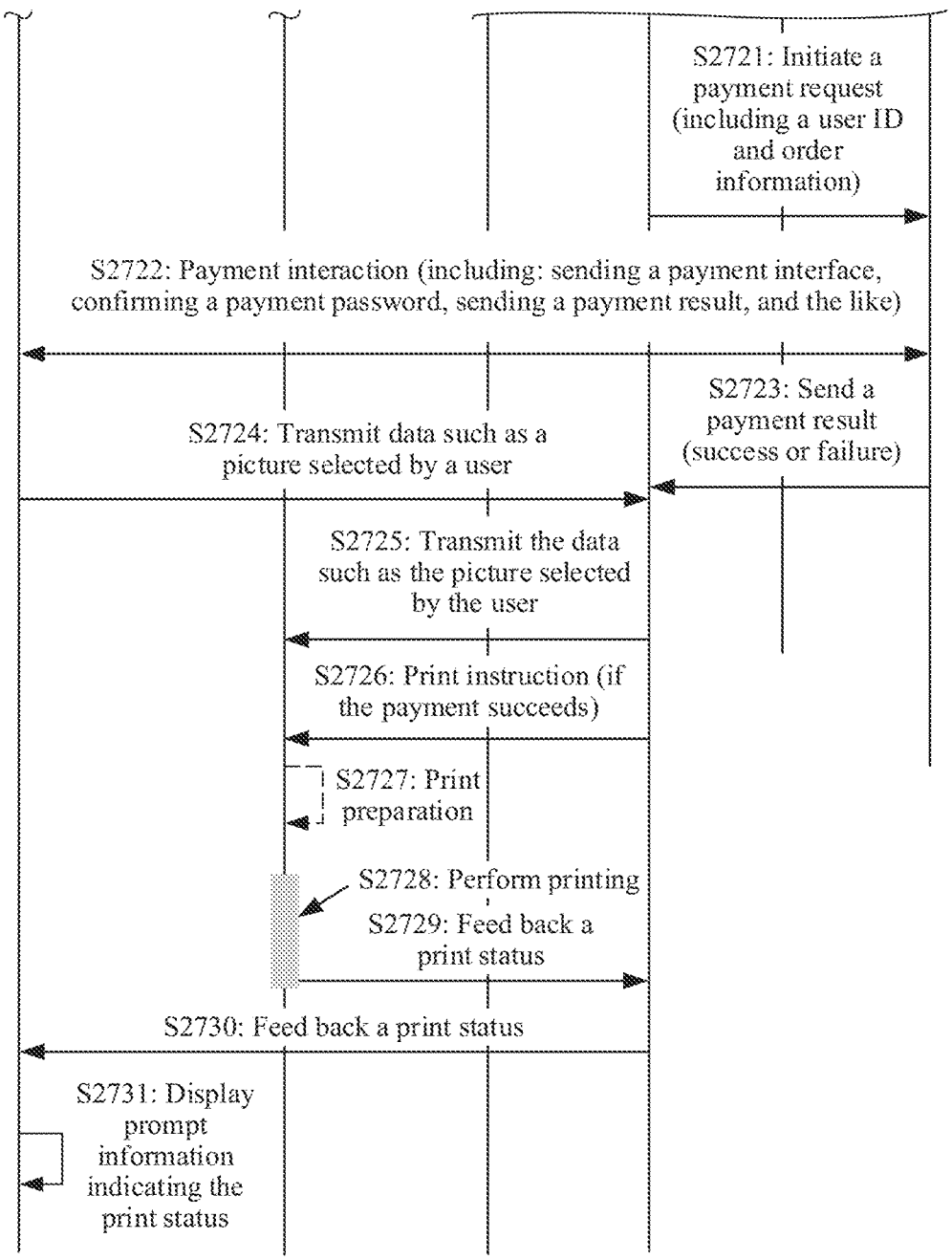

Method Embodiment in FIG. 27B-1 and FIG. 27B-2

In the method embodiment in FIG. 27B-1 and FIG. 27B-2, "Moment share" may be used to support the user in sharing data with a device near the electronic device, for example, a nearby printer, or may be used to support the user in sharing data with a cloud device, for example, a cloud printer. In an embodiment, enabling "Moment share" may be enabling cellular mobile data, a WLAN, and Bluetooth, or may be enabling cellular mobile data and a WLAN, or may be enabling cellular mobile data and Bluetooth, or may be enabling a WLAN and Bluetooth. After enabling "Moment share", the electronic device may discover the device near the electronic device by using one or more technologies such as Bluetooth, Wi-Fi direct (such as Wi-Fi P2P), Wi-Fi SoftAP, and a Wi-Fi LAN, or may discover the cloud device by using a cellular mobile communications network technology or a WAN communications technology.

The method embodiment in FIG. 27B-1 and FIG. 27B-2 corresponds to the embodiments shown as the examples in FIG. 6A to FIG. 6J or the embodiments shown as the examples in FIG. 7A to FIG. 7C. For example, the user interface displayed by the electronic device in the method embodiment in FIG. 27B-1 and FIG. 27B-2 may be each user interface described in the embodiments shown as the examples in FIG. 6A to FIG. 6J or the embodiments shown as the examples in FIG. 7A to FIG. 7C.

A communications system 2700 for data sharing is first described.

As shown in an example in FIG. 27A-1 and FIG. 27A-2, the communications system 2700 may include a server 2715, a server 2717, an electronic device 2701, a mobile phone 2731, and one or more printers, such as a printer 2703, a printer 2705, a printer 2707, and a printer 2709, and the communications system may further include a server 2719, a server 2721, a printer 2723, a printer 2725, and a printer 2727.

The server 2715 may be a server that provides one or more services such as a cloud printing service, a cloud projection service, or a cloud screen mirroring service. The server 2715 may be configured to control a printer connected to the server 2715 to provide a print service, may be configured to control a projector connected to the server 2715 to provide a projection service, may be configured to control a display connected to the server 2715 to provide a screen mirroring service, or may be configured to control a media playback device or the like connected to the server 2715 to provide a media data playback service. The server 2717 may be configured to provide a payment settlement service between the user and a print service provider. For the server 2715, refer to the server 2615 in the communications system 2600 shown in FIG. 26A. For the server 2717, refer to the server 2617 in the communications system 2600 shown in FIG. 26A. Details are not described herein again.

The printer 2703 may be a printer with a Bluetooth (BT) module. The printer 2705 may be a printer with a WLAN module. The printer 2707 may be a printer with a Bluetooth (BT) module and a WLAN module. Same as the printer 2705, the printer 2709 may also be a printer with a WLAN module. For the printer 2703, refer to the printer 2603 in the communications system 2600 shown in FIG. 26A. For the printer 2705, refer to the printer 2605 in the communications system 2600 shown in FIG. 26A. For the printer 2707, refer to the printer 2607 in the communications system 2600 shown in FIG. 26A. For the printer 2709, refer to the printer 2609 in the communications system 2600 shown in FIG. 26A. Details are not described herein again.

The server 2721 may be a server of a cloud printing service provider, and is configured to control a cloud printer to provide a print service. The server 2719 may be configured to provide a payment settlement service between the user and the cloud printing service provider. The server 2719 may be a payment server of the cloud printing service provider, or may be a payment server of a third-party payment service provider. The server 2721 and the server 2719 may be connected by using a LAN or WAN communications technology, so that the server 2721 initiates payment to the server 2719, and the server 2719 sends a payment result to the server 2721. For details, refer to the related content in the method embodiment in FIG. 26B-1 and FIG. 26B-2. Details are not described herein again.

The electronic device 2701 may be the electronic device mentioned in the foregoing UI embodiments. For details, refer to the electronic device 2501 in the communications system 2500 shown in FIG. 25A. Details are not described herein again. The electronic device may be connected to the server 2719 by using a cellular mobile communications technology or a WAN communications technology, may discover a cloud printer by using the server 2719, and may communicate with the cloud printer by using the server 2719, for example, transmit data to the cloud printer and receive feedback from the cloud printer. The electronic device may be connected to the server 2721 by using a cellular mobile communications technology or a WAN communications technology, to facilitate payment interaction with the server 2721. For details, refer to the related content in the method embodiment in FIG. 26B-1 and FIG. 26B-2. Details are not described herein again.

The printer 2723 may be a printer with a WLAN module. The printer 2723 may be connected to the server 2721 by using a WAN communications technology, to communicate with the server 2721.

The printer 2725 may be a printer with a cellular mobile communications (such as 3G, LTE, or 5G) processing module. The printer 2725 may be connected to the server 2721 by using a cellular mobile communications (such as 3G, LTE, or 5G) technology, to communicate with the server 2721.

The printer 2727 may be a printer with a WLAN module and a cellular mobile communications (such as 3G, LTE, or 5G) processing module. The printer 2727 may be connected to the server 2721 by using a WAN communications technology and/or a cellular mobile communications (such as 3G, LTE, or 5G) technology, to communicate with the server 2721.

In some embodiments, the electronic device 2701 may discover the printer 2703 by using one or more Bluetooth communications technologies such as classic Bluetooth (Bluetooth 2.1) or Bluetooth low energy (BLE), establish a communication connection to the printer 2703, and may share data with the printer 2703 by using the one or more Bluetooth communications technologies such as classic Bluetooth (Bluetooth 2.1) or Bluetooth low energy (BLE).

In some embodiments, the electronic device 2701 may discover the nearby printer 2705 by using one or more WLAN communications technologies such as Wi-Fi direct or Wi-Fi SoftAP, establish a communication connection to the printer 2705, and may share data with the printer 2705 by using the one or more WLAN communications technologies such as Wi-Fi direct or Wi-Fi SoftAP.

In some embodiments, the electronic device 2701 may discover the printer 2707 by using one or more wireless communications technologies such as Bluetooth, Wi-Fi direct, or Wi-Fi SoftAP, establish a communication connection to the printer 2707, and may share data with the printer 2707 by using the one or more WLAN communications technologies such as Bluetooth, Wi-Fi direct, or Wi-Fi SoftAP.

In some embodiments, the electronic device 2701 may discover, by using a wireless communications technology, namely, a Wi-Fi LAN, the printer 2709 that is located in the same local area network (LAN) as the electronic device, and may share data with the printer 2709 by using the local area network (LAN).

In some embodiments, after the electronic device 2701 is connected to the server 2721 in a network, the server 2721 may provide the electronic device 2701 with a device list of cloud devices (such as the printer 2723, the printer 2725, and the printer 2727) connected to the server 2721, so that the electronic device 2701 can discover the cloud devices.

In some embodiments, the communications system 2700 may further include a cloud server 2713, and data such as a picture may be stored in the cloud server 2713. The electronic device 2701 may access the cloud server 2713, so that the user can use the electronic device 2701 to browse the data such as the picture stored in the cloud server 2713.

It may be understood that a structure shown in an embodiment does not constitute a limitation on the communications system 2700. In some other embodiments of this application, the communications system 2700 may include more or fewer devices than those shown in the figure. For example, in addition to the devices shown in FIG. 27A-1 and FIG. 27A-2, the communications system 2700 may further include a projector with one or more of a cellular mobile communications processing module, a Bluetooth (BT) module, and a WLAN module, a display with one or more of a cellular mobile communications processing module, a Bluetooth (BT) module, and a WLAN module, and another device with one or more of a cellular mobile communications processing module, a Bluetooth (BT) module, and a WLAN module, for example, a sound box, and may further include a mobile phone (for example, the mobile phone 2731), a tablet computer, a personal computer, and the like.

Second, based on the communications system 2700 shown in FIG. 27A-1 and FIG. 27A-2, the method embodiment in FIG. 27B-1 and FIG. 27B-2 is described in detail by using an example in which printing is performed by using the electronic device.

FIG. 27B-1 and FIG. 27B-2 show an overall procedure of still another data sharing method. As shown in FIG. 27B-1 and FIG. 27B-2, the method may include the following operations.

S2701: The electronic device may detect an operation used to enable "Moment share".

S2703: The electronic device may enable "Moment share" in response to the detected operation used to enable "Moment share". The operation may be the fifth operation. For details, refer to the related descriptions of the fifth operation in the foregoing content.

In an embodiment, enabling "Moment share" may be enabling cellular mobile data, a WLAN, and Bluetooth, or may be enabling cellular mobile data and a WLAN, or may be enabling cellular mobile data and Bluetooth, or may be enabling one or more of a WLAN or Bluetooth. After enabling "Moment share", the electronic device may discover the device near the electronic device by using one or more technologies such as Bluetooth, Wi-Fi direct (such as Wi-Fi P2P), Wi-Fi SoftAP, and a Wi-Fi LAN, or may discover the cloud device by using a cellular mobile communications network technology or a WAN communications technology.

S2704: The electronic device displays a first user interface.

For details, refer to S2504 in the method embodiment in FIG. 25B-1 and FIG. 25B-2. Details are not described herein again.

S2705: The electronic device may detect an operation of sharing a selected object.

For details, refer to S2505 in the method embodiment in FIG. 25B-1 and FIG. 25B-2. Details are not described herein again.

S2707: The electronic device may display a "moment share interface" in response to the detected first operation.

In some embodiments, for an embodiment of the "moment share interface", refer to the related descriptions of the "moment share interface" shown as an example in FIG. 6A to FIG. 6C. Details are not described herein again.

In some other embodiments, for an embodiment of the "moment share interface", refer to the related descriptions of the "moment share interface" shown as an example in FIG. 7A to FIG. 7C. Details are not described herein again.

S2709 and S2711: The electronic device may detect, in the "moment share interface", an operation used to enable "Moment share".

In one case, the "moment share interface" may be the "moment share interface" shown as an example in FIG. 6A to FIG. 6C. In this case, the operation is the fifth operation. For details, refer to the related descriptions of the fifth operation in the foregoing content. The fifth operation may be an operation performed on a first interactive element. For descriptions of the first interactive element, refer to the related descriptions in the foregoing content. Details are not described herein again. The electronic device may enable "Moment share" in response to the fifth operation.

In another case, the "moment share interface" may be the "moment share interface" shown as an example in FIG. 7A to FIG. 7C. In this case, "Moment share" may be classified into "local moment share" and "cloud moment share". Embodiments of S2709 and S2711 may be described below.

In some embodiments, the electronic device may detect, in the "moment share interface", an operation used to enable "local moment share". The operation is the sixth operation. For details, refer to the related descriptions of the sixth operation in the foregoing content. The electronic device may enable "local moment share" in response to the sixth operation. Enabling "local moment share" may be enabling one or more of Bluetooth or a WLAN.

In some embodiments, the electronic device may detect, in the "moment share interface", an operation used to enable "cloud moment share". The operation is the seventh operation. For details, refer to the related descriptions of the seventh operation in the foregoing content. The electronic device may enable "cloud moment share" in response to the detected seventh operation.

S2713: When "Moment share" is enabled, the electronic device may discover a nearby device and/or a cloud device.

Herein, the nearby device may include a nearby first device and a nearby second device. The cloud device may include a cloud first device. The cloud device may further include a cloud second device.

For an embodiment of discovering the nearby device (for example, a printer n) by the electronic device, refer to S2513 in the method embodiment in FIG. 25B-1 and FIG. 25B-2. Details are not described herein again.

An embodiment of discovering the cloud device (for example, a printer 1 or a printer 2) by the electronic device is described below.

In some embodiments, after the electronic device may be connected to a server of a cloud printing service provider in a network by using a cellular mobile communications technology or a WAN communications technology, the server may provide the electronic device with a device list of another device connected to the server, so that the electronic device can discover the another device, and the another device may be a cloud device discovered by the electronic device. For example, if the device list includes indication information of the printer 1 and the printer 2, for example, a network identifier (for example, an IP address), the electronic device can discover the printer 1 and the printer 2.

In addition, the electronic device may further discover the cloud device in another manner, for example, discover another device in a WAN according to a WAN discovery protocol. This is not limited in this application.

The electronic device may refresh the "moment share interface" when "Moment share" is enabled. Details are as follows:

In one case, the "moment share interface" may be the "moment share interface" shown as an example in FIG. 6A to FIG. 6C. In this case, the electronic device may refresh a third area in the "moment share interface". One or more of a device option and a user option may be displayed in the refreshed third area. The nearby device option corresponds to the nearby first device and/or the cloud first device discovered by the electronic device through "Moment share", and the nearby user option corresponds to the nearby second device and/or the cloud second device discovered by the electronic device through "Moment share".

For example, if the electronic device discovers the printer 1, the printer 2, . . . , and the printer n, corresponding device options—a printer option corresponding to the printer 1, a printer option corresponding to the printer 2, . . . , and a printer option corresponding to the printer n may be displayed in the refreshed third area. The user can select, by using the printer option, the printer to print the selected object.

In another case, the "moment share interface" may be the "moment share interface" shown as an example in FIG. 7A to FIG. 7C. In this case, the electronic device may refresh a third area and a fourth area in the "moment share interface".

One or more of a nearby device option and a nearby user option may be displayed in the refreshed third area. The nearby device option corresponds to the nearby first device discovered by the electronic device through "Moment share", and the nearby user option corresponds to the nearby second device discovered by the electronic device through "Moment share".

Both a remote device option and a remote user option may be displayed in the refreshed fourth area. The cloud device option corresponds to the cloud first device discovered by the electronic device through "cloud moment share", and the cloud user option corresponds to the cloud second device discovered by the electronic device through "Moment share".

For example, if the electronic device discovers the printer 1, the printer 2, . . . , and the printer n, a printer option corresponding to the printer n may be displayed in the refreshed third area, and a printer option corresponding to the printer 1 and a printer option corresponding to the printer 2 may be displayed in the refreshed fourth area. The user can select, by using the printer option, the printer to print the selected object.

S2715 to S2728: Trigger, in response to a detected operation of selecting a nearby printer for printing, the printer selected by the user to print the object selected in the first operation. The printer option may include a nearby printer option and a cloud printer option.

For example, the operation of selecting the printer for printing may be an operation performed on the printer option.

In one case, the "moment share interface" may be the "moment share interface" shown as an example in FIG. 6A to FIG. 6C. In this case, the nearby printer option and the cloud printer option may be displayed in a third area in the "moment share interface".

In another case, the "moment share interface" may be the "moment share interface" shown as an example in FIG. 7A to FIG. 7C. In this case, the nearby printer option may be displayed in a third area in the "moment share interface", and the cloud printer option may be displayed in a fourth area in the "moment share interface".

In some embodiments, the electronic device may detect an operation that the user selects a nearby printer to perform printing. The operation may be an operation that is detected by the electronic device in the "moment share interface" and that is performed on a nearby printer option, for example, a touch operation performed on a nearby printer icon. The "moment share interface" may be the user interface 61 described in the embodiments shown as examples in FIG. 6A to FIG. 6C, or may be the user interface 71 described in the embodiments shown as examples in FIG. 7A to FIG. 7C.

For a manner in which the electronic device responds to the detected operation that the user selects the nearby printer to perform printing, refer to S2515 to S2531 in the method embodiment in FIG. 25B-1 and FIG. 25B-2. Details are not described herein again. If a fee needs to be paid for the nearby printer selected by the user, for a manner in which the electronic device responds to the detected operation, reference may be further made to S2615 to S2631 in the method embodiment in FIG. 26B-1 and FIG. 26B-2. Details are not described herein again.

A cloud printer is selected for printing.

In some other embodiments, the electronic device may detect an operation that the user selects the cloud printer to perform printing. The operation may be an operation that is detected by the electronic device in the "moment share interface" and that is performed on a cloud printer option, for example, a touch operation performed on a cloud printer icon. The "moment share interface" may be the user interface 61 described in the embodiments shown as examples in FIG. 6A to FIG. 6C, or may be the user interface 71 described in the embodiments shown as examples in FIG. 7A to FIG. 7C.

The electronic device may provide the following manners of responding to the detected operation that the user selects the cloud printer (for example, a printer 1) to perform printing.

Manner 1: The electronic device may first display, in response to the detected operation (for example, a touch operation performed on an icon of the printer 1) performed on a device option corresponding to the cloud printer (for example, the printer 1), a user interface used by the user to perform a print setting. For details, refer to S2717. In response to a detected operation of performing a print setting, the electronic device may determine, as a print setting corresponding to data such as a picture selected by the user, the print setting (such as a color or a paper size) selected by the user. For details, refer to S2719. Then, the electronic device may trigger the cloud printer (for example, the printer 1) to print, based on the print setting selected by the user, the data such as the picture selected by the user. For details, refer to S2720 to S2728.

For an embodiment of the user interface used by the user to perform the print setting, refer to the user interface 43 shown in FIG. 4D. Details are not described herein again.

Manner 2: The electronic device may trigger, in response to the detected operation (for example, a touch operation performed on a printer icon) performed on a device option corresponding to the cloud printer (for example, the printer 1), the cloud printer (for example, the printer 1) selected by the user to print, based on a default print setting, a picture selected by the user. For details, refer to S2720 to S2728. For example, a default quantity of to-be-printed copies is 1, a default paper size is A4, and a default print color is black and white.

It can be learned that in Manner 2, when the user triggers printing, a print service based on the default print setting may be provided, and the user does not need to perform the print setting, so that a quantity of operations can be reduced.

Different from triggering the nearby printer to perform printing, if the printer (for example, the printer 1) selected by the user is the cloud printer, as shown in FIG. 27B-1 and FIG. 27B-2, the printer may wait for a print instruction from the server 2721 in the communications system 2700 shown as an example in FIG. 27A-1 and FIG. 27A-2 before performing printing. After determining that the user successfully pays a print fee, the server 2721 may send the print instruction to the cloud printer. A process may include but is not limited to the following operations.

S2720: The electronic device may send a print request to the server 2721 in the communications system 2700 shown as example in FIG. 27A-1 and FIG. 27A-2. The print request may be used to request the cloud printer selected by the user to print data such as a picture selected by the user.

In some embodiments, the print request may carry a printer option, identification information of the user, and indication information indicating a print setting corresponding to data such as a picture selected by the user. The printer option may be a device identifier of the printer, or may be a network identifier of the printer, for example, an IP address. The identification information of the user may be information that can be used to uniquely identify a user identity, such as an international mobile subscriber identity (IMSI). This is not limited in this application. The print setting may be used to determine a print fee. The print setting may be selected and set by the user in a user interface (for example, the user interface 43 shown as an example in FIG. 4D) used to perform the print setting, or may be a default print setting.

S2721: After receiving the print request of the user that is reported by the printer, the server 2721 may initiate a payment request to the server 2719 in the communications system 2700 shown as an example in FIG. 27A-1 and FIG. 27A-2. The payment request may carry identification information of the user and order information. For example, the order information may include a print fee that needs to be paid by the user, for example, "¥12.00". The order information may further include identification information of a payee, and the like.

S2722: After receiving the payment request initiated by the server 2721, the server 2719 may perform payment interaction with the electronic device. For an embodiment of the payment interaction, refer to the related content in the method embodiment in FIG. 26B-1 and FIG. 26B-2. Details are not described herein again.

S2723: After the payment is completed, the server 2719 may feed back a payment result to the server 2721.

S2724 to S2726: After determining that the user successfully pays the print fee, the electronic device may transmit the data such as the picture selected by the user to the server 2721. Correspondingly, the server 2721 may transmit the data such as the picture from the electronic device to the cloud printer (for example, the printer 1) selected by the user, and may send, based on the printer option carried in the print request, the print instruction to the cloud printer selected by the user. The print instruction may carry the indication information indicating the print setting, to instruct the printer to perform printing based on the print setting.

S2728: After receiving the print instruction sent by the server 2721, the cloud printer (for example, the printer 1) selected by the user may print the data such as the picture selected by the user.

In some embodiments, the printer may perform printing based on the print setting corresponding to the data such as the picture. The print setting corresponding to the data such as the picture may be carried in the print request sent by the electronic device. The print setting may be selected and set by the user in the user interface (for example, the user interface 43 shown as an example in FIG. 4D) used to perform the print setting, or may be a default print setting of the electronic device. In some other embodiments, the printer may print the data such as the picture based on a default printer setting on a printer side.

In some embodiments, the cloud printer may print data while receiving the data from the server 2721 without waiting until all data is received before printing starts, and may delete the printed data in time. In this way, storage load of the cloud printer can be reduced, and print efficiency can also be improved.

In some embodiments, referring to S2527, after receiving the print instruction, the printer may perform print preparation. S2528 may be optional. The printer does not need to perform print preparation before performing each print task.

S2729 to S2731: Feed back a print status.

In some embodiments, the printer may feed back, to the server 2721 in a data printing process, a print status of the data such as the picture selected by the user, and then the server 2721 may feed back the print status to the electronic device. Alternatively, the printer may feed back, to the server 2721 after data printing ends, a print status of the data such as the picture selected by the user, and then the server 2721 may feed back the print status to the electronic device.

In some embodiments, after receiving the print status fed back by the server 2721, the electronic device may display prompt information to prompt the user with the print status.

For descriptions of the print status, refer to S2533 to S2539 in the method embodiment in FIG. 25B-1 and FIG. 25B-2. Details are not described herein again.

It may be understood that for content that is not mentioned in the method embodiment in FIG. 26B-1 and FIG. 26B-2, reference may be made to the embodiments shown as examples in FIG. 6A to FIG. 6J, the embodiments shown as examples in FIG. 7A to FIG. 7C, and the related extensions, or reference may be made to the method embodiment in FIG. 25B-1 and FIG. 25B-2 and the method embodiment in FIG. 26B-1 and FIG. 26B-2. Details are not described herein again.

According to the method embodiment in FIG. 26B-1 and FIG. 26B-2, when identifying the scenario in which the user shares the picture, the electronic device may automatically discover the nearby printer and/or the cloud printer, and intuitively present, to the user, the nearby printer and/or the cloud printer discovered by the electronic device, so that the user taps the nearby printer option or the cloud printer option (for example, the icon) to trigger the nearby printer or the cloud printer to print the picture selected by the user, and user experience is intuitive and simple.

Similar to the method for printing the data by using the cloud printer discovered by the electronic device that is shown in FIG. 27B-1 and FIG. 27B-2, in a method for projecting data by using a cloud projector discovered by the electronic device, the electronic device may discover the cloud projector in a manner of discovering the cloud printer, and then the electronic device may trigger, in response to an operation that is detected in the "moment share interface" and that is of selecting the cloud projector to project data such as a picture selected by the user, the cloud projector to perform projection. A difference lies in that to trigger the cloud projector to perform projection, the electronic device sends a projection request instead of the print request to the server 2721. The projector may perform projection according to a projection instruction sent by the server 2721.

Similar to the method for printing the data by using the cloud printer discovered by the electronic device that is shown in FIG. 27B-1 and FIG. 27B-2, in a method for performing screen mirroring on data by using a cloud display discovered by the electronic device, the electronic device may discover the cloud display in a manner of discovering the cloud printer, and then the electronic device may trigger, in response to an operation that is detected in the "moment share interface" and that is of selecting the cloud display to perform screen mirroring on data such as a picture selected by the user, the cloud display to perform displaying. A difference lies in that to trigger the cloud display to perform displaying, the electronic device sends a display request instead of the print request to the server 2721. The display may perform displaying according to a display instruction sent by the server 2721.

In addition, a method for playing data by using a cloud multimedia device and the like may be similar to the method for printing the data by using the cloud printer that is shown in FIG. 27B-1 and FIG. 27B-2. Details are not described again.

According to the context, the term "when" used in the foregoing embodiments may be interpreted as a meaning of "if" or "after" or "in response to determining" or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

One of ordinary skilled in the art may understand that all or some of the procedures of the methods in the embodiments may be implemented by a computer program instructing related hardware. The program may be stored in a computer readable storage medium. When the program is executed, the procedures of the methods in the embodiments may be included. The foregoing storage medium includes any medium that can store program code, such as a ROM, a random access memory RAM, a magnetic disk, or an optical disc.

What is claimed is:

1. An electronic device, comprising:
   a touchscreen;
   one or more processors coupled to the touchscreen; and
   a memory coupled to the one or more processors and storing instructions which, when executed by the one or more processors, cause the electronic device to:
   display a first user interface on the touchscreen which comprises a first area, a second area, and a third area;
   display a selected image in the first area;
   display a user option and a device option in the second area;
   display a service option in the third area, wherein the user option corresponds to a smartphone discovered by the electronic device, wherein the device option corresponds to a printer discovered by the electronic device, and wherein the service option corresponds to an application used to share the image;
   detect a second touch operation on the device option;
   display a printing preview interface in response to detecting the second touch operation, wherein the printing preview interface comprises a thumbnail of the image and a second icon;
   detect a third touch operation on the second icon;
   display an authentication user interface used to verify a validity of the electronic device; and
   send the image to the printer when the authentication succeeds.

2. The electronic device of claim 1, further caused to: display the authentication user interface in response to detecting the third touch operation.

3. The electronic device of claim 1, further caused to: display the authentication user interface in response to receiving an authentication request from the printer, wherein the request indicates the electronic device to pay a print service fee.

4. The electronic device of claim 1, wherein the authentication user interface is a user interface for requesting the electronic device to pay a print service fee.

5. The electronic device of claim 1, further caused to: detect a fourth touch operation on the service option; trigger a process of sharing the image with a contact through the application in response to detecting the fourth touch operation.

6. The electronic device of claim 1, further caused to: display a user interface used to perform a print setting on the image, wherein the print setting comprises one or more of a quantity of to-be-printed copies, a paper size, or a print color.

7. The electronic device of claim 1, further caused to: display a first notification window, wherein prompt information used to indicate a print state status of printing the image by the printer displayed in the first notification window, wherein the first notification window is displayed in one or more of the following user interfaces: a home screen, the first user interface, a second user interface, or a lock screen.

8. A graphical user interface on an electronic device, wherein the electronic device has a touchscreen, a memory, and one or more processors, and the one or more processors are configured to execute instructions stored in the memory; and the graphical user interface is configured to:
- display a first user interface on the touchscreen which comprises a first area, a second area, and a third area;
- display a selected image in the first area;
- display a user option and a device option in the second area;
- display a service option in the third area, wherein the user option corresponds to a smartphone discovered by the electronic device, wherein the device option corresponds to a printer discovered by the electronic device, and wherein the service option corresponds to an application used to share the image;
- detect a second touch operation on the device option;
- display a printing preview interface in response to detecting the second touch operation, wherein the printing preview interface comprises a thumbnail of the image and a second icon;
- detect a third touch operation on the second icon;
- display an authentication user interface used to verify a validity of the electronic device;
- send the image to the printer when the authentication succeeds; and
- display a first notification window to prompt information used to indicate a print state status of printing the image by the printer, wherein the first notification window is displayed in one or more of a home screen, the first user interface, a second user interface, or a lock screen.

9. A non-transitory computer-readable storage medium storing one or more instructions which, when executed by an electronic device with a display and one or more processors, cause the electronic device to:
- display a first user interface on a touchscreen which comprises a first area, a second area and a third area;
- display a selected image in the first area;
- display a user option and a device option in the second area;
- display a service option in the third area; wherein the user option corresponds to a smartphone discovered by the electronic device, wherein the device option corresponds to a printer discovered by the electronic device, and wherein the service option corresponds to an application used to share the image;
- detect a second touch operation on the device option;
- display a printing preview interface in response to detecting the second touch operation, wherein the printing preview interface comprises a thumbnail of the image and a second icon;
- detect a third touch operation on the second icon;
- display an authentication user interface used to verify a validity of the electronic device; and
- send the image to the printer when the authentication succeeds.

10. The non-transitory computer-readable storage medium of claim 9, wherein the electronic device is further caused to:
display the authentication user interface in response to detecting the third touch operation.

11. The non-transitory computer-readable storage medium of claim 9, wherein the electronic device is further caused to:
display the authentication user interface in response to receiving an authentication request from the printer, wherein the request indicates the electronic device to pay a print service fee.

12. The non-transitory computer-readable storage medium of claim 9, wherein the authentication user interface is a user interface for requesting the electronic device to pay a print service fee.

13. The non-transitory computer-readable storage medium of claim 9, wherein the electronic device is further caused to:
detect a fourth touch operation on the service option;
trigger a process of sharing the image with a contact through the application in response to detecting the fourth touch operation.

14. The non-transitory computer-readable storage medium of claim 9, wherein the electronic device is further caused to:
display a user interface used to perform a print setting on the image, wherein the print setting comprises one or more of the following: a quantity of to-be-printed copies, a paper size, and a print color.

15. The non-transitory computer-readable storage medium of claim 9, wherein the electronic device is further caused to:
display a first notification window, wherein prompt information used to indicate a print state status of printing the image by the printer displayed in the first notification window, wherein the first notification window is displayed in one or more of the following user interfaces: a home screen, the first user interface, a second user interface, or a lock screen.

* * * * *